March 24, 1942.  R. M. CHENOWETH ET AL  2,277,208
DICTATING MACHINE
Filed Dec. 7, 1935  24 Sheets-Sheet 1
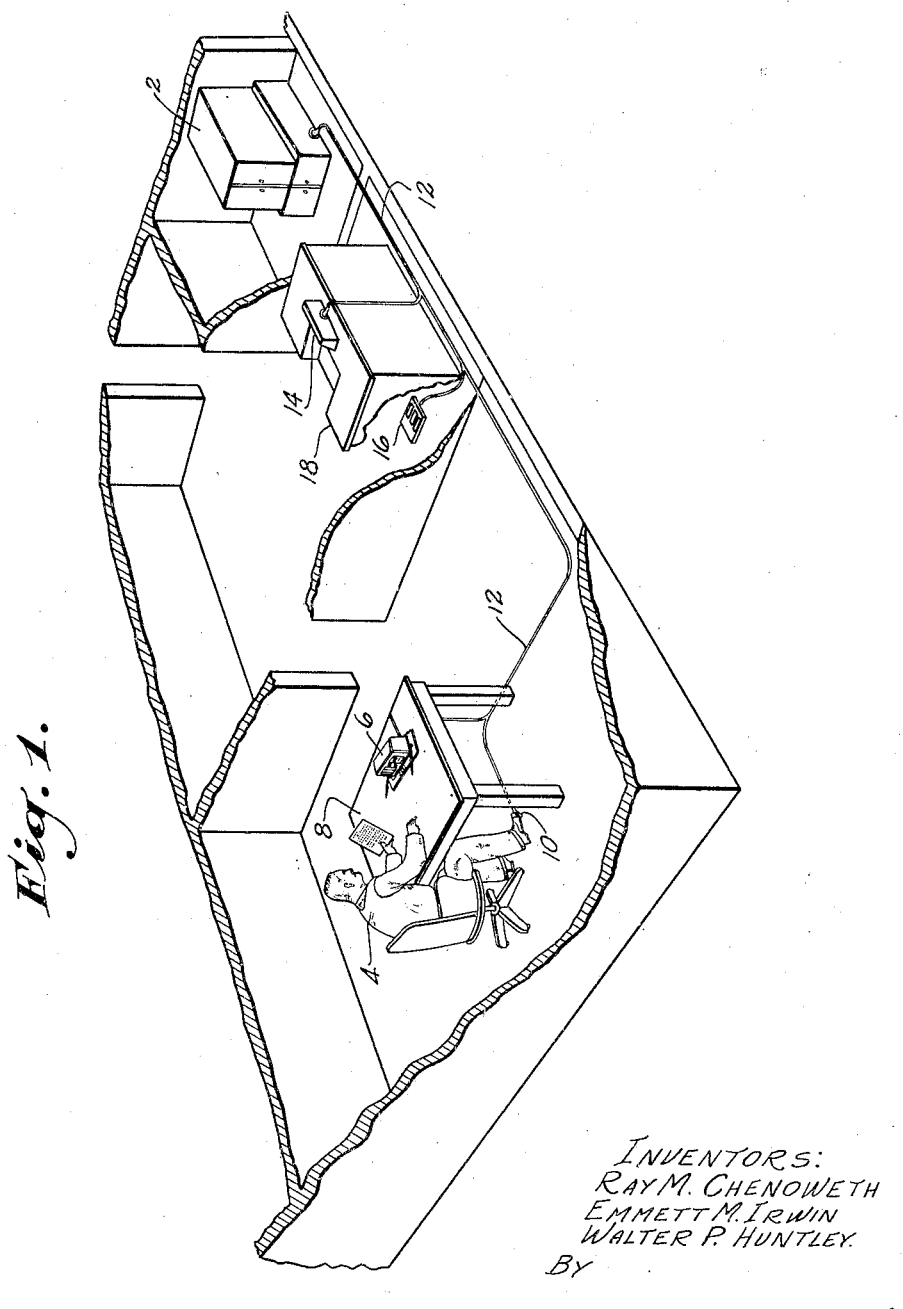
INVENTORS:
RAY M. CHENOWETH
EMMETT M. IRWIN
WALTER P. HUNTLEY.
BY
Robert M. McManigal
ATTORNEY.

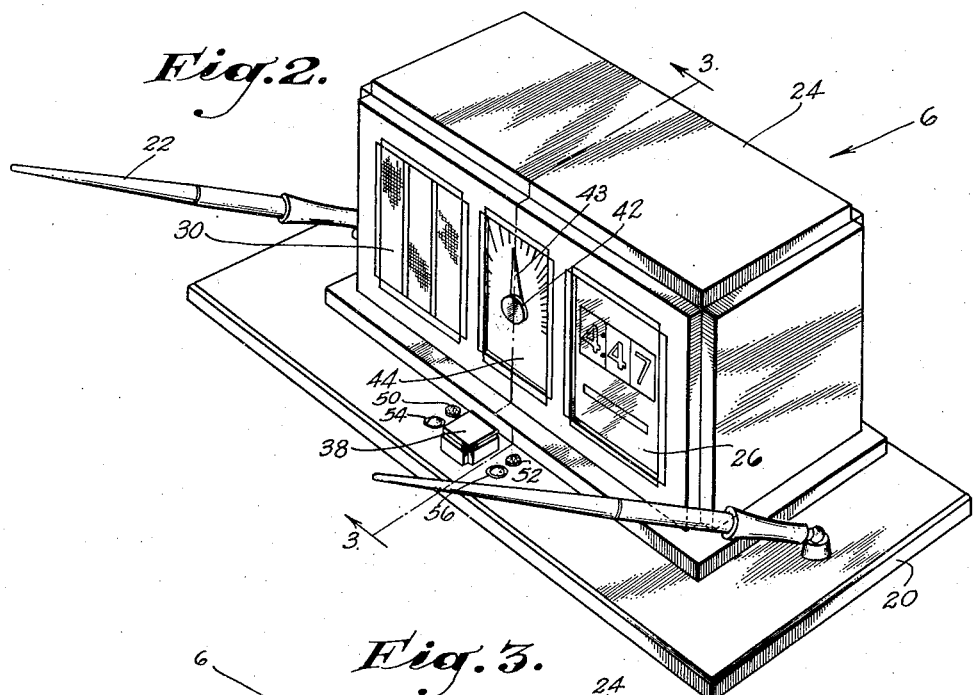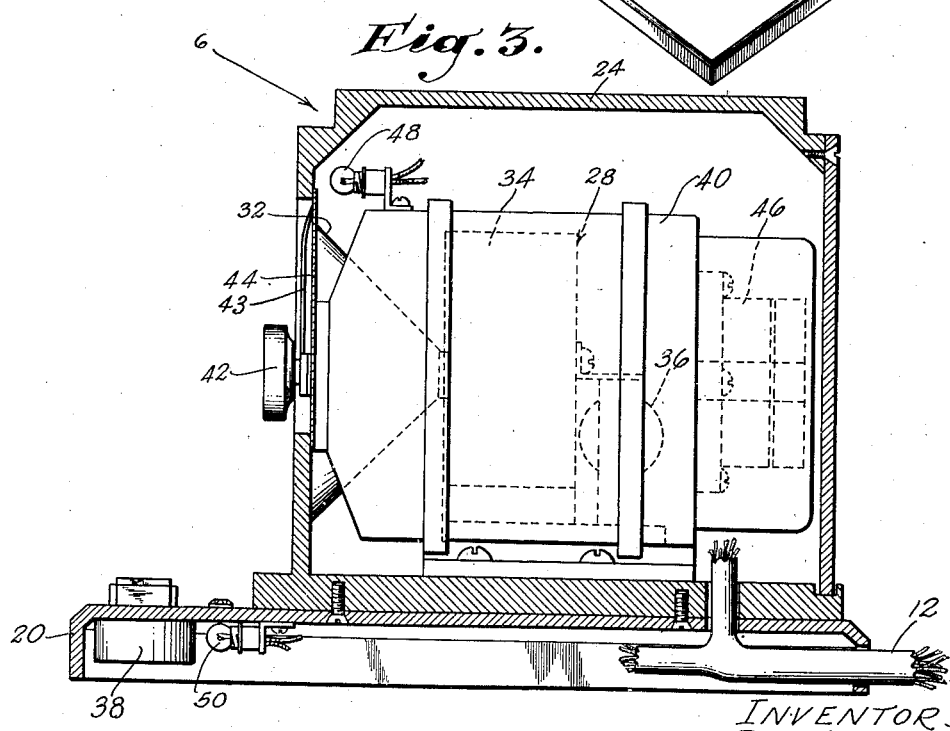

March 24, 1942. R. M. CHENOWETH ET AL 2,277,208
DICTATING MACHINE
Filed Dec. 7, 1935    24 Sheets-Sheet 3

INVENTORS:
RAY M. CHENOWETH
EMMETT M. IRWIN
WALTER P. HUNTLEY
BY Robert M. McManigal
ATTORNEY.

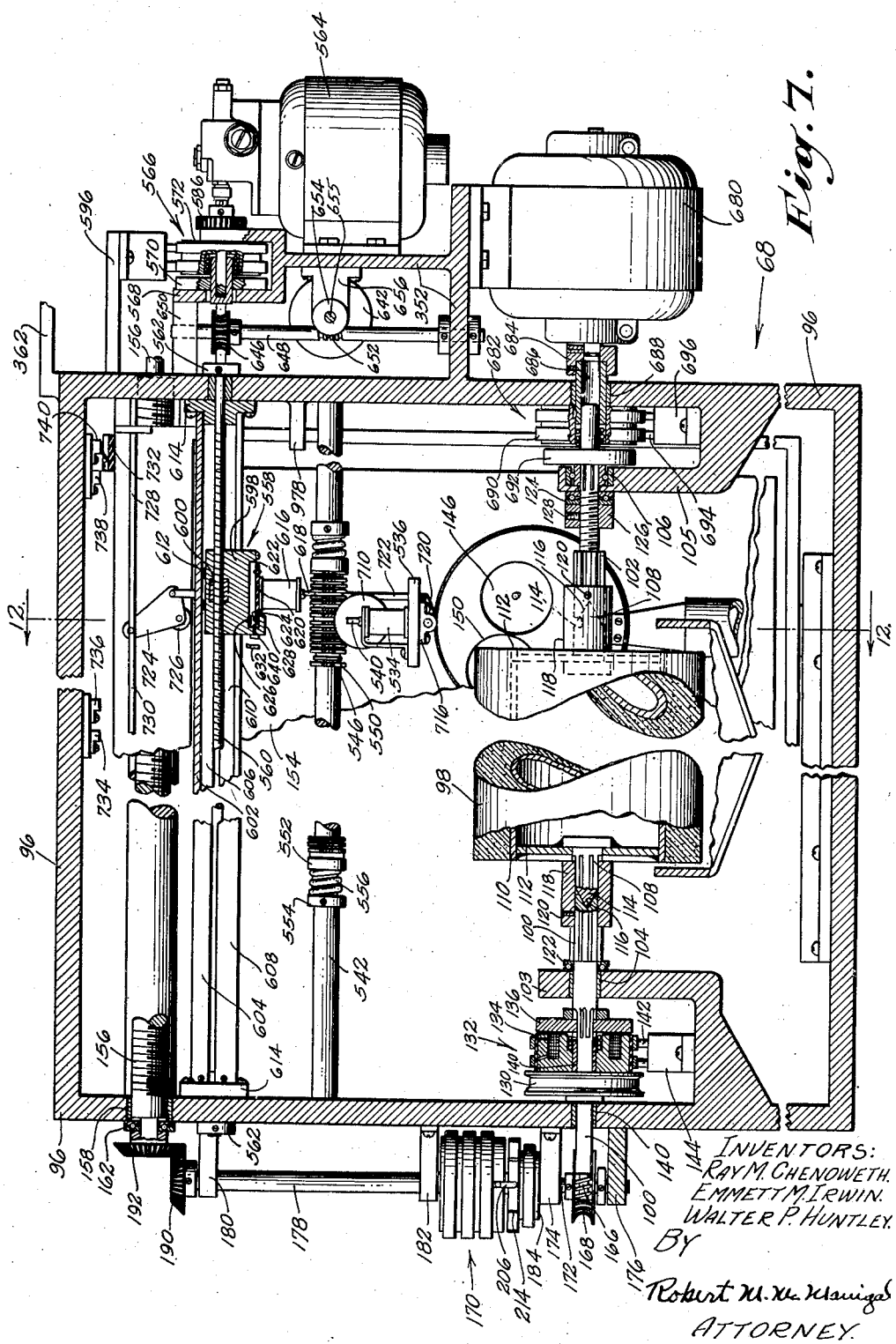

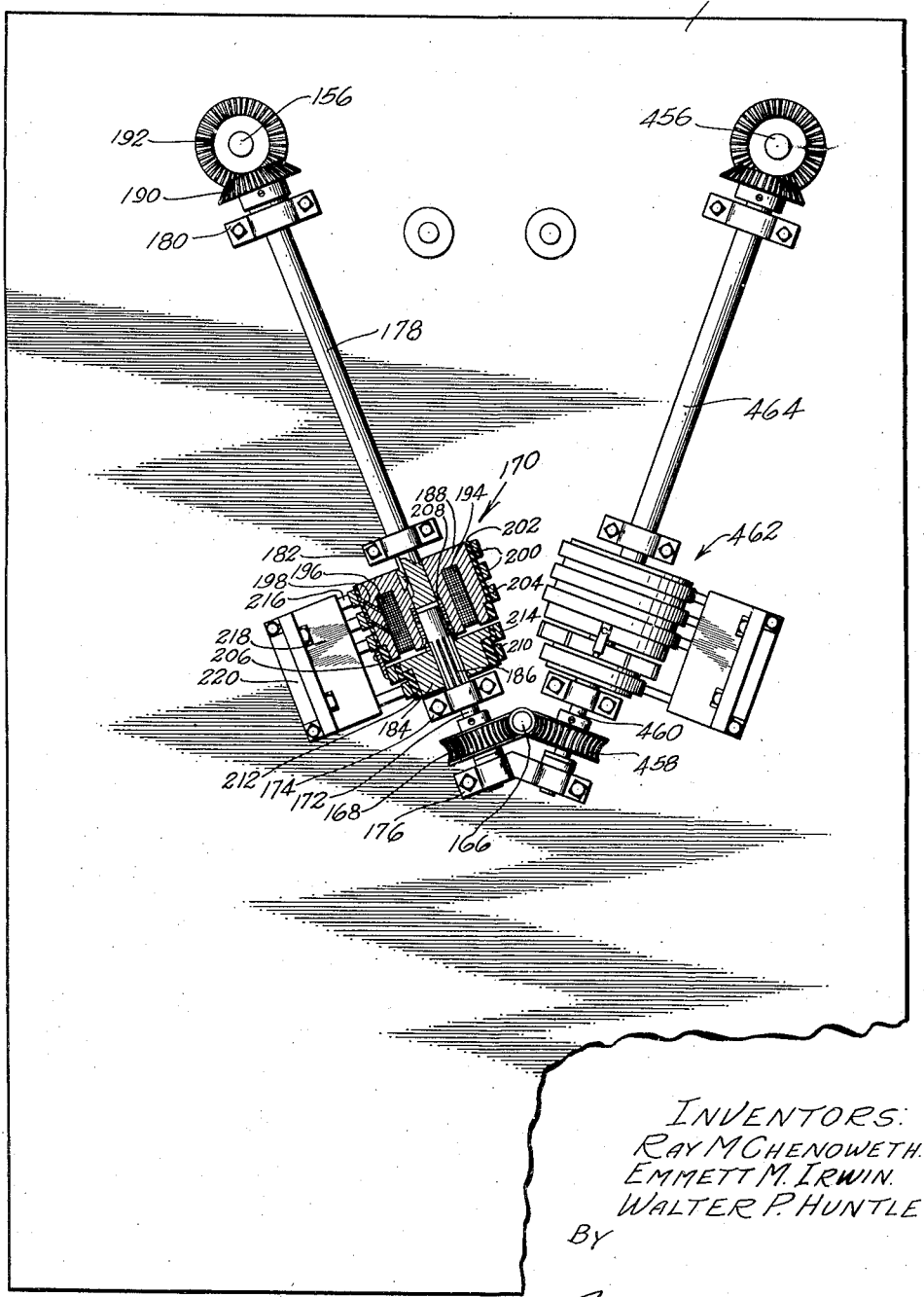

March 24, 1942. R. M. CHENOWETH ET AL 2,277,208
DICTATING MACHINE
Filed Dec. 7, 1935   24 Sheets—Sheet 6
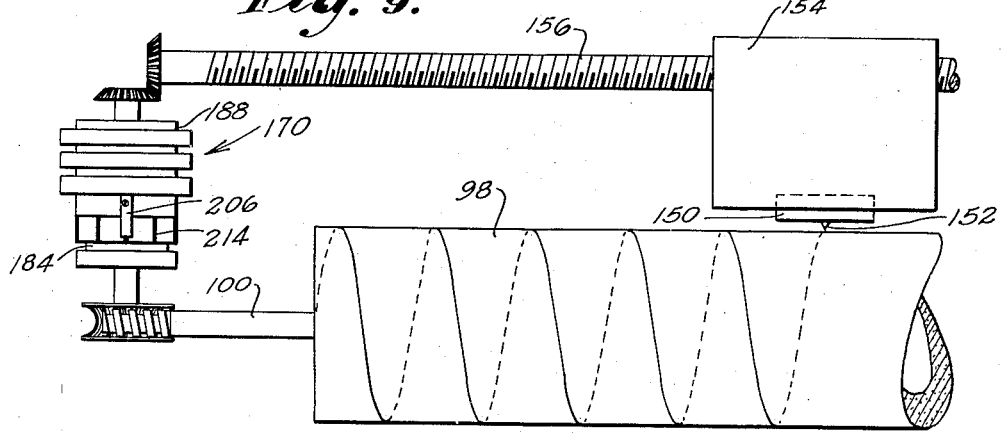
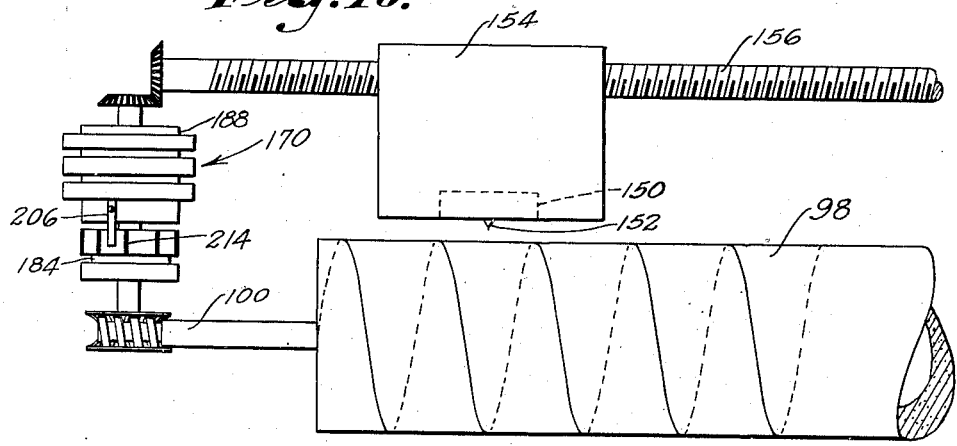
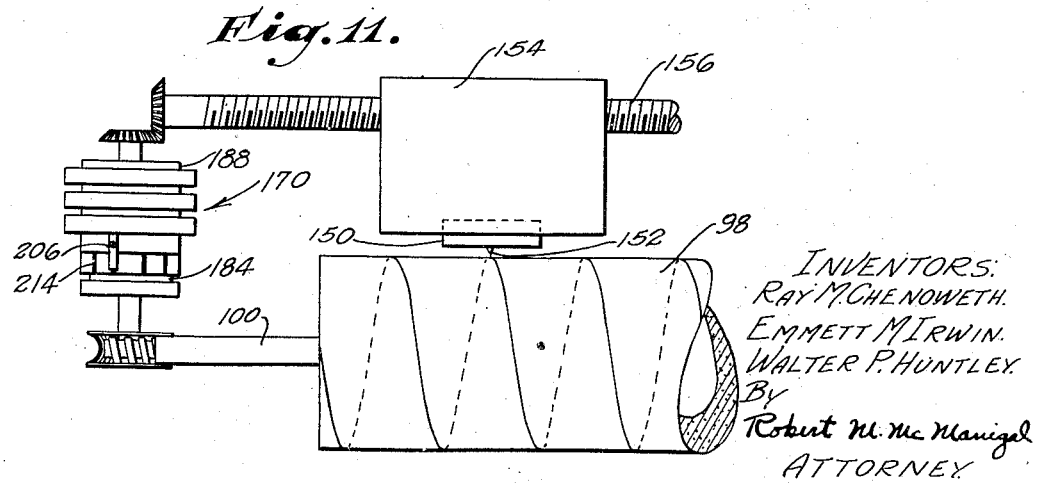
INVENTORS:
RAY M. CHENOWETH.
EMMETT M. IRWIN.
WALTER P. HUNTLEY.
BY Robert M. McManigal
ATTORNEY.

March 24, 1942.  R. M. CHENOWETH ET AL  2,277,208
DICTATING MACHINE
Filed Dec. 7, 1935  24 Sheets-Sheet 8

INVENTORS:
RAY M. CHENOWETH
EMMETT M. IRWIN
WALTER P. HUNTLEY
BY Robert M. McManigal
ATTORNEY.

March 24, 1942.  R. M. CHENOWETH ET AL  2,277,208
DICTATING MACHINE
Filed Dec. 7, 1935   24 Sheets-Sheet 9

INVENTORS:
RAY M. CHENOWETH.
EMMETT M. IRWIN.
WALTER P. HUNTLEY.
BY Robert M. McManigal
ATTORNEY.

March 24, 1942.    R. M. CHENOWETH ET AL    2,277,208
DICTATING MACHINE
Filed Dec. 7, 1935    24 Sheets-Sheet 11
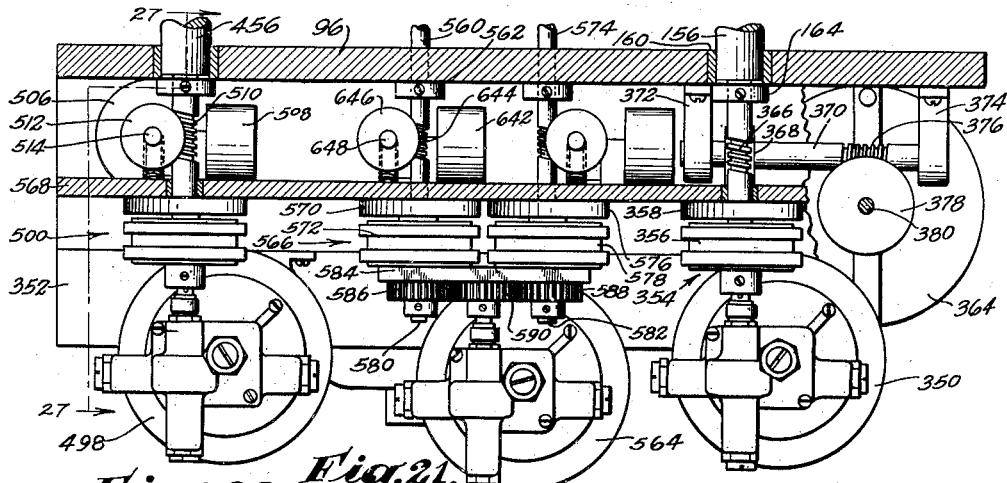
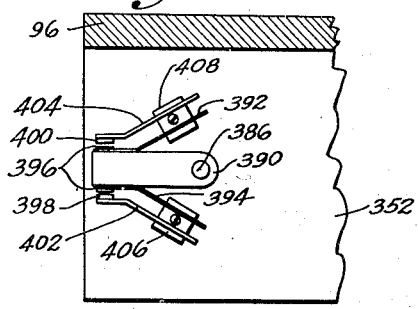
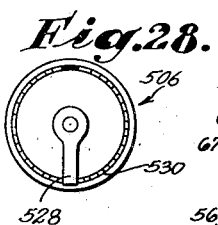
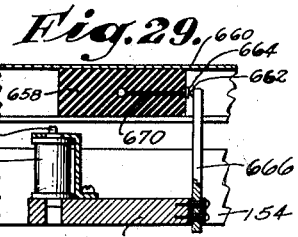
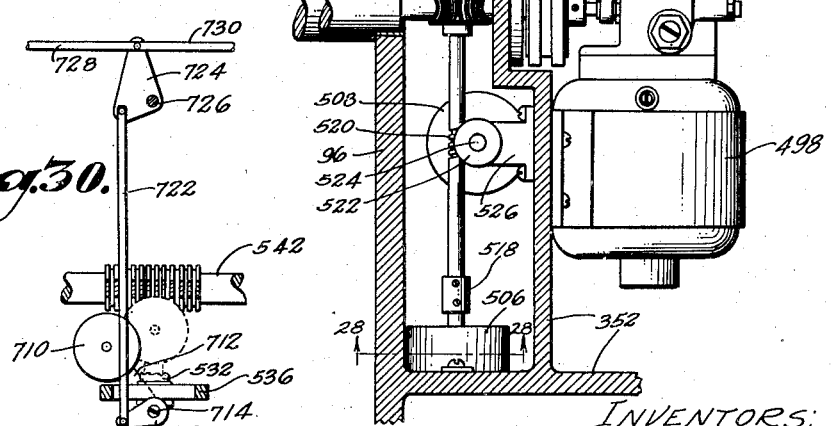
INVENTORS:
RAY M. CHENOWETH.
EMMETT M. IRWIN.
WALTER P. HUNTLEY.
BY Robert M. McManigal
ATTORNEY.

March 24, 1942. R. M. CHENOWETH ET AL 2,277,208
DICTATING MACHINE
Filed Dec. 7, 1935 24 Sheets-Sheet 12
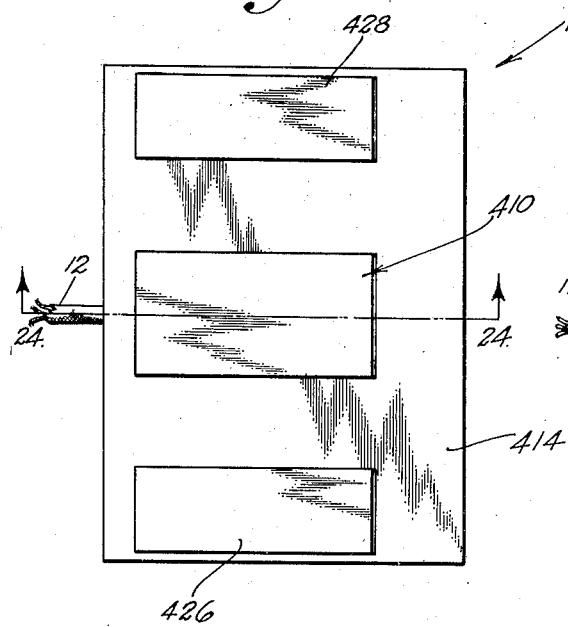
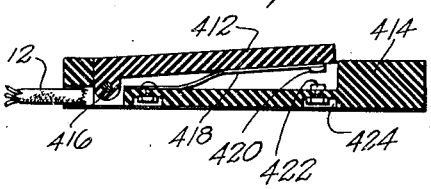
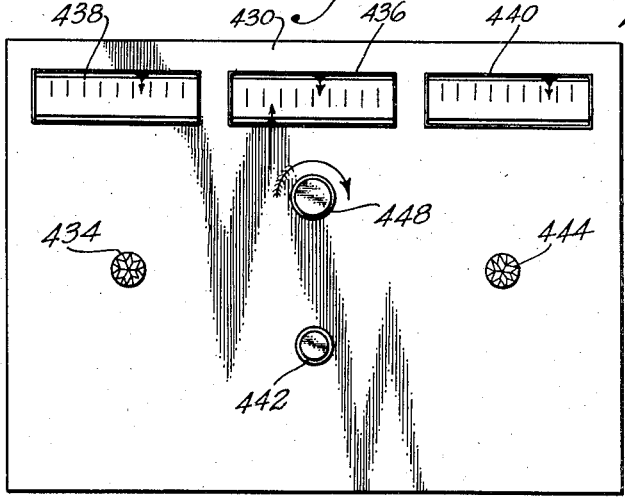
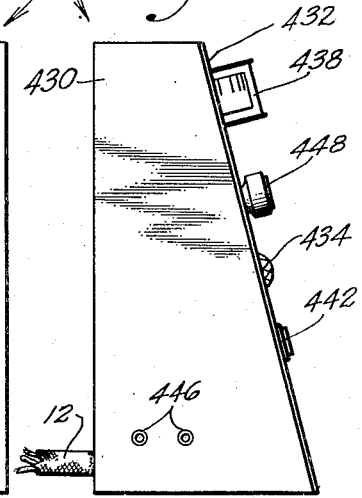
INVENTORS:
RAY M. CHENOWETH.
EMMETT M. IRWIN.
WALTER P. HUNTLEY.
BY Robert M. McManigal
ATTORNEY.

March 24, 1942.   R. M. CHENOWETH ET AL   2,277,208
DICTATING MACHINE
Filed Dec. 7, 1935    24 Sheets-Sheet 13
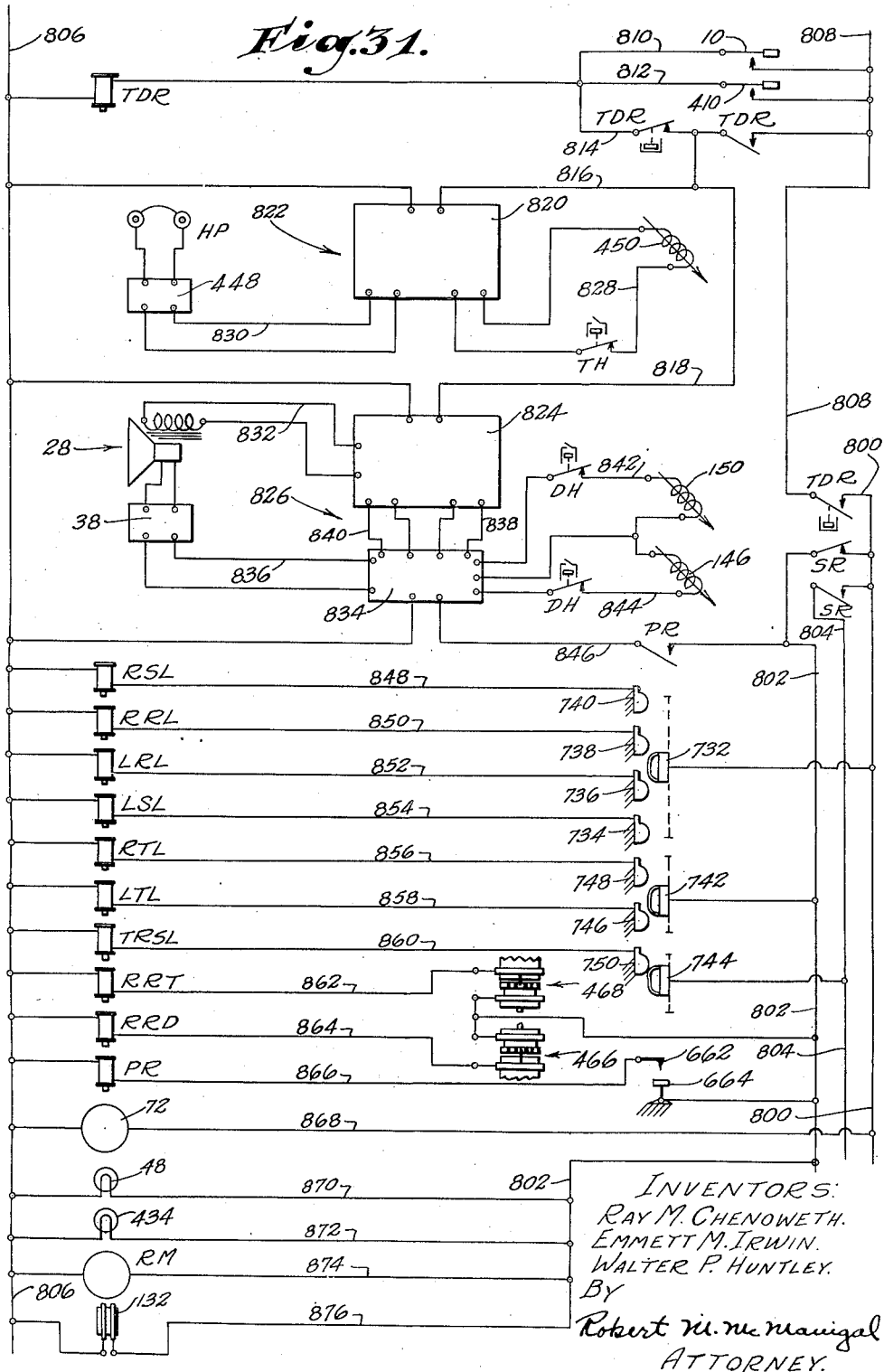

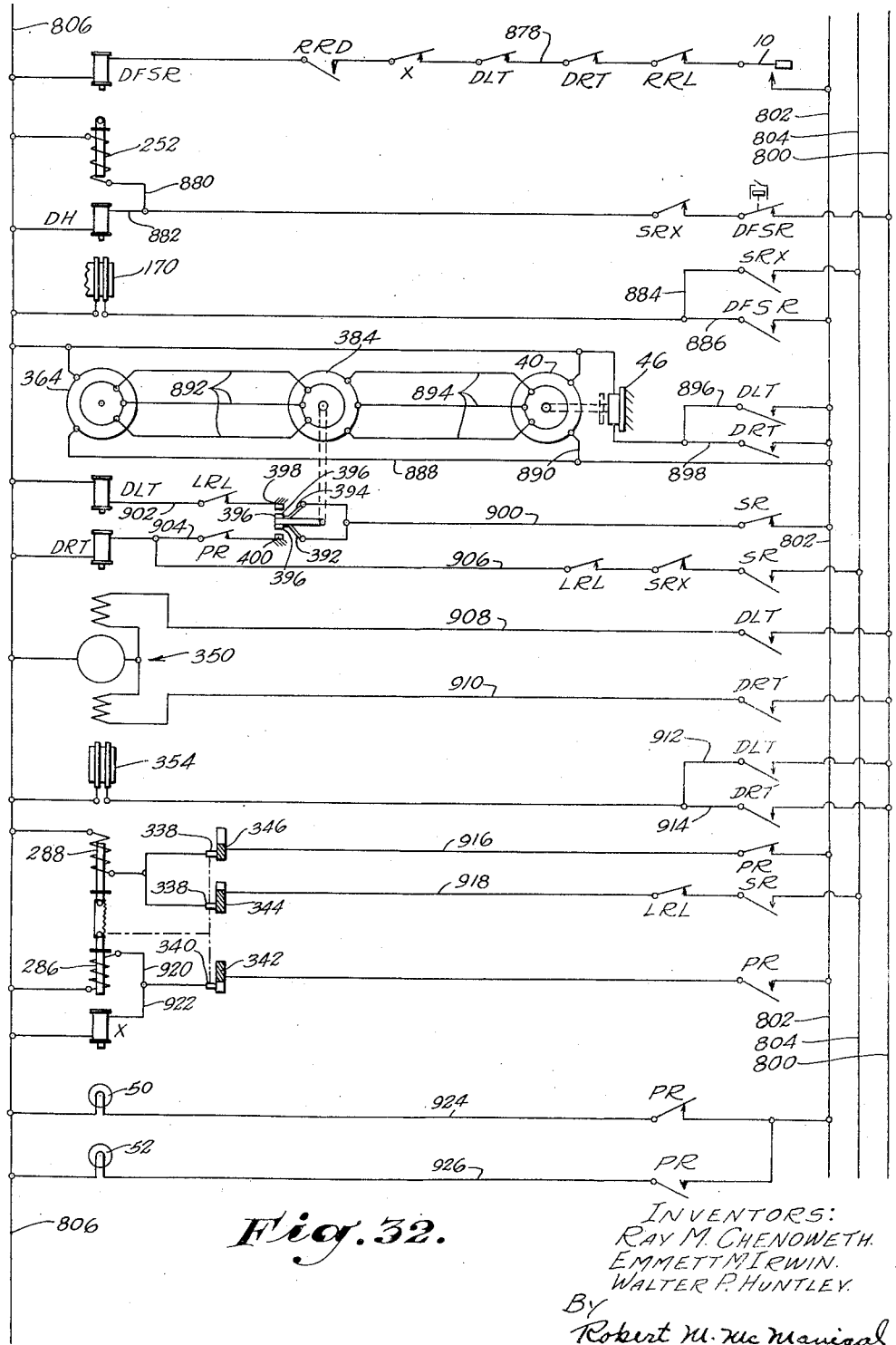

March 24, 1942. R. M. CHENOWETH ET AL 2,277,208
DICTATING MACHINE
Filed Dec. 7, 1935 24 Sheets-Sheet 17

INVENTORS:
RAY M. CHENOWETH.
EMMETT M. IRWIN.
WALTER P. HUNTLEY.
BY Robert M. McManigal
ATTORNEY.

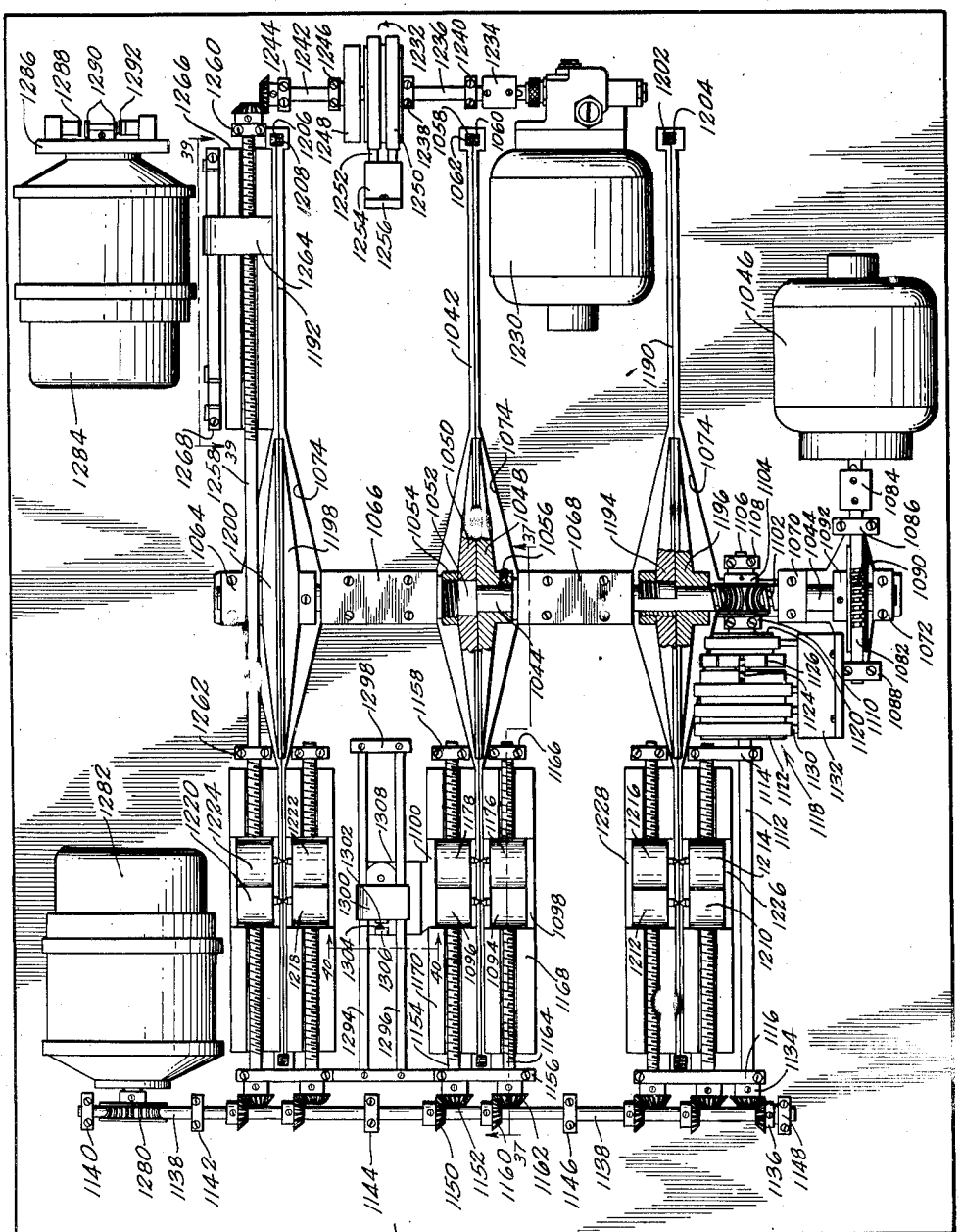

March 24, 1942.    R. M. CHENOWETH ET AL    2,277,208
DICTATING MACHINE
Filed Dec. 7, 1935    24 Sheets-Sheet 19
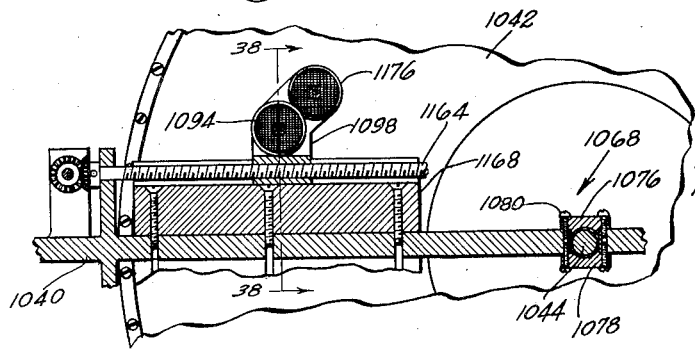
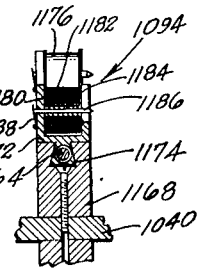
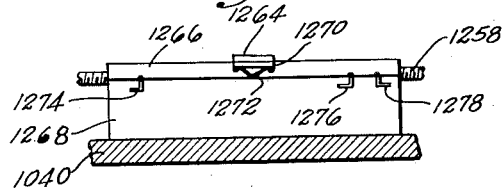
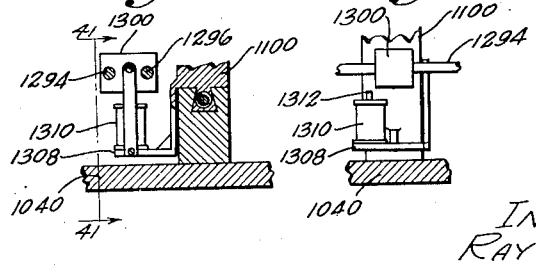
INVENTORS:
RAY M. CHENOWETH
EMMETT M. IRWIN
WALTER P. HUNTLEY
BY
Robert M. McManigal
ATTORNEY.

March 24, 1942. R. M. CHENOWETH ET AL 2,277,208
DICTATING MACHINE
Filed Dec. 7, 1935 24 Sheets—Sheet 20

INVENTORS:
RAY M. CHENOWETH.
EMMETT M. IRWIN.
WALTER P. HUNTLEY.
BY
Robert M. Mc Manigal
ATTORNEY.

March 24, 1942.  R. M. CHENOWETH ET AL  2,277,208
DICTATING MACHINE
Filed Dec. 7, 1935  24 Sheets-Sheet 24

INVENTOR:
RAY M. CHENOWETH.
EMMETT M. IRWIN.
WALTER P. HUNTLEY.
BY
Robert M. McManigal
ATTORNEY.

Patented Mar. 24, 1942

2,277,208

UNITED STATES PATENT OFFICE 2,277,208

DICTATING MACHINE

Ray M. Chenoweth, Los Angeles, and Emmett M. Irwin and Walter P. Huntley, Pasadena, Calif., assignors to C-W-B Development Co., Los Angeles, Calif., a corporation of California Application December 7, 1935, Serial No. 53,396

39 Claims. (Cl. 274—17)

Our invention relates broadly to a system for recording and reproducing sound which finds particular utility where transcription of such sounds is desired. It relates more particularly to devices for recording and reproducing dictation, conversation, testimony, etc. and finds particular utility in offices and like places.

The conventional dictating system requires the use of three units—a dictating machine, a transcribing machine and a shaving machine. The dictating machine is used by a dictating operator and after a record is completed it is removed and placed on a transcribing machine. At the time of the removal a slip on which certain "error" and "end of letter" indications have been made by the operator, is detached and sent with the record, where both the record and the "error" slip are placed in the proper position on the transcribing machine.

The recorded material is transcribed and the used record is removed from the transcribing machine and placed on the shaving machine where it is shaved and again may be used by the dictating operator in recording further dictation. Thus it is seen that a small office comprising a dictating and a transcribing operator must be provided with three machines—a dictating machine, a transcribing machine and a shaving machine.

The primary object of our invention is to provide a saving in expense and to improve the operation of an office by providing a dictating machine which performs all of the functions now accomplished by the aforementioned three machines.

Additional objects of our invention are to correct several well known defects which exist in the present dictating system. When using a commercial transcribing machine the machine must be placed adjacent to the transcribing operator so that she may manually perform the necessary control operations on the machine. Also in performing these operations it is necessary for the operator to remove her hands from the keyboard of the typewriter. This wastes considerable of the operator's time inasmuch as she has lost the proper position of her hands with respect to the typewriter keys as is used in the touch system of typing. It is also apparent that a system that requires considerable handling of records and "error" and "end of letter" slips is liable to considerable breakage of records and loss of time and accuracy resulting from the loss or transposition of the "error" and "end of letter" slips.

It is therefore an object of our invention to provide a dictating machine which may be used simultaneously by a plurality of operators.

It is also an object of our invention to provide a dictating machine which can be operated simultaneously for dictation, transcription and reconditioning of the recording medium. We prefer to accomplish this object by providing a dictating machine in which the recording medium rotates continuously and pauses in the dictation and transcription are accomplished by placing the recording and reproducing units in an inoperative condition.

It is an additional object to provide a remotely operated controlling system which may be readily adapted to operate a plurality of types of dictating machines which may utilize different principles of recording. We have therefore shown hereafter two forms of our dictating machine which utilize different principles of recording.

It is an object of this invention to provide a saving in expense in the operation of an office by providing a dictating machine which requires so little attention that it may be so located as to utilize the least valuable space.

In accordance with the preceding object, it is a further object of this invention to provide a dictating machine in which the records need not be removed when they are filled with dictation, but of such type that the record may be used many times before removal is necessary.

Another object of our invention is to provide a new and novel means whereby the recording medium may be reconditioned for further dictation without removing it from the machine.

It is a further object to provide a remotely controlled dictating machine which reduces the amount of work which must be performed by the dictating and the transcribing operators. We prefer to accomplish this object in a novel manner by making several of the functions automatic in their operation.

In accordance with the preceding object, it is an object to provide a new and novel single control means which may be situated remotely from a machine of this class and which is adapted to control by a single movement thereof the major operations on the machine.

It is an object of our invention to provide, among other things, the same facilities as are available in present day machines for indicating to the transcribing operator the location of pertinent portions of the recording.

We have therefore provided a novel means whereby the dictating operator may remotely register a condition so that the transcribing operator may later know that the dictating operator wishes to call her attention to a particular portion of the recording.

It is a further object of our invention to provide a remotely operated indicating means adjacent to the transcribing operator which enables the transcribing operator to see at a glance the precise location of the next portion of the recording that the dictator wishes to call to her particular attention, and to indicate in succession the location of said portions of the recording medium with respect to the portion which is being transcribed.

It is an additional object to provide the transcribing operator with improved indicating devices of a micrometer type which provide indications of high accuracy and which may be easily read.

It is also an object to provide a remotely controlled dictating machine which operates in such a manner as to record a sound track which is continuous and which has an essentially constant pitch, though the recording process may be interrupted for the purpose of reproducing material which has been previously recorded.

Another object is to provide a new and novel synchronizing means whereby it is impossible for the transcribing operator to inadvertently miss any of the recorded dictation.

Many defects exist in the conventional type of dictating machine which is adapted to record electrically. A major defect lies in the fact that the quality of recording and reproduction is very poor. This results from the fact that frequency distortion is introduced by the eccentricity of the surface of the recording medium during the recording and transcribing processes. In the present day machine, the recording medium is shaved on one mandrel and is then placed on another for recording, and placed on still another for transcribing. The recording medium is therefore in the majority of cases eccentric in different directions and to a varying degree on each of the recording and transcribing mandrels.

It is therefore an object of this invention to improve the quality of recording and reproduction by elimination of the aforementioned defects. We have eliminated these defects in two novel manners. In the first, we have provided means whereby the recording medium may be used many times without altering the surface thereof so that said medium will remain concentric indefinitely after a primary adjustment. In the second, we have provided means whereby the recording medium is maintained concentric despite the fact that the size thereof is reduced periodically by a surface reconditioning process.

In accordance with the preceding object, it is an additional object to provide a machine in which the recording medium is reconditioned on the same mandrel as is used for recording and reproducing.

It is an additional object of this invention to provide a dictating machine in which the recording, reproducing, and record reconditioning units are so guided during relative movement between said units and the recording medium that the operating members thereof may, when in operation, continually bear similar relationships to the recording medium.

It is therefore an object of our invention to provide a rigid method of mounting the recording and reproducing units in a rigid position relative to the recording medium when conditioned for recording or reproducing.

Other objects and advantages features of our invention will be set forth at length with the foregoing in the following description where we outline the forms of the invention which we have selected for illustration in the drawings accompanying and forming part of the present specifications. In the drawings we have shown two forms of our invention. It is to be understood, however, that we do not limit ourselves to such forms since the invention, as explained in the claims, may be embodied in a plurality of forms.

Referring to the drawings:

Fig. 1 is a view showing the general arrangement of equipment when using a dictating machine of our invention.

Fig. 2 is a view showing the appearance of a control panel which is employed with the dictating machine.

Fig. 3 is a section taken essentially on the line 3—3 of Fig. 2 showing the interior of the control panel.

Fig. 7 is a longitudinal section taken essentially on the line 7—7 of Fig. 4 showing the arrangement of a part of the recording and reproducing equipment.

Fig. 8 is an end view of the machine unit as it appears in Fig. 4 with certain portions sectioned to show additional details of construction.

Fig. 9 is a diagrammatic drawing illustrating one step in the operation of a synchronizing means of our invention.

Fig. 10 is a drawing similar to Fig. 9 but showing later steps in the operation of the synchronizing equipment.

Fig. 11 is a drawing similar to Fig. 9 but showing the final step in the operation of the synchronizing equipment.

Fig. 21 is a section taken essentially on the line 21—21 of Fig. 20 showing the arrangement of parts shown in Fig. 20.

Fig. 22 is a section taken essentially on the line 22—22 of Fig. 20 showing the construction of a differential switch of our invention.

Fig. 23 is a view showing the appearance of a foot control station of our invention for use by a transcribing operator.

Fig. 24 is a transverse section taken essentially on the line 24—24 of Fig. 23 showing the construction of the control devices forming part of the foot control station of our invention.

Fig. 25 is a view showing the appearance of an indicating panel of our invention.

Fig. 26 is an end view of the indicating panel shown in Fig. 25.

Fig. 27 is a section taken essentially on the line 27—27 of Fig. 21 showing the arrangement of part of the equipment cooperating with the transcriber's carriage device.

Fig. 28 is a section taken essentially on the line 28—28 of Fig. 27 showing the construction of a special potentiometer used with an indicating system of our invention.

Fig. 29 is a section taken essentially on the line 29—29 of Fig. 12 showing the construction of a position registering mechanism of our invention.

Fig. 30 is a view taken essentially as indicated by the line 30—30 of Fig. 12 showing the arrangement of parts comprising a condition removing means used with a remote marking system of our invention.

Fig. 31 is a wiring diagram showing the electrical connections for a part of the equipment.

Fig. 32 is a wiring diagram forming a continuation of Fig. 31.

Fig. 36 is a plan view of the machine unit shown in Fig. 35.

Fig. 37 is a section taken essentially on the line 37—37 of Fig. 36 showing the relative location of certain portions of the recording and reproducing equipment.

Fig. 38 is a section taken essentially on the line 38—38 of Fig. 37 showing the construction of a recording-reproducing unit used with the machine of our invention.

Fig. 39 is a section taken essentially on the line 39—39 of Fig. 36 showing the relation of parts forming a limit switch of our invention.

Fig. 40 is a section taken essentially on the line 40—40 of Fig. 36 showing the construction of a position registering device of our invention.

Fig. 41 is a section taken essentially on the line 41—41 of Fig. 40 showing the relative location of parts of the position registering mechanism.

Figure 4:
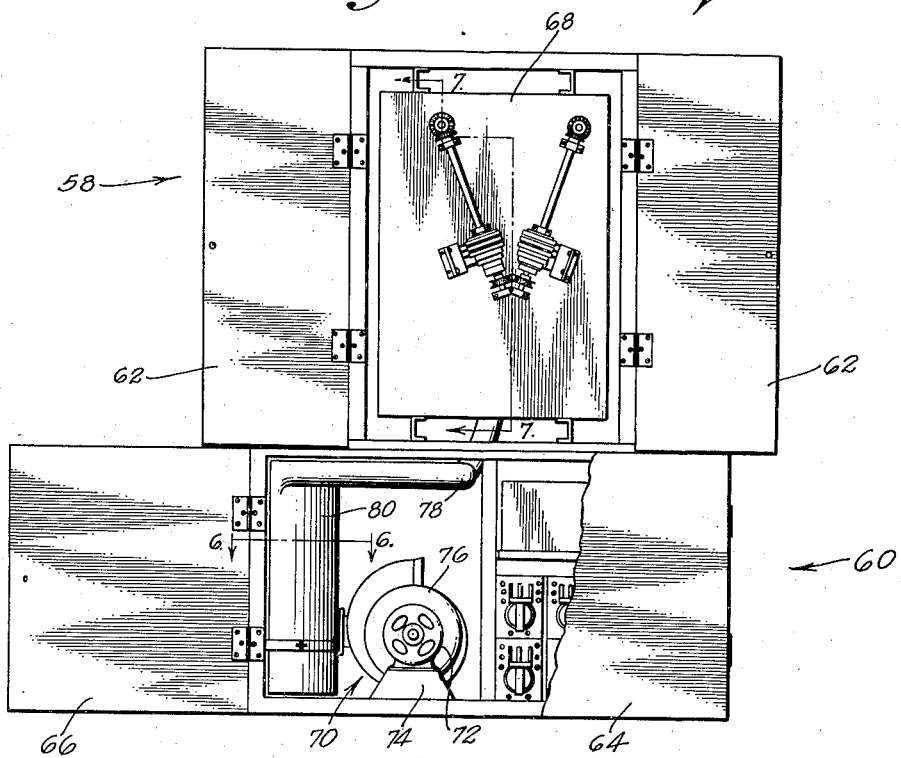
Fig. 4 is an elevation of one form of the dictating machine with some of the doors open to show the interior.

In accordance with the objects of our invention we have provided a recording station comprising a dictating machine indicated by numeral 2 in Figure 1 which is adapted to be remotely operated by a dictating operator and a transcribing operator so as to perform among other things the functions of a commercial dictating machine, a commercial transcribing machine and a record reconditioning machine.

The machine 2 may be located in the same room with the dictating operator 4 or the transcriber operator but is preferably located where it will utilize the least valuable space. In order that the machine 2 may be remotely operated by the dictating operator 4 or the transcribing operator, we have provided the dictating operator with a dictating station which includes an ornamental control panel 6 which may be located on the desk or table 8 of the operator 4 for convenience in manually operating such devices on the panel 6 and a foot switch 10 which is preferably placed underneath the desk or table 8 where it may be operated by the operator's foot. Both the control panel 6 and the foot switch 10 contain electrical devices which are connected to the machine 2 by a cable 12. In a like manner we have provided the transcribing operator with a transcribing station including a control panel 14 which may be utilized to remotely operate the transcribing portion of the machine 2.

The control panel 14 and a foot control panel 16, which is preferably placed beneath the desk 18 where it may be operated by the transcribing operator's foot, contain electrical devices which are also connected to the machine 2 as by the cable 12. It will be noted that the appearance of an office can be materially improved by removing conventional dictating machines, transscribing machines and shaving machines from the office and installing instead control panels of our invention which may be ornamented to conform to the furnishings of the office.

A further novel feature in moving machine 2 from the office of the operator 4 lies in the fact that the machine may be operated to take down statements, etc. without the dictator's knowledge. This is particularly advantageous in legal offices, where it is desired to record certain oral statements without obliging the dictator to dictate to a conventional dictating machine, or to have a stenographer present.

In addition to providing control for operating machine 2, the control panel 6 may form part of a desk set, which includes a base 20 and pens 22, Figures 2 and 3. Mounted on the base 20 is an ornamental housing 24, which provides a hollow interior in one end of which a clock 26 may be installed for convenience. We have located in the housing 24 certain of the devices which operate with the dictating machine 2. These devices include the necessary equipment for receiving the sound undulations of the dictator's voice for recording on a recording medium and the necessary equipment for reproducing the recorded dictation. The above equipment includes a sound responsive element which responds to the sound undulations and which translates the sound undulations into corresponding electric undulations, and a sound producing element which responds to electrical undulations for reproducing recorded dictation. We prefer to combine the sound responsive and sound producing elements into one device in the form of a dynamic loud-speaker 28 for convenience but it should be understood that separate devices may be used if desired.

The dynamic loud-speaker 28 is placed at the rear of a grill 30 in the housing 24 and is preferably small in size and of conventional construction. The dynamic speaker 28 includes a cone 32 to which is attached a voice coil (not shown) mounted for movement in a magnetic field created by an electro-magnet 34. When acting as a sound responsive element the cone 32 of the dynamic speaker 28 moves in response to the sound undulations and produces corresponding electric undulations in the voice coil in a well known manner. Electrical undulations are then transmitted over the cable 12 to the machine 2 for recording. Conversely when the dynamic speaker 28 is used as a sound producing device, electrical undulations transmitted from the machine 2 over the cable 12 are applied to the voice coil and move the cone 32 to produce sound undulations in a well known manner. A conventional output transformer 36 is located at the rear of the dynamic speaker 28 and is connected between the voice coil on the cone 32 and the wires of the cable 12 in a conventional manner. In order to adjust the response of the dynamic speaker 28 to various locations and various operators, means is provided adjacent to the operator 4 whereby the amount of power flowing between the wires of the cable 12 and the output transformer 36 may be regulated. This includes a T-pad 38 of conventional type which is located beneath the base 20 of the control panel 6, connected in the circuit in a conventional manner, such connection being more clearly shown in the wiring diagram.

As stated above, the control panel 6 also includes control means whereby the operator 4 may control the operation of the dictating machine 2. Such control includes means whereby the machine 2 may be placed in recording or reproducing conditions, and means whereby the machine may be operated to record or reproduce at various points on the recording medium. In accordance with the object of our invention we have combined the above control means in a single combination control and indicating device which comprises a self-synchronous device 40 located in the housing 24 of the control panel 6. The shaft of the self-synchronous device 40 extends through the front of the housing 24 and has attached thereto a knob 42 and pointer 43, which is arranged to move over a translucent indicating scale 44. We have also fitted the shaft of the receiving self-synchronous device 40 with a restraining or locking means comprising an electrical brake 46 of conventional construction which operates when energized to apply a slight braking action to the rotation of the rotor of said self-synchronous device. This braking action should be sufficient to prevent said rotor from rotating as a result of the torque developed by the windings of said self-synchronous device but should be light enough to allow the rotor to be readily rotated by hand through use of the control knob 42. We have shown the brake as being attached to the frame of the self-synchronous device 40 and mounted within the case, but it is to be understood that the brake may be mounted separately if so desired. The knob 42 and pointer 43, translucent dial 44, self-synchronous device 40 and the electric brake 46 cooperate to provide a combination indicating and controlling means which operates in a manner to be more fully described hereinafter.

We have also provided in the control panel 6 certain indicating devices by means of which the operator 4 may know the function being performed by the machine 2. These devices include a dial light 48 which may illuminate the dial 44 of the controlling and indicating device 40 and two indicating lights 50 and 52 which are located in the base 20. Indicating lights 50 and 52 respectively indicate the recording and reproducing conditions of the machine 2.

Located in the base 20 are also two push-buttons, 54 and 56 which are control devices by means of which the operator may indicate "error" and "length" of the dictation to the transcribing operator. The function and operation of the above devices are described in more detail hereinafter.

As has been heretofore mentioned, it is our intention to show that our extremely adaptable and flexible scheme of remote control for dictating machines may be utilized in connection with a plurality of types of dictating machines which may involve entirely different principles of recording. It is well known in the art that various types of recording mediums and systems for recording thereon may be used for various purposes. The present day commercial dictating machine uses a recording medium of wax or similar material which is mechanically deformed by a cutting stylus. Another principle of recording which is old in the art is the use of a recording medium of magnetic material which is not deformed during a recording process but which is suitably magnetized in accordance with speech undulations or similar sounds. Other types of recording mediums and principles of recording thereon are also well known in the art. We will at this time, therefore, illustrate a form of the machine 2 which operates by mechanically deforming the recording medium. As shown in Figure 4 the form of the dictating machine 2 which is adapted to record on a wax medium is preferably enclosed for appearance and to exclude dust and includes a two piece cabinet 58 and 60 provided with swinging access doors 62, 64 and 66. The upper access doors 62 give access to the dictating machine unit 68, while the lower access doors 64 and 66 give access respectively to certain electrical relays, amplifiers and a wax removing device 70. The relays operate in connection with certain equipment built into the machine unit 68 and the equipment mounted in the dictator's control panel 6 and the transcriber's control panel 14 to operate the dictating machine 2 in a novel manner which is described in more detail hereinafter. Inasmuch as the machine 2 is utilized to replace the conventional machines which are included in a present day dictating system, it is obvious that the portions of the recording medium which are removed during the shaving operation must be suitably removed from the vicinity of the equipment operating in the machine unit 68. For this purpose we have provided a motor 72 which may be suitably mounted on a base 74 and adapted to drive a centrifugal blower 76. The centrifugal blower 76 operates to withdraw air from the vicinity of the recording medium so as to draw the light wax particles therewith and conduct said air and wax by means of an intake manifold 78 to a centrifugal air cleaning device 80.

Figure 5:
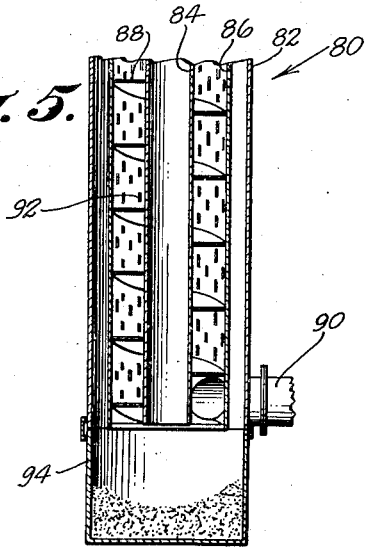
Fig. 5 is a section taken essentially on the line 5—5 of Fig. 6 showing the construction of an air-cleaning device used with the dictating machine.
Figure 6:
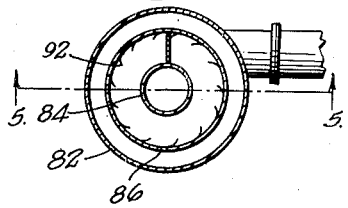
Fig. 6 is a section taken essentially on the line 6—6 of Fig. 4 showing the construction of the air cleaning device.

Referring to Figures 5 and 6 it will be seen that the air cleaner 80 is composed of three concentric cylinders 82, 84 and 86. The annular space between the inner and middle cylinders 84 and 86 is divided into a helical passageway by helical fins 88 in such a manner that air entering the top of the cleaner 80 pursues a helical course downward and leaves by the discharge pipe 90. The annular space between the middle and outer cylinders 82 and 86 provides a wax chute down which wax slides after escaping through small orifices 92 in the cylinder 86 into a removable wax container 94.

The relatively high angular velocity of the air travelling down the helical course between the cylinders 84 and 86 throws wax particles to the outside, by virtue of the centrifugal force exerted thereon, where they are trapped by the small orifices and fins 92 and transferred to the outer annular chamber lying between cylinders 82 and 86 where the wax falls by gravity to the removable wax container 94.

In this type of machine we prefer to employ a cylindrical wax record as the recording medium and provide a machine capable of using a record larger than the standard commercial size. We prefer to construct our machine 2 so that it may use a record which is approximately four times as long and twice the diameter of the standard dictating machine records and which is also so constructed as to have considerable thickness of wax so that the record may be shaved many times before it becomes useless. It is obvious, however, that recording mediums of other sizes may be utilized satisfactorily. We therefor do not wish to be limited to the size we have illustrated.

The machine unit 68 is accordingly provided with a base 96 (Figure 7) upon which is permanently mounted the necessary equipment for making the machine unit 68 operative. We have also provided a recording medium 98 which is rotatably supported on shafts 100 and 102 suitably journalled as by bearings 104 and 106 respectively in posts 103 and 105 formed on the base 96.

In order that the recording medium 98 may be removed after it has been used many times and replaced with a fresh recording medium, we have accordingly mounted it concentrically with shafts 100 and 102 so that it may be easily removed. We have therefore provided stub shafts 108 concentrically located in the record mandrel 110, upon which the recording medium 98 is cast, as by suitable end plates 112. Stub shafts 108 are in turn provided with conical ends 114 which cooperate with conical seats 116 so as to maintain the desired concentric relationship between the recording medium 98 and the rotatable supporting shafts 100 and 102. In order that the recording medium 98 may be rotated during the recording and shaving operations we have provided a mechanical connection between the shafts 100 and 108 and between shafts 102 and 108 which comprises splined collars 118 adapted to slide on splines formed on the aforementioned shafts 100, 102 and 108. These collars 118 are provided with a set screw 120 so that they may be permanently located in a position which bridges the connection between said shafts so as to provide a drive means between shafts 100 and 108 and between shafts 102 and 108.

In order to prevent the recording medium 98 from shifting endwise along the axis thereof, we have accordingly provided a thrust bearing 122 which cooperates with the shaft 100 and the post 103 to prevent the shaft 100 from moving to the left. In a like manner we have provided a thrust bearing 124 cooperating with the shaft 102 and the bearing post 105 to prevent the shaft 102 from moving to the right. In order that the shaft 102 may be moved to the right so that the recording medium 98 may be removed from the machine unit 68 we have provided a threaded nut 126 adapted to screw along the shaft 102 and be locked in a normal position engaging the thrust bearing 124 by a set screw 128.

It should be noted that the particular rotatable supporting means which we have supplied for the record 98, in addition to rigidly supporting the record 98 concentrically with the drive shafts 100 and 102 and providing a suitable rotatable drive means therebetween, allows the record 98, mandrel 110, and stub shafts 108 to be easily removed as a whole from the machine unit 68 whenever necessary. This may be accomplished by loosening the splined collars 118 and separating shafts 100 and 102 by sliding the shaft 102 to the right through the bearing 106. This operation may be described in detail as follows: Set screws 120 are loosened and splined collars 118 are slid away from the record 98 thus disconnecting shafts 108 from shafts 100 and 102. Set screw 128 is then loosened and threaded nut 126 is backed away from the thrust bearing 124. Shaft 102 may then be slid to the right through the bearing 106 so as to separate shafts 100 and 102 sufficiently to allow conical ends 114 of shafts 108 to clear the conical seats 116 of shafts 100 and 102, so that the record assembly may be removed.

The assembly operation is the reverse of the operation just described.

In order that the recording medium 98 may be driven continuously at the proper speed for recording and reproducing, we have provided a constant speed electric motor and a belt, not shown, which are arranged to drive the record supporting shaft 100 by means of a pulley 130 through a suitable electric clutch 132 which includes a clutch magnet 134 and a clutch armature 136. The motor, belt and pulley 130 are arranged to drive the recording medium in the proper direction for recording and reproducing as indicated by arrow 138 of Figure 12. The pulley 130 and the clutch magnet 134 which is suitably attached thereto are rotatably supported by an extension of a bushing 140 which suitably journals the shaft 100 in the end frame 96. The clutch magnet 134 is adapted to receive power as by brushes 142 which are held in electrical contact with slip rings on the clutch magnet 134 and which are maintained in this position by springs in a suitable brush supporting means 144 attached to the bearing post 103.

Clutch magnet 134 cooperates with the clutch armature 136 which is slidably splined on shaft 100 in such a way that energization of the clutch magnet 134 will draw the clutch armature 136 thereto and provide a frictional drive means between the pulley 130 and the record supporting shaft 100. The electrical clutch 132 and all electrical clutches to be hereinafter referred to are, unless specifically noted as being otherwise, identical in principle and construction with those previously disclosed in our co-pending application No. 17,666, filed April 22, 1935.

Figures 13, 17, 18, 19:
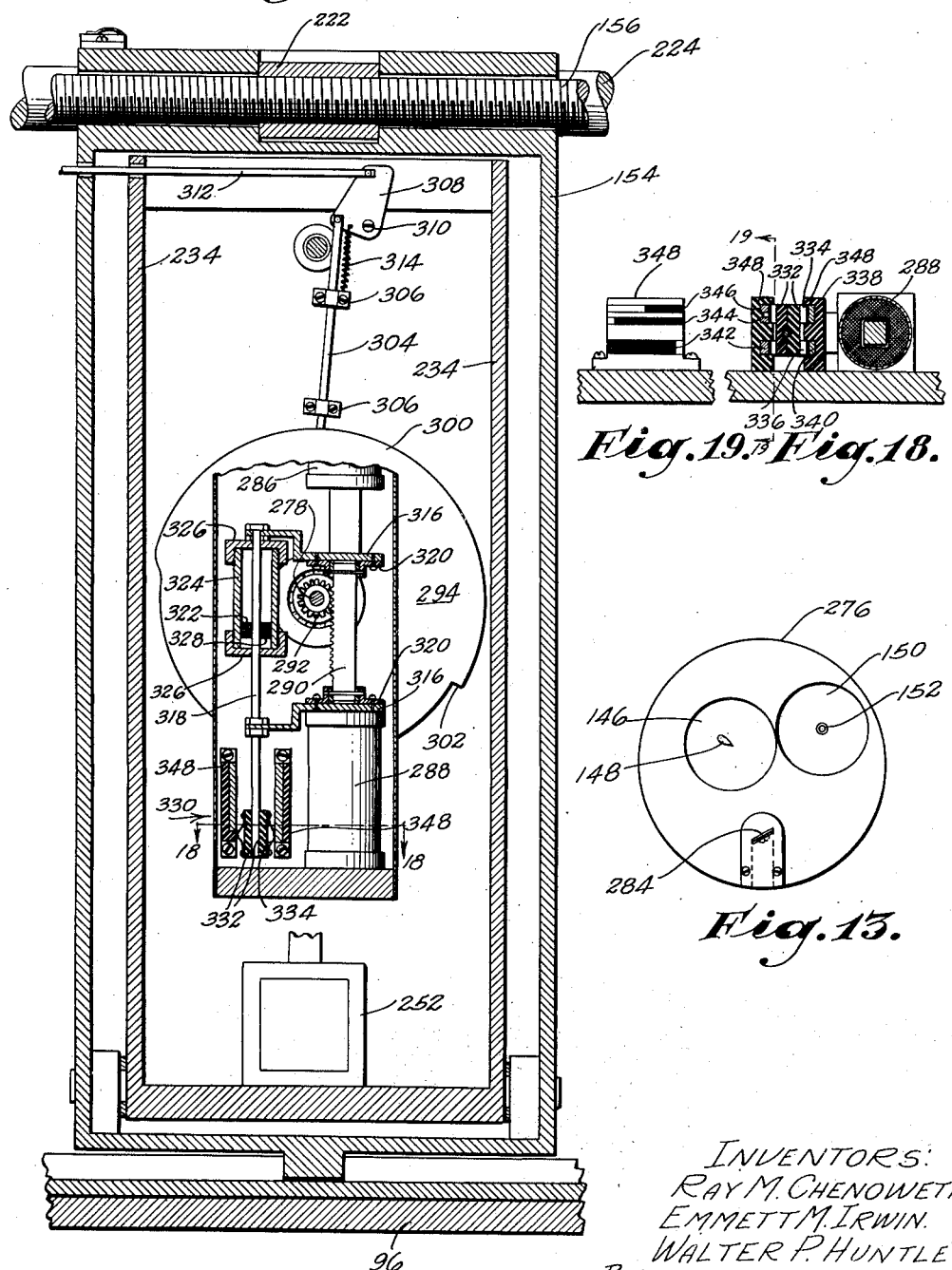
Fig. 13 is a face view of the dictator's head supporting structure illustrated in Fig. 12.
Fig. 17 is a section taken essentially on the line 17—17 of Fig. 12 showing additional details of the dictator's carriage structure.
Fig. 18 is a section taken essentially on the line 18—18 of Fig. 17 showing the construction of a solenoid limit switch of our invention.
Fig. 19 is a section taken essentially on the line 19—19 of Fig. 18 showing the arrangement of parts shown in Fig. 18.

In order that the dictating operator may suitably record speech and other sounds upon the recording medium 98 and may reproduce these sounds, we have accordingly provided a dictator's electric recording head 146 which includes a recording stylus 148 and a dictator's electric reproducing head 150 which includes a reproducing stylus 152 (Figures 7 and 13). These heads are suitably mounted on a dictator's carriage structure 154. The dictator's carriage structure 154 is adapted to be moved along the recording medium 98 during the recording and reproducing processes in the proper direction at the proper speed for recording and reproducing by a dictator's advancing screw 156. The dictator's advancing screw 156 is suitably journalled in the end plate 96 as by journals 158 and 160 (Figures 7 and 21).

In order to prevent movement of the dictator's advancing screw 156 along the axis thereof resulting from the end thrust necessary to move the carriage 154 along the record, we have accordingly provided thrust bearings 162 and 164 (Figures 7 and 21) which cooperate with the end plates 96 to prevent any endwise movement of the advancing screw 156.

In order that the dictator's advancing screw 156 may be driven in synchronism with the recording medium 98 so that the dictator's recording head 146 will record upon the recording medium 98 in the form of a continuous helix, we have accordingly provided a driving means which operably connects the record supporting shaft 100 to the dictator's advancing screw 156.

Referring to Figures 7 and 8, it will be seen that this driving means includes a worm reduction gear system comprising a worm 166, formed on the record shaft 100 and a worm gear 168. The worm gear 168 may transmit power from the record shaft 100 through a synchronizing clutch mechanism 170 to the dictator's advancing screw 156.

To be more explicit, worm 166 meshes with worm gear 168 which in turn is suitably secured to a short shaft 172. Shaft 172 is journalled in suitable bearing posts 174 and 176. We have also provided a shaft 178 which is mounted co-axially with shaft 172 and is suitably journalled in bearing posts 180 and 182.

The synchronizing clutch 170 includes an armature 184 which is slidable on splines 186 formed on the shaft 172 so that it may be moved into or out of engagement with a clutch magnet 188, keyed to the shaft 178, and when in engagement therewith may transmit power from the shaft 172 to the shaft 178. Shaft 178 carries on the upper end thereof a bevel gear 190. Bevel gear 190 in turn meshes with another bevel gear 192 suitably secured to the dictator's advancing screw 156. Bevel gears 190 and 192 are arranged so as to provide a 90 degree displacement of the axis of rotation. Electro-magnet 188 of the electric clutch 170 provides annular grooves 194 in which coils 196 are secured. The terminals of the coils 196 are connected through holes 198 to slip-rings 200, supported on insulating collars 202 around the electro-magnet 188. We also provide a third slip-ring 204 also insulated from the electro-magnet 188 by the insulating collar 202 and electrically connected to a spring switch finger 206, which is also supported by the insulating collar 202. The armature 184 is normally maintained out of engagement with the electro-magnet 188 by compression spring 208 retained in an annular groove in the electro-magnet 188.

We have also provided on the armature 184 a slip ring 210 which is insulated therefrom by insulating collar 212. The slip ring 210 is in turn connected electrically to metallic switch segments 214 placed at suitable intervals about the periphery of the armature 184 and secured to and insulated therefrom as in conventional commutator construction by the insulating collar 212.

Power to operate the synchronizing clutch mechanism 170 is supplied through four brushes 216 which make electrical contact with slip rings 200, 204 and 210 and are held thereagainst by springs in a manner similar to that described in connection with the clutch mechanism 132. The brushes 216 are retained in guide blocks 218, which are suitably secured to a post 220. The post 220 is also suitably attached as by screws to the base plate 96.

The electrical synchronizing clutch mechanism 170, in addition to providing the usual friction clutching action as heretofore described provides a means of synchronizing the rotation of the advancing screw 156 or maintaining zero phase angle relationship between the recording medium 98 and the advancing screw 156.

As will be described in more detail hereinafter, we propose to make the dictator's recording and reproducing heads 146 and 150 of such type that the styli thereof will have little or no lateral freedom and further we propose to continuously rotate the recording medium during the normal recording and reproducing process. We also propose to allow for pauses in the dictation or reproduction by stopping the advance of the heads along the record and placing them in an inoperative position so that the styli thereon do not engage the recording medium. It follows then that the sound track which is cut in the recording medium by the recording stylus should not only be continuous for satisfactory operation but should be in the form of a continuous helix with little or no variations in the pitch thereof. It further follows that the dictator's reproducing head 150 should be put into operative relationship with the recording medium so that the stylus thereof is placed on the record so as to come down into the sound track groove and not in the space between two grooves. We have therefor provided the spring switch finger 206 on the clutch mechanism 170 which cooperates with the metallic switch segments 214 which are mounted on the periphery of the armature 184 and have so utilized the switch means provided thereby that during the normal recording and reproducing process the dictator's recording and reproducing styli must necessarily follow the same helical path along the recording medium 98 at all times.

The manner in which the synchronizing clutch mechanism 170 operates to bring about the desired results may be described as follows: As will be later shown in connection with the wiring diagram, we have interlocked the operation of the clutch magnet 188, the operative and inoperative positions of the heads and certain electrical relays with the switch means formed by the spring switch finger 206 and the contact segments 214 in such a manner that the equipment cannot be conditioned for recording or reproducing by placing the heads into operative relationship with the recording medium and energizing the clutch magnet 188 to advance the heads along the recording medium unless the aforementioned synchronizing contacts are closed. We have so arranged the equipment that said switch means will be closed only when the styli are in such a position that they will contact the record on the helical sound track or an extension thereof. This arrangement may be more easily comprehended by referring to Figures 9, 10 and 11 where we have illustrated diagrammatically the operation of the synchronizing equipment.

In Figure 9 it will be seen that we have shown the head in the operative position with the stylus engaging the record on the helical sound track and the synchronizing contacts closed. It is obvious that this condition will obtain upon the first operation as a result of the interlocking of the functioning elements as described above. It remains to be shown that upon following operations, the styli will be in a position to engage the recording medium on the helical sound track whenever the synchronizing contacts are closed.

Since the recording medium revolves continuously, it follows that the armature 184 bearing the switch segments 214 will also revolve continuously. If the clutch magnet 188 is deenergized so that the switch finger 206 remains stationary and if there are equally spaced around the periphery of the armature 184 a number of the segments 214 equal to the ratio of the worm and gear 166 and 168, it will be seen that a segment 214 will pass under the switch finger 206 once each revolution of the recording medium 98. If we then consider Figure 9 to be a representation of the conditions at a given instant with the head in the aforementioned operative position and at said instant deenergize the clutch magnet 188, it will be seen that the advancing screw will be stopped and that the head will be stopped in its advance along the helical path on the record, but that the helical path will continue to advance as the record rotates. It follows then, that as soon as the recording medium has rotated slightly, the helical path will no longer be properly located with respect to the stylus. It is also obvious that whenever the recording medium has rotated one full turn the synchronizing contacts will close and the record will be in a position identical with that which it occupied at the said instant when the clutch magnet was deenergized. At this time the stylus will be properly located with respect to the record and the helical sound track thereon as illustrated in Fig. 9.

For the purpose of further illustrating the operation of the equipment, let us assume that at the instant represented by Figure 9. the advancing screw be rotated independently of the record so as to move the stylus along the recording medium to some other position such as illustrated in Fig. 10. It will be noted that the synchronizing contacts are open and the stylus is not in a position to engage the sound track. In referring to Fig. 10 it should be observed that, as previously pointed out the distance separating two adjacent segments 214 represents one complete turn of the recording medium.

Should the record then be rotated until the synchronizing contacts close, the helical sound track will advance to the position shown in Fig. 11 so as to be located directly under the stylus.

The position of the contact finger 206 with respect to the next segment to come into contact therewith may also be considered as a measure of the portion of a complete revolution which the recording medium must make in order to advance the helical sound track to such position that it will lie directly under the stylus. The closing of the synchronizing switch means may be considered as indicating that the aforementioned condition is met.

It will be remembered that we have provided a dictator's recording head 146 and a dictator's reproducing head 150 suitably secured to the dictator's carriage 154 in such a manner that the aforementioned heads may suitably engage the recording medium 98.

It will be noted that in order to satisfactorily record upon the recording medium 98 the carriage structure 154 must be advanced forwardly or to the right along the recording medium 98 as the recording and reproduction process continues, and that we have provided the dictator's advancing screw 156 for accomplishing this movement. In order that rotation of the advancing screw 156 may be communicated to drive the dictator's carriage structure 154 forwardly or to the right along the record, we have provided a threaded nut 222 (Figures 12 and 17) which is suitably retained in a slot in the dictator's carriage structure 154, so that it has considerable lateral freedom but no longitudinal freedom. Inasmuch as the advancing screw 156 must be rather long, we provide this means of allowing the threaded nut 222 to move laterally with respect to the axis of recording medium 98 so that eccentricities in the advancing screw 156 will not tend to bind or restrict the travel of the carriage 154 along the record. In order that the carriage structure 154 may be suitably guided in its travel along the record, we have provided two guide bars 224 and 226 which may be suitably mounted on the end frames 96 in such a manner as to provide a means of supporting the weight of the carriage 154. In order that the equipment be perfectly rigid in a direction perpendicular to the axis of the record 98, we have accordingly provided a tail piece 228 on the lower portion of the carriage 154 adapted to fit in a guide channel 230 adjustably secured to the base 96 as by screws 232.

It will also be remembered that since we propose to use the recording medium 98 many times by mechanically removing a small portion thereof after each period of dictation, it is obvious that the recording medium 98 will therefore be gradually reduced in diameter. We have therefore provided a gauging means whereby the dictator's recording and reproducing heads 146 and 150 may be periodically advanced at the proper time to compensate for the reduction in size of the recording medium.

We have therefore made the carriage structure 154 in the form of a hollow frame as shown in Fig. 17, and have rotatably mounted therein an inner carriage structure 234. The inner carriage structure 234 is held in position by a hinge-pin 236 which cooperates with the inner structure 234 and the dictator's carriage structure 154. Suitably threaded into a projection of the carriage structure 154 is a micrometer screw 238 which carries a ratchet wheel 240 and is suitably journalled at the outward end by a bearing post 242 secured to the carriage structure 154. The other end of the micrometer screw 238 has a hard rounded nose which rests against a hardened seat 244 suitably secured to the inner carriage structure 234. In order that the inner carriage structure 234 may be maintained in engagement with the micrometer advancing screw 238 at all times, we have provided tension springs 246 which extend along either side of the inner carriage structure 234 and are suitably attached thereto as by hocks. The other end of the tension springs 246 may be hocked on to a suitable projection formed on the dictator's carriage structure 154. It will be seen that these tension springs operate to keep the inner carriage structure 234 pulled away from the recording medium 98 so that the hardened rounded nose of the micrometer screw 238 continuously engages the hardened inset seat 244 of the inner carriage structure 234.

The ratchet wheel 240 is aligned with a pawl, not shown, mounted on the end plate 96 in such a manner that the pawl engages the ratchet wheel 240 when the carriage is at the extreme right limit of travel.

The inner carriage structure 234 indirectly carries the recording and reproducing heads 146 and 150. It will be seen that a precise forward movement may be applied to the inner carriage 234 by means of a micrometer screw 238 so that, among other things, the recording and reproducing heads 146 and 150 may be advanced toward the axis of the recording medium 98 so as to compensate for periodic reductions in size of said recording medium as the record is shaved for further dictation. As has been previously pointed out, we prefer to rotate the recording medium 98 continuously and to render the dictator's reproducing and recording heads 146 and 150 inoperative during pauses in the dictation and reproduction by removing them from the recording medium 98. We have accordingly made the inner carriage structure 234 in the form of a hollow frame so as to include therein a dictator's head carriage 248 which is rotatably supported therefrom as by a hinge pin 250.

Figure 12:
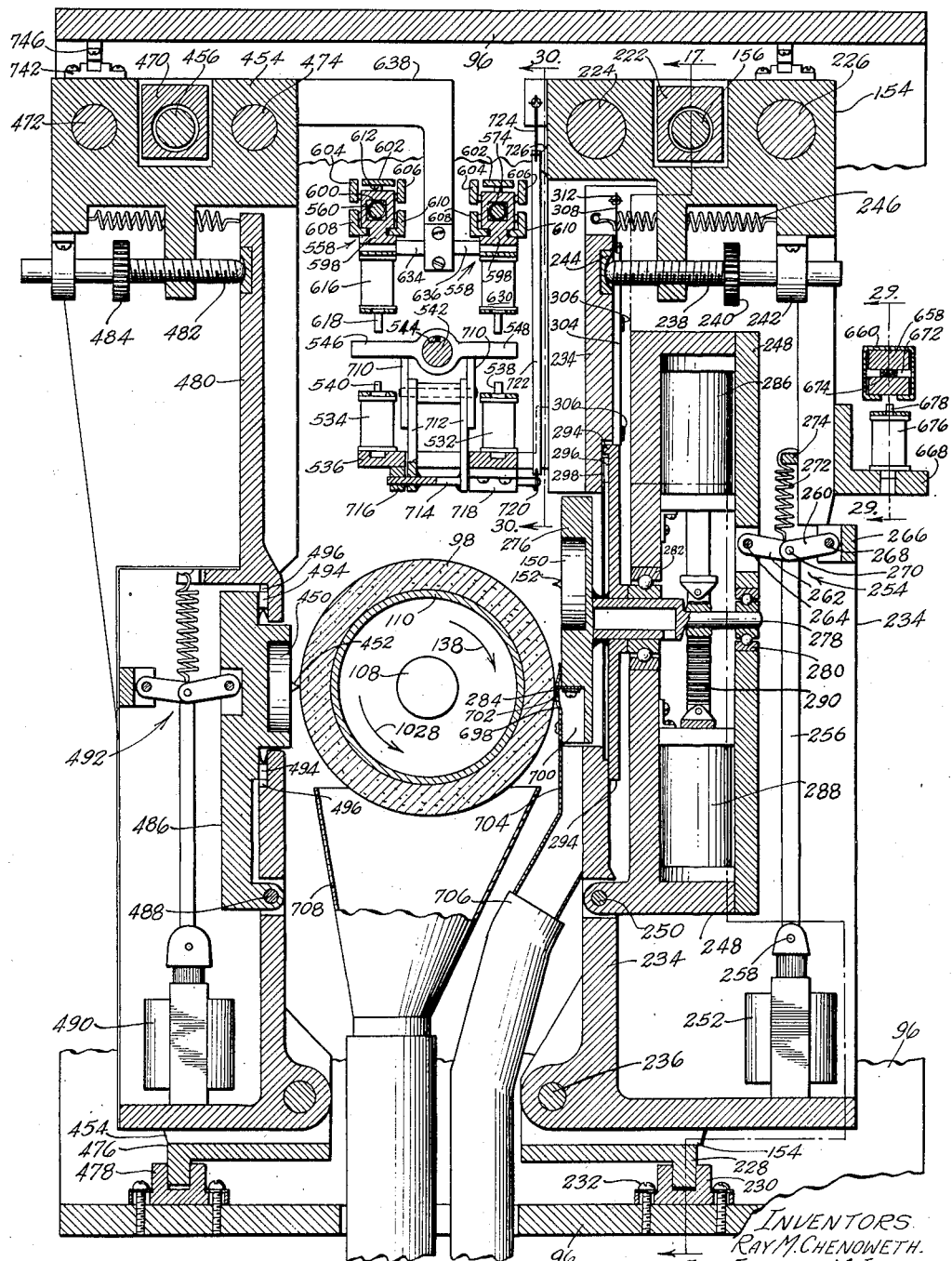
Fig. 12 is a transverse section of the machine unit taken essentially on the line 12—12 of Fig. 7 showing equipment associated with a transcriber's carriage device and a dictator's carriage device.

In order that the head carriage 248 may be rotated about the hinge pin 250 so that the recording and reproducing heads 146 and 150 may be moved into and out of engagement with the recording medium 98 we have provided a dictating actuating means including a solenoid 252 which cooperates with a suitable linkage 254 so as to rotate the carriage structure 248 in a clockwise direction, as shown in Figure 12, about the hinge pin 250 whenever the solenoid 252 is energized. The linkage 254 consists of a vertical link 256 which is secured to the armature of the solenoid 252 as by a suitable pin 258.

The upper end of the vertical link 256 is in turn connected to a toggle linkage system composed of links 260 and 262 which are respectively pivoted to the head carriage 248 by a pin 264 and to an extension 266 of the inner carriage 234 as by pin 268. Links 260 and 262 are pinned to the vertical link 256 as by a pin 270. Cooperating with link 256 and pin 270 is a tension spring 272 which is hooked to a suitable projection 274 of the inner head carriage 234. It will be seen by referring to Figure 12 that energization of the solenoid 252 will move link 256 downward. This will in turn shorten the distance between pins 264 and 268 and will thus swing the head carriage 248 about the pin 250 in such a manner as to remove the reproducing or recording stylus from the record. When the solenoid is deenergized spring 272 is effective in moving the link 256 in an upward position and moving the head carriage 248 into the forward position, or with the stylus contacting the record.

As has been heretofore pointed out, in order to make it possible for the dictating operator to record or reproduce at will from the recording medium 98 we have provided separate recording and reproducing heads 146 and 150, which are so mounted that they may alternately be brought into operative relationship with the recording medium 98. We have accordingly mounted the heads 146 and 150 on a rotatable head supporting structure 276 which is secured to a special shaft 278. Special shaft 278 is journalled for rotation by suitable bearings 280 and 282 mounted in the head carriage 248. In addition to the heads 146 and 150 the head supporting structure 276 also carries a shaving tool 284, which is used to shave the recorded material from the record after it has been transcribed.

The manner in which this shaving tool 284 is used to shave or recondition the record will be discussed in detail in connection with the shaving equipment. In order that the supporting structure 276 may be properly rotated so as to present the desired heads 146 or 150 or the shaving tool 284 to the recording medium 98, we have accordingly provided solenoids 286 and 288 to the armatures of which is attached a rack 290. The rack 290 engages a pinion 292 which is suitably attached to the special shaft 278. The solenoids 286 and 288 are so located on either side of the pinion 292 that the armature of one will be in the extended position when the armature of the other is in the retracted position.

It will thus be seen that energization of the proper solenoids 286 or 288 will move the rack 290 in the corresponding direction. The rack 290 engaged with the pinion 292 will then rotate the shaft 278. Shaft 278 in turn carries the head supporting structures 276 and thus it will be seen that energization of the proper solenoids 286 or 288 will rotate the head structure so as to present one or the other of the heads to the record.

It should be noted that we have located the reproducing head 150 (Figure 13) and the recording head 146 as well as the shaving tool 284 on the head supporting structure 276 in the following manner. The aforementioned heads and the shaving tool each lie on a radial line extending from the center of the head supporting structure 276 and which are spaced at intervals of exactly 120 degrees. Thus it will be seen that in order to change from one head to the other or from the reproducing head 150 to the shaving tool 284 it is necessary to rotate the head supporting structure through an angle of 120 degrees.

We prefer to define these various positions as follows: Whenever the solenoid 252 is energized to pull the head supporting structure into the inoperative position, we shall term the three positions as "inoperative recording," "inoperative reproducing," and "inoperative shaving." Whenever the head supporting structure is lowered into the operative position by the de-energization of the solenoid 252, the resulting three positions shall be termed "operative recording," "operative reproducing," and "operative shaving" positions.

Figure 14:
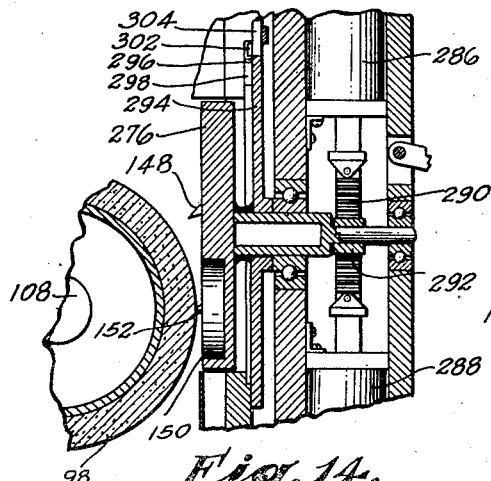
Fig. 14 is a fragmentary section similar to Fig. 12 showing the dictator's recording and reproducing equipment in the operative reproducing position.
Figure 15:
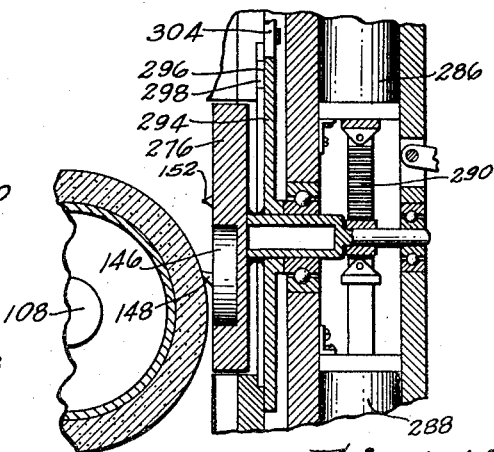
Fig. 15 is a view similar to Fig. 14 but showing the equipment in the operative recording position.
Figure 16:
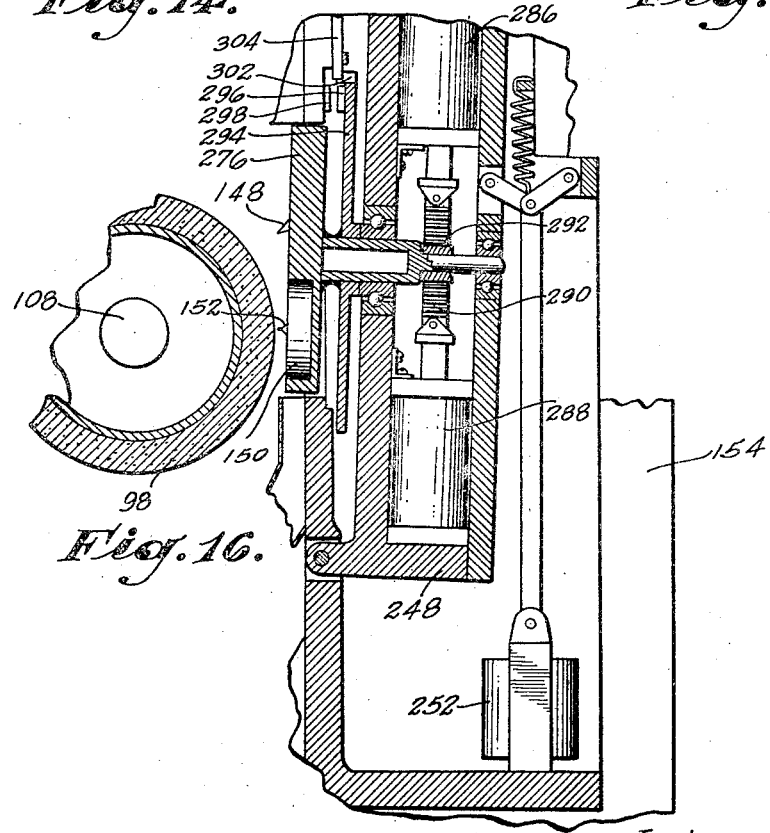
Fig. 16 is a view similar to Fig. 14 but showing the equipment in the inoperative reproducing position.

Four of these six positions are illustrated in Figures 12, 14, 15 and 16. As previously noted, Figure 12 illustrates the relation between the various devices when the equipment is in the operative shaving position. Figure 14 shows the equipment in the operative reproducing position in which the head supporting structure 276 has been rotated to such position that the reproducing head may contact the record and the solenoid 252 de-energized to allow the head supporting structure to be lowered into the operative position. Figure 15 is similar in that it shows the solenoid 252 de-energized to allow the head supporting structure to be lowered into the operative position but with said head supporting structure rotated to place the equipment in the operative recording position. In Figure 16 we have shown the head supporting structure rotated to the reproducing position but with the solenoid 252 energized so as to pull said head supporting structure into the inoperative reproducing position.

The operation of placing the devices into the various operative and inoperative positions is accomplished by energizing the solenoid 252 so as to pull the head carriage device 248 and the head supporting structure 276 away from the record into the inoperative position. The proper solenoid 286 or 288 may then be energized to rotate the head supporting structure 276 so as to remove one head from the vicinity of the record and move the other into the proper position to engage the recording medium. Inasmuch as we depend upon the solenoids 286 and 288 merely to rotate the heads 146 and 150 into an approximately correct position, we provide means for finally locating them in the proper angular position and for rigidly positioning them properly with respect to the inner carriage 234 whenever the solenoid 252 is de-energized so as to allow the spring 272 to move them into a record engaging or operative position.

It will be noted, as has been heretofore shown, since the inner carriage structure 234 is continuously positioned the proper distance from the surface of the recording medium 98 by operation of the micrometer screw 238, that the heads 146 and 150 may therefore also be located the proper distance from the record 98. The centralizing and stopping means for accomplishing this (Figures 12 and 17) may comprise an annular plate 294 secured to the shaft 278 and arranged with hardened wedge type projections 296 which cooperate with similar seats 298 in the carriage structure 234.

If we arrange the hardened wedge type projections 296 at equal spacings of 120 degrees around the annular plate 294 and also arrange the hardened seats 298 which cooperate with the projections 296 at similar intervals about the center of rotation of the shaft 278, we will have provided a means whereby the head supporting structure 276 may be accurately positioned in any one of three positions 120 degrees apart.

Inasmuch as the solenoids provide positive stops at either end of the travel or the recording and shaving positions, it is only necessary to provide a positive stop in mid-travel or the reproducing position. Accordingly we have fitted annular plate 294 with a segment 300 which bears a stop face 302 so as to cooperate with a stop shaft 304 to stop the rotation of the head structure when the reproducing head is in position to be presented to the record. Stop shaft 304 is suitably guided by means of guide brackets 306 secured to the inner carriage structure 234. Stop shaft 304 may be operated by means of a bell crank 308 pivoted to the inner carriage structure 234 as by a pivot 310. The bell crank 308 in turn is operated by means of a push rod 312 and a tension spring 314 suitably located in the inner carriage structure 234.

It will thus be seen that at the extreme right hand travel of the carriage 154, push rod 312 will come in contact with the end plate 96, operate the bell crank 308 and lift the stop shaft 304 so that it no longer engages the stop face 302 on the annular plate 294. Thus it will be seen that energization of solenoid 288 will then pull the head structure around 120 degrees further than was possible before the stop shaft 304 was lifted. This will then allow the shaving tool to be presented to the record.

The recording and reproducing heads 146 and 150 may be any suitable electric head device which may record and reproduce by the "hill and dale" system, but are preferably mutually similar in construction to those described in our copending application 828. The recording head 146 may include a stylus bearing armature of magnetic material which is resiliently mounted so as to be moved by a magnetic field which varies in response to electrical undulations corresponding to the sound undulations to be recorded. In the same manner, the reproducing head 150 may include a stylus bearing armature of magnetic material which is resiliently mounted so as to be moved in a magnetic field by undulations in the recording medium in such a manner as to generate electrical undulations corresponding thereto.

It should also be noted that if proper care is taken in the machine work and the heads 146 and 150 are properly located on the head supporting structure 276 with respect to the shaving tool 284, the recording head 146 will cut a blank groove or sound track on the freshly shaved recording medium of a pre-determined depth. In the same way it is obvious that if the reproducing head 150 is properly located the stylus thereon will extend the proper distance into the sound track which has been cut by the recording stylus and thus obviate the necessity of a loosely suspended head as is common in the present type of dictating machine with their attendant disadvantages.

Thus it follows that we have used a type of electric recording and reproducing head which may be mounted solidly to the head supporting structure 276, rather than the loosely suspended type as is in common use. This makes for more efficiency and higher fidelity recording and reproducing due to the fact that the heads are solidly supported, for in the case of the recording all of the useful energy expended in the head windings is directed toward cutting the record, while in the case of the reproducing head all of the movement of the stylus is effective in moving the armature of the head rather than moving the head as a whole.

This system is made possible by utilizing the same mandrel for rotating the recording medium during the recording and shaving processes and by mounting the heads and the shaving tool in such a manner that the guide structure which guides the recording head in its travel along the recording medium is contoured such that the projected contours thereof are congruent with the contours of the surface of the recording medium. In the form shown, we actually employ the shaving means to contour the surface of the recording medium in accordance with the previous statement, and have utilized the same guide means for guiding the shaving tool and the recording head during their respective travel along the length of the recording medium, but our invention comprehends the use of a guide means contoured as described above, regardless of the means used to establish said desired relationship between said guide means and the surface of said recording medium.

It will be further noted that the recording head 146 is located nearer the center of the head supporting structure 276 so that the stylus on the recording head 146 is nearer the center of the head supporting structure 276 than the stylus of the reproducing head 150. The dimensions have been so arranged that the stylus of the reproducing head 150 strikes the surface of the record at a point which lies on a horizontal plane through the center of the recording medium. The recording head 146 has been placed so that the stylus thereon contacts the recording medium at a point higher than the point at which the reproducing stylus contacts the record.

In this manner we have provided that the tangential line of reaction on the stylus of the recording head 146 may bear the proper relationship to the various elements involved, so as to attain higher quality recording and also reduce the danger of the head chattering.

We prefer to use separate recording and reproducing heads inasmuch as it is then possible to construct these heads with particular reference to the single function which they perform. The chief advantage derived from this type of construction lies in the fact that the reproducing head may be constructed so as to reproduce with high fidelity and the recording head may be constructed to record with equal fidelity. If these units are combined into one head, it is necessary to compromise between the desired conditions and construct a head which will record and reproduce speech and similar sounds with only fair quality. It is also apparent that frequencies which correspond to a resonant frequency in the head will cause the distortion resulting therefrom to be squared if a single head is used, whereas if separate heads are used, these resonant points may be made to occur at different frequencies in each head and thus materially reduce the distortion resulting therefrom. It should be further understood that although we have shown separate recording and reproducing heads, it lies within the scope of this invention to use a single head upon which are mounted two suitable styli, one for recording and one for reproducing.

It is obvious that if a single head is used with separate recording and reproducing styli, the same system of selecting between the recording and reproducing position, in other words, rotation of the head supporting structure 276, may be used.

We have broadly termed such head or heads a translation means operable between a recording medium and a propagating medium to transmit undulations existing in one of said mediums to the other of said mediums. In the form shown, the translation means 146 operates to transmit electrical undulations existing in a propagating medium comprising the connecting electrical conductors to the recording medium, said electrical undulations corresponding to sound undulations created by the dictators voice. The translation means 150, on the other hand, operates to transmit undulations existing in the recording medium to the electrical conductors. It falls within the scope of this invention, however, to use a translation means whether such means operates between a recording medium and an electric circuit or between a recording medium and any other medium capable of propagating undulations. In the form shown, we have provided two translation means, one for recording and the other for reproducing, but our invention, as previously stated, comprehends the use of a translation means whether such means is used for recording or for reproducing or for both.

In order to prevent the solenoids 286 and 288 from rotating the head supporting structure 276 at a dangerous speed, we have accordingly fitted the armatures of said solenoids with a suitable air dash-pot device which operates to reduce the speed of rotation of the head supporting structure 276 and bring it to a cushioned stop. We have therefore fitted the armatures of the solenoids 286 and 288 with brackets 316 (Figure 17) adapted to carry a piston rod 318. The brackets 316 may be suitably attached to the solenoid armatures as by screws and angle brackets 320. Secured to the piston rod 318 is a piston 322 slidable in a cylinder 324 suitably secured to the head carriage 248 and suitably closed by cylinder heads 326. We have provided an air bypass through the piston 322 as by a suitable hole 328 which operates to relieve the pressure of the air confined between the piston 322 and the cylinder head 326. It is obvious that the size of the bypass hole 328 will govern the speed of rotation of the head supporting structure 276 and may be chosen to provide any speed of operation desired.

In order that the solenoids 286 and 288 may be disconnected after they have performed their required operation, we have provided a limit switch structure 330. Referring to Figures 17, 18 and 19 it will be seen that we have provided insulating blocks 332. Insulating blocks 332 in turn carry spring fingers 334 and 336. Spring fingers 334 and 336 cooperate with metallic switch segments 338, 340, 342, 344 and 346 which in turn are suitably secured in insulating blocks 348. Insulating blocks 348 are suitably secured to the head carriage 248. It will be seen that spring finger 334 forms two circuits between switch segment 338 and switch segments 344 and 346. Segments 344 and 346 are so arranged that solenoid 288 will be disconnected in the playback position or in the shaving position, depending upon which operation is required at the time. In the same manner switch segments 340 and 342 cooperate with spring fingers 336 to disconnect the solenoid 286 in the dictating position. The manner in which these spring fingers and switch segments are connected to perform the above-mentioned operations will be discussed in connection with the wiring diagram.

Figure 20:
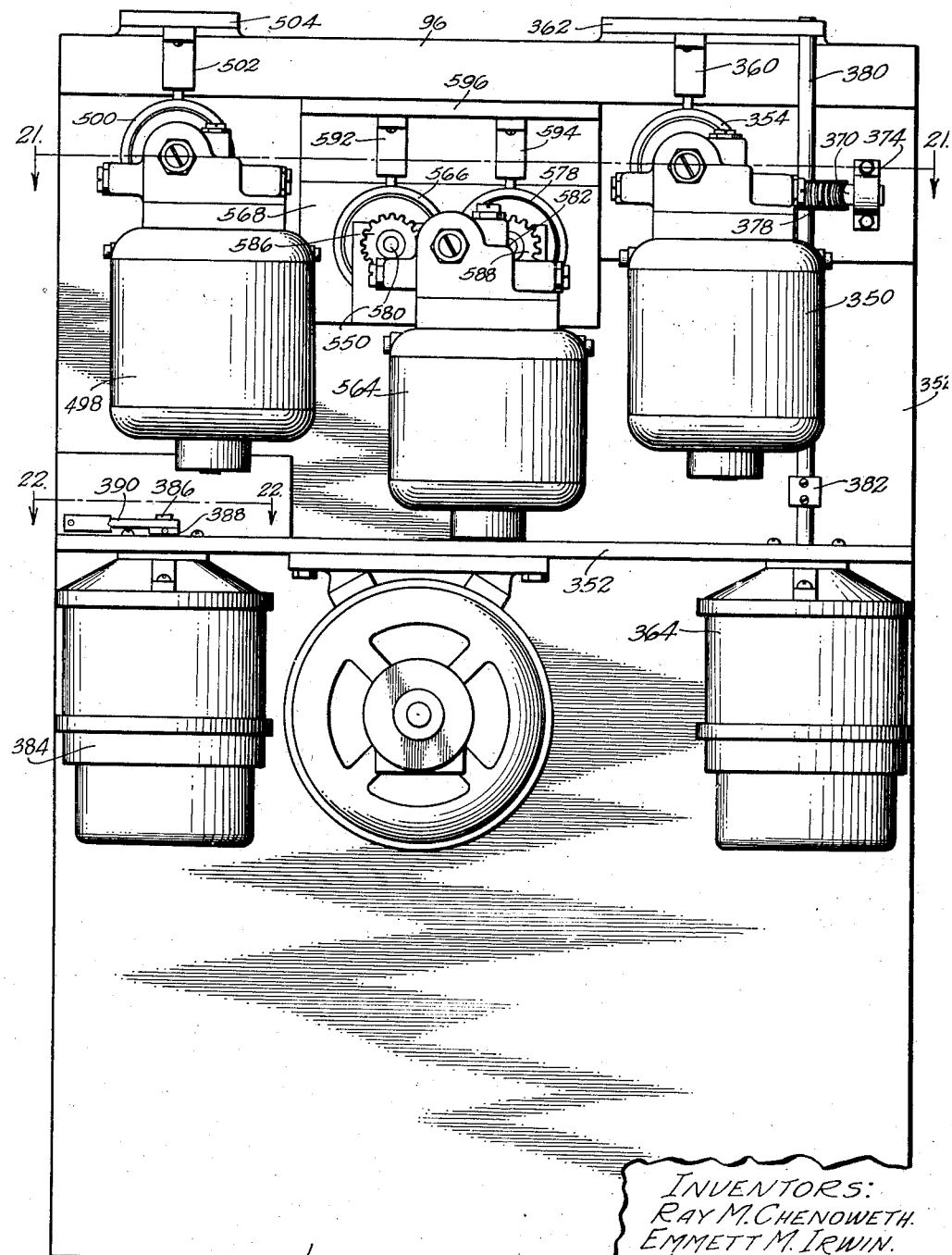
Fig. 20 is an end view of the machine unit showing the end opposite to that shown in Fig. 8.
Figure 33:
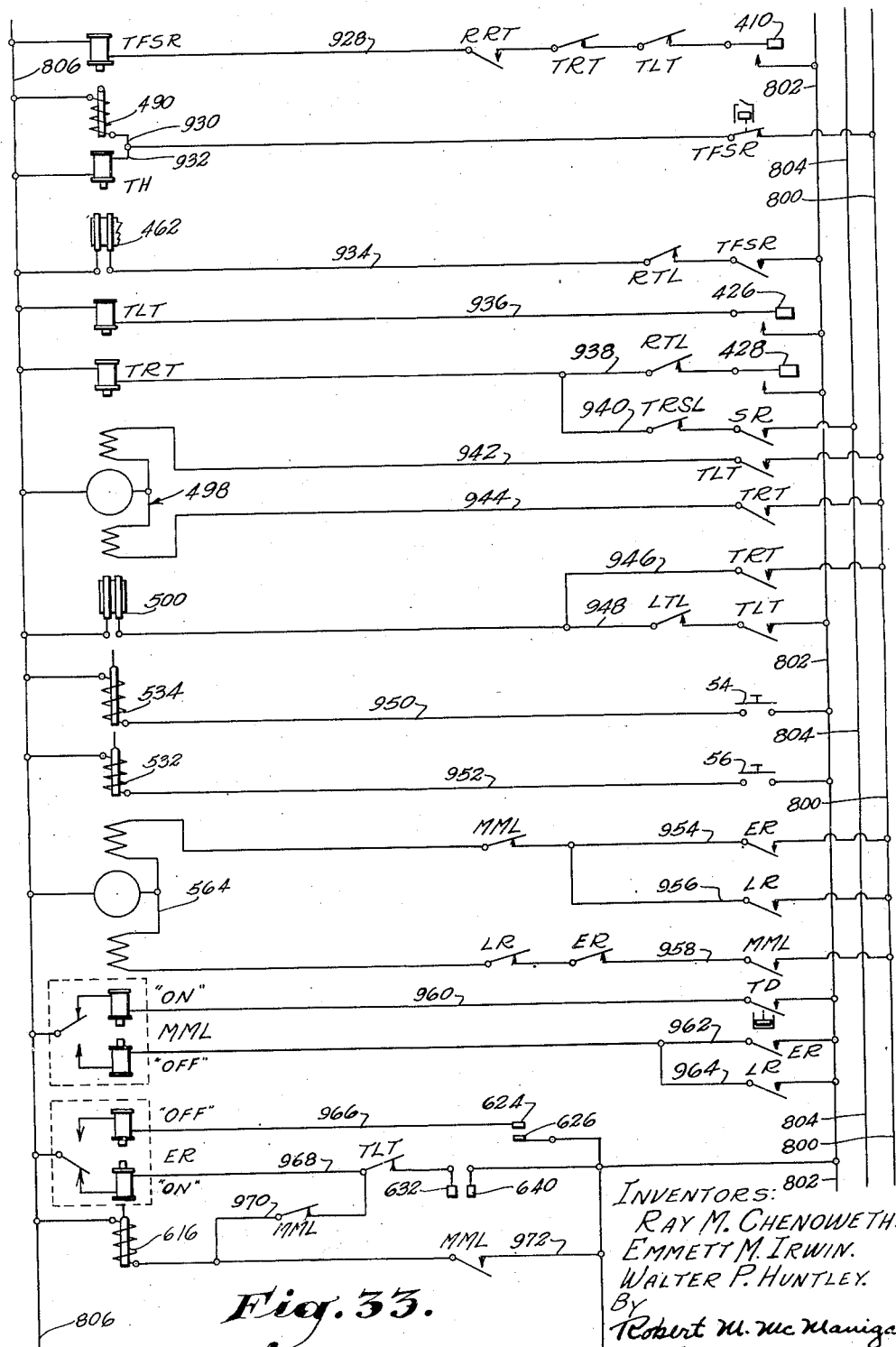
Fig. 33 is a wiring diagram forming a continuation of Fig. 32.
Figure 34:
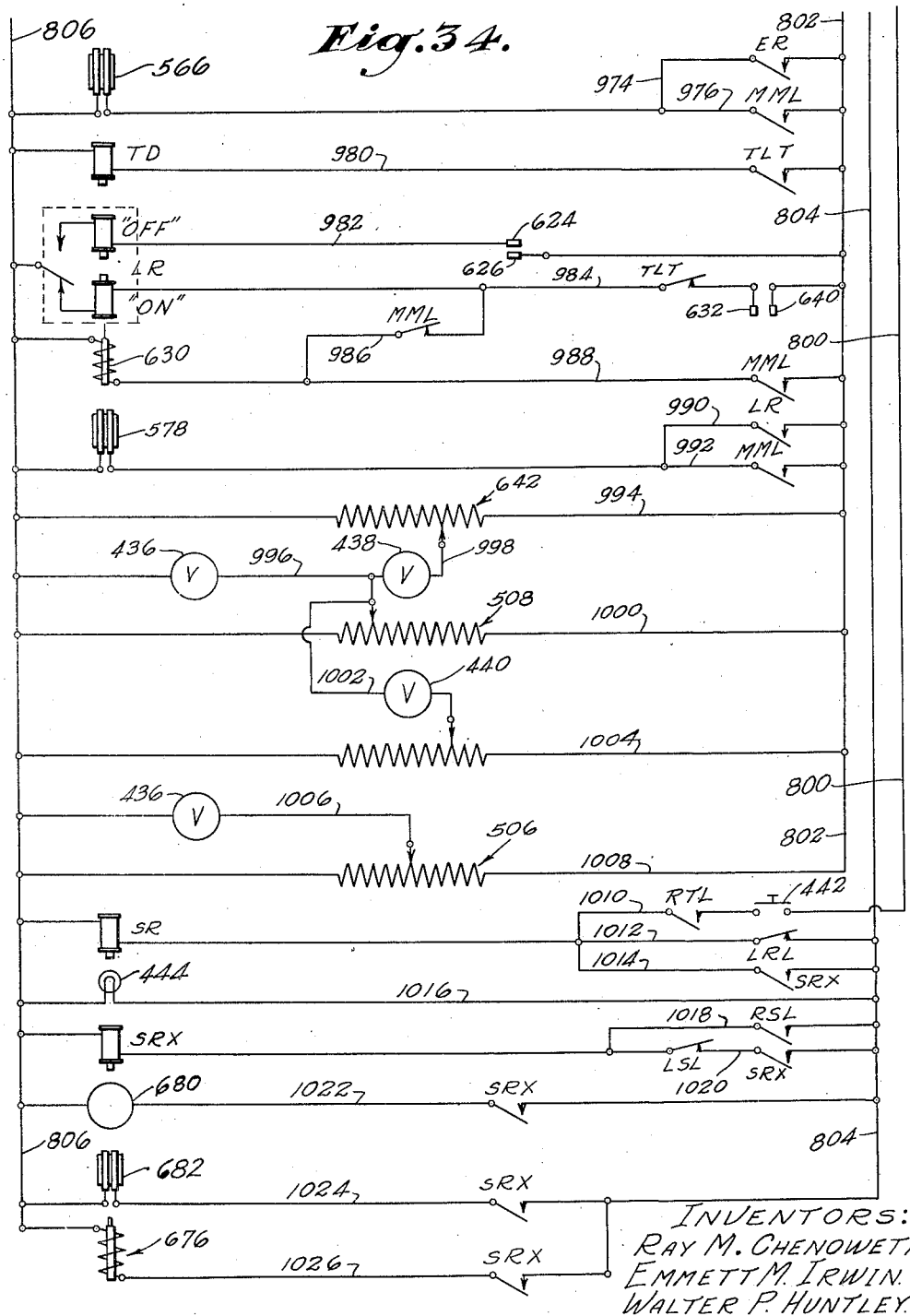
Fig. 34 is a wiring diagram forming a continuation of Fig. 33.

It frequently happens that the dictating operator may desire to reproduce a previously recorded portion of the dictation which may be located at a point on the recording medium remote from the point at which the last of the dictated material was recorded. It is therefore highly desirable that the dictating operator be provided with a means whereby he may move the reproducing head back to the left or toward the fore-part of the record at a sufficiently high speed to allow him to reach the aforementioned point without undue waste of time. We have accordingly provided a means as shown in Figures 20 and 21 whereby the dictating operator may cause the carriage 154 to move in either direction at high speed along the recording medium 98. This high speed driving means may include a geared reversible motor 350 suitably supported by a post 352 formed on the base 96. The rotation of the shaft of the geared reversible motor 350 may be communicated to the dictator's advancing screw 156 by a suitable electric clutch 354. The clutch magnet 356 may be suitably secured to the shaft of the motor 350 and may co-act with a clutch armature 358, slidably splined to an extension of the dictator's advancing screw 156. The clutch magnet 356 may derive power for its operation through a suitable brush mechanism 360 which may be supported by a post 362 formed on the base 96. Thus it is seen that energization of the electric clutch 354 operably connects the advancing screw 156 to the shaft of the dictator's high speed travel motor 350, so that upon energization of the motor 350 the advancing screw 156 may be rotated so as to drive the dictator's carriage 154 along the record in either direction at high speed. This movement along the record or across the sound track in either direction we have termed a transverse movement to distinguish it from the movement of the heads in the direction of the sound track. It is also very desirable that the dictating operator have some remotely operated indicating means whereby he may ascertain at a glance the relative position of the recording and reproducing heads 146 and 150 with respect to the length of the record. As is pointed out in connection with the dictator's control devices which are included in the control panel 6, the carriage position indicating device has been combined with the novel controlling device of our invention in the form of the receiving self-synchronous device 40. The receiving self-synchronous device 40 cooperates with a transmitting self-synchronous device 364 which is operated as a function of the position of the dictator's carriage with respect to the length of the record. The manner in which the transmitting self-synchronous device 364 is made to operate as a function of the position of the dictator's carriage with respect to the length of the record will now be described.

Referring now to Figures 20 and 21, it will be seen that the advancing screw 156 which operates the dictator's carriage is extended through the base 96 and carries on an extension thereof a formed worm 366 which cooperates with a worm gear 368. Attached to the worm gear 368 is a counter shaft 370 suitably journalled in bearing posts 372 and 374 affixed to the base plate 96. Formed on the counter shaft 370 is a worm 376 which in turn cooperates with the worm gear 378. Worm gear 378 is suitably attached to a vertical shaft 380. The vertical shaft 380 is suitably journalled in bearing posts 362 and 352 formed on the base 96. The vertical shaft 380 connects to the transmitting self-synchronous device 364 by means of a suitable coupling 382.

We propose to arrange the aforementioned reduction gearing so that the transmitting self-synchronous device will rotate 180 degrees or less as the carriage travels the full length of the recording medium.

It will thus be seen that since the dictator's carriage is fastened securely to the dictator's advancing screw 156, that the position of the head along the length of the record is a function of the number of turns the advancing screw 156 has revolved. It will also be seen that with the advancing screw 156 connected through the aforementioned reduction gearing to the self-synchronous device 364, that the rotation of the self-synchronous device 364 operates as a function of the number of revolutions of the advancing screw. Thus it follows that the angular position of the rotor of the transmitting self-synchronous device 364 with respect to its initial position is directly a function of the position of the dictator's carriage along the length of the record.

As will be later shown the transmitting self-synchronous device 364 connects indirectly with the receiving self-synchronous device 40 in the distator's control panel and thus indicates to the dictating operator the exact position of the dictator's carriage at all times.

Reference to Figure 20 will show that we have provided a differential self-synchronous device 384 suitably secured to post 352 formed on the base 96. Affixed to the shaft 386 of the self-synchronous device 384 is a collar 388 which carries an insulating arm 390. Positioned on either side of the insulating arm 390 (see Figure 22) are spring switch fingers 392 and 394 which carry contacts 396. Suitably located near contacts 396 are associated contacts 398 and 400. Contacts 398 and 400 are affixed to supporting arms 402 and 404. Arms 402 and 404 as well as spring fingers 392 and 394 are mounted on the post 352 by insulating blocks 406 and 408 in such a manner as to be insulated each from the other as well as from the post 352. Spring fingers 392 and 394 resiliently contact the arm 390 and maintain it in a neutral position with contacts 398, 400 and 396 disengaged whenever the self-synchronous device 384 is de-energized.

We have shown the differential self-synchronous device 384 and the associated switch means attached to the post 352 formed on the base 96. As there is no mechanical connection between these devices and the other devices which are mounted on the base 96, it follows that the differential self-synchronous device may be mounted in any convenient location.

Referring to Figure 22 it will be seen that when the self-synchronous device 384 is rotated so as to bring the arm 390 to the left of the center position an electrical circuit will be formed between contacts 396 and 398. Conversely when the self-synchronous device 384 has rotated to the right so as to bring arm 390 to the right of the neutral position another electrical circuit will be formed between contacts 396 and 400. The differential switch means just described cooperates with the transmitting self-synchronous device 364 and the receiving self-synchronous device 40 in a novel manner which will now be described.

As is well known in the art, the fundamental characteristic of the self-synchronous device, is that a given angle of displacement in the transmitting self-synchronous device will cause a similar and equal angle of displacement in the receiving self-synchronous device. Thus it will be seen that if we connect the transmitting self-synchronous device 364 to the receiving self-synchronous device 40 located in the dictator's control panel, the receiving self-synchronous device 40 will indicate accurately to the dictating operator the position of the carriage along the record at all times. Further, if we connect the transmitting self-synchronous device 364 to the receiving self-synchronous device 40 through a differential self-synchronous device 384 in a conventional manner, it will be seen that as long as the resistance to turning of the differential self-synchronous device 384 is greater than that of the receiving self-synchronous device 40, the receiving self-synchronous device 40 will continue to indicate correctly the position of the carriage along the record.

If, on the other hand, the receiving self-synchronous device 40 is turned by hand, the differential self-synchronous device 384 then must be displaced inasmuch as the transmitting self-synchronous device 364 is tied mechanically to the lead screw 156 and cannot revolve independently. It will be further seen that rotation of the differential self-synchronous device 384 will establish electrical circuits in the manner already described and this establishment of circuits may be used as a means of controlling the travel of the dictator's carriage.

These circuits may be maintained after they are once established by properly utilizing the brake 46 which is built into the housing of the receiving self-synchronous device 40. This brake may be included in suitable circuits in such a manner that said brake will be energized to hold the receiving self-synchronous device 40 in the position in which it was placed by the operator, so that it is not necessary to hold it there by hand, whenever the aforementioned contacts are established.

The precise manner in which this is accomplished and the electrical circuits pertaining thereto will be described in detail in connection with the wiring diagram.

As has been previously pointed out, we prefer to make the dictating machine 2 of such type that it may be used to replace the conventional office system comprising a dictating machine, a transcribing machine and a shaving machine. We also prefer to make the machine 2 of such type that it may be readily remotely operated by a dictating operator and a transcribing operator. We have accordingly provided the dictating operator, as has been hereinbefore illustrated, with a control panel 6 and a foot switch 10 which may be used by the dictating operator to remotely control the dictating equipment mounted on the machine unit 68.

In a like manner, we have provided the transcribing operator with a control panel 14 and a foot control station 16 which may be used by the transcribing operator to perform the necessary operations for satisfactorily transcribing the record by operating certain transcribing equipment which is mounted upon the machine unit 68.

In order that the transcribing operator may easily and readily perform the necessary functions on the machine 2 which are required for satisfactory transcription of the record without removing her hands from the keyboard of the typewriter and thus losing the normal positioning thereof as is used in the touch system of typing, we have provided the foot control station 16 which may be connected to the machine unit 2 by the cable 12. A requisite of a transcriber's control station is that the transcribing operator may stop the reproduction of the recording at any time she may wish and restart it in a like manner so that she may suitably record the dictated material recorded on the recording medium 98 as by typing without requiring a speed of typing which is equal to the speed at which the dictating operator dictated the material.

We have accordingly provided a foot control switch 410 (Figures 23 and 24) on the foot control station 16 which operates to render such transcribing equipment inoperative when released in order to allow for a pause in the transcription. The foot control switch 410 may be placed in the center of the foot control station 16.

The foot control device 410 may comprise a foot-operated push button which includes a pedal 412, hinged to a base 414 as by a hinge pin 416.

The pedal 412 cooperates with a piece of spring material 418 which carries a movable electrical contact 420 so arranged as to make electrical contact with a stationary contact 422 which is suitably secured to the base 414 as by a nut 424. It will thus be seen that depression of the foot control device 410 will establish an electrical circuit between the movable contact 420 and the stationary contact 422. Conversely, releasing the foot switch 410 will allow the spring material 418 to raise the foot control device 410 into a raised position and thus interrupt the circuit formed between the contacts 420 and 422. The manner in which the foot control device is used to control certain equipment mounted on the machine unit 68 will be described in detail in connection with the wiring diagram.

It is also desirable that the transcribing operator be provided with a means whereby she may cause certain portions of the dictated material to be reproduced a number of times. It is also desirable that the transcribing operator be provided with a means whereby she may reproduce material from the recording medium which may lie at a point remote from the portion of the recording medium where transcription is being accomplished. These portions of the recording medium may lie either forwardly along said recording medium or back along the record toward the fore part thereof. We have therefore provided a second foot control device 426 which is identical in construction and operation with the foot control device 410 previously described. The foot control device 426 operates to control certain transcribing equipment mounted in the machine unit 68 in such a manner that the transcribing operator may have reproduced to her as sound portions of the recorded dictation which lie toward the fore part of the record. This may, for convenience, be designated the "transcriber's high speed left travel switch."

In the same way we have provided a third control device 428 which is also identical in construction and operation with the previously described control device 410. The control device 428 operates so that upon depression thereof, it will cause the certain transcribing equipment mounted within the machine unit 68 to operate so as to allow the transcriber to hear reproduced as sound, recorded dictation which lies farther along the record or nearer the end of the recorded dictation. This may be hereinafter referred to as the "transcriber's high speed right travel switch."

Inasmuch as these three control devices 410, 426 and 428 may be used to perform the major operations of certain transcribing equipment as has been heretofore described, we prefer to place these control devices underneath the desk 18 of the transcribing operator so that she may control the machine 2 in such a manner as to transcribe suitably the material recorded on the recording medium 98, without removing her hands from the keyboard of the typewriter.

It is also essential, in order that satisfactory remote operation of the machine 2 by the transcribing operator may be accomplished, that she be provided with certain indicating means which will continuously indicate to her certain conditions which are necessary for satisfactory transcription of the record.

It is also essential that these indicating devices be so positioned that the transcribing operator may readily see at a glance the exact function and operation being performed by certain transcribing equipment included in the machine 2. For this reason we prefer to make the control panel 14 (Figures 25 and 26) in the form of a housing 430 which has included on the front face thereof a removable panel 432. The control and indicating panel 14 may be so placed on the desk 18 of the transcribing operator that the aforementioned indicating devices which are mounted on the removable panel 432 may be readily seen by said operator.

In order that the transcribing operator may readily ascertain whether the machine 2 is in an operative condition, we have provided an indicating light 434 which is mounted on the removable panel 432 and which is used to indicate the fact that the machine 2 is in a condition to be operated by the transcribing operator to transcribe the dictated material recorded on the recording medium 98.

It is highly desirable that the transcribing operator may have some means of knowing the relative location with respect to the total amount of dictation which may be recorded on the recording medium 98 of the particular portion of said dictation she may be transcribing at any instant.

We have accordingly provided a carriage position indicating device in the form of special volt meters 436 which, for convenience, may be mounted in the upper center of the removable panel 432.

The special volt meters 436 cooperate with certain equipment included in the machine unit 68 in a novel manner which will be described in detail hereinafter.

As has been pointed out in connection with the dictator's control panel 6, we have provided therein certain devices which may be operated to indicate to the transcribing operator the location of certain points of interest to which he wishes to call said operator's attention. These points may include the location of "errors" or the "length" of the dictated material. It therefore follows that it is essential that we provide the transcribing operator with indicating devices which enable her to see at a glance the location of the portion of the recording to which the dictating operator wishes to call her attention. We prefer to indicate this by showing the relative amount of recorded dictation which is included between that portion of the recording which she may be transcribing at any instant and the portion of the recording that the dictating operator wishes to call to her attention.

We have therefore provided "error" and "length of dictation" indicating devices in the form of identical volt meters 438 and 440 mounted for convenience in the upper left and upper right portions of the removable panel 432 respectively. The volt meters 438 and 440 cooperate with certain equipment included in the dictating machine unit 68 to indicate properly to the transcribing operator certain portions of the recording medium, to which the dictating operator wishes to call her attention, in advance of the time that she may transcribe that portion. These devices operate in a new and novel manner which will be explained in detail in connection with the wiring diagram.

Inasmuch as it is our desire to construct the machine 2 in such a manner that it will replace not only a dictating and a transcribing machine but a shaving machine, it is necessary that we provide certain equipment which may be remotely operated so as to shave or recondition the recording medium. Inasmuch as the recording medium should be reconditioned after all of the dictated material which has been recorded thereon has been suitably transcribed for record by the transcribing operator, we prefer to make the transcribing operator responsible for this operation and have accordingly provided her with a control device 442 comprising a push button which may be mounted on the removable panel 432 so that operation thereof will cause certain equipment included in the machine unit 68 to operate so as to recondition the recording medium for further dictation.

We have placed the control device 442 which operates to recondition the recording medium in such position that it may be operated by the transcribing operator inasmuch as she is the one who will most likely know definitely whether all of the dictated material recorded on the recording medium 98 has been transcribed. In order that the transcribing operator may be apprised of the fact that the machine 2 is no longer in a condition to be operated for transcription and that the reconditioning process has been started as the result of the depression of the control device 442, we provide on the removable panel 432 an indicating light 444. This indicating light 444 serves to indicate to the transcribing operator the conditions of operation of the machine 2 as hereinbefore described in a novel manner which will be discussed in detail hereinafter.

All of the control and indicating devices which are mounted in the transcriber's control panel 14 may be electrically connected to the dictating machine 2 by the cable 12.

In order that the transcribing operator may have suitably reproduced as sound the material which is recorded upon the recording medium 98, we have provided in the end of the control panel 14 suitable electric connectors such as phone tip jacks 446 which may be used to connect any suitable sound producing device to certain transcriber's equipment included in the machine unit 68. The sound producing devices which may be connected by the connectors 446 to the dictating machine 2, may comprise any suitable electrically operated sound producing device, but for convenience we prefer to show as this device a standard telephone receiver or head set.

It is often desirable that the transcribing operator have some means of adjusting the volume of the reproduced dictation to meet certain conditions arising during the transcription of the record. We have accordingly provided a transcriber's volume control unit 448 mounted on the front panel 432 which may be used at will to increase or decrease the volume of the reproduced sound.

While we have described a panel for use in remotely controlling a dictating machine of our invention which utilizes electric recording and reproducing, it falls within the scope of this invention to use said panel for controlling a machine which utilizes a mechanical acoustic system for recording and reproducing.

In order that the transcribing operator may suitably reproduce the speech and other sounds which have been recorded upon the recording medium by the dictating operator, we have provided a transcriber's electrical reproducing head 450 (Figure 12) which includes a reproducing stylus 452, and which may be suitably mounted on a transcriber's carriage structure 454. The transcriber's carriage structure 454 is adapted to be moved along the recording medium 98 during the transcription process, in the proper direction and at the proper speed for reproducing, by a transcriber's advancing screw 456. The transcriber's advancing screw 456 is suitably journalled in the end plates 96 and provided with thrust bearings to prevent endwise movement of the transcriber's advancing screw 456 in a manner identical with that previously described in connection with the dictator's advancing screw 156.

To move properly the transcriber's carriage structure 454 along the record during the transcription process, it is necessary that the advancing screw 456 be driven in sunchronism with the recording medium 98. We have therefore provided a driving means which operably connects the record supporting shaft 100 to the transcriber's advancing screw 456.

Referring to Figure 8, it will be seen that this driving means is identical to that which has previously been described in connection with the dictating equipment and may include a worm reduction gear system comprising the worm 166 formed on the record shaft 100 and a worm gear 458. The worm gear 458 may transmit power from the record shaft 100 through a countershaft 460, suitably journalled in posts formed on the base 96, an electric clutch 462, another countershaft 464 suitably journalled in posts formed on the base 96, and a pair of bevel gears to the transcriber's advancing screw 456.

The electric clutch 462 is identical in construction with the electric clutch 170 previously described. The function of the electric clutch 462 is similar to that of electric clutch 170 and differs only in that it controls the transcriber's operation while the latter controls the dictator's operation. These electric clutches may be hereinafter referred to as transcriber's and dictator's synchronizing clutches respectively. The synchronizing switch formed by fingers 206 and segments 214 of the dictator's synchronizing clutch 170 will be hereinafter referred to as switch means 466 while that associated with the transcriber's synchronizing clutch 462 will be termed switch means 468. The operation of these electric clutches and switch means will become apparent when the wiring diagram is described.

It will be remembered that we have provided a transcriber's reproducing head 450 which is suitably mounted to the transcriber's carriage structure 454 in such a manner that the aforementioned head may suitably cooperate with the recording medium 98. The carriage structure 454 is similar to that previously described in connection with the dictator's recording and reproducing equipment. The carriage structure 454 is in fact identical to the carriage structure 154 except for one point—that is to say that the head carriage device 248 of the dictator's structure carries the head supporting structure 276 on which there are mounted two electric heads and a shaving tool. The transcriber's head carriage device differs from that of the dictator in that it has mounted thereon only the transcriber's reproducing head 450. It will be noted then by referring to Figure 12 that we have mounted a nut 470 which completely encircles the advancing screw 456 and which is mounted in the transcriber's carriage device 454 in a manner identical to that previously described in connection with the dictator's carriage structure 154.

In a like manner we have provided guide bars 472 and 474 which are used to support the weight of the carriage 454 and guide it in its travel along the record. The guide bars 472 and 474 cooperate with a tail piece 476 and a guide channel 478 which are identical in construction and operation to those previously described in connection with the dictator's carriage structure 154. We have also provided an inner carriage structure 480 which is mounted within the transcriber's carriage 454 and arranged to be periodically moved forward by a micrometer advancing screw 482. The construction of the inner carriage structure 480 and the micrometer advancing screw 482 and the manner in which the advancing screw 482 and the carriage structure 480 cooperate with the carriage 454 are all identical in construction and operation with those previously described in connection with the dictator's carriage structure 154. We have provided on the micrometer advancing screw 482 a ratchet wheel 484 so arranged as to cooperate with a pawl which may be mounted on the end plate 96 in such a manner that the inner carriage structure 480 will be moved forwardly toward the axis of the recording medium 98 whenever the carriage 454 is in its extreme right hand position. This periodic advance of the inner carriage 480 is used to compensate for periodic reductions in size of the recording medium 98 which will result from the shaving operation. In a manner similar to that used in connection with the dictator's equipment, we have provided a transcriber's head carriage device 486 which is similarly mounted to the inner carriage device 480.

As has been previously pointed out in connection with the dictating equipment, we prefer to rotate the recording medium 98 continuously and render the transcriber's reproducing head 450 inoperative during pauses in the transcription by removing the head from the recording medium 98. In order that the head carriage 486 may be rotated about a hinge pin 488 so that the reproducing head 450 may be moved into and out of engagement with the recording medium 98, we have provided a transcribing actuating means including a solenoid 490 which cooperates with a suitable linkage 492 so as to rotate the carriage structure 486 in a counterclockwise direction, as shown in Figure 12, about the hinge pin 488 whenever the solenoid 490 is energized.

The linkage 492 is identical in construction and operation with the linkage 254 previously described in connection with the dictator's carriage structure 248. In order that the transcriber's reproducing head 450 may be properly located with respect to the surface of the recording medium 98 whenever the solenoid 490 is deenergized, we have provided wedge type projections 494 which are suitably attached to the transcriber's head carriage 486. The wedge type projections 494 are arranged to cooperate with similar hardened tapered seats 496 which may be suitably secured to the transcriber's inner carriage structure 480.

The projections 494 and the hardened seats 496 rigidly locate the transcriber's reproducing head 450 with respect to the surface of the recording medium 98 in a manner similar to that described in connection with the centralizing and stopping means for the dictator's head carriage device 248.

As was pointed out in connection with the description of the transcriber's foot control station 16, we have provided a controlling means which includes a "transcriber's high speed left travel switch" whereby the transcribing operator may cause certain portions of the dictated material to be reproduced a number of times. There is also provided control means which includes a "transcriber's high speed right travel switch" whereby the transcribing operator may reproduce material from a portion of the recording medium which may lie at a point remote from the portion of the recording medium where the transcription is being accomplished. We have further stated that these control devices control certain equipment in the dictating machine unit 68 so as to bring about the desired result.

We have therefore arranged mechanisms in the machine unit 68 which will cause the transcriber's carriage structure 454 to move at high speed to the left or back toward the forepart of the recording medium 98 whenever the foot control pedal 426 is depressed and which will cause the transcriber's carriage 454 to travel to the right at high speed along the recording medium 98 whenever the foot control device 428 is depressed.

This high speed driving means may include a transcriber's travel motor 498 (Figures 20 and 21) which may be operably connected to the transcriber's travel clutch mechanism 500. The motor 498 and the associated electric clutch 500 and other mechanisms are identical in construction with the dictator's travel motor 350, electric clutch 354, etc., previously described.

The electric clutch 500 may derive power for its operation from suitable brushes retained in brush guides 502 attached to a post 504 formed on the base 96.

In order that the transcriber's carriage position indicating device 436 may at all times properly indicate the position of the transcriber's carriage 454 with respect to the length of the record, we have provided a portion of the indicating means which includes suitable mechanisms for controlling the potentials across certain electric circuits as a function of the movement of said carriage. We have therefore provided a secondary potentiometer 506 (Figure 27) and a primary potentiometer 508 which are driven by suitable reducing gear means from the transcriber's advancing screw 456.

The transcriber's advancing screw 456 has formed thereon a worm 510 which is arranged to mesh with a worm gear 512. The worm gear 512 may be suitably attached to a vertical shaft 514 journalled at the upper end by a post 504 formed on the main frame 96 and which extends to the special secondary potentiometer 506 and is connected thereto as by a coupling 518. The vertical shaft 514 also has a worm 520 formed thereon which engages a worm gear 522. The worm gear 522 is suitably secured to a horizontal shaft 524 which is journalled in a bearing post 526 suitably attached to the post 352. The shaft 524 connects to the primary potentiometer 508. The manner in which these potentiometers operate as a definite function of the location of the carriage 454 with respect to the length of the record will now be described.

Since the carriage 454 is connected to the advancing screw 456, the position of the carriage 454 with respect to the length of the record is a function of the number of revolutions of the advancing screw 456. Thus in order to measure the exact position of the carriage with respect to the length of the record, it is only necessary to measure the number of revolutions the advancing screw 456 has made in order to advance the carriage 454 to that position. In order to do this we have provided the two potentiometers with associated gearing as heretofore described.

Potentiometer 508 is driven by the reduction gearing system comprising worms 520 and 510 and worm gears 522 and 512 in such a manner that the rotating arm of the potentiometer 508 makes less than one complete revolution during the complete travel of the carriage 454 over the full length of the record. Thus it will be seen that the potentiometer 508 will, if properly used in connection with a volt meter or other potential or current sensitive device, measure the exact position of the carriage 454 with respect to the length of the record.

The potentiometer 506 on the other hand is geared to the advancing screw 456 in such a manner that an arm 528 (Figure 28) of the potentiometer 506 which engages a resistance strip 530 contained therein will make a number of complete revolutions during the total travel of the carriage 454 along the length of the record.

Potentiometer 506 differs from a commercial potentiometer in that there are no stops provided for the arm 528 and the resistance strip 530 extends in very nearly a complete circle so that the arm 528 in making a revolution has a very narrow neutral portion in which it does not contact any portion of the resistance strip.

It is proposed to arrange the voltage applied to the potentiometers 506 and 508 in such a manner that the potentiometer 506 operates to increase the accuracy of the indication and the reading obtainable over that of a system using a single potentiometer.

The manner in which the potentiometers 506 and 508 are connected to the volt meters 436 in the transcriber's control panel 14 will be described in detail in connection with the wiring diagram.

It will be noted in connection with the dictator's control panel 6 and the transcriber's control panel 14 that we have provided therein devices whereby the dictating operator may create and cause to be retained a condition which may later be used to inform the transcribing operator that the dictating operator wishes to call her particular attention to that portion of the dictated material.

In the present state of the art, the dictator, in order to indicate the location of "errors" or the "length of dictated material" to the transcribing operator, must make suitable markings on a slip of paper either by hand or by using certain remotely operated equipment.

These markings are placed on the paper so that their location bears the same relationship to the length of the said slips as do the location of "errors," etc., with respect to the length of the record. These slips of paper are then placed in a suitable position on the transcribing machine so that they may be seen by the transcribing operator.

In the machine of our invention, where it is virtually impossible for the transcribing operator to see the recording medium, it is essential that a means be provided which will readily apprise the transcribing operator of the location of "errors" etc., regardless of said operator's position with respect to the machine.

In the machine of our invention, we have eliminated the slips of paper and have provided the aforementioned means in the form of certain mechanical and electrical equipment which cooperates with the aforementioned electrical controlling and electrical indicating means. This system of indication may be hereinafter referred to as "remotely operated marking devices."

In general, the remotely operated marking equipment may be considered as being divided into three parts which are analogous to certain parts and operations of the system at present known to the art.

The first operation which is performed under the old system consists of the operation by the dictator to make certain markings on a slip of paper. We have, in our invention, provided the first portion of the marking equipment in the form of a dictator's condition creating means. The use of the dictator's condition creating means enables the dictating operator to create certain conditions as a function of the location of the aforementioned points of interest with respect of the length of the record.

The second portion of the old system includes the slip of paper which operates to store the pencilled markings made by the dictator until they are needed by the transcriber. We have also provided a second portion which is analogous to that just described and comprises a condition retaining means. The condition retaining means functions to retain the conditions which have been created by the dictating operator until such time as the information retained thereby is needed by the transcribing operator.

The third operation under the old system consisted of transferring the slips of paper from the dictating machine to the transcribing machine and the inspection by the transcribing operator of said slips to interpret the marks stored thereon. We have provided in the system of our invention a condition interpreting means which includes certain automatically and remotely operated devices which function to interpret the retained conditions and transmit them to the transcribing operator.

Inasmuch as the transcriber is enabled under the old system to look ahead and determine the amount of recording to be considered before the pencilled marking is reached, we have so arranged the devices comprising the condition interpreting means that the interpretations of the retained conditions will be transmitted to the transcribing operator in advance of the time she may consider that portion of the recording. We further make these transmissions of such type that the indication to the transcribing operator is continuous thereby enabling said operator to consider them at her own convenience.

The dictator's condition creating means may include the "error" and "length" of dictation push buttons 54 and 56 which are located in the dictator's control panel as has been heretofore described. The push buttons 54 and 56 may be connected by means of the cable 12 to "error" and "length" of dictation solenoids 534 and 532 respectively (Figures 7 and 12). The solenoids 532 and 534 are mounted on a bracket 536 which is suitably secured to the dictator's carriage 154. The solenoids 532 and 534 slidably guide armatures 538 and 540 respectively so that upon energization of either solenoid, the corresponding armature will be raised to an operative position.

When raised into the operative position, the armatures 538 and 540 function to control the second portion of the marking equipment comprising a suitable condition retaining means in such a manner that certain conditions will be created and retained in a position which is a function of the position occupied by the dictator's carriage 154, with respect to the length of the record at the time the corresponding solenoid was energized.

This condition retaining means may include a rod 542 which extends longitudinally the full length of the record and is securely fastened in position by suitably affixing it to the end frames 96. The rod 542 may have a keyway 544 cut therein full length. Mounted alternately on the rod 542 are a sufficient number of condition retaining members in the form of rotary stops and isolating members or spacers to completely cover said rod for a space equal to the length of the record.

The rotary stops are made of thin metal and include a central washer-like portion having a central opening through which the rod 542 may be passed, and extending arm portions 546 and 548. These arm portions may hereinafter be referred to as stops 546 and 548. The stops 546 and 548 are spaced from adjacent stops by isolating members in the form of washers 550 which are received on the bar 542 and non-rotatably maintained thereon by lugs which extend into the keyway 544. This assembly of alternate stops and spacers is maintained in relative friction engagement by collars 552 and 554 and compression springs 556 to prevent any of the stops 546 or 548 from rotating under the influence of gravity or vibration.

It will be noted that rotation of any stop 546 or 548 will not be transmitted to an adjacent stop inasmuch as the stops 546 and 548 are all separated from each other by the non-rotatably mounted washers 550. We prefer to make the stops 546, 548 and the washers 550 very thin, so that a great number may be included in a space equal to the length of the record.

We prefer to locate this condition retaining means directly above the solenoids 532 and 534 so that as the armatures thereof are raised into the operative position they will strike the rotary stops 546 and 548. Thus it will be seen that whenever either of the push buttons 54 or 56 is pushed, the corresponding solenoid will be energized and the slidably guided armature thereof will strike the rotary stop 546 or 548 a blow sufficient to cause it to be rotated slightly from the neutral position.

In order that the armatures 538 and 540 may contact a minimum number of the stops 546 and 548 we have made them with the upper ends thereof in the form of thin flat bars. The thickness of these ends should be such that they will not enter the space between two stops but will always contact at least one. We prefer to make the bodies of the armatures 538 and 540 square so that the upper ends thereof may be continually kept in the proper relationship with the stops 546 and 548.

It will be seen that each of the multiplicity of rotary stops may correspond to a small and particular portion of the recording medium 98, and that displacement of one of these stops may establish and cause to be retained a condition which corresponds to the portion of the recording medium 98 which was being recorded upon at the time the proper solenoid was energized to displace said stop.

Inasmuch as it is very unlikely that the dictating operator would wish to establish an "error" and a "length of dictation" indication at identical portions of the recording; we have, in order to simplify the construction, shown the stops 546 integral with the stops 548. It lies within the scope of this invention however to make the stops 546 separate from the stops 548, and we are not limited to the type of construction shown as it is obvious to those skilled in the art that other arrangements of elements may also be satisfactorily used.

Since the solenoids 532 and 534 are mounted on a projection of the dictator's carriage, they must move along the stops in synchronism with the recording head 146 as it moves along the recording medium 98. Thus it is seen that by energizing either solenoid 532 or 534 and causing one of the stops 546 or 548 to be displaced from its neutral position, we have provided a means of creating and retaining a condition at a point along the length of the record where an error may have occurred or which may be the end of the dictation.

As has been hereinbefore stated, we provide certain automatic and remotely operated equipment which will interpret the location of the aforementioned retained conditions and transmit certain understandable indications to the transcribing operator. We prefer to accomplish this by providing a pointing means comprising automatically operated carriage devices 558 which will take up successive positions which correspond to the positions of the aforementioned conditions, and by providing suitable indicating means which will indicate the relative positions of these carriage devices to the transcribing operator. Referring to Figures 7, 12 and 21, it will be seen that the carriage devices are adapted to be driven along the length of the record in a position which enables them to operate in conjunction with the aforementioned condition retaining means. The drive means for the carriage device may include a lead screw 560 which is suitably journalled in the end plates 96 and fitted with thrust bearings 562 to prevent end-wise movement thereof. The advancing screw 560 may be suitably driven by a geared reversible electric motor 564 through a gear train and a combination electric clutch and brake 566.

Referring to Figures 20 and 21, it will be seen that advancing screw 560 is suitably journalled in a post 568 formed on the base 96 and has slidably splined thereon a clutch armature 570. The clutch armature 570 cooperates with a clutch magnet 572 so that upon energization of the clutch magnet 572, the advancing screw 560 will be drivably connected thereto. In the same manner an advancing screw 574, associated with the "length of dictation" indicators, is journalled in post 568 and slidably splines a clutch armature 576. Clutch armature 576 in turn cooperates with a clutch magnet 578 in a manner similar to clutch magnet 572. The clutch magnets 572 and 578 are suitably secured to stub shafts 580 and 582 which are journalled in a bracket 584 suitably attached to the posts 568 and 352. Also attached to the stub shafts 580 and 582 are spur gears 586 and 588 which in turn mesh with a spur gear 590 suitably attached to the shaft of the motor 564. Electric clutches 566 and 578 may be energized by suitable brush mechanisms 592 and 594, suitably secured to a post 596 formed on the base 96.

We prefer to make motor 564 reversible so that upon energization of the motor 564 and the proper electric clutch 566 or 578, either of the carriage devices 558 may be caused to travel at high speed in either direction along the record and along the stops 546 and 548.

Inasmuch as the devices which are used to indicate the location of "error" markings to the transcriber are identical in construction and operation with those used to indicate the "length" of dictation, we deem it necessary to describe only one. We will therefore confine our attention to the equipment which operates in conjunction with the "error" indications.

Referring to Figure 7, it will be seen that the carriage device 558 includes an insulating block 598, which is fitted with a nut 600 into which is threaded the advancing screw 560. Thus it will be seen that rotation of the advancing screw 560 will move the carriage device 558 in one direction while a reverse rotation will move it in the opposite direction. In order to prevent the block 598 from rotating about the axis of the advancing screw as the advancing screw rotates, we have provided guide channels 602, 604, 606, 608 and 610 (Fig. 12) which operate not only as guide channels but as electrical conductors to conduct the electric circuit from the stationary equipment to certain contacts and a solenoid mounted on the carriage device 558. This connection is made to the guide channels by means of spring brushes 612. Guide channels 602 to 610 inclusive are insulated from the frame 96 of the machine by insulating blocks 614 suitably secured to the frame 96.

In order that the carriage device 558 will automatically take up successive stationary positions corresponding to the aforementioned conditions, we have provided thereon certain electrical and mechanical equipment. Still confining our discussion to the equipment for indicating the location of "error" markings, it will be seen that the insulating block 598 carries a solenoid 616. The solenoid 616 slidably guides a downward extending armature 618.

The armature 618 extends downward such a distance that it will clear the stops 546 when they are in the neutral position, but will contact any of said stops which have been pushed upward from said neutral position. The equipment is so arranged however, that should the solenoid 616 be energized, the armature 618 will be retracted sufficiently to clear all of the rotary stops, displaced or otherwise.

Referring to Figure 7 then, it will be seen that solenoid 616 is suitably secured to an insulating base 620. The insulating base 620 is in turn resiliently attached to the insulating block 598 by means of a piece of spring material 622. At the other end of the base 620 is mounted a contact point 624, which is positioned to make contact with a stationary contact point 626 mounted on the insulating block 598. It will be seen that the movement of the solenoid 616 about the spring material 622 is limited in the clockwise direction by the contacts 624 and 626 and in the counter-clockwise direction by a bracket 628 which extends down from the insulating block 598. It will be seen then that if the block 598 as shown in Figure 7, were to move to the right until the armature 618 of the solenoid 616 were to strike one of the stops 546 which had previously been pushed upward, the solenoid 616 would hinge about the spring material 622 and close the contacts 624 and 626, thereby establishing an electrical circuit which is conducted through the guide channels 602 to 610 inclusive to the stationary equipment mounted on the base 96.

The establishment of this electric circuit may then be effective in causing the carriage device 558 to stop in its travel to the right. The manner in which this is accomplished will be explained in detail in connection with the wiring diagram.

Referring to Figure 12, it will be seen that we have provided identical equipment to that just described which includes a solenoid 630 for controlling the operation of the "length" of dictation advancing screw 574 and the associated indicating devices.

Cooperating with the solenoids 630 and 616 and the drive means for the advancing screws 560 and 574 are contacts 632 which are mounted on spring fingers 634 and 636 carried by an arm 638 which is extended from the transcriber's carriage 454 and insulated therefrom. The contacts 632 are so located that they may engage contact points 640 mounted on the insulating blocks 598. The manner in which these contacts operate to control the marking equipment will be described in connection with the wiring diagram.

It has been pointed out, however, that the contacts 624 and 626 are used to stop the travel of the carriage device 558 when it has moved along the record to a point corresponding to the position of the dictator's recording head at the time the stop 546 was displaced from a neutral position. In a similar manner, the contacts 632 and 640 function to start the carriage device 558 moving along the record whenever the transcriber's reproducing head has reached the aforementioned point, and at the same time momentarily energize the solenoids 616 and 630 so that the downward extending armatures will be raised to clear the stop 546 or 548 which caused the carriage device 558 to come to rest at that point.

It was pointed out before that the particular stop 546 which was pushed up by action of the solenoid 534 in itself registers the position of the dictator's carriage along the record at the time the error was made. In the same way, since the carriage device 558 is caused to come to rest whenever it encounters one of the stops which is displaced from the neutral position, the location of the carriage device when at rest indicates the position of the "error" or other pertinent portion of the record. It follows then, that such location may be indicated to the transcribing operator by utilizing a system similar to that used for indicating the position of the transcriber's carriage.

We prefer to accomplish this by the use of measuring devices comprising geared potentiometer systems which may actuate the indicating devices 438 and 440 located in the transcriber's control panel 14, and which is similar to that used for indicating to the transcribing operator the position of the transcribing carriage 454 with respect to the length of the record, except that these systems use a single potentiometer system.

For operating the "error" indicators 438, the equipment may include a potentiometer 642 which is connected by suitable reduction gearing to the "error" advancing screw 560. The mechanism for operating the "length of dictation" indicators 440 may include a potentiometer which is identical to that used with the "error" equipment and which is connected by identical reduction gearing to the "length" advancing screw 574.

The gearing system which drives the potentiometer 642 may include a worm 644 which is formed on the "error" advancing screw 560 (Fig. 7) and which is arranged to mesh with a worm gear 646. The worm gear 646 may be suitably attached to a vertical shaft 648 journalled at the upper end by a post 650 formed on the main frame 96 and which extends downward to the post 352, and is journalled therein by suitable journalling means. The vertical shaft 648 also has a worm 652 formed thereon which engages a worm gear 654. The worm gear 654 is suitably secured to a horizontal shaft 655 which is journalled in a bearing post 656 suitably attached to the post 352. The shaft 655 connects to the potentiometer 642. This potentiometer operates in a manner similar to the potentiometer 508 previously described, in such a manner that the position of the arm thereof with respect to its allowable travel is a function of the position of the carriage device 558 with respect to the length of the condition retaining means.

The potentiometer which is used to indicate the position of "length" indications, and the gearing system which drives it is identical to that described above and it is not deemed necessary to describe it in detail.

The manner in which the potentiometers are connected to the voltmeters 436, 438 and 440 in the transcriber's control panel and the operating sequence of the indicating equipment just described will be described in detail in connection with the wiring diagram.

In order to simplify the operation of the dictating machine from the dictating operator's standpoint, we have provided a position registering mechanism or point defining means which is similar in the principles of construction and operation with that described in our co-pending application Serial No. 17,666. As shown in Figures 12 and 29, the position registering mechanism may consist of an insulating block 658 guided by square tubing 660. The square tubing 660 is supported by suitable insulating brackets from the end frames 96 and has a slot cut full length in the under side thereof. Secured to one end of the block 658 and in a position to be engaged by a second contact 662 is a stationary contact 664. The movable contact 662 is carried by a vertical arm 666 from a bracket 668 suitably attached to the dictator's carriage 154. The stationary contact 664 is connected as by conductor 670 to brushes 672 which are forced apart and into contact with the hollow tubing 660 as by springs 674. The brushes 672 and springs 674 also cooperate to provide a frictional drag on the block 658.

Thus it will be seen as the recording process is carried on, the block 658 is pushed forwardly by the carriage 154 and the upwardly rising arm 666, and furthermore that the contacts 662 and 664 are closed, establishing electrical circuits between the arm 666 and the hollow tubing 660.

If, on the other hand, the carriage is moved in the reverse direction as it would be in order to play back certain of the recorded material, the block 658 will be left in its previous position while the arm 666 will move away therefrom. Thus it follows that the block 658 accurately registers the position at which the last of the dictated material was recorded and as the carriage is moved in the right hand direction approaching the block 658 the closing of the contacts 662 and 664 will accurately indicate the fact that the point at which the last of the dictated material was recorded on the record has been reached. The way in which the contacts 662 and 664 cooperate with the driving equipment will be explained in detail in connection with the wiring diagram.

Reference to Figures 12 and 29 will also show that we have provided a solenoid 676 which is mounted on the bracket 668 and which slidably guides an armature 678. The armature 678 is so arranged that energization of the solenoid 676 is effective in forcing said armature upward until it will engage the rearward face of the insulating block 658. This may then be used as a means for returning the block 658 to the beginning of the record during the shaving operation.

In accordance with an object of our invention, namely to provide a machine which will replace the present dictating system which includes three types of machines, a dictating machine, a transcribing machine and a shaving machine, we have also included in the dictating machine of our invention equipment which will operate to shave or recondition the recording medium. Inasmuch as it is generally conceded that the shaving operation can best be performed if the wax recording medium is rotating at a speed considerably higher than the speed at which the recording is accomplished, we have accordingly provided a driving system which will rotate the recording medium 98 at a high speed. This may comprise a suitable electric motor 680, (Figure 7) which is arranged to drive the record shaft 102 through a suitable electric clutch 682. The motor 680 may be mounted to the formed projection 352 on the base 96 and be coupled by means of a suitable coupling 684 to a hollow shaft 686. Hollow shaft 686 is in turn journalled in the frame 96 by means of suitable bearings 688. Suitably secured to the hollow shaft 686 is a clutch magnet 690 which cooperates with a clutch armature 692 splined to the shaft 102 in such a manner that upon energization of the clutch magnet 690 the clutch armature 692 will engage the clutch magnet and provide a drive between the motor 680 and the recording medium 98. The electric clutch 682 may be supplied with power through suitable brushes 694 mounted in a brush supporting means 696 suitably secured to the post 105 formed on the base 96.

It has previously been pointed out that during the shaving operation the dictator's carriage structure 154 may be caused to travel to the right sufficiently far to operate the push rod 312 and lift the stop shaft 304 so that the head supporting structure 276 may rotate sufficiently far to allow the shaving tool to be properly presented to the recording medium. Reference to Figure 12 will show that we have so arranged the shaving tool 284 that the recording medium 98 must be rotated in a direction during the shaving operation which is opposite to that which is used in the recording operation. We prefer to do this for reasons which will be made apparent hereafter and also so that the wax which is cut from the surface of the recording medium 98 may properly enter suitable wax chutes which connect with the wax removal equipment located in the base below. It will be noted that the shaving tool 284 is suitably secured to the head supporting structure 276 and is covered with a suitable cover 698. We have also provided a channel 700 extending below the shaving tool 284 which cooperates with a slot 702 in the cover 698 to convey the wax removed from the record during the shaving operation to the wax removal equipment located below. Consequently channel 700 registers with a channel 704 formed on the outside of the inner carriage structure 234 which in turn connects with a flexible hose 706. Flexible hose 706 connects with the intake manifold 78 (as shown in Figure 4) of the wax removal equipment 70.

In order to eliminate as nearly as possible the escaping of the wax from the channels 700 and 704 and to provide a means of removing any wax which may be cut from the recording medium 98 during the dictation and transcription, we have also provided a trough 708 immediately below the recording medium 98. Trough 708 is closed at the ends and tapers to a pipe connection which in turn connects with the intake manifold 78 on the wax removal equipment 70.

It has also been pointed out that the travel of the carriages to the right is effective in engaging the pawls which are mounted on the end frames 96 with the ratchet wheels forming part of the micrometer advancing screw system. Rotation of these micrometer advancing screws is therefore effective in advancing the dictator's inner carriage structure a predetermined amount so that the shaving tool 284 may remove a predetermined amount of the recording medium and as previously described, is effective in moving the transcriber's head forward so that it may suitably cooperate with the freshly shaved recording medium.

The shaving operation may be considered as the last of three operations which form a repeating cycle. First the record is used to record dictated material. The dictated material is then transcribed. The record is then shaved or reconditioned and the cycle is complete. It follows then, that certain operations which function to reset all of the equipment for the beginning of a new cycle, must be performed during the shaving operation.

The first of these operations is the matter of restoring the position registering block 658 to the end of the record so that the position registering contacts 662 and 664 may properly register the point at which the last of the dictated material is recorded.

This may be accomplished by maintaining the solenoid 676 in an energized state during the time the carriage is traveling in the left direction during the shaving operation.

The position registering block 658 will thereby be moved backward along the record with the dictator's carriage 154. The manner in which the solenoid 676 cooperates with the rest of the control equipment to bring the position registering block 658 to the first part of the record during the shaving operation will be explained in detail in connection with the wiring diagram.

The other operations which must be performed during the shaving operation in order to render the equipment operative whenever the record is shaved or reconditioned includes an operation for restoring the rotary stops 546 and 548 of the remotely operated marking devices. In order that the transcriber may start transcribing a new series of dictation it is essential that these rotary stops 546 and 548 be restored to a neutral position during the shaving operation. We have accordingly provided two wheels 710 (Figures 7, 12 and 30) which are so arranged and of such diameter that upon being raised into the upper of their two positions, they restore to the neutral position as the carriage 154 travels along during the shaving operation any stops 546 and 548 which may have been displaced from the neutral position. The two wheels 710 are therefore rotatably supported on a yoke 712 which is secured to a short shaft 714 suitably journalled in bearings 716 and 718 mounted on the bracket 536. In order that the wheels 710 may engage the arms 546 and 548 suitably during the shaving operation, we have accordingly provided the shaft 714 with a bell crank 720. Bell crank 720 is suitably connected to a vertical link 722, which is in turn pinned to a second bell crank 724 pivoted to a boss 726 on the carriage 154. The other side of the bell crank 724 connects to two push rods 728 and 730 which operate in the same manner as push rod 312.

Thus when the dictator's carriage travels to the extreme right, as at the beginning of the shaving operation, push rod 728 will operate the bell crank 724 which in turn lifts the vertical link 722. Lifting the vertical link 722 then causes a rotary motion of bell crank 720 and the shaft 714 attached thereto. Rotation of the shaft 714 will then raise the wheel 710 into such a position that it will restore the stops 546 and 548 to the neutral position. Conversely, at the extreme left of the travel or at the end of the shaving operation push rod 730 will operate the aforementioned linkage in such a manner as to lower the wheels 710 to an inoperative position. Figure 30 shows the wheels 710 lowered to an inoperative position and also illustrates by dotted lines the operative position of said wheels.

It is apparent from the foregoing description that some of the operations of the machine depend on the carriages traveling one way or the other to their extreme limit in that direction. In order to control properly these functions and to prevent breakage of the various mechanisms and drives, we have provided certain limit switches. Referring to Figure 7, it will be seen that we have affixed to the top of the dictator's carriage 154, a spring switch structure 732 which is arranged to contact other switch segments 734, 736, 738 and 740 which are mounted to the upper portion of the frame 96.

The switch formed by the contacts 732 and 734 we shall term the "left shaving limit switch" since it operates to limit the travel of the carriage 154 to the left during the shaving operation. We shall also term the switch structure formed by the contacts 732 and 740 the "right shaving limit switch" inasmuch as it is similarly operative during the shaving operation.

In the same manner we have termed the switches formed by the contacts 732 and 736, and 732 and 738 the "left" and "right" recording limit switches respectively since they operate to limit the travel of the dictator's carriage 154 in said directions during the normal process of recording and reproducing.

It will also be noted that we have provided similar spring switch structures which include structures 742 and a similar structure 744 not shown, mounted on the transcriber's carriage 454. The contact 742 is arranged to contact switch segments 746 and 748 (not shown) to form "left" and "right" transcription limit switches respectively. These switches are used to limit the travel of the transcriber's carriage 454 in the left and right hand directions. The contact 744 co-operates with a switch structure 750 (not shown) to form a "transcriber's right shaving limit switch." This limit switch is used to limit the travel of the transcriber's carriage 454 to the right during the shaving operation.

The aforementioned recording and transcription limit switches operate during the recording and transcription operations to limit the travel of the dictator's and transcriber's carriages so that they will never travel beyond either end of the recording medium. The controls are so arranged, however, that during the shaving operation, the aforementioned carriages may pass the ends of the recording medium and so bring into operative relationship certain pawls with certain ratchet wheels and certain push rods with the end frames. We have therefore arranged the dictator's and transcriber's shaving limit switches so that they may stop the travel of the carriages after these operations are completed and thus prevent damage or possible breakage of the equipment.

The precise function of these limit switches and the manner in which they are connected to control the various drives and certain relays will be described in detail in connection with the wiring diagram.

The wiring diagram illustrates the complete wiring for the equipment described heretofore, and in addition, the amplifiers and certain relays which are mounted in the lower portions of the machine 2 behind the access doors 64. The relays and amplifiers are electrically interlocked to secure the proper operation of the dictating machine 2. It is not essential that the equipment and relays be wired exactly as shown hereinafter, it being understood that other circuits and arrangements of circuits may also accomplish the desired results in a satisfactory manner.

We prefer to use electrical relays which we interlock with each other electrically instead of using mechanical linkages of movements which are dependent upon each other for proper operation, but our invention comprehends the use of such mechanical linkages and movements and we are not limited to the use of relays for accomplishing the desired results. It is obvious that various types of relays may be used and we do not intend to limit ourselves to the types shown in Figures 31 to 34 inclusive.

As the interlocking of the relays to secure the proper operation of the equipment is somewhat complex, a brief preliminary description of the wiring and operation of the machine 2 will aid in tracing the circuits. The major operations of the machine 2 may be divided into three parts, the dictating or recording operation, the transcribing or reproducing operation, and the shaving or reconditioning operation.

The dictating or recording operations of the machine 2 are controlled by the dictating operator through use of the control knob 42, the foot switch 10 and a sound recording and reproducing system designated by numeral 326 in Figure 31. The function of these devices can best be understood by an explanation of the sequence of operation of the machine 2. Let us assume that the dictator has just finished recording some dictation on the record and has just removed his foot from the foot switch 10. The solenoid 252 will then be energized and the head supporting structure 276 pulled away from the record. It should be noted that pauses during the normal dictation are accomplished by removing the foot from the foot switch 10. This stops the travel of the carriage 154 in the right hand or forward direction and pulls the structure 276 away from the record. But contrary to standard practice in dictating machines, it does not stop the rotation of the record.

Let us assume now the dictator wishes to play back certain of the recorded dictation. He turns knobs 42 to the left, to a point on the dial 44 corresponding to that portion of the recording he wishes to hear reproduced. Certain relays are then actuated which automatically cause the carriage 154 to move to the left at high speed. As soon as the point is reached corresponding to that at which the pointer 43 on the knob 42 is set, the travel of the carriage 154 will stop. The operator then depresses the foot switch 10, and the recorded dictation is then played back to him. Closing of the foot switch 10 to play back the recorded dictation, de-energizes the solenoid 252 and allows the play-back stylus to come into contact with the record. Closing of the foot switch 10 also energizes the dictator's synchronizing clutch mechanism 170 so as to drive the dictator's carriage 154 to the right or forwardly along the record.

When the operator has finished playing back the desired dictation, he turns the control knob 42 to the right, to a point which is further to the right than the point at which he stopped dictation. The head structure 276 is then pulled in to the inoperative position by the energization of the solenoid 252 and the carriage 154 will travel to the right along the record at high speed. As soon as the carriage reaches the point at which the last of the dictated material was recorded, the carriage will stop and, upon depression of the foot switch 10, the head structure 276 will lower the recording head upon the record and recording may continue.

The control knob 42 operates in such a manner that it is possible for the dictating operator to move the dictator's carriage in any direction at any time, and the circuits are so further arranged that whenever the head structure is over a portion of the record which has already been dictated upon, the play-back or reproducing stylus will be presented to the record. Furthermore the operator cannot travel to the right at a high rate of speed beyond the point at which the last dictated material was recorded. The circuits are further interlocked so that at that time only can the recording stylus be brought into operative relationship with the recording medium.

This operation and protection system is similar to that previously described in our co-pending application No. 17,666. As had been noted therein, the operator is at all times prevented from skipping a space on the record or placing the machine in the recording position when the carriage is over a portion of the record which has already been recorded upon.

The transcribing or reproducing operation is controlled by the transcribing operator through her use of the three control devices 426, 410 and 428, which are located in the transcriber's foot control station 16. Depression of the foot control pedal 410, lowers the transcriber's reproducing head upon the record and advances the carriage along with the recorded material at the proper speed for reproduction. Depressing the control pedal 428, on the other hand, lifts the reproducing head from the record and starts the transcriber's carriage travelling to the right at high speed, which travel may continue until the complete length of the record has been traversed. Depressing the control pedal 426, reverses the operation and the transcriber's carriage may move to the left at high speed, which travel may continue until the beginning of the record is reached.

The shaving or reconditioning operation is entirely automatic and the equipment is so arranged that the transcribing operator may start the shaving sequence by depressing the reconditioning control device 442. Whenever the control device 442 is depressed, certain relays are actuated which immediately disconnect the dictating operator's and the transcribing operator's control devices so that they may no longer control the operation of the machine 2. The dictator's carriage structure is caused to travel to the right at high speed, past the end of the record and to bring into contact with the end-plates 96, the various devices which are thereby operated to advance the carriage structure forward toward the axis of the record and to shift the carriage structure so that the shaving tool will be placed in operative relationship with the recording medium. The dictator's carriage is then automatically caused to travel to the left and the recording medium to be rotated at high speed so that the shaving tool will remove a predetermined amount of wax from the surface of the recording medium. As soon as the carriage has travelled the full length of the record, the travel is stopped and the carriage is moved to the right or forwardly far enough for the recording stylus to engage properly the beginning of the recording medium. At the same time, the transcriber's carriage has been caused to travel to the right, past the end of the record, so that the micrometer feed screw may come into operative relationship with the end plates 96 and so feed the transcriber's head forwardly toward the axis of the record a sufficient amount to compensate for the reduction in size of the recording medium which results from the shaving operation.

During this reconditioning operation the rotary stops of the condition retaining means are restored to the neutral position and the position registering mechanism is returned to the forepart of the record so that these devices may properly operate at the beginning of a new series of dictation.

Reference will now be made to the wiring diagram as shown in Figures 31 to 34 inclusive, where the above operations will be more fully explained. Referring generally to the diagram, it will be noted that vertical buses are positioned on opposite sides of the drawing. These buses extend from one figure to the next and the operating coils and equipment are placed between them. In general, the buses on the left side of the page have one polarity and those on the right side the opposite polarity. It should be understood that in referring to polarity, we do not wish to be limited to any particular source of power, for operating the equipment as either direct or alternating current may be used to operate our invention. We prefer, however, to use alternating current for the operation of the machine 2, for numerous obvious reasons and have accordingly shown in the wiring diagram a control means which is adapted to use alternating current.

It should also be noted that we have designated one of the right hand buses, 800, as the normally energized bus, and the two adjacent buses 802 and 804 as the operation bus and the shaving bus. These latter buses 802 and 804 are connected by individual contacts of a shaving relay SR to the normally energized bus 800 so as to be energized during the normal operation or the shaving operation, as required. We also designate another bus 806 at the left of the drawing, as the other main bus.

To simplify the location of the circuits, we have numbered the circuits consecutively. In accordance with conventional electrical practice, a circuit is formed by a chain of devices connected in series between busses of opposite polarity. In some instances, such devices are connected in a plurality of circuits. It is obvious, however, that the devices may be further combined into circuits, or devices may be used to simplify the circuits without departing from the spirit of our invention.

The mechanical equipment is shown with the dictator's and the transcriber's carriages in the central portion of their travel and with the dictator's translation means in the inoperative recording position and the transcriber's translation device in the inoperative position.

All relays are shown de-energized. In designating the various relays we have lettered them corresponding to their functions and the contacts belonging to a particular relay are lettered the same as the relay for clarity, but are not necessarily shown in the wiring diagram adjacent to the relay coil.

In order to connect the equipment for operation, the main bus 806 and a bus 808 are connected to opposite polarities of a suitable source of electrical power. As stated above, the bus 806 forms one of the main busses of the equipment and the bus 808 the other main bus. The bus 808 is connected to energize the bus 800 through a contact of a time delay relay TDR. The relay TDR is of a common type, in which the contacts thereof are closed a definite time after the coil thereof is energized. This relay is so arranged that one set of contacts closes instantly upon energization of the coil, but all contacts are held closed a definite time after the coil has been de-energized.

The coil of the relay TDR is connected in either of two series circuits, 810 or 812, between the main bus 808 and the other main bus 806. Circuit 810 includes contacts of the dictator's foot switch 10, while circuit 812 includes contacts of the transcriber's' foot switch 410. Thus it will be seen that upon closure of either the foot switch 10 or the foot switch 410, the coil of the TDR relay will be energized. The TDR relay then completes its own temporary holding circuit through the TDR contact in circuit 814, thereby keeping the coil energized until the time relay contacts operate. Upon operation of the time delay contact, circuit 814 is opened, thereby disconnecting the temporary holding circuit.

Upon energization of the coil of the time delay relay TDR, circuits 816 and 818 are instantaneously energized through the instantaneous contact of the time delay relay TDR. Circuit 816 supplies the transcriber's amplifier 820 of the transcriber's sound system 822, and circuit 818 supplies the dictator's amplifier 824 of the dictator's sound system 826.

Upon closure of either of the foot switches 10 or 410 the transcriber's amplifier 820 and the dictator's amplifier 824 will therefore be immediately energized. It is proposed to use heater type tubes in the aforementioned amplifiers, and the time setting for the TDR contact which energizes the main bus 800 from the supply bus 808 is made such that the aforementioned contact will close after sufficient time has elapsed after the energization of the coil of the relay TDR for the amplifiers 820 and 824 to become operative. It will thus be seen that when either foot switch 10 or 410 is depressed for the first time the relay TDR is energized and the amplifiers 820 and 824 are energized by the completion of circuits 816 and 818. As soon as the tubes of the amplifiers 820 and 824 have reached operating temperature, the time delay contact TDR connecting the main bus 800 to the supply bus 808 will be closed and the machine will be energized for operation.

When the operators release either the foot switch 10 or the foot switch 410, the main bus 800 and the machine 2 are maintained in operative condition for a given length of time depending upon the setting of the TDR relay. It has been previously stated that the foot switches are used to control the operation of the head and the travel of the carriage during dictation, playback, and transcription. The time delay relay TDR therefore permits the foot switches 10 and 410 to be released by the operators during periods of dictation and transcription while maintaining the machine energized for operation. However, should the operators, while operating the machine, be interrupted, the machine 2 will be de-energized after a given length of time, thus conserving the useful life of the vacuum tubes and other equipment in the machine 2. It is found that a time delay of approximately ten minutes is desirable but that other periods of delay will give satisfactory results.

The time delay switching system which we have shown in our co-pending application No. 17,666 is similar to the one shown in this application, inasmuch as both are arranged to automatically disconnect the equipment after a given length of time has passed from the last operation of the foot control switches. The system described in our co-pending application No. 17,666 requires the use of instantaneous type tubes in the amplifiers, however, for satisfactory operation. In the system used here, we have so arranged the circuits that heater type tubes may be used in the amplifiers and that these tubes will reach operative temperature before the machine is connected for operation. Inasmuch as the heater type tubes which are commercially available are much more efficient and have longer life and better operating characteristics than the instantaneous type tubes available, it will be seen that there is a distinct advantage in providing a time delay relay system, such as we have shown, which will allow the use of heater type tubes in the amplifiers and provide a means of heating them to operative temperature before the equipment included in the machine 2 is energized for operation.

The transcriber's sound system 822 is a typical reproducing sound system consisting of an amplifier 820, an electrical reproducing head 450, a sound producing device which we have shown as head phones, and a volume control means 448 for controlling the volume that may be reproduced by the head phones.

These devices are interconnected in a conventional manner well known to those skilled in the art, such connection being as follows:

The transcriber's reproducing head 450 is connected to the input of the amplifier 820 by a circuit 828. Circuit 828 has placed therein a normally closed contact of a transscriber's head relay TH, the function of which will be described in detail hereinafter. The sound producing device HP is connected to the output of the amplifier 820 by a circuit 830 which has connected therein the volume control means 448.

The dictator's sound system 826 is preferably a sound system similar to that outlined in our co-pending application No. 17,666 previously referred to, and includes the sound responsive and sound reproducing device or dynamic speaker 28, which may receive the power for energizing its field from the amplifier system 824 through a circuit 832. The voice coil of the dynamic speaker 28 is connected in a conventional manner through the T pad 38 and connected by cable 12 to a switching mechanism 834 by a circuit 836. The switching mechanism 834 is also connected by circuits 838 and 840 to the input and output terminals of the amplifier 824 and by a circuit 842 and a circuit 844 to the dictator's reproducing head 150 and the dictator's recording head 146. The switching mechanism 834 may be of the type previously described in our co-pending application No. 17,666 or any other suitable switching means.

Switching mechanism 834 may comprise a relay (not shown) which in one position connects the system for recording by connecting the dynamic speaker 28 to the input of the amplifier 824 and the output of the amplifier 824 to to the dictator's recording head 146. In the other position, the switching device 834 may connect the system for reproducing by connecting the dictator's reproducing head 150 to the input of the amplifier 824 and the dynamic speaker 28 to the output of said amplifier.

In the system shown we have arranged the circuits so that in the energized position, switching mechanism 834 connects the system for recording and in the de-energized position for reproducing. A coil of the relay in the switching device 834 is connected in a circuit 846 which extends between the busses 806 and 802 and includes a normally open contact of a position registering relay PR. The functions of the position registering relay PR will be described in detail hereinafter, but it may be explained that the contact of said relay in circuit 846 operates to switch automatically the sound system from recording to reproducing and vice versa in the manner previously described. The manner in which the bus 802 is energized from the bus 800 will be explained hereinafter.

We have found that the sound system 826 which we have illustrated, is particularly adapted for use in a dictating machine of our invention, but it should be understood that we are not limited to this particular form of a sound system.

We have defined the electric recording and reproducing heads which form a part of the sound systems 822 and 826 as a translation means operable between a recording medium and a propagating medium to transmit undulations in at least one direction therebetween. In the broader sense, this definition may include all of the elements of said sound systems and our invention comprehends the use of a translation means whether such means is used for recording or for reproducing or for both or, as in the form shown, part of said means is used for recording, part for reproducing and part for both, and whether the intermediary of electrical undulations corresponding to sound undulations is employed or not.

As stated above, we prefer to relay all mechanically operated contacts, thus securing many advantages. Among the advantages secured are the elimination of a plurality of electrical contacts on the mechanical equipment and the elimination of a large number of wires which may interfere with the proper operation of the mechanical equipment. The relaying also helps segregate and facilitate the location of troubles which may arise due to continued operation.

We have therefore shown these mechanical contacts in circuits which are shown on the wiring diagram directly below these just described. These circuits may include the contacts 732 and 740 of the right shaving limit switch which are connected in a circuit 848 which extends from the normally energized bus 800 to a right shaving limit relay RSL.

Circuit 850 extends from the normally energized bus 800 to the coil of a right recording limit relay RRL and includes contacts 732 and 738 of the right recording limit switch.

Circuit 852 also originates at the normally energized bus 800 and extends to the coil of a left recording limit relay LRL and includes contacts 732 and 736 of the left recording limit switch.

Circuit 854 includes contacts 732 and 734 of the left shaving limit switch and extends from the normally energized bus 800 to a left shaving limit relay LSL.

Circuit 856 extends from the bus 802 to the coil of a right transcription limit relay RTL and includes contacts 742 and 748 of the right transcription limit switch.

Circuit 858 also originates at the bus 802 and extends to a left transcription limit relay LTL and includes contacts 742 and 746 of the left transcription limit switch.

We have also relayed the contacts 744 and 750 of the transcriber's right shaving limit switch by connecting them in a circuit 860 which extends from the shaving bus 804 to a transcriber's right shaving limit relay TRSL.

Circuit 862 extends from the operation bus 802 to a transcriber's rotation synchronizing relay RRT and includes therein contacts of the synchronizing switch means 468.

In a like manner we have connected a dictator's rotation synchronizing relay RRD in a circuit 864 which extends from the operation bus 802 and includes contacts of the synchronizing switch means 466.

We also prefer to relay the contacts of the position registering mechanism and have therefore included contacts 662 and 664 in a circuit 866 which extends from the operation bus 802 and includes a position registering relay PR.

It has been previously stated that we have so arranged the controlling equipment that the machine 2 may be conditioned for recording only when the recording stylus is sufficiently far to the right to engage an unrecorded portion of the recording medium. In a like manner we have so arranged the equipment that the machine 2 will always be conditioned for reproducing whenever the dictator's carriage structure 154 and the heads carried thereby are to the left or towards the fore part of the record from the point at which the last of the dictated material was recorded. Inasmuch as contacts 662 and 664 of the position registering mechanism which are included in circuit 866 will be closed only when the heads are far enough to the right to engage an unrecorded portion of the recording medium, the position registering relay PR will be energized by the closing of the aforementioned contacts only when the machine should be conditioned for recording.

We may therefore use the position registering relay PR as a master controlling relay in such a manner that energization of said relay may be effective in conditioning the equipment for recording and conversely, de-energization of said relay may be effective in conditioning the equipment for reproducing. We have therefore included, as has been previously described, a normally open contact of the position registering relay PR in circuit 846 which supplies the switching mechanism 834. Whenever the position registering relay PR is energized so as to condition the machine 2 for recording, circuit 846 will be completed so as to energize the switching mechanism 834 and connect the sound system 826 in the recording position. De-energization of the position registering relay PR will be effective in interrupting circuit 846 and connecting the sound system 826 for reproducing in a manner previously described.

We have included the wax removal motor 72 in a circuit 868 which extends from the normally energized bus 800 so that when the bus 800 is energized through the contact of the TDR relay the wax removal motor 72 is energized, thus providing positive wax removal in the vicinity of the heads during the dictation, transcription and shaving operations.

The operation bus 802 is supplied through a normally closed contact of a shaving relay SR, and the shaving bus 804 is supplied through a normally open contact of said relay from the normally energized bus 800. As will be later shown, the shaving relay SR is the master controlling relay for the shaving operation and is energized during the shaving operation only. During the normal transcription and recording oprations, the operation bus 802 will be energized through the normally closed contacts of the shaving relay SR. However, during the shaving operation, the shaving bus 804 will be energized from the normally energized bus 800 through the contact of the shaving relay SR and the operation bus 802 will be de-energized.

We have connected the dial light 48 in a circuit 870 extending from the operation bus 802. We have also included the transcriber's indicating light 434 in a circuit 872 which extends from the operation bus 802.

Circuit 874 extends from the operation bus 802 to a record motor RM. The record motor RM is used to drive the recording medium 98 during the dictation and transcription operation. In the same way the record clutch mechanism 132 is included in a circuit 876 which extends from the operation bus 802.

As soon as sufficient time has elapsed from the closing of the foot switches 10 or 410 for the amplifiers 820 and 824 to become operative, the TDR contact will close so as to energize the normally energized bus 800 and the operation bus 802. The dictating and transcribing operators will then be apprised of the fact that the machine 2 is in the operative condition by the illumination of the dial lights 48 and 434, and the record motor RM will be caused to rotate in such a direction as to drive the recording medium 98 in the proper direction and at the proper speed for recording and reproducing. Energy may be mechanically transmitted from the record motor RM to the recording medium 98 through the record clutch 132 which is energized by circuit 876 from the operation bus 802. As long as the operation bus 802 is energized, the recording medium 98 will rotate continuously in response to the rotation of the record motor RM as transmitted by the record clutch 132.

In order that the dictating operator may start and stop the process of recording dictation at any time he wishes, we have provided a dictator's foot switch relay DFSR which is adapted to be controlled by contacts of the dictator's foot switch 10. The dictator's foot switch relay DFSR and the dictator's foot switch 10 are connected by means of a circuit 878 in such a manner that the dictator's foot switch relay DFSR, may be energized by the closing of the dictator's foot switch 10. The manner in which this is accomplished will be described hereinafter.

In order that the energization of the dictator's foot switch relay DFSR may control the operation of the solenoid 252, so as to lower the head supporting structure 276 to the operative position, we have included in a circuit 880, which extends from the normally energized bus 800 to the solenoid 252, a normally closed contact of the dictator's foot switch relay DFSR and a normally closed contact of an auxiliary shaving relay SRX. The function of the auxiliary shaving relay SRX will be explained in connection with the shaving operation, it being sufficient at this time to consider the auxiliary shaving relay SRX as de-energized.

We have also provided a circuit 882 which parallels the dictator's neutral solenoid 252 and includes a dictator's head relay DH, so that the head relay DH will be energized whenever the solenoid 252 is energized to pull the head into the inoperative position.

Referring now to circuits 842 and 844, which connect the dictator's reproducing head 150 and the dictator's recording head 146, to the switching mechanism 834, it will be seen that we have included therein a normally closed time delay contact of the dictator's head relay DH. Inasmuch as the dictator's head relay DH is connected by means of circuit 882 in parallel with the dictator's neutral solenoid 252, the head relay DH will be energized whenever the solenoid 252 is energized. It will be remembered in connection with the mechanical specifications that energization of solenoid 252 is effective in pulling the heads away from the record into the inoperative position. Whenever the heads are pulled into the inoperative position, the dictator's head relay DH will be energized. Energization of the relay DH will then interrupt circuits 842 and 844, so as to disconnect the dictator's recording and reproducing heads 150 and 146 from the sound system 826.

We prefer to make the relay DH of a time delay type, such that the contacts associated therewith are operated instantly upon energization of the coil, but are delayed in their operation upon de-energization of the coil. The instant solenoid 252 is energized to pull the heads into an inoperative position, the heads will be disconnected by the opening of the circuits 842 and 844. Upon de-energization of solenoid 252, to allow the heads to come down into the operative relationship with the recording medium however, the contacts of the dictator's head relay DH will be delayed in their operation for a sufficient length of time for the head supporting structure 276 to come down firmly and securely into position before the dictator's recording and reproducing heads are connected to the sound system.

Thus we have provided a means of preventing any loud or unusual noise resulting from the operation of the solenoid 252, being reproduced as sound in the presence of the dictating operator.

We have included the dictator's synchronizing clutch mechanism 170 in a circuit 886 which extends from the operation bus 802 and includes a normally open contact of the dictator's foot switch relay DFSR. Upon energization of the dictator's foot switch relay DFSR, the synchronizing clutch mechanism 170 will be energized to connect operatively the dictator's advancing screw 156 to the record supporting shaft 100 and thus provide a drive means for causing the dictator's carriage to move along the recording medium at the proper speed for recording and reproducing.

The manner in which the dictator's foot switch relay DFSR and the dictator's foot switch 10 are interconnected will now be described. We have included contacts of the dictator's foot switch 10 in a circuit 878 which extends from the operation bus 802 to the dictator's foot switch relay DFSR and which includes therein in addition to the previously mentioned contacts of the dictator's foot switch 10, normally closed contacts of the right recording limit relay RRL, a dictator's right travel relay DRT, a dictator's left travel relay DLT, an auxiliary relay X, and normally open contacts of the dictator's rotation synchronizing relay RRD.

As has been heretofore shown, the right recording limit relay RRL, will be energized by the completion of circuit 850, whenever the dictator's carriage 154 is to the right sufficiently far to close contacts 732 and 738 of the right recording limit switch.

Whenever the carriage 154 is at the right hand end of the record, circuit 878 will therefore be opened by the opening of the right recording limit relay contact contained therein, so that the dictator's foot switch relay DFSR cannot be energized at that time by the closing of the foot switch device 10. The right recording limit relay RRL therefore operates to limit the travel of the carriage 154 to the right during the recording and reproducing operation by opening circuit 878 at the proper time and de-energizing the dictator's foot switch relay DFSR so as to subsequently de-energize the dictator's synchronizing clutch mechanism 170 and thus disconnect the dictator's advancing screw 156 from the record shaft 100.

In the same manner, we have included in circuit 878 contacts of the dictator's right travel relay DRT and the dictator's left travel relay DLT. These relays as will be hereinafter shown, operate to cause the dictator's carriage 154 to travel at high speed to the right and to the left respectively. The function of the relay X, normally closed contacts of which are included in circuit 878, will be explained in detail hereinafter, it being only necessary at this time to consider the relay X as de-energized during the normal dictating or reproducing operation of the machine 2.

It is apparent from the foregoing that the dictator's foot switch relay DFSR, cannot be energized by the closing of the dictator's foot switch 10, unless all of the normally closed contacts contained in circuit 878, are closed. The manner in which these contacts are used to interrupt circuit 878 and deenergize the dictator's foot switch relay DFSR, will be explained in detail hereinafter.

With respect to the normally open contacts included in circuit 878, it will be noted that the switch means 466 included in circuit 864, will be closed as previously explained whenever the recording medium 98 has rotated to such a position that the stylus of the reproducing head 150 or the recording head 146 is in a position to come down on the recording medium 98 in a sound track groove and not in a space between two grooves. Whenever the stylus is properly located with respect to the recording medium, the dictator's rotation synchronizing relay RRD will be energized so as to close the contacts of the relay RRD in circuit 878.

The dictator's foot switch relay DFSR may therefore be energized at the time the styli are in the aforementioned position with respect to the recording medium 98 by the closing of the contacts of the foot switch 10 which are included in circuit 878, provided the previously mentioned normally closed relay contacts contained therein are closed.

In order to understand more fully the operation of the circuits just described, let us assume that the dictating operator is dictating upon the recording medium 98 and that after pausing he wishes to resume his dictation. Let us assume that the dictator's carriage 154 is somewhere in the center portion of the record so that the right recording limit relay RL is de-energized. In a like manner, as long as the dictator is not causing the carriage 154 to travel to the right or to the left at high speed, the dictator's right travel and the dictator's left travel relays DRT and DLT, are de-energized. Let us assume also, for the purpose of this explanation, that the auxiliary relay X is de-energized.

In order to resume his dictation, the dictating operator depresses the foot control switch 10. This will complete circuit 878 as soon as the recording medium 98 rotates to such a position that the recording styli may contact the recording medium 98 in the proper relationship with the sound track which has been cut to that point. Completion of circuit 878 will energize the dictator's foot switch relay DFSR.

Energization of the dictator's foot switch relay DFSR will then interrupt circuits 880 and 882 by virtue of the normally closed DFSR contact contained therein. This interruption of circuits 880 and 882 will de-energize the head relay DH and the solenoid 252 so as to allow the recording head 146 to be brought into the operative recording position. Also, the de-energization of the dictator's head relay DH will complete circuits 842 and 844 so that the aforementioned heads are electrically connected to the sound system 826. Referring to circuit 886, it will also be seen that energization of the dictator's foot switch relay DFSR will complete circuit 886 so as to energize the dictator's synchronizing clutch mechanism 170 from the operation bus 802.

Thus, by depressing the foot control device 10, the dictating operator has caused the head to be lowered into operative relationship with the recording medium, the heads to be connected to the sound system 826, and the dictator's synchronizing clutch mechanism 170 to be energized so as to operatively connect the dictator's advancing screw 156 to the recording medium 98 as previously explained and thus provide a drive means to the right at the proper speed for recording. In the same way if the dictator wishes to pause in his dictation, he may remove his foot from the foot control device 10. Releasing the foot switch 10 will then interrupt circuit 878 and de-energize the dictator's foot switch relay DFSR. De-energization of the relay DFSR will then complete circuits 880 and 882 so as to energize the solenoid 252 and pull the heads away from the record into the inoperative position and to interrupt circuits 842 and 844 so as to disconnect the heads from the sound system. De-energization of the dictator's foot switch relay DFSR is also effective in interrupting circuit 886 so as to de-energize the dictator's synchronizing clutch mechanism 170 and stop the travel of the carriage 154 to the right along the recording medium 98.

With respect to the alternate raising and lowering of the head supporting structure 276 into the operative and inoperative positions, it has been found that there is necessary a very small lapse of time after the synchronizing contacts 466 close for the operation of the relays and clutch to lower the styli upon the record. Since we deem it advisable to cut a continuous sound track and arrange the equipment so that the sound track will have a substantially constant pitch, we have provided a means for contacting the record with the styli at the point they were last in contact therewith. To do this it is necessary to compensate for the aforementioned lapse of time.

We have accordingly provided the relay DFSR with a slight time-delay opening characteristic on certain contacts. These contacts control the operation of the solenoid 252 in such a manner that the styli actually remain in contact with the record for a short time after the foot switch 10 and the clutch 170 have been released, this time being made equal to the lapse of time aforementioned with respect to the lowering operation.

Summarizing briefly then, it will be seen that the depression of the foot control device 10 is effective, when the recording medium has rotated to the proper position, in energizing the dictator's foot switch relay DFSR to lower the recording stylus upon the recording medium and energize the clutch mechanism 170 to drive the carriage forwardly along the record at the proper speed for recording. Conversely, releasing the foot control device 10 at any time, immediately causes the reverse operation so that the travel to the right along the record is stopped and the head supporting structure 276 is pulled away from the record into the inoperative position. It will also be seen that the styli are always placed in an operative position such that the styli engage the sound track and not a portion bounded by adjacent sound tracks. Also the styli are caused to come down at the point where they were last in contact with the record, so as to describe a continuous path or sound track.

As has been heretofore mentioned, we have provided a combination indicating and controlling means for the use of the dictating operator in controlling the operation of the dictating portion of the machine 2. This combination controlling and indicating means includes self-synchronous devices 40, 364 and 384 as has been previously shown. We have therefore connected the receiving self-synchronous device 40, the transmitting self-synchronous device 364 and the differential self-synchronous device 384 by means of primary circuits 888 and 890 and secondary circuits 892 and 894 in the conventional manner.

It is an inherent characteristic of the self-synchronous device that the receiving self-synchronous device will take up an angular position exactly corresponding to that of the transmitting self-synchronous device. In making use of this principle, we connect the receiving self-synchronous device 40 to the transmitting self-synchronous device 364 by means of three-wire circuits, 892 and 894. It will be noted that we have connected in circuits 892 and 894 the differential self-synchronous device 384 and that such connection will either allow the receiving self-synchronous device 40 or the differential self-synchronous device 384 to rotate in response to the angular displacement of the transmitting self-synchronous device 364. The self-synchronous device that has the least resistance to rotation will be the self-synchronous device that will follow the action of the transmitting self-synchronous device 364.

It will also be remembered that we have provided in the housing of the receiving self-synchronous device 40, an electric brake 46 which operates when energized to apply a slight braking action to the rotation of said self-synchronous device. This braking action should be sufficient to hold the receiving self-synchronous device in whatever position it may be placed by the dictating operator, but it should also be light enough to allow said self-synchronous device to be readily rotated by hand. This electric brake may be any suitable electric brake of conventional construction and may be located outside of the housing of the receiving self-synchronous device 40, but we prefer to use an electric brake of the type described.

The electric brake 46 is connected to the operation bus 802 by means of circuits 896 and 898, which include respectively therein normally open contacts of the dictator's left travel relay DLT and the dictator's right travel relay DRT. As has been previously stated, these relays are used to cause the dictator's carriage 154 to travel to the left or to the right at high speed along the recording medium 98. Circuits 896 and 898 therefore operate to energize the brake whenever the carriage is traveling in either direction at high speed. We prefer to make the brake of such type that upon energization thereof, a slight braking action will be applied to the shaft of the receiving self-synchronous device 40, but that de-energization of the brake mechanism allows the receiving self-synchronous device 40 to rotate freely.

It will also be remembered that we have connected to the shaft of the differential self-synchronous device 384 the previously mentioned differential switch mechanism which is normally held in the neutral position by the action of the springs 392 and 394. Since the brake on the receiving self-synchronous device 40 is de-energized whenever the dictator's carriage is not traveling at high speed in either direction, the receiving self-synchronous device 40 will be the one that will rotate in response to the rotation of the transmitting self-synchronous device 364 as the carriage 154 travels along the recording medium 98 during the recording and reproducing processes. This follows from the fact that the shaft of the differential self-synchronous device 384 tends to remain in the neutral position by virtue of the action of the springs 392 and 394. Hence it will be seen that the pointer 43 on the knob 42 attached to the shaft of the receiving self-synchronous device 40 will indicate the position of the carriage along the record in response to the action of the transmitting self-synchronous device 364. If the dictating operator turns the control knob 42 so as to manually rotate the receiving self-synchronous device 40, the transmitting self-synchronous device 364 cannot rotate as the result of said operation, inasmuch as it is securely fastened to the dictator's advancing screw 156 by means of a previously described worm gear system.

Manual rotation of the receiving self-synchronous device 40 will thus in turn rotate the differential self-synchronous device 384. The rotation of the differential self-synchronous device 384 is then effective in operating the differential switch so as to close either contacts 396 and 398 or contacts 396 and 400. Due to the resilient nature of the self-synchronous devices when connected as shown, the receiving self-synchronous device 40 may be rotated to any position desired even though movement of the differential self-synchronous device 384 is arrested shortly after the closing of the contacts of the differential switch.

In order to make use of the operation of rotating the receiving self-synchronous device 40 manually to cause the dictator's carriage structure 154 to travel in the corresponding direction along the length of the recording medium 98, we have connected the common contact 396 of the differential switch mechanism by means of a circuit 900 to the operation bus 802. Included in circuit 900 is a normally closed contact of the shaving relay SR, the function of which will be explained later in connection with the shaving operation. As previously explained, however, the relay SR is de-energized during the dictating and transcribing operation.

We have provided a dictator's left travel relay DLT which is connected to the contact 398 of the differential switch by means of a circuit 902 which includes a normally closed contact of the left recording limit relay LRL.

We prefer to connect the self-synchronous devices in such a manner that whenever the receiving self-synchronous device 40 is manually rotated to the left, the circuit 900 may be completed by the closing of the differential switch contacts 396 and 398 so that the dictator's left travel relay DLT may be energized from the operation bus 802. In a like manner we have provided a dictator's right travel relay DRT which is connected to the contact 400 of the differential switch by means of a circuit 904 which includes therein a normally closed contact of the position registering relay PR.

Thus, upon rotation of the receiving self-synchronous device 40 in the opposite direction, or to the right, the closing of the contacts 396 and 400 may energize the dictator's right travel relay DRT from the operation bus 802. In order that energization of the relays DLT and DRT may cause the dictator's carriage structure 154 to travel at high speed in the corresponding direction, we have accordingly connected the dictator's travel motor 350 in circuits 908 and 910 which include therein normally open contacts of the dictator's left travel relay DLT and the dictator's right travel relay DRT. Circuit 908 extends from the normally energized bus 800 to the motor 350 and includes a normally open contact of the dictator's left travel relay DLT, while circuit 910 extends from the normally energized bus 800 to the motor 350 and includes a normally open contact of the dictator's right travel relay DRT.

While we have shown the motor 350 as being of the split-series field type in which energization of one field causes the motor to rotate in one direction and energization of the other field causes rotation in the opposite direction, it falls within the scope of our invention to provide any type of reversible drive means or to provide separate drive means for causing each of said directions of drive.

Referring to circuit 908, it will be seen that energization of the dictator's left travel relay DLT will complete said circuit from the normally energized bus 800 to the travel motor 350 as to cause the motor to rotate in such direction as to drive the dictator's carriage 154 to the left along the recording medium.

In the same way circuit 910 includes a normally open contact of the dictator's right travel relay DRT so that energization of the said relay will complete circuit 910 from the normally energized bus 800 to cause the motor 350 to rotate in the opposite direction and drive the carriage 154 to the right or forwardly along the record at high speed.

In order that the rotation of the motor 350 may be transmitted to the dictator's advancing screw 156 so as to drive the carriage along the recording medium 98, we have connected the dictator's travel clutch mechanism 354 in circuits 912 and 914. Circuit 912 extends from the normally energized bus 800 and includes a normally open contact of the dictator's left travel relay DLT; while circuit 914 includes a normally open contact of the dictator's right travel relay DRT and extends from the normally energized bus 800 to the dictator's travel clutch mechanism 354.

Upon analysis, then, it is seen that manual rotation of the receiving self-synchronous device 40 by the dictating operator may cause the dictator's travel motor 350 to be energized to rotate in such direction as to drive the dictator's carriage 154 along the recording medium in a direction corresponding to the manual rotation of the receiving self-synchronous device 40. The dictator's travel clutch mechanism 354 is so arranged as to be energized and connect the advancing screw 156 to the dictator's travel motor 350 whenever the travel motor 350 is energized to drive the carriage 154 along the record.

Whenever the differential self-synchronous device 384 is displaced from the neutral position to cause the carriage 154 to travel along the record at high speed, the receiving self-synchronous device 40 will, as has been previously shown, be held in the position in which it is placed by the dictating operator. As soon as the dictator's carriage 154 begins to move along the record, the transmitting self-synchronous device 364 will move in response to the motion of said carriage as transmitted by the gear train from the advancing screw 156. The motion of the transmitting self-synchronous device 364 will be transmitted over circuits 892 and 894 to the differential self-synchronous device 384 and the receiving self-synchronous device 40. Inasmuch as the brake 46 which is supplied through circuits 896 or 898 is holding the receiving self-synchronous device 40 and thereby preventing it from rotating, the torque developed by the differential self-synchronous device 384 to keep the contacts of the differential switch closed reduces in response to the rotation of the transmitting self-synchrous device 364. Therefore, as the carriage travels along the record, the contacts of the differential switch are maintained engaged until the torque developed by the differential self-synchronous device 384 reduces to substantially zero and the springs 392 and 394 swing the arm 390 to the neutral position. This neutral position will be reached when the transmitting self-synchronous device 364 has rotated in response to the travel of the carriage along the record to such a point that the position of the carriage corresponds to the position indicated by the receiving self-synchronous device 40, at which time the travel relay which is energized through the differential switch will be de-energized to stop the travel. From the foregoing description it is apparent that the particular connection of the self-synchronous devices used affords a resilient or yieldable connection between the control knob 42 and the dictator's carriage.

As has been previously stated, we prefer to use the position registering relay PR as a master controlling relay for the entire operation of the machine 2. We have therefore included the solenoids 286 and 288, which operate to rotate the head supporting structure 276 into the proper position, in circuits which are controlled by normally open and normally closed contacts of the position registering relay PR. We have therefore connected the solenoid 288 in a circuit 916 which extends from the operation bus 802 and includes a normally closed contact of the position registering relay PR and contacts 338 and 346 of the solenoid limit switch structure.

In a similar manner, we have included the solenoid 286 in a circuit 920 which extends from the operation bus 802 and includes a normally open contact of the position registering relay PR and contacts 340 and 342 of the solenoid limit switch structure. We have connected an auxiliary relay X in parallel with the solenoid 286 by means of the circuit 922. The function of the relay X will be made clear later.

Inasmuch as the position registering relay PR is used to control the operation of the machine with respect to the recording and reproducing conditions, we have accordingly provided an indicating light 50 which is included in a circuit 924 extending from the operation bus 802 and have included therein a normally closed contact of the position registering relay PR.

Inasmuch as the position registering relay PR is de-energized whenever the equipment is conditioned for reproducing, it is seen that the indicating light 50 may be used to indicate the reproducing condition of the dictating machine 2. In a similar manner we have included an indicating light 52 in a circuit 926 which extends from the operation bus 802 and includes a normally open contact of the position registering relay PR. As heretofore shown, the position registering relay PR is energized to condition the equipment for recording and hence the indicating light 52 may be used to indicate the face that the machine 2 is in the recording condition.

The manner in which the previously described control equipment operates to indicate the position of the dictator's carriage 154 with respect to the length of the record and to control the operation of said carriage can best be understood by tracing the sequence of operation of the equipment functioning during the operation of the machine 2.

Let us assume that the dictator has the foot switch 10 depressed and is dictating material for record. The carriage advances along the record and as it travels the transmitting self-synchronous device 364 is rotated in such a manner that its angular displacement from its initial position is a function of the distance the dictator's carriage has travelled with respect to the length of the record. It has been previously shown how the receiving self-synchronous device 40 is made to follow the transmitting self-synchronous device 364, thus accurately indicating to the dictating operator the position of the carriage with respect to the length of the record.

Let us assume now that the dictating operator wishes to reproduce a portion of the recorded dictation which lies at a point to the left or back toward the fore part of the recording medium. To do this the dictating operator turns the control knob 42 which is attached to the shaft of the receiving self-synchronous device 40, to the left, to a point indicated to him by the translucent dial 44 as that portion he wishes to hear reproduced. As has been previously shown, this is effective in rotating the differential switch structure so as to close contacts 396 and 398 and complete circuits 900 and 902 so as to energize the dictator's left travel relay DLT. Energization of the dictator's left travel relay DLT may complete circuit 896 so as to energize the brake 46 on the receiving self-synchronous device 40 from the operation bus 802. Energization of the brake 46 on the receiving self-synchronous device 40 will then hold it in the position in which it has been placed by the dictating operator.

As has been previously shown, we have included in circuit 878, which supplies the dictator's foot switch relay DFSR, a normally closed contact of the dictator's left travel relay DLT. Energization of the dictator's left travel relay DLT is therefore effective in interrupting circuit 878 so as to de-energize the dictator's foot switch relay DFSR. As has been previously shown, de-energization of the dictator's foot switch relay DFSR is effective in energizing the solenoid 252 so as to pull the head supporting structure 276 away from the record into the inoperative position.

As has been previously shown, energization of the dictator's left travel relay DLT is effective in completing circuit 908 so as to energize the dictator's travel motor 350 to rotate in such direction as to cause the dictator's carriage 154 to travel to the left or back toward the forepart of the record. In a like manner circuit 912 is completed by the energization of the dictator's left travel relay DLT so as to energize the dictator's travel clutch mechanism 354 and operatively connect the dictator's travel motor 350 to the dictator's advancing screw 156 so that rotation of the motor 350 may be utilized to cause the dictator's carriage 154 to travel to the left or back toward the forepart of the record.

As soon as the dictator's carriage 154 starts its travel to the left, contacts 662 and 664 of the position registering mechanism which are included in circuit 866 will open so as to de-energize the position registering relay PR. De-energization of the position registering relay PR is then effective in completing circuit 916 so as to energize the solenoid 288. Energization of the solenoid 288 will then rotate the head supporting structure 276 into the inoperative reproducing position. As soon as the solenoid 288 has moved the head supporting structure 276 into said position, contacts 338 and 346 of the solenoid limit switch mechanism will open, thereby interrupting circuit 916 and de-energizing the solenoid 288.

As has been previously stated, we have included in the circuit 846 which supplies the switching mechanism 834 from the operation bus 802, a normally open contact of the position registering relay PR. We have further shown that de-energization of the switching mechanism 834 is effective in conditioning the dictator's sound system 826 for reproducing. Thus, whenever the dictator's carriage structure 154 is to the left of the point at which the last of the dictated material is recorded, the sound system 826 will be conditioned for reproducing.

The high speed travel of the dictator's carriage 154 to the left will continue as long as the dictator's left travel relay DLT remains energized. It has been shown that as soon as the carriage 154 has moved to a position corresponding to that indicated on the dial 44 by the pointer 43 that the contacts 396 and 398 of the differential switch mechanism will open. This operation will then interrupt circuits 900 and 902 so as to de-energize the dictator's left travel relay. It will be observed however, that should the carriage for any reason travel to the very beginning of the record, the relay DLT will be de-energized by the energization of the left recording limit relay LRL and the subsequent interruption of circuit 902 so as to prevent overtravel in this direction.

As has been previously shown, de-energization of the dictator's left travel relay DLT is effective in de-energizing motor 350 and the electric clutch 354 so as to stop the travel of the dictator's carriage to the left or toward the forepart of the record. Inasmuch as the dictator's head supporting structure 276 has been rotated into the inoperative reproducing position, the dictator may have the dictated material at this point reproduced by depressing the foot switch 10. As has been previously shown, depression of the foot switch 10 is effective in lowering the head supporting structure 276 upon the record so that the equipment is placed in the operative reproducing position and in causing the carriage 154 to advance along the record so that the dictator may hear reproduced as sound the dictated material lying at that point.

At this point the dictating operator may cause the carriage 154 to travel in either direction along the record at high speed to any pre-selected portion, by merely turning the control knob 42 on the receiving self-synchronous device 40 to the point indicated on the dial 44 as the portion desired. As has been previously shown, manual rotation of the receiving self-synchronous device 40 causes a corresponding rotation of the differential switch which is attached to the shaft of the differential self-synchronous device 384 so as to energize the corresponding relay DLT or DRT. As long as the position registering relay PR remains de-energized it will be seen that whenever the head supporting structure 276 is placed in the operative position, it will always be placed in the operative reproducing position.

Let us now assume that the dictating operator wishes to hear reproduced as sound all of the material lying between the point at which he has placed the reproducing head 150 and the point at which the last of the dictated material is recorded. As has been previously shown, this may be accomplished by depressing the foot control device 10.

As soon as the carriage has travelled to the right sufficiently far from the reproducing head 150 to arrive at the point at which the last of the dictated material is recorded, the contacts 662 and 664 of the position registering mechanism will close so as to complete circuit 866 and energize the position registering relay PR from the operation bus 802. As has been previously stated, we prefer to use the energization of the position registering relay PR to automatically condition the machine 2 for dictation. The manner in which this is accomplished will now be described.

It has been previously shown with respect to the switching mechanism 834, that energization of the position registering relay PR is effective in completing circuit 846 so as to energize the switching mechanism 834 and condition the dictator's sound system 826 for recording.

Referring to circuit 920, it will also be seen that energization of the position registering relay PR will complete circuit 920 so as to energize the solenoid 286 through contacts 340 and 342 of the solenoid limit switch mechanism. Inasmuch as we have included the relay X in a circuit 922 with parallels the solenoid 286 it follows that the relay X is energized simultaneously with the solenoid 286. Referring to circuit 878, which may energize the dictator's foot switch relay DFSR from the operation bus 802, it will be seen that we have included therein a normally closed contact of the relay X, and therefore that energization of the relay X is effective in interrupting the circuit 878 so as to de-energize the dictator's foot switch relay DFSR. As has been heretofore shown, de-energization of the relay DFSR is effective in pulling the head supporting structure 276 away from the recording medium 98 into the inoperative position.

Energization of the solenoid 286 is effective in rotating the head supporting structure 276 into the inoperative recording position. It will be remembered in connection with the solenoid limit switch structure that as soon as the solenoid 286 has rotated the head supporting structure 276 into the aforementioned position, contacts 340 and 342 of said limit switch will open so as to de-energize the solenoid 286 and the auxiliary relay X.

De-energization of the auxiliary relay X will then complete circuit 878, if the dictating operator has maintained the foot switch device 10 closed, so as to energize the dictator's foot switch relay DFSR whenever the recording medium has rotated to such a position that the recording stylus may properly engage the recording medium 98.

As has been heretofore shown, energization of the dictator's foot switch relay DFSR at this time is effective in lowering the head supporting structure 276 into operative relationship with the recording medium so that the recording head 146 is placed in the operative recording position. The dictating operator will at this time be apprised of the change in condition of the machine 2 from the reproducing to the recording position by the darkening of the reproducing dial light 50 and the illumination of the recording dial light 52.

Another sequence of operation may be considered at this time. Let us assume that the dictating operator wishes to cause the carriage 154 to travel at high speed to the point at which the last of the dictated material was recorded so as to continue with the recording of the dictation at that point. To do this, the dictating operator turns the knob 42, which is attached to the shaft of the receiving self-synchronous device 40, to a point which is to the right at least as far as the point at which the last of the dictated material is recorded. As has been heretofore shown, this is effective in rotating the differential self-synchronous device 384 so as to close contacts 396 and 400 of the differential switch structure and complete circuits 900 and 904 so as to energize the dictator's right travel relay DRT.

Energization of the dictator's right travel relay DRT is then effective in interrupting circuit 878 so as to de-energize the dictator's foot switch relay DFSR and pull the head supporting structure 276 into the inoperative reproducing position. Energization of the dictator's right travel relay DRT is also effective in completing circuit 898 so as to energize the brake 46 on the receiving self-synchronous device 40 which operates to maintain the receiving self-synchronous device 40 in the position in which it was placed by the dictating operator.

As has been previously shown, energization of the dictator's right travel relay DRT is effective in energizing the dictator's travel motor 350 and the dictator's travel clutch mechanism 354 so as to cause the dictator's carriage structure 154 to travel at high speed to the right or towards the point at which the last of the dictated material is recorded. As soon as the point is reached at which the last of the dictated material is recorded, contacts 662 and 664 of the position registering device will close and energize the position registering relay PR. Energization of the position registering relay PR is then effective in conditioning the machine 2 for recording in a manner which will now be described.

It has been previously shown that energization of the position registering relay PR will complete circuit 846 so as to connect the dictator's sound system 826 for recording. Referring to circuit 904 supplying the dictator's right travel relay DRT from the differential switch mechanism, it will be seen that energization of the position registering relay PR is effective in opening circuit 904 so as to de-energize the dictator's right travel relay DRT. De-energization of the dictator's right travel relay DRT is then effective as has been heretofore shown, in stopping the high speed travel of the dictator's carriage 154 to the right along the record.

Also, de-energization of the dictator's right travel relay DRT will interrupt circuit 898 so as to release the brake 46 on the receiving self-synchronous device 40. The springs 392 and 394 on the differential switch structure may then operate to rotate the differential switch structure into the neutral position and thus rotate the receiving self-synchronous device 40 so that the pointer 43 indicates on the translucent dial 44 the exact position of the dictator's carriage 154 with respect to the length of the record as transmitted by the transmitting self-synchronous device 364. It will also be noted that energization of the position registering relay PR will at the same time complete circuit 920 so as to energize the solenoid 286 to rotate the head supporting structure 276 into the inoperative recording position. As has been previously shown, the auxiliary relay X which is included in circuit 922 will at this time be energized so as to interrupt circuit 878 in a manner previously described and maintain the dictator's foot switch relay DFSR in the de-energized position.

As has been previously shown, however, as soon as the solenoid 286 has rotated sufficiently far to place the head supporting structure 276 in the inoperative recording position, the auxiliary relay X and the solenoid 286 will be de-energized by the opening of the solenoid limit switch contacts 340 and 342. De-energization of the relay X will then allow circuit 878 to be completed by depression of the dictator's foot control device 10 as soon as the recording medium 98 has rotated to such a position that the dictating operator may continue the recording in the form of a continuous sound track. Completion of circuit 878 will energize the dictator's foot switch relay DFSR so as to lower the head supporting structure 276 into the operative recording position.

As has been previously stated, the dictating operator will be apprised of the fact that the machine is again in condition for recording by the darkening of the dial light 50 and the illumination of the dial light 52.

Summarizing, it will be seen that we have provided the dictator's sound system 826, and that said system is automatically conditioned for recording, or reproducing as the condition of the machine 2 requires. It has been shown that this operation requires no attention from the dictating operator. We have also provided a synchronizing system which operates independently of attention by the operator to cause the recorded sound track to be in the form of a continuous helix.

We have also provided a system of control which may be operated remotely to shift the dictator's head with respect to the length of the record and which is simpler in operation than those machines now in use. In addition to materially simplifying the operation, we have also provided certain automatically operating protective features which eliminate the necessity of the dictating operator analysing what operations are necessary on the machine. That is to say, in the present-day hand-operated machine, in order for the dictating operator to take the machine out of the recording position and move it to the left or back toward the fore part of the record and place it into the reproducing position, three distinct motions are required. The first motion shifts the stylus operating lever to the neutral position, the second moves the carriage back toward the fore part of the record, and the third shifts the stylus operating lever to the reproducing position.

In our control system it is only necessary for the operator to make a simple single unbroken motion. It is to be noted further that our system of control is simpler in that the dictating operator may cause the head carriage 154 to move along the record in a direction corresponding to the movement of the control device. We have, however, provided additional automatic protective features which prevent the dictating operator from going past the point at which the last dictated material is recorded and thus wasting a portion of the recording medium; and have also provided devices which prevent the equipment from lowering the recording stylus upon a previously recorded portion of the record and thus regrooving the record and damaging or eliminating the dictation which has been recorded thereon.

We have also combined the controlling device and the carriage position indicating device into a single control means which controls the operation of the machine in such a manner that the operator may pre-select the point on the recording medium at which he wishes the machine to operate.

The operator may also operate the single control means to pre-select the operation which the machine will perform after it has caused the heads to move along the recording medium.

The function of choosing a point on the recording medium at which it is desired to have the machine operate may be termed "pre-selecting" said point, if one point chosen from a plurality of points is indicated other than mentally, before the operation of moving the translation means longitudinally along the record is complete, and if said operation is automatically completed in accordance with said indication without attention by the operator after initially establishing said indication. In the same way, an operation may be considered as being "pre-selected" if one operation of a plurality of available operations is started and brought to a predetermined conclusion without attention by the operator after completion of the initial manipulation of the controlling means.

For example, the operator may pre-select the point at which he wishes to have reproduction of the recorded dictation begin by merely turning the control knob to such position that the pointer indicates a corresponding point on the translucent dial. As has been previously shown, this causes the carriage to travel to that point, stop, and condition the equipment for reproducing at that point.

If the carriage is to the left of the point at which the last of the dictated material was recorded, the operator may pre-select an operation to condition the equipment for reproducing or recording as desired merely by properly manipulating the single control means. That is to say, if the operator wishes to condition the equipment for reproducing, he may turn the control knob to such position that the pointer indicates a portion of the recording medium which is toward the forepart of the record from the point at which the last of the dictated material was recorded. As previously shown, the operation of conditioning the equipment for reproducing will be started and completed after the operator has completed the operation of the control device.

In the same way the operator may pre-select the operation of conditioning the equipment for recording by turning the control knob to such a point that the pointer will indicate a portion of the recording medium which is at least as far to the right as the point at which the last of the dictated material was recorded. As previously explained, this is effective in starting and completing the pre-selected operation after the operator has completed the operation on the single control means.

It will be further noted that we have provided a position registering mechanism and a position registering relay PR which operate automatically to control the operation of the machine 2 so that it is properly conditioned for recording or reproducing at all times, and that we have used this position registering relay PR to indicate the operative condition of the machine 2 to the dictating operator by means of the indicating lights 50 and 52.

Let us now consider the manner in which the dictating machine 2 may be controlled by a transcribing operator through use of the foot control panel 16 and the transcriber's indicating panel 14. The prime requisite, of course, in any transcribing system is that the transcribing operator may reproduce as sound the material which has been previously recorded on the recording medium. As has been previously shown, we have provided the transcriber's reproducing sound system 822 which operates to reproduce as sound in the presence of the transcribing operator any material which has been recorded on the recording medium 98. It is also essential that a means be provided which will allow the transcriber to start and stop the reproduction of the recorded material so that she may suitably record same as by typing.

We have therefore included contacts of the transcriber's foot control device 410 in a circuit 928 so that it may be used to energize properly a transcriber's foot switch relay TFSR. We have therefore included the contacts of the transcriber's foot control device 410 in a circuit 928 which extends from the operation bus 802 to the transcriber's foot switch relay TFSR and includes normally closed contacts of a transcriber's left travel relay TLT and a transcriber's right travel relay TRT and a normally open contact of the transcriber's rotation synchronizing relay RRT.

This circuit operates in a manner similar to that previously described in connection with the dictator's foot switch relay DFSR. Completion of circuit 928 resulting from the closing of the transcriber's foot control device 410 may energize the transcriber's foot switch relay TFSR whenever the recording medium 98 has rotated to such a position that the transcriber's reproducing stylus will properly cooperate with the sound track recorded thereon. Whenever the recording medium 98 has rotated to the proper position, the transcriber's rotation synchronizing relay RRT will be energized and thus complete circuit 928.

The normally closed contacts of the transcriber's left travel relay TLT and the transcriber's right travel relay TRT in circuit 928 may be used to interrupt said circuit and deenergize the transcriber's foot switch relay TFSR. As will be later shown, the transcriber's left travel relay TLT and the transcriber's right travel relay TRT operate to control the high speed travel of the transcriber's carriage 454. Thus, whenever the transcriber causes the carriage 454 to move at high speed along the recording medium 98, the transcriber's foot switch relay TFSR will be de-energized.

In order that energization of the transcriber's foot switch relay TFSR may operate the solenoid 490 so as to lower the transcriber's reproducing head 450 into operative relationship with recording medium 98, we have included the solenoid 490 in a circuit 930 which extends from the normally energized bus 800 and includes a normally closed time delay contact of the transcriber's foot switch relay TFSR.

This time delay contact of the relay TFSR operates in a manner identical to that described in connection with the dictator's equipment so that upon energization of the relay TFSR, solenoid 490 will be instantly de-energized, but such that upon de-energization of the relay TFSR, solenoid 490 will be delayed in its energization.

In a manner similar to that used with the dictator's control equipment, we have provided a transcriber's head relay TH in a circuit 932 connected in parallel with the solenoid 490, so that whenever the solenoid 490 is energized to pull the transcriber's reproducing head 450 into the inoperative position the transcriber's head relay TH will be energized. Energization of the transcriber's head relay TH is then effective in interrupting circuit 828 so as to disconnect the transcriber's reproducing head 450 from the transcriber's amplifier 820. This system operates in a manner identically to that described in connection with the dictator's head relay DH, and operates to disconnect the transcriber's reproducing head 450 from the amplifier 820 so that loud and unusual noises resulting from the operation of the machine 2 will not be reproduced as sound in the presence of the transcribing operator.

We also prefer to make closure of the transcriber's foot control device 410 and subsequent energization of the transcriber's foot switch relay TFSR effective in causing the transcriber's carriage 454 to move to the right along the recording medium 98 at the proper speed for reproducing. We have therefore included the transcriber's synchronizing clutch mechanism 462 in a circuit 934 which extends from the operation bus 802 and has included therein normally closed contacts of the right transcription limit relay RTL and normally open contacts of the transcriber's foot switch relay TFSR.

Energization of the transcriber's foot switch relay TFSR will complete circuit 934 so as to energize the transcriber's synchronizing clutch mechanism 462, providing the carriage 454 has not been moved sufficiently far to the right to energize the right transcription limit relay RTL. Whenever the carriage moves sufficiently far to the right to energize the aforementioned relay, circuit 934 will be interrupted so as to stop the travel of the transcriber's carriage 454 at that point.

Conversely, de-energization of the transcriber's foot switch relay TFSR is effective in closing circuits 930 and 932 and energizing the solenoid 490 and the transcriber's head relay TH so as to pull the transcriber's reproducing head 450 away from the record into the inoperative position, and to disconnect the head 450 from the amplifier 820. De-energization of the transcriber's foot switch relay TFSR is also effective in opening circuit 934 so as to de-energize the transcriber's synchronizing clutch mechanism 462 and so stop the travel of the carriage 454 to the right along the recording medium 98. It will be noted that this system is similar to that which has been used for the dictator's foot control device 10.

It frequently happens that the transcribing operator is desirous of moving the carriage 454 at high speed to the left in order to reconsider material recorded toward the forepart of the record, or may be desirous of moving the carriage 454 at high speed forwardly or to the right along the recording medium in order to have reproduced as sound, recorded material which may be of a special nature and which may lie at a point somewhat remote from that portion which she may be reproducing.

We have therefore connected contacts of the transcriber's high speed left travel pedal 426 in a circuit 936 which extends from the operation bus 802 to the transcriber's left travel relay TLT.

In a similar manner we have included contacts of the transcriber's high speed right travel pedal 428 in a circuit 938 which extends from the operation bus 802 to the transcriber's right travel relay TRT and includes a normally closed contact of the right transcription limit relay RTL. Depression of the foot switch control device 426 will instantly energize the transcriber's left travel relay TLT, while depression of the foot control device 428 will energize the transcriber's right travel relay TRT, providing the carriage 454 is not sufficiently far to the high to energize the right transscription limit relay RTL.

In order that energization of the transcriber's left travel relay TLT or the transcriber's right travel relay TRT may control the operation of the transcriber's travel motor 498, we have connected the motor 498 in circuits 942 and 944. The circuit 942 extends from the normally energized bus 800 to the transcriber's travel motor 498 and includes a normally open contact of the transcriber's left travel relay TLT while circuit 944 extends from the normally energized bus 800 and includes a normally open contact of the transcriber's right travel relay TRT.

We have shown the motor 498 as being of the split-series field type which operates identically with the motor 350 previously described.

Energization of the transcriber's left travel relay TLT or of the transcriber's right travel relay TRT is effective in energizing the motor 498 to rotate in the proper direction for moving the transcriber's carriage 454 in a corresponding direction along the recording medium 98.

In order that the rotation of the motor 498 may be transmitted to the transcriber's advancing screw 456, we have connected the transcriber's travel clutch mechanism 500 in circuits 946 and 948. Circuit 946 extends from the normally energized bus 800 to the transcriber's travel clutch mechanism 500 and includes a normally open contact of the transcriber's right travel relay TRT. Circuit 948 is similar in that it extends from the operation bus 802 to the transcriber's travel clutch mechanism 500 and includes a normally open contact of the transcriber's left travel relay TLT, and a normally closed contact of the left transcription limit relay LTL.

Energization of either of the transcriber's right travel relay TRT or the transcriber's left travel relay TLT will be effective in completing circuit 946 or circuit 948, thereby energizing the transcriber's travel clutch mechanism 500 from either the normally energized bus 800 or the operation bus 802.

The normally closed contact of the right transcription limit relay RTL included in circuit 938 operates to limit the high speed travel of the carriage 454 to the right by deenergizing the transcriber's right travel relay TRT whenever the right hand end of the record is reached. In a similar manner, the left transcription limit relay LTL operates to stop the travel of the carriage 454 whenever it has travelled to the left to the beginning of the record, by opening circuit 948 and disconnecting the transcriber's travel clutch mechanism 500.

Summarizing briefly, it will be seen that we have provided the transcribing operator with a suitable sound reproducing system 822 which may operate to reproduce as sound in the presence of a transcribing operator the material which has been recorded on the recording medium 98. It will be further noted that we have provided the transcriber's foot control device 410 which cooperates with the transcriber's foot switch relay TFSR so that the transcriber may at will remove the reproducing head 450 from the recording medium and stop the travel of the carriage along said recording medium, or may cause the head 450 to be lowered upon the record and the carriage to travel to the right at the proper speed for reproducing. This system cooperates with the synchronizing equipment in such a manner as to make it impossible for the transcribing operator to inadvertently skip any of the recorded dictation.

It will be further noted that we have included the transcriber's high speed left travel control device 426 and the transcriber's high speed right travel control device 428 in suitable circuits to control suitable relays so that the transcriber's travel motor 498 may be energized to move the carriage at high speed along the record, and that rotation of said motor may be transmitted through the electric clutch mechanism 500 to rotate the transcriber's advancing screw 456 in the corresponding direction.

Let us now consider the operation of the equipment which is used to indicate remotely to the transcribing operator the location of certain points of interest to which the dictating operator may wish to call the transcribing operator's attention. These points of interest may include "end of dictation" and "errors." It will be remembered in connection with the mechanical specifications covering the marking devices, that we may for the sake of explanation divide this equipment into three parts, namely; the dictator's condition creating means, the condition retaining means, and the transcriber's condition interpreting means. Inasmuch as the condition retaining means is purely mechanical in its operation it does not appear on this wiring diagram. We have however shown the wiring for the condition creating means and the condition interpreting means inasmuch as both of these devices are electrical in their operation. We will therefore at this time consider the operation of the dictator's condition creating means.

It will be remembered in connection with the mechanical specifications, that we have provided two solenoids, 532 and 534, which may be used by the dictating operator in conjunction with the push buttons 54 and 56 to create conditions whose position along the length of the record corresponds to the location of certain points of interest that the dictating operator may wish to call to the transcribing operator's attention.

We have accordingly connected the solenoid 534 in a circuit 950 which extends from the operation bus 802 and includes contacts of the push button 54. In a similar manner we have included the solenoid 532 in a circuit 952 which extends from the operation bus 802 and includes contacts of the push button 56. Depression of either push button 54 or 56 will complete either circuit 950 or 952 so as to energize the proper solenoid 532 or 534 and alter a portion of the condition retaining means from a normal to an abnormal condition.

It has been previously pointed out how energization of said solenoids is effective in creating and causing to be retained a condition by displacing the rotary stops 546 or 548; which condition is later interpreted by the condition interpreting means. It will be further remembered that this condition interpreting means consisted of a combination of suitable carriage devices 558 and drive means for causing these devices to take up successive positions along the length of the recording medium, which positions correspond to the location of the aforementioned points of interest. We have therefore included the marker motor 564 of the drive means in a system of reversing circuits 954, 956 and 958 which are controlled by various impulse relays so that the marker motor 564 may be energized to drive the carriage devices 558 in the proper direction along the condition retaining means.

The impulse relays are of a common type as explained in our co-pending application No. 17,666. In referring hereinafter to an impulse relay we are referring to a relay which utilizes two operating coils in such a manner as to operate a toggle which maintains the contacts thereof in the last operated position. An auxiliary finger is provided which deenergizes the coils of the relay when the toggle has been tripped. The impulse relays shown in this wiring diagram are shown with the contacts in the position which they occupy after energization of the "off" coil.

The impulse relays which control the operation of the marker motor 564 may include a marker motor left travel relay MML, an error relay ER, and a length relay LR. The manner in which these relays are connected in various circuits and the manner in which they operate to control the equipment will now be described.

Controlling circuits for the marker motor 564 include forward circuits 954 and 956. Circuit 954 extends from the normally energized bus 800 and includes a normally open contact of the error relay ER and a normally closed contact of the marker motor left travel relay MML. Circuit 956 extends from the normally energized bus 800 and includes a normally open contact of the length relay LR and a normally closed contact of the marker motor left travel relay MML. The reverse circuit for the motor 564 comprises a circuit 958 which extends from the normally energized bus 800 and includes a normally open contact of the marker motor left travel relay MML and normally closed contacts of the error relay ER and the length relay LR.

The marker motor left travel relay MML is controlled by an "on" circuit 960 which extends from the operation bus 802 and includes a normally open contact of a time delay relay TD, the function of which will be explained later, and "off" circuits 962 and 964 which extend from the operation bus 802 and which may be respectively controlled by normally open contacts of the error relay ER and the length relay LR. In the same way the circuits which cause the marker motor 564 to be driven in the forward direction are controlled by the error relay ER and the length relay LR.

The error relay ER is of the impulse type and is supplied from the operation bus 802 by circuits 966 and 968. Circuit 966 extends from the operation bus 802 to the "off" coil of the error relay ER and includes contact 624 and 626 of the condition interpreting means. Circuit 968 also extends from the operation bus 802 to the "on" coil of the error relay ER and includes a normally closed contact of the transcriber's left travel relay TLT and contacts 632 and 640 of the condition interpreting means.

We have connected the solenoid 616 in a circuit 972 which extends from the operation bus 802 and includes a normally open contact of the marker motor left travel relay MML. We have also connected the solenoid 616 in parallel with the "on" coil of the error relay ER by means of a circuit 970 which includes a normally closed contact of the marker motor left travel relay MML.

We have included the error clutch mechanism 566 in two circuits which extend from the operation bus 802 in the following manner: circuit 974 extends from the operation bus 802 and includes a normally open contact of the error relay ER and circuit 976 extends from the operation bus 802 and includes a normally open contact of the marker motor left travel relay MML.

It will aid in understanding the operation of the previously described devices if we trace the sequence of operation. Let us assume therefore that the transcriber's carriage 454 is at the left end or the beginning of the recording medium, and that the carriage device 558 is also at the same point so that contacts 632 and 640 are closed. Let us further assume that the dictator has dictated a considerable portion of the recording medium 98 and has created certain conditions corresponding to the position of errors by displacing certain of the rotary stops 546 in a manner which has been previously described in connection with the mechanical specifications.

Referring to circuit 968 it will be seen that the closure of contacts 632 and 640 is effective in completing circuit 968 so as to energize the "on" coil of the error relay ER. This will then trip the error relay ER to the "on" position so as to close the normally open contacts associated with that relay.

Referring to circuit 954, we see that energization of the error relay ER will complete said circuit so as to energize the marker motor 564 to rotate in the proper direction to advance the carriage device 558 to the right along the condition retaining means.

It will also be noted that should the marker motor left travel relay be tripped to the "on" position, energization of the "on" coil of the error relay ER will complete circuit 962 and energize the "off" coil of the marker motor left travel relay MML and trip said relay to the "off" position so as to complete circuit 954 in the manner described.

Rotation of the motor 564 may be transmitted to the error advancing screw 560 by the error clutch mechanism 566 which is included in circuit 974 and energized by the energization of the error relay ER. At this time the carriage device 558 is being driven forwardly to the right along the condition retaining means.

Let us assume now that the downward extending armature of the solenoid 616 strikes one of the rotary stops 546 which was previously displaced by the dictating operator. As was shown in connection with the mechanical specifications, this will cause the solenoid 616 to rotate about the spring material which secures it to the insulating block 598 and thus close contacts 624 and 626. The closing of contacts 624 and 626 will complete circuit 966 so as to trip the error relay ER to the "off" position. Tripping the error relay ER to the "off" position will then open the ER contact contained circuit 974 so as to de-energize the error clutch 566. De-energization of the error clutch 566 then disconnects the advancing screw 560 from the marker motor 564 and also applies a braking action to said advancing screw so that it will stop instantly in its rotation and thus cause the carriage device 558 to immediately come to rest at the point corresponding to the location of the rotary stop 546 which was displaced by the dictator. Tripping the error relay ER to the "off" position also opens circuit 954 so as to de-energize the travel motor 564.

The carriage device 558 has thus been caused to travel to the right to a point corresponding to that indicated as an error by the dictating operator and has further been caused to come to rest at that point. As soon as the transcriber's carriage travels to the right sufficiently far to reach said point, however, contacts 632 and 640 will close. This will complete circuit 968 so as to energize the error relay ER to the "on" position in the manner previously described. As has been shown this will once more cause the carriage device 558 to travel to the right along the condition retaining means and to continue its travel until the downward extending armature of the solenoid 616 may strike another rotary stop 546 which has been displaced by the dictating operator.

Referring to the solenoid 616 and circuit 970, it will be seen however that closure of the contacts 632 and 640 is effective in completing circuit 970 so that the error solenoid 616 will be energized at the same time as the error relay ER. Energization of the error solenoid 616 causes this solenoid to retract the armature thereof so that it may clear the rotary stop 546 with which it is engaged. As soon, however, as the carriage device 558 has travelled to the right sufficiently far to open the contacts 632 and 640 circuit 970 will be de-energized and the solenoid 616 will be de-energized so as to allow the armature thereof to assume once more the extended position so that it may engage any one of the rotary stops 546 which has been displaced by operation of the dictating operator.

If the carriage device 558 travels past the end of the condition retaining means, the downward extending armature of the solenoid 616 will strike a suitable stop 978 (Figure 7), formed on the base 96, and thus cause contacts 624 and 626 to close. Closure of these contacts is effective, as has been hereinbefore described, in disengaging clutch 566 and is effective in de-energizing the marker motor 564 so as to stop the rotation of the advancing screw 560.

We have also provided a means whereby the transcribing operator may return the carriage devices 558 along with the transcriber's carriage 454 to the fore portion of the record. It sometimes happens that the transcribing operator is obliged to return the carriage 454 to the fore portion of the record in order to transcribe material recorded thereon. If this becomes necessary, it is also necessary that the transcribing operator be provided with the proper indication as regards "error" and length of dictation. In order to accomplish this we have provided a time delay relay TD which is included in circuit 980 extending from the operation bus 802 and including normally open contacts of the transcriber's left travel relay TLT. We prefer to make the time delay relay TD of a common type in which the contacts thereof are delayed in their operation a definite length of time after the energization of the coil, such contacts being immediately operable in the reverse direction whenever the coil thereof is de-energized.

It will be remembered that the transcriber's left travel relay is energized briefly to perform the ordinary back-spacing operation. During this operation it is not necessary or desirable to return the carriage devices 558 with the transcriber's carriage 454. On the other hand, the transcriber's left travel relay TLT is also used to return the carriage to the forepart of the record as described above. This operation requires more time than does the back-spacing operation and we therefore prefer to make the time setting of the time delay relay TD such that short time energization of the relay TLT for back-spacing will not close the contacts of the relay TD but such that longer time energization of the relay TLT will cause the contacts of the relay TD to close.

Referring to circuit 960 it will be seen that we have included therein, as previously described, normally open contacts of the time delay relay TD so that energization of said relay will trip the marker motor left travel relay MML to the "on" position. In order to understand this operation, let us assume that the transcribing operator wishes to return the carriage 454 to the forepart of the record in order to reconsider material recorded thereon. As has been heretofore shown, she may accomplish this by depressing the foot control pedal 426 which energizes the transcriber's left travel relay TLT. Energization of the left travel relay TLT is effective in causing the transcriber's carriage 454 to move to the left or back toward the forepart of the record in the manner previously described. In addition, however, energization of the transcriber's left travel relay TLT will complete circuit 980 so as to energize the time delay relay TD.

Energization of the time delay relay TD will then, after a definite time has elapsed, complete circuit 960 extending from the operation bus 802 to the "on" coil of the marker motor left travel relay MML so as to trip the marker motor left travel relay to the "on" position. As has been previously shown, tripping the marker motor left travel relay to the "on" position then completes circuit 958 so as to cause the marker motor 564 to rotate in such direction as to drive the carriage device 558 back toward the fore part of the condition retaining means. At the same time, energization of the marker motor left travel relay will complete circuit 976 so as to energize the clutch mechanism 566. This will then transmit power from the marker motor 564 to the error advancing screw 560.

In order that the carriage device 558 will overtake the transcriber's carriage 454, we prefer to make the speed of the drive means which includes the motor 564 such that the carriage device 558 will move along the condition retaining means at a speed which is materially higher than the speed of travel of the carriage 454. Inasmuch as the carriage device 558 and the contacts 632 and 640 are so constructed that it is impossible for the carriage device 558 to pass the transcriber's carriage 454, we have made the error clutch 566 of such type that whenever the torque required to drive the carriage device 558 rises above a given maximum value, the clutch 566 will slip.

Thus it will be seen that the carriage device 558 will, upon overtaking the transcriber's carriage 454, continue to travel along the condition retaining means at the same speed that the transcriber's carriage 454 is travelling along the recording medium 98, and the excess speed of the motor 564 will be absorbed in slipping the clutch mechanism 566.

It will be noted, by referring to circuit 968, that closure of the contacts 632 and 640, causes no change in the operation of the equipment, inasmuch as circuit 968 is at this time interrupted by the normally closed contact of the transcriber's left travel relay TLT contained therein. The solenoid 616 is at this time energized through circuit 972 so that the armature thereof is retracted sufficiently far to clear any of the rotary stops 546.

The travel of the carriage device 558 to the left or back toward the fore part of the record and the condition retaining means will continue as long as the transcriber's left travel relay TLT is energized. As soon, however, as the transcriber's left travel relay TLT is de-energized, circuit 968 will be completed by the closing of the normally closed contact of the transcriber's left travel relay TLT contained therein. This will then energize the "on" coil of the error relay ER in a manner previously described.

Energization of the "on" coil of the error relay ER is effective in completing circuit 962 so as to trip the marker motor left travel relay MML to the "off" position. This will then stop the rotation of the marker motor in the direction which drives the carriage device 558 to the left. At the same time energization of the "on" coil of the error relay ER is effective in causing the marker motor 564 to rotate in the reverse direction and drive the carriage devices to the right. Said carriage devices will come to rest at the first of the rotary stops 546, which has been displaced by the operation of the dictating operator in a manner previously described.

We have also provided equipment which operates in a manner similar to that previously described and which is used to indicate to the transcribing operator the position of "length of dictation" indications. This equipment includes the "length" clutch 578; the "length" solenoid 630; contacts 632 and 640; contacts 624 and 626; and the "length" relay LR. These devices are connected in circuits identical to those just described and are shown on the wiring diagram as circuits 982 to 992 inclusive.

It was previously stated in connection with the mechanical specifications, that we prefer to indicate the position of "errors" and "length of dictation" markings as set by the dictating operator by indicating to the transcribing operator on the indicating devices 438 and 440 the location of the carriage devices 558 during such time as said carriage devices are at rest.

We further prefer to indicate to the transcribing operator the relative amount of recorded material which normally would be considered before the transcriber's carriage 454 reaches that point of the recording to which the dictating operator wished to call the transcribing operator's attention. This indication may be secured by indicating the relative distance between the transcriber's carriage 454 and the carriage devices 558. We will therefore at this time consider the circuits and the equipment used for operating the indicating devices 436, 438 and 440 which are mounted in the transcriber's indicating panel 14.

We have accordingly connected the primary potentiometer 508 between the operation bus 802 and the other main bus 806 by a circuit 1000. It has been previously pointed out that the position of the rotary arm of the potentiometer with respect to the resistance strip of the potentiometer is a function of the position of the transcriber's carriage with respect to the length of the record. Thus it follows, that if we connect the arm of the potentiometer 508 by means of a circuit 996 to the position indicating device 436, we see that the voltage between the circuit 996 and the main bus 806 will vary as a function of the position of the transcriber's carriage 454 with respect to the length of the recording medium 98. The connection of the potentiometer 508; the indicating meter 436; and circuits 1000 and 996 is similar to that previously described in our co-pending application No. 17,666.

We have connected the secondary potentiometer 506 in parallel with the primary potentiometer 508 by means of a circuit 1008 which extends between the operation bus 802 and the main bus 806. We have also connected the movable arm thereon by means of circuit 1006 to the secondary element of the carriage position indicating device 436. We have arranged the gearing which drives the potentiometers 506 and 508 such that the arm of the potentiometer 506 will make a number of complete revolutions during the total travel of the carriage along the length of the record. The secondary element of the indicating device 436 which is supplied by circuit 1006 operates to increase the accuracy of the indication and facilitate reading over that afforded by the primary element which is supplied by circuit 996.

We prefer to calibrate the elements of the indicating devices 436 in the following manner. We have calibrated the primary element of the device 436 in steps of 100 so as to read 0 when the carriage is at the beginning of the record and so as to read 1000 when the carriage is at the extreme right hand position. We have calibrated the secondary element of the device 436 from 0 to 100 in unit steps and have so arranged the gearing that the arm of the potentiometer 506 makes ten complete revolutions during the length of the carriage travel. As the secondary element of the device 436 travels from 0 to a full scale deflection of 100, the primary element of the device 436 will move over one-tenth of its total scale and will therefore read 100. At this point, then, the two devices read alike.

Let us assume then that the carriage travels still farther and that the primary element of the device 436 reads somewhere between 100 and 200. In order to determine the exact value of the quantity which lies somewhere between 100 and 200, we refer to the secondary element and find, let us say, that it reads 42. Thus, the position of the carriage referred to a basis of 1000 will be 142 or a combination of the readings of the primary and secondary elements of the device 436. We have thus provided a system whereby the position of the carriage with respect to the length of the record may be remotely indicated to the transcribing operator, and further, we have provided a means which is far more accurate and easier to read with a high degree of accuracy than would a system based on a single device or a device with a single element.

We have stated above that this connection of the devices 436 operates to increase the accuracy of the indication as well as facilitate reading. That this is true may be more readily seen by considering a numerical case. The indicating devices which we have shown may comprise voltmeters which may be easily procured with a guaranteed accuracy of five percent. As shown, we have arbitrarily divided the length of the recording medium into 1000 units. Using devices as noted above, the error when using a single device may be as high as five percent of 1000 or 50 of the arbitrary units.

In the system of our invention, the primary device will indicate the portion of the record to which the carriage is adjacent. Since this device is calibrated in steps of 100, the natural error of five percent will not change the reading of this device sufficiently to bother. The maximum error therefore occurs in the reading of the secondary element and this error may be five percent of its full scale deflection (100) or a total error of five units. This error is only one-tenth of the error possible with a system using a single indicating device.

Let us assume that the actual position of the carriage may be designated as 970 and that the indicating devices are indicating a value which is five percent of the full scale deflection low. If a single device is used, the indication will therefore be 50 low or 920. If the dual device system of our invention is used, it is readily seen that reference to the primary element will show that the position of the carriage lies somewhere between 900 and 1000, or that the first figure of the number is 9. The secondary element should read 70, but due to the five percent error reads 5 low, or 65. Thus, a combination of the readings of the first and second elements gives a reading of 965 or a total error of 5 while a single device would give an error of 50.

It should be noted that this manner of indicating the position of the translation device along the record may be advantageously employed where the indicating devices are placed remotely from the machine and where errors may occur in the indicating devices. As shown by the example above, if the error is introduced between the indicating devices and their point of operation, greater accuracy will result than if the error were introduced between the lead screw and the operating devices which control the indicators. The use of an indicating device which is fitted with a vernier attachment falls in the second class of operation in which the total error is much larger.

In the foregoing description and in subsequent statements the term "indicating device" is to be interpreted as being any suitable voltage or current sensitive device. In the form shown we have included two indicating devices in the same housing, but it lies within the scope of our invention to use one or more indicating devices as desired and to arrange them with a common dial or use separate dials as desired.

In order that the location of the error indication may be indicated to the transcribing operator with respect to the position of the transcriber's carriage 454 rather than with respect to their position along the length of the recording medium 98, we have provided a potentiometer 642 which is connected by means of a circuit 994 between the operation bus 802 and the main bus 806. This potentiometer operates in a manner identical to potentiometer 508. Thus it is seen that if we connect a circuit 998 to the arm of the potentiometer 642 that the potential between the arm and the main bus 806 will be a function of the position of the carriage device 558 with respect to the length of the recording medium 98 and the condition retaining means.

Since the potential of the arm connected in circuit 996 is likewise a measure of the position of the transcriber's carriage 454 with respect to the length of the record, the potential between the potentiometer arms in circuits 996 and 998 will be a function of the relative distance between the position of the transcriber's carriage 454 and the carriage device 558 of the condition interpreting means. We have therefore connected the error indicating device 438 in the circuit 998 between the arm of the potentiometer 642 and the arm of the potentiometer 508.

We choose to indicate the position of the length of the dictation indication in the same manner by providing a potentiometer which is connected by means of a circuit 1004 between the operation bus 802 and the main bus 806, and have connected the length of dictation indicating device 440 in a circuit 1002 between the arm of said potentiometer and the arm of the potentiometer 508. From the foregoing description it is apparent that these devices in combination constitute a differential device for indicating the difference in positions of two devices relative to some pre-determined reference point.

This system of indicating "error" and "length of dictation" indications to the transcribing operator is similar to the system used on present-day machines. The arm of the potentiometer 642 indicates with respect to the length of the record the position of the next "error" to be considered. In the present-day system the pencilled marking on the slip of paper provides a similar indication. In the present-day system there is provided a pointer which is attached to the carriage of the transcribing machine and which extends over a slip of paper to indicate the position of said carriage with respect to the length of the record. The arm of the potentiometer 508 provides a similar indication. At this point, however, the analogy ceases. Under the old system it was necessary for the transcribing operator to measure by some means, as by subtracting one number from another, the relative amount of recorded material to be considered before the material corresponding to the indication pencilled on the slip of paper was reached.

The machine of our invention makes it unnecessary for the transcribing operator to make this subtraction inasmuch as the subtracted values are continuously indicated by the devices 438 and 440. It will also be noted that our invention makes it possible to transmit these indications to the transcribing operator, regardless of said operator's position with respect to the machine, remote or otherwise. It is also unnecessary when using the machine of our invention to attach and to detach auxiliary equipment and transfer said equipment from one operator to the other as from a dictating operator to a transcribing operator.

We therefore have provided a means whereby certain points of interest on the record occurring during the dictation of said record may be noted by the dictating operator and said notations kept until the transcribing operator shall reach such a point in her work that she will be interested in those points of interest to which the dictating operator wishes to call her attention. Furthermore, it will be noted that we have provided a means for remotely creating these indications by the dictating operator and a second remotely operating means whereby the transcribing operator may accurately ascertain the exact position with respect to her carriage of the aforementioned points of interest.

It has previously been stated that the machine of our invention combines the functions of three commercial machines, a dictating machine, a transcribing machine and a shaving machine. Let us at this time consider the operations and the equipment which functions to perform the shaving or reconditioning operation on the recording medium 98. In a preferred embodiment of our invention we have placed the responsibility of the shaving or reconditioning operation on the transcribing operator, inasmuch as she will most likely know whether all of the material recorded on the recording medium 98 has been transcribed. We have therefore provided the control device or push button 442 which is mounted on the transcriber's indicating panel 14 and which may be operated by the transcribing operator to start the shaving sequence. The shaving operation is controlled by a master shaving relay SR which is connected in an energizing circuit 1010 and holding circuits 1012 and 1014. Circuit 1010 extends from the normally energized bus 800 to the shaving relay SR and includes the push button 442 which is used to start the shaving operation and includes a normally open contact of the right transcription limit relay RTL.

We have placed the contacts of the right transcription limit relay RTL in circuit 1010 in order to reduce the possibility of accidentally starting the shaving operation. It will be seen that unless the transcriber's carriage 454 is at the extreme right end of the recording medium 98 so as to energize the right transcription limit relay RTL, depression of the push button 442 will have no effect on the operation of the equipment. However should the right transcription limit relay be closed, depression of the push button 442 will complete circuit 1010 so as to energize the shaving relay SR from the normally energized bus 800.

As has been previously pointed out, energization of the shaving relay SR will immediately disconnect the operation bus 802 from the normally energized bus 800 and connect the shaving bus 804 thereto. As soon then as the shaving bus 804 is energized, circuit 1012, which extends from the shaving bus 804 to the shaving relay SR and includes a normally closed contact of the left recording limit relay LRL, will become operative so as to maintain the shaving relay energized after the release of the push button 442. In order to start the shaving operation it only is necessary for the transcribing operator to have the transcriber's carriage 454 at the extreme right end of the recording medium 98, and to push the shaving control button 442 momentarily, since the shaving relay SR establishes its own holding circuit and makes continued depression of the push button 442 unnecessary.

The energization of the shaving relay SR and the subsequent de-energization of the operation bus 802 is effective in isolating the dictating and transcribing operator's controlling devices, so that they may not accidentally interfere with the shaving operation.

As soon as the shaving relay SR is energized, the dictating operator is apprised of the fact that the machine is no longer operative from his control station by darkening of the dial light 48 and the indicating lights 50 and 52. It will be remembered that these lights are all supplied with energy from the operation bus 802 by circuits 870, 924 and 926. The transcribing operator, on the other hand, is apprised of the fact that the shaving operation has begun by the darkening of the indicating light 434 which is supplied from the operation bus 802, by circuit 872 and the illumination of the indicating light 444 which is supplied from the shaving bus 804 by a circuit 1016. Energization of the shaving relay SR and the subsequent energization of the shaving bus 804 and the de-energization of the operation bus 802 immediately stops the rotation of the record motor RM, (circuit 874) and de-energizes the record clutch mechanism 132, (circuit 876).

Energization of the shaving relay SR will interrupt circuit 900 so as to eliminate the possibility of any feed back between the shaving bus 804 and the operation bus 802, through circuits 900, 904 and 906, and the differential switch structure.

De-energization of the operation bus 802 also de-energizes the dictator's foot switch relay DFSR (circuit 878) and the transcriber's foot switch relay TFSR (circuit 928) so as to cause the dictator's and transcriber's head supporting structures to be pulled away from the recording medium 98 into the inoperative position.

We have connected the dictator's right travel relay DRT to the shaving bus 804 by means of a circuit 906 which includes normally closed contacts of the left recording limit relay LRL, and the auxiliary shaving relay SRX, and also normally open contacts of the shaving relay SR. As was previously mentioned, the auxiliary shaving relay SRX may at this time be considered de-energized. Energization of the shaving relay SR therefore completes circuit 906 so as to energize the dictator's right travel relay DRT. As has been previously shown, energization of the dictator's right travel relay DRT is effective in causing the dictator's carriage 154 to travel to the right along the recording medium 98 at high speed. It will be remembered that the carriage 154 also carries the shaving tool 284. We have therefore caused the carriage 154 to travel to the right at high speed so that, among other things, the shaving tool 284 may begin to shave the record at the proper end thereof.

We have also connected the solenoid 288 in a circuit 918 which extends from the shaving bus 804 and includes a normally open contact of the shaving relay SR, a normally closed contact of the left recording limit relay LRL and contacts of the solenoid limit switch structure 338 and 344.

Energization of the shaving relay SR will complete circuit 918 so as to energize the solenoid 288. Energization of the solenoid 288 then causes the head supporting structure 276 to be rotated in the proper direction to place it in the inoperative shaving position. It should be noted, however, that the solenoid 288 is limited in its rotation in said direction by the stop shaft 304.

As soon, then, as the dictator's carriage 154 has travelled to the right sufficiently far for the push rod 312 to contact the end plate 96 and lift the stop shaft 304, the solenoid 288 will complete the rotation of the head supporting structure 276 into the inoperative shaving position. When this position is reached, contacts 338 and 344 of the limit switch structure will open thereby opening circuit 918 and de-energizing the solenoid 288.

This travel of the carriage to the right sufficiently far for the various devices to cooperate with the end plate 96 will also engage the pawl and the ratchet wheel 240 so that the micrometer advancing screw 238 will be moved forward a pre-determined amount. We prefer to make this amount such that the dictator's inner carriage structure 234 will be moved forward a sufficient distance to allow the shaving tool 284 to remove a very small portion of the recording medium 98 whenever it is brought into contact therewith. We prefer to make this small portion of the recording medium 98 which is removed by the shaving tool 284 just sufficient to remove effectively all of the recording which has been recorded upon said recording medium.

We have included in circuits 1018 and 1020 an auxiliary shaving relay SRX. Circuit 1018 extends from the shaving bus 804 and includes a normally open contact of the right shaving limit relay RSL. Circuit 1020 extends from the shaving bus 804 and includes a normally open contact of the auxiliary shaving relay SRX and a normally closed contact of the left shaving limit relay LSL. As soon as the carriage has advanced sufficiently far to the right to perform the operations on the push rod 312 and the micrometer advancing screw 238, the right shaving limit relay RSL will be energized by the completion of circuit 848 as a result of the closing of the limit switch contacts 732 and 740. Energization of the right shaving limit relay RSL will thus complete circuit 1018 so as to energize the auxiliary shaving relay SRX. Energization of the auxiliary shaving relay SRX then completes circuit 1020 so as to maintain the auxiliary shaving relay SRX energized from the shaving bus 804 regardless of the ensuing operation of the right shaving limit relay RSL. Energization of the auxiliary shaving relay SRX will then open circuit 906 so as to de-energize the dictator's right travel relay DRT. De-energization of the right travel relay DRT will then cause the high speed travel of the dictator's carriage 154 to the right to stop.

In summarizing briefly at this point then, it will be seen that the transcribing operator, by pressing the shaving control button 442 under the proper conditions, has caused the dictator's and transcriber's heads to be pulled away from the recording medium into the inoperative position and has caused the dictator's carriage structure 154 to travel to the right at high speed until such time as the push rod 312 and the ratchet wheel 240 will cooperate with the end plate 96. At this time the travel of the dictator's carriage 154 to the right is automatically stopped.

As has been shown the operation of the push rod 312 is effective in removing the stop shaft 304 so that the head supporting structure 276 may be rotated into the inoperative shaving position. Also the rotation of the ratchet wheel 240 has, as previously described, been effective in advancing the dictator's head supporting structure 276 an amount such that the shaving tool 284 carried thereon may remove a pre-determined amount of wax when it is placed in operative relationship with the recording medium.

Referring now to the transcriber's right travel relay TRT, it will be seen that we have also included it in a circuit 940 which extends from the shaving bus 804 and includes a normally open contact of the shaving relay SR and a normally closed contact of the transcriber's right shaving limit relay TRSL. It will thus be seen that the moment the shaving relay SR is energized, circuit 940 will be completed so as to energize the transcriber's right travel relay TRT. Energization of the transcriber's right travel relay TRT will, as has been shown, cause the transcriber's carriage to travel to the right at high speed. This travel will continue the transcriber's right shaving limit switch contacts 744 and 750, included in circuit 860, close so as to energize the transcriber's right shaving limit relay TRSL.

Energization of relay TRSL will then open circuit 940 and de-energize the transcriber's right travel relay TRT. Deenergization of the transcriber's right travel relay TRT will then cause the transcriber's carriage 454 to stop in its travel to the right.

As has been pointed out previously in connection with the mechanical specifications, this last portion of travel of the transcriber's carriage 454 to the right is effective in causing the micrometer advancing screw 482 associated therewith to advance a pre-determined amount. We prefer to make this amount such that the transcriber's head 450 will be advanced toward the axis of the recording medium 98 an amount sufficient to cooperate properly with the surface of the recording medium 98 after it has been reconditioned by the shaving tool 284.

We have included the shaving motor 680 in a circuit 1022 which extends from the shaving bus 804 and includes a normally open contact of the auxiliary shaving relay SRX. In a similar manner we have included the shaving clutch mechanism 682 in a circuit 1024 which extends from the shaving bus 804 and includes a normally open contact of the auxiliary shaving relay SRX. We have also included the position registering solenoid 676 in a circuit 1026 extending from the shaving bus 804 and including a normally open contact of the auxiliary shaving relay SRX.

As soon as the dictator's carriage 154 has travelled to the right sufficiently far to energize the right shaving limit relay RSL, the auxiliary shaving relay SRX will be energized. Energization of the auxiliary shaving relay SRX, as has been shown, is then effective in causing the high speed travel of the carriage 154 to stop. Referring to circuits 1022 and 1024, it will be seen that energization of the auxiliary shaving relay SRX is also effective in energizing the shaving motor 680 and the shaving clutch mechanism 694, so that the recording medium 98 may be rotated in the direction indicated by arrow 1028 in Figure 12 at a speed sufficiently high for the shaving tool 284 to remove the wax therefrom smoothly and cleanly.

It will be noted at this point that we have provided a means of shaving the record on the same mandrel as is used for recording and reproducing and also that the shaving tool is carried by the structure that carries the recording and reproducing heads. This ensures that the record will always be concentric and the heads will always properly engage said record.

It will also be noted by referring to circuit 1026 that energization of the shaving relay SRX will energize the position registering solenoid 676 so that the slidably guided armature 678 thereof will be raised into its operative position and will engage the rearward face of the position registering block 658.

This will then cause the position registering block 658 to be moved to the left as the dictator's carriage structure 154 moves to the left or toward the forepart of the record during the operation of reconditioning the recording medium.

Remembering that the head supporting structure 276 has at this time been rotated into the inoperative shaving position, it will be seen that energization of the relay SRX will interrupt circuit 880 so as to de-energize the neutral solenoid 252. De-energization of the solenoid 252, as has been explained heretofore, will then allow the head supporting structure 276 to come into the operative shaving position.

We have included the dictator's synchronizing clutch mechanism 170 in a circuit 884 which extends from the shaving bus 804 and includes a normally open contact of the auxiliary shaving relay SRX. Energization of the auxiliary shaving relay SRX will complete circuit 884 and energize the dictator's synchronizing clutch mechanism 170. Energization of the dictator's synchronizing clutch mechanism 170 then operatively connects the dictator's advancing screw 156 to the record supporting shaft 100.

Inasmuch as the recording medium 98, during the shaving operation, is rotated in the direction indicated by arrow 1028 of Figure 12, and inasmuch as this direction is the reverse of that used for the recording process, it will be seen that energization of the clutch mechanism 170 will cause the dictator's advancing screw 156 to be rotated in such direction as to cause the dictator's carriage 154 to travel to the left along the recording medium 98.

It will be further noted that since the head supporting structure 276 is in the operative shaving position, the shaving tool 284 will remove the aforementioned pre-determined amount of wax from the surface of the recording medium 98, as this travel to the left continues.

Referring to the shaving relay SR and circuits 1012 and 1014, it will be seen that energization of the auxiliary shaving relay SRX will complete a circuit 1014 which parallels circuit 1012, so that as the carriage 154 travels to the left along the recording medium 98 sufficiently far to energize the left recording limit relay LRL, the shaving relay SR will remain energized through circuit 1014. This travel to the left will therefore continue until the carriage 154 has reached a point where the contacts 732 and 734 comprising the left shaving limit switch will close and energize the left shaving limit relay LSL through circuit 854. Energization of the left shaving limit relay LSL will then interrupt circuit 1020 so as to de-energize the auxiliary shaving relay SRX.

De-energization of the auxiliary shaving relay SRX will then open circuits 1022, 1024 and 1026 so as to stop the rotation of the recording medium 98 and to allow the armature 678 of the solenoid 676 to be restored to the inoperative position.

De-energization of the auxiliary shaving relay SRX will complete circuit 880 so as to again energize the solenoid 252 and pull the head supporting structure 276 into the inoperative position away from the surface of the recording medium. De-energization of the auxiliary shaving relay SRX will also interrupt circuit 884 so as to de-energize the dictator's synchronizing clutch mechanism 170, thereby disconnecting the dictator's advancing screw 156 from the record supporting shaft 100.

De-energization of the auxiliary shaving relay SRX also completes circuit 906 for a second time so as to again energize the dictator's right travel relay DRT. Energization of the dictator's right travel relay DRT as has been heretofore described, will cause the dictator's carriage 154 to travel to the right at high speed. This travel will continue as long as the dictator's right travel relay DRT is energized. When the carriage 154 has travelled to the right sufficiently far for the head supporting structure 276 to be over a portion of the recording medium 98, the left recording limit relay LRL will be energized. Energization of the left recording limit relay LRL will thus interrupt circuit 906 and de-energize the dictator's right travel relay DRT thereby stopping the travel of the dictator's carriage 154 to the right at high speed.

When the dictator's carriage 154 has travelled to the right sufficiently far to engage the left recording limit switch and energize the left recording limit relay LRL, energization of the left recording limit relay LRL will open circuit 1012. Opening circuit 1012 will thereby de-energize the shaving relay SR. De-energization of the shaving relay SR immediately de-energizes the shaving bus 804 and energizes the operation bus 802.

De-energization of the shaving bus 804, and the energization of the operation bus 802, in addition to restoring control for the dictating and transcribing operators and apprising them of the fact that the shaving operation is completed by the illumination of the previously mentioned dial lights, is effective in causing the head supporting structure 276 to rotate into the inoperative recording position. This operation is caused by the completion of circuits 920 and 922 from the operation bus 802 through contacts of the position registering relay PR. As has been previously shown completion of circuit 920 and the resulting energization of the solenoid 286 is effective in rotating the head supporting structure 276 into the inoperative recording position. It will also be noted by referring to the mechanical specifications, that as soon as the head supporting structure 276 has rotated to the inoperative recording position, the stop shaft 304 will be restored by action of the spring associated therewith into such position that it may stop the rotation of the head supporting structure 276 in the opposite direction at the inoperative reproducing position.

It should also be explained that the push rod 728 which operates to raise the wheels 710 into the operative position was operated at the right shaving limit and that during travel of the carriage to the left during the shaving operation, the wheels 710 operated to restore to the neutral position any displaced rotary stops 546 and 548. In the same way, the push rod 730 was operated at the left shaving limit to lower the wheels 710 into the inoperative position so that they would not interfere with the subsequent recording operation.

It will thus be seen then, that at this time the dictating operator may begin recording dictation on a freshly reconditioned recording medium in a manner which has been previously described.

It will also be noted that the transcriber's carriage 454 and the condition interpreting means associated with the error and length of letter indicating devices have been left at the extreme right limit of their travel. It is obvious that the transcribing operator may restore both the carriage 454 and the condition interpreting means to the fore part of the recording medium by depression of the transcriber's high speed left travel pedal 426 in a manner previously described.

It will also be remembered that we have provided wax removal equipment which operates continuously as long as the normally energized bus 800 is maintained energized. It is thus seen that we have also provided positive wax removal in the vicinity of the carriages and the recording medium during the shaving operation as well as the recording and reproducing operations.

The foregoing description and explanation in conjunction with the previously described drawings illustrate a form of our invention which is adapted to record by mechanically deforming the recording medium and which is adapted to be remotely controlled by a plurality of operators to record and reproduce speech and similar sounds.

In accordance with the objects of our invention, we have also provided a second form of the dictating machine of our invention which may be remotely operated by dictating operators and transcribing operators simultaneously through the use of the control panels 6 and 14, and the foot control stations 10 and 16, in the same manner as that heretofore described.

In order to fully illustrate the complete flexibility and adaptability of our system of remote control for dictating machines, we have therefore shown as an alternate means, a dictating machine which operates on an entirely different principle from that which has just been described. We prefer to illustrate a machine which will record speech or similar sounds by non-mechanically altering the surface or the body of the recording medium. This classification may include machines which record by causing certain chemical changes to take place within the recording medium, and machines which alter the character of the recording medium, such alterations being invisible to the unaided eye.

As representative of this classification, we have chosen a machine which records by forming suitable magnetic impressions on or within a recording medium of magnetic material. As this principle of recording is very old, as shown in the Poulsen Patents No. 661,619 and No. 788,728 we make no claims concerning the use of this principle of recording per se. It is our intention, however, to show how the principles taught by Poulsen in the aforementioned patents may be applied to a dictating machine of this class; and, among other things, that our invention may be embodied in a plurality of forms.

Figure 35:
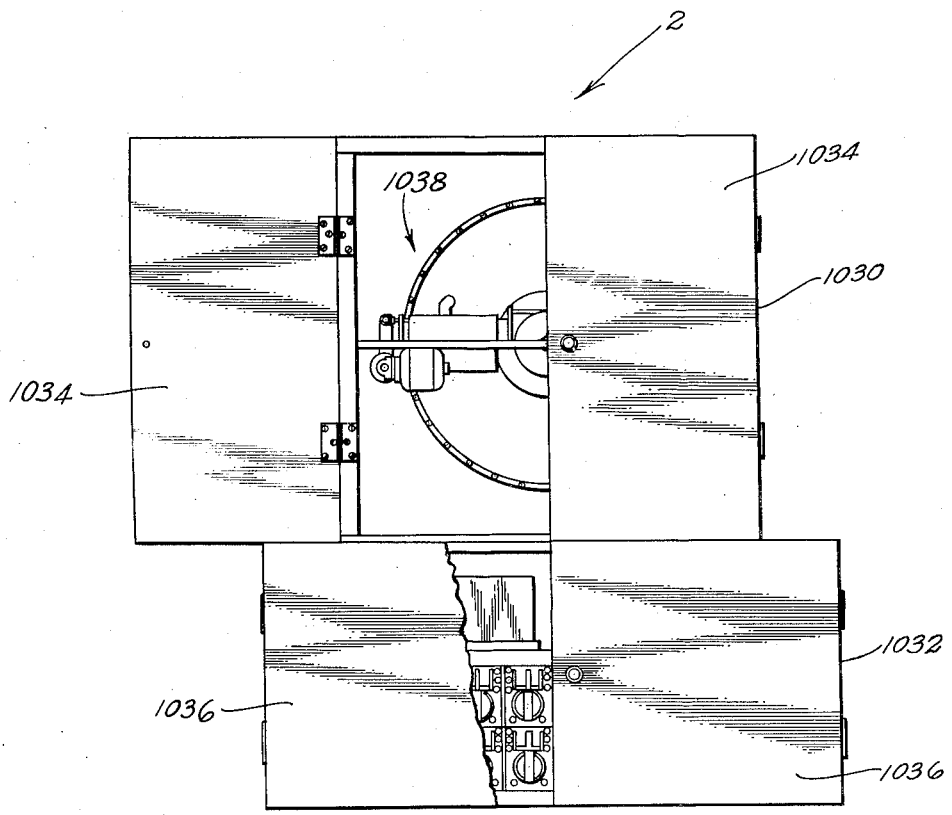
Fig. 35 is an elevation of a second form of the dictating machine of our invention with some of the doors open to show the interior.

As shown in Fig. 35, the form of the dictating machine 2 which is adapted to record on a magnetic medium is preferably enclosed for appearance and to exclude dust. We have accordingly enclosed the dictating machine 2 in a two-piece cabinet composed of an upper portion 1030 and a lower portion 1032 which are provided with swinging access doors 1034 and 1036 respectively. The upper swinging access doors give access to a machine unit 1038 while the lower swinging access doors give access to the relay and amplifier racks enclosed therein. The use of the relays and amplifiers will be explained in detail in connection with the wiring diagram.

The machine unit 1038 (Fig. 36) is accordingly provided with a base 1040, upon which is mounted the necessary equipment for making the machine unit 1038 operative.

For this type of machine unit we prefer to use as the recording medium a thin flat disk composed of magnetic material and embodying the characteristics considered to be the most suitable for this use. This may be in the form of a disk shaped recording medium 1042 which is suitably secured to a record shaft 1044 and which is adapted to be rotated continuously by a record motor 1046 through a suitable gear train.

We have secured the recording medium 1042 to the record shaft 1044 by means of suitable hubbed flanges 1048 and 1050. The hubbed flange 1048 provides a sleeve-like portion 1052 which is adapted to pass through an opening in the center of the recording medium 1042, and which is threaded to receive a nut 1054. The flange 1050 is passed over the sleeve portion 1052 of the flange 1048 and forces the recording medium 1042 into engagement with the flange 1048 by action of the nut 1054 screwed thereagainst. This assembly is secured to the record shaft 1044 as by a set screw 1056.

The recording medium 1042 is also fitted with stretching rings 1058 and 1060 which operate to keep the recording medium taut and to improve the mechanical strength of the structure. The stretching rings 1058 and 1060 are preferably of a material which has a coefficient of thermal expansion which is materially different from that of the recording medium 1042. These rings may then be secured to the recording medium by means of a sufficient number of screws 1062 to fasten the rings securely thereto. The assembly operation is performed at a temperature which is materially different from the temperatures at which the machine is to operate, so that when the temperature has altered to the operating temperature, the stretching rings 1058 and 1060 will expand sufficiently with respect to the recording medium 1042 to stretch the medium taut as described.

In the form shown, we prefer to use a recording medium which is made of extremely thin material, and have provided the system described for improving the mechanical strength thereof. It falls within the scope of this invention, however, to use other means of improving the strength of the recording medium or to provide a recording medium which has sufficient mechanical strength to make the use of a strengthening means unnecessary.

The record shaft 1044 is journalled for rotation by suitable journals 1064, 1066, 1068, 1070 and 1072. The construction of these journals and the location of the record shaft 1044 with respect to the base 1040 may be more clearly seen by referring to Fig. 37.

It will be seen that we have located the shaft 1044 so that its center-line coincides with the center of the base 1040. The base 1040 is provided with suitable openings 1074 through one of which the recording medium 1042 extends. We have shown the journal 1068 as composed of two bearing halves 1076 and 1078. Each of these bearing halves is lined with a suitable bearing material such as bronze or Babbitt metal, and are securely fastened together as by screws 1080 threaded into the base plate 1040.

As previously stated, the record shaft 1044 is adapted to be driven at constant speed by the record motor 1046 through a suitable geared connection. This connection will now be described. The shaft of the motor 1046 is suitably coupled to a countershaft 1082 as by a coupling 1084. The countershaft 1082 is suitably journalled in bearing posts 1086 and 1088 which may be formed on the base 1040 and carries thereon a formed worm 1090. The formed worm 1090 meshes with a worm gear 1092 which is suitably secured to the record shaft 1044, so that rotation of the motor 1040 may rotate the record shaft 1044 and the recording medium 1042.

As previously stated, we prefer to rotate the recording medium 1042 continuously so that it may be used simultaneously by dictating and transcribing operators. Inasmuch as the recording medium 1042 rotates continuously it is not subjected to the high stresses due to the rapid acceleration and deceleration which would necessarily result from the conventional type of control in which the recording medium is stopped in its rotation at every pause of the dictating or transcribing operator.

In order that the dictating operator may record speech or similar sounds on the recording medium 1042, we have provided a dictator's recording-reproducing system which includes recording-reproducing units 1094 and 1096. In order that the path of these units over the surface of the recording medium 1042 may be in the form of a mathematical spiral, we have mounted said units on suitable carriage devices 1098 and 1100 and have provided a drive means for advancing the carriage inwardly over the surface of the recording medium 1042 as the recording process is carried on.

This drive means may include suitable advancing screws for moving the carriages and gear means for driving said advancing screws from the record shaft 1044. This means of connection will now be described.

We have therefore provided on the record shaft 1044 a formed worm 1102 which is adjacent to the journal 1070 and which is adapted to drive a worm gear 1104 securely fastened to a counter shaft 1106 suitably journalled for rotation in bearing posts 1108 and 1110 which may be formed on the base 1040. We have also provided a shaft 1112 which is mounted coaxially with the counter shaft 1106 and which is suitably journalled in bearing posts 1114 and 1116 formed on the base 1040.

We have provided a means for drivably connecting the shaft 1106 to the shaft 1112, said means comprising a dictator's synchronizing clutch 1118. Accordingly the counter shaft 1106 has splined thereon a clutch armature 1120 which is adapted to be operated by a dictator's electric clutch magnet 1122. The clutch magnet 1122 is suitably secured to the shaft 1112 so that when the clutch magnet 1122 is energized, the armature 1120 will engage the clutch magnet 1122 and provide a frictional drive means between the counter shaft 1106 and the shaft 1112.

The synchronizing clutch mechanism 1118 is in every way identical with the synchronizing clutch mechanism which has been described in connection with the form of our machine which we have illustrated for recording on a wax medium, and also includes a synchronizing switch means which is formed by spring contacts 1124 which are mounted on the dictator's synchronizing clutch magnet 1122 and contact segments 1126 mounted on the clutch armature 1120. We shall term this switch means synchronizing switch means 1128. Clutch mechanism 1118 may derive power as from brushes 1130 which are mounted in suitable guides 1132. The guides 1132 are also securely fastened to an extension of the bearing post 1088 which is formed on the base 1040.

At the opposite end of the shaft 1112 we have provided a bevel gear 1134 which is suitably secured thereto as by a set screw and which meshes with another bevel gear 1136. The bevel gear 1136 is secured to a dictator's recording countershaft 1138 so that the shaft 1138 may be driven from the shaft 1112 and be placed at right angles thereto. The shaft 1138 is suitably journalled in bearing posts 1140, 1142, 1144, 1146 and 1148, which are all formed on the base 1040.

We have affixed to the shaft 1138 a bevel gear 1150 which meshes with another bevel gear 1152, securely fastened to a dictator's advancing screw 1154 which is suitably journalled at each end by bearing posts 1156 and 1158 formed on the base 1040. In like manner we have provided a bevel gear 1160 attached to the shaft 1138 and arranged to drive another bevel gear 1162, attached to a second dictator's advancing screw 1164 which is in turn suitably journalled in the bearing post 1156 and a bearing post 1166.

As the shaft 1138 revolves the advancing screws 1154 and 1164 also revolve in the same direction and at the same speed in response to the energy transmitted by the aforementioned gears. Thus it is seen that the dictator's recording carriages 1098 and 1100 may be made to move on either side of the recording medium 1042 at the same speed and in the same space relationship with each other at all times.

Referring to Figures 36, 37 and 38, it will be seen that the dictator's recording carriage is composed of two separate elements or carriage structures 1098 and 1100. These structures are adapted to be moved by the advancing screws 1154 and 1164 down opposite sides of the recording medium 1042, and are further adapted to support the necessary electrical equipment for recording the sound of the dictator's voice upon the recording medium 1042, and also for polarizing the recording medium 1042 so as to effectively erase any recording that may be thereon. Referring to Figures 37 and 38 it will be seen that the independent carriage structures 1098 and 1100 are arranged to slide freely on guide channels 1168 and 1170. Since these structures 1098 and 1100 are identical both in construction and operation, it is deemed sufficient to describe the construction of one only.

The weight of the structure 1098 and the electrical equipment which it carries, is supported as it slides by the plane surface 1172 of the guide channel 1168. The structure 1098 is guided as it moves along the guide channel 1168 by a trapezoidal guide structure 1174. This guide structure 1174 fits closely into the similarly shaped guide portion of the channel 1168 and is threaded to receive the advancing screw 1164. Thus it will be seen that if the advancing screw 1164 rotates, the carriage structure 1098 will be moved to the right or left along the guide channel 1168.

We have mounted on the carriage 1098, the speech recording head 1094 and a polarizing head 1176. In like manner on the carriage structure 1100 we have mounted the speech recording head 1096 and a polarizing head 1178. We will now describe the construction of the speech recording head 1094.

Suitably supported by the carriage structure 1098 is a coil spool 1180 upon which a coil 1182 is wound. Arranged to slide freely through suitable guide means 1184 in the center of the coil 1182 is located an armature 1186. The armature 1186 is forced against the recording medium 1042 with a very slight pressure as by a leaf spring 1188. The end of the armature which contacts the recording medium 1042 is so tapered as to provide a contact face of very small area.

The speech recording unit 1096 is identical to the speech recording unit 1094 described above and is placed on the opposite side of the recording medium 1042 from the unit 1094 so that the armatures of the units contact the recording medium directly opposite each other. The coils of the speech recording units 1094 and 1096 are to be connected to the output of a dictator's speech amplifying system which is similar to that previously described in connection with the form of our invention which is adapted to record on a wax medium.

These units are to be connected to the amplifying system in such a manner that undulating currents corresponding to the undulations of the dictator's voice will pass through the coils of the units and polarize the armatures thereof in such a manner that the pole-faces thereof are oppositely polarized. This will cause an undulating magnetic flux to flow from one armature to the other through the recording medium 1042 and thence through the carriage structure 1100, the guide channel 1170, the base 1040, the guide channel 1168 and the carriage structure 1098 to the other recording unit.

The undulating flux passing through the recording medium 1042 will magnetize it or, in accordance with the molecular theory of magnetism, will change the molecular arrangement thereof so that the variations in magnetism may be later used to reproduce the recorded speech. These units operate in the conventional manner well known in the art to either record speech on a magnetic medium or reproduce speech or similar sounds therefrom.

The erasing units 1176 and 1178 are identical in construction with the recording units except that the faces of the armatures which contact the recording medium 1042 are made wider than those of the recording units 1094 and 1096. This is done to insure that all of the recording medium 1042 which passes between the units 1176 and 1178 will be polarized thereby. The erasing units 1176 and 1178 may be supplied from a suitable source of direct current so that the recording medium 1042 may be magnetized to saturation in order to condition the recording medium 1042 for further dictation. It will be noted that magnetizing the recording medium 1042 to saturation will effectively erase any recording which may be recorded thereon since this recording will be obscured by the highly magnetized state of the recording medium when it is magnetized to saturation.

We have also provided a system for remotely indicating to the transcribing operator the locations of "error" and "length of dictation" indications which is identical in principle with that previously described in connection with the form of the machine for recording on a wax medium. This system includes a condition creating means, a condition retaining means and a condition interpreting means. We shall now describe the construction of the condition retaining means which we have supplied for use on a machine for recording on a magnetic medium.

This condition retaining means comprises recording mediums 1190 and 1192 of magnetic material which are identical to the speech recording medium 1042 previously described. We shall term these disks "error" and "length" disks respectively. The "error" disk 1190 is secured to the record shaft in a manner identical to that used for mounting the recording medium 1042, such mounting means comprising hubbed flanges 1194 and 1196. The "length" disk is identically mounted by means of hubbed flanges 1198 and 1200. The "error" and "length" disks are provided with stretching rings 1202—1204 and 1206—1208 respectively.

We prefer to employ as the condition creating means for this machine, recording units which are identical to the speech recording units previously described and which are adapted to be driven over the surface of the "error" and "length" disks in a manner identical to that used for the speech recording units.

We have accordingly provided error recording units 1210—1212 and error erasing units 1214—1216, and length recording units 1218—1220 and length erasing units 1222—1224. The recording units are identical to the recording units previously described and the erasing units or restoring devices are identical to the erasing units previously described for operation with the recording medium 1042. The error devices are mounted on carriage devices 1226 and 1228 which are identical to the carriage devices previously described and are adapted to be driven over the surface of the condition retaining means by a system of advancing screws and bevel gears from the dictator's recording countershaft 1138 in a manner identical to that used with the carriage devices previously described.

We have also mounted the length units on suitable carriage devices which are adapted to be driven over the surface of the condition retaining means by a system of advancing screws and bevel gears from the recording countershaft 1138 in a manner identical to that previously described in connection with the units operating in conjunction with the recording medium 1042. These carriage devices are guided in their travel along the condition retaining means by guide channels which are identical to the guide channels 1168 and 1170 previously described.

Summarizing, then, it is seen that we have provided the dictating operator with a recording system which includes the recording units 1094 and 1096 and the recording medium 1042. Since these units are driven by separate advancing screws, it is readily seen that since the armatures of the units 1094 and 1096 are placed directly opposite each other on the recording medium 1042 they will remain in that position, since the advancing screws 1154 and 1164 are driven in synchronism.

We also arrange the "error" recording units and the "length" recording units in the same manner. Furthermore, it is also obvious that the three pairs of units are so arranged that at a given instant they are all equidistant from the center of their respective recording mediums. Further, it will be seen that whenever the recording mediums are being rotated by the motor 1046 the error and length carriages as well as the dictator's recording carriage may be moved forward, or from the outer edge of the disk towards the center in response to the rotation of their associated advancing screws by energizing the dictator's synchronizing clutch mechanism 1118. Thus it will be seen that we have provided a means of simultaneously recording on each of the recording mediums 1042, 1190 and 1192 in the form of a true mathematical spiral.

We have already shown the mechanism whereby the dictator's recording units may be caused to move inward along the recording medium so as to record thereon in the form of a true spiral, but it often happens that the dictating operator is desirous of moving the recording-reproducing unit in as short a time as possible to a portion of the recording medium remote from that on which he may be operating. Accordingly we have provided the dictating operator with a system for driving the recording units either inward or outward or to the right or left along the recording medium at high speed.

We therefore provide a dictator's travel motor 1230 which is adapted to drive the recording countershaft 1138 and the advancing screws associated therewith through a suitable geared connection and a dictator's travel clutch mechanism 1232. The motor 1230 may be any suitable electric motor which may be located on the base 1040 between the recording mediums 1042 and 1190 as shown in Figure 36. The shaft of the motor 1230 is therefore coupled by means of a suitable coupling 1234 to a countershaft 1236 which is journalled for rotation in bearing posts 1238 and 1240 formed on the base 1040. We have mounted coaxially with the countershaft 1236 another countershaft 1242 which is journalled in bearing posts 1244 and 1246 formed on the base 1040. The countershaft 1242 may be driven from the countershaft 1236 by means of the clutch mechanism 1232.

The clutch mechanism 1232 includes an armature 1248 slidably splined to the countershaft 1242 and a clutch magnet 1250 which is suitably secured to the countershaft 1236 and is adapted to receive power for its operation through suitable brushes 1252 retained in brush guides 1254 which may be secured to a post 1256 formed on the base 1040. This clutch mechanism is identical to clutches of this type which were described in connection with the form of our invention which is adapted to record on a wax medium.

The other end of the countershaft 1242 carries a bevel gear which meshes with another bevel gear attached to an extension of one of the "error" advancing screws 1258. The advancing screw is additionally journalled for rotation in bearing posts 1260 and 1262 formed on the base 1040.

Should the dictator's travel motor 1230 and the dictator's travel clutch mechanism 1232 be energized, the recording units associated with the dictator's operation will be driven at high speed by their respective advancing screws through the countershafts 1236 and 1242, the advancing screw 1258 and the dictator's countershaft 1138. Since all of these elements are geared together by means of various bevel gears it will be seen that the "error" and the "length" recording units will move either right or left in synchronism with the dictator's speech recording unit. We propose to make the motor 1230 reversible, so that the recording units associated with the dictator's operation may be moved either right or left, as desired, at high speed.

We have also provided a limit switch mechanism 1264 associated with the advancing screw 1258 and which is adapted to be driven either right or left along a guide channel 1266 in response to the rotation of the advancing screw 1258. Since the advancing screw 1258 rotates whenever the dictator's recording units are moving it will be seen that the position of the limit switch structure 1264 is a function of the position of the dictator's speech recording unit, as well as the "error" and "length" units, at any time.

Referring to Figure 39 it will be seen that we have extended a portion of the limit switch structure 1264 so that it extends over an insulating block 1268. Attached to this arm of the structure 1264 by means of suitable pins and an insulating block 1270 is a spring contact 1272 arranged to slide over the top surface of the insulating block 1268. Retained in the insulating block are three contact points 1274, 1276 and 1278. Thus it will be seen that as the limit switch structure 1264 moves from one end of its travel to the other it may establish electrical circuits by alternately connecting the spring contact 1272 to the contact segments 1274, 1276 and 1278. The switch means formed by the contacts 1272 and 1274 we will term the right recording limit, since it is used to stop the travel of the dictator's recording units when they have traversed the entire portion of the recording medium in the recording process.

In a like manner we will term the switch structure formed by the contacts 1272 and 1276 as the left recording limit switch, since it limits the travel of the dictator's recording units to the left, or back towards the beginning of the record, to the point at which the recording is begun. Also we will term the switch structure formed by the spring contact 1272 and the contact 1278 as a left auxiliary limit switch. The use of these limit switches and their method of connection to the various relays and motors will be made apparent when the wiring diagram is described.

In a manner similar to that described in connection with the machine used for recording on a wax medium, we propose to utilize the self-synchronous devices for indicating and controlling operations of this machine. Consequently we have extended the shaft 1138 through the bearing posts 1140 and 1142 and have provided thereon a formed worm (not shown). Cooperating with the formed worm is a worm gear 1280 suitably secured to the shaft of a transmitting self-synchronous device 1282. We have arranged the gearing and the pitch of the advancing screws such that the rotor of the transmitting self-synchronous device 1282 makes a total rotation of less than 180° during the full length of travel of the dictator's carriages. As has been explained in detail in connection with the machine used for recording on a wax medium, the angular position of the transmitting self-synchronous device will at all times indicate the position of the recording units along the useful length of the recording medium.

In order that the receiving self-synchronous device 40 and the transmitting self-synchroncus device 1282 may be used to control and indicate the operation of the machine in a manner similar to that described in connection with the machine for recording on a wax medium, we provide a differential self-synchronous device 1284 suitably mounted as by a post 1286 formed on the base 1040. Also secured to the post 1286 is a differential switch structure which is identical in construction with that described in connection with the machine for recording on a wax medium, comprising contact structures 1288, 1290 and 1292. The manner in which these self-synchronous devices are used to control and indicate the operation of the machine unit 1038 will be described in detail in connection with the wiring diagram.

The position registering device used with this form of dictating machine is identical in principle and operation and similar in construction with that described in connection with the form of the machine for recording on a wax medium. We have provided, as shown in Figure 36 between the recording mediums 1042 and 1192, two guide rods 1294 and 1296, which are suitably supported on the post 1156 and a post 1298 formed on the base 1040 and have arranged an insulating block 1300 to slide along said guide rods. The insulating block 1300 carries a stationary contact point 1302 arranged so as to be contacted by a movable contact 1304 secured to an upright post 1306 formed on an extension 1308 of the dictator's carriage structure 1100.

Reference to Figures 40 and 41 will show that we have also provided on the extension 1308 of the carriage stucture 1100 a solenoid 1310 which is so placed that when energized, a slidably guided armature 1312 thereof will extend upwards so as to engage the rear portion of the insulating block 1300. This solenoid is used so that the insulating block 1300 included in the position registering mechanism may be returned to the beginning of the record at the time the equipment is re-set for further operation. The manner in which the contact points 1302 and 1304 cooperate with the various drives and relays to control the operation of the dictating portion of the machine 2 will be described in detail in connection with the wiring diagram.

It will be noted that all of the equipment which we have described thus far has been located on one side of the machine base 1040. We will consider this side of the base as the top side and it will be further noted that all of the equipment located on the top side of the base is used by the dictator for performing the operations desired. In a like manner we have confined all of the equipment associated with the transcriber's operation to the under side of the base 1040.

Figure 42:
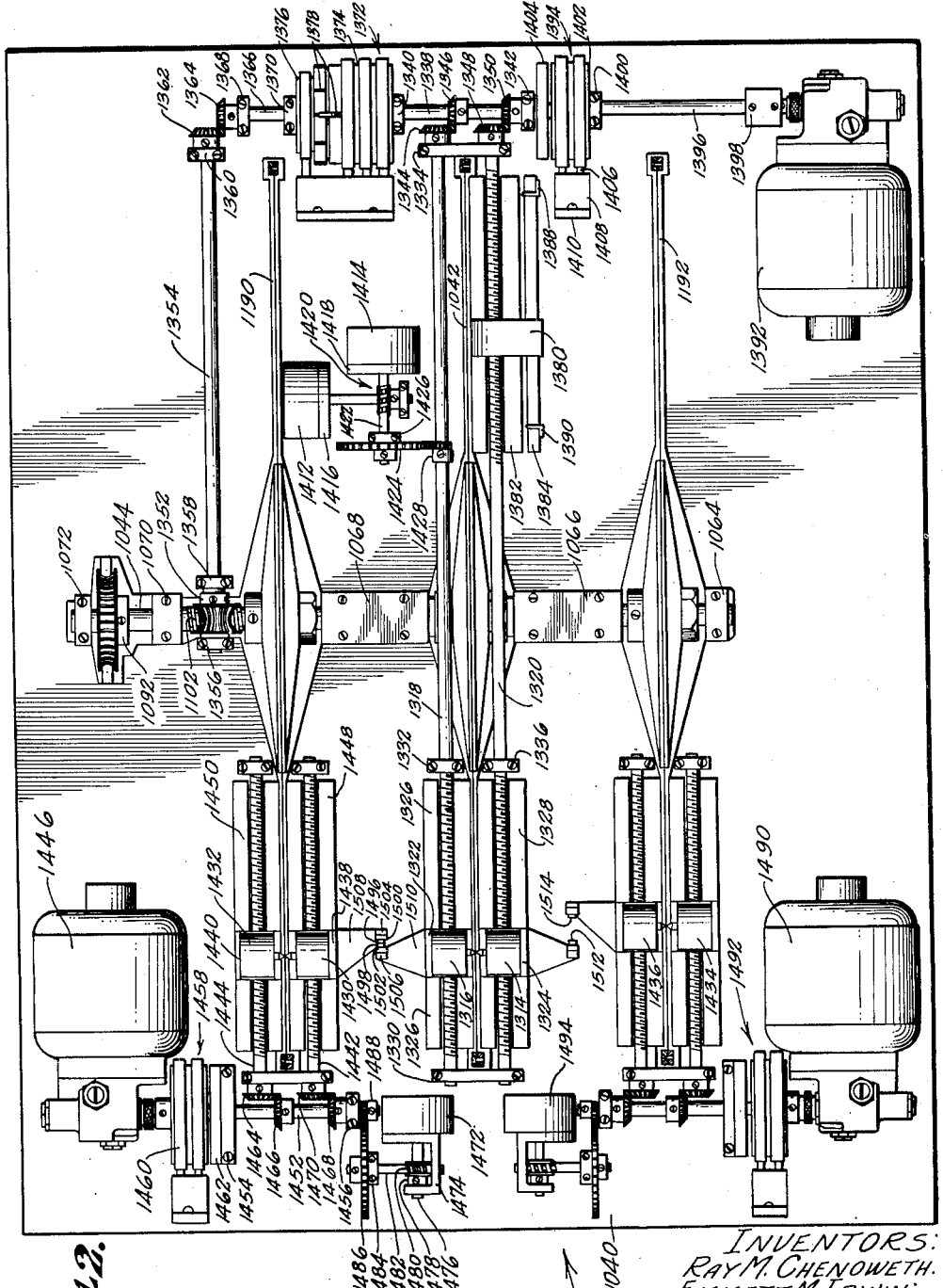
Fig. 42 is a view showing the equipment mounted on the side of the machine unit opposite to that shown in Fig. 36.
Figure 43:
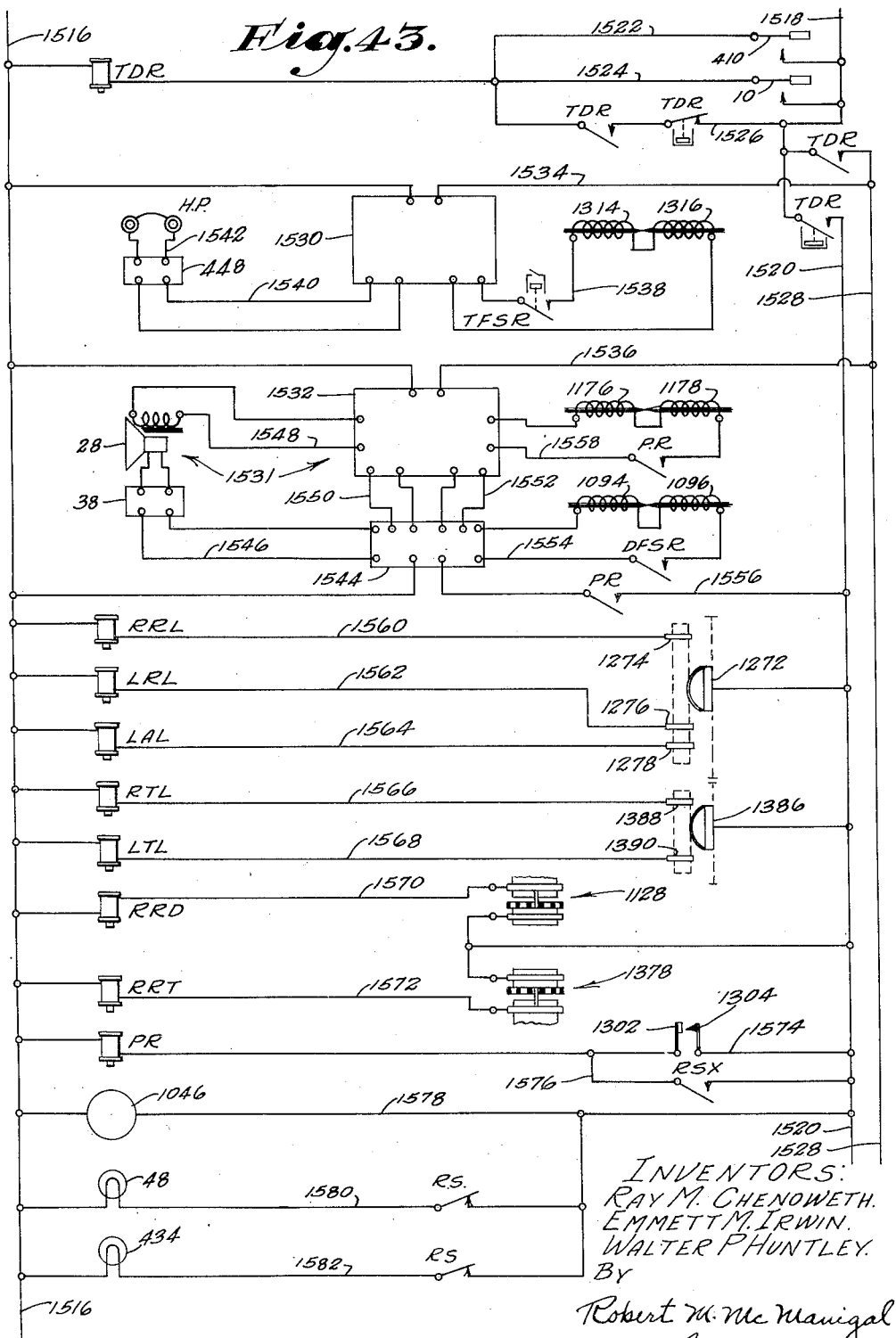
Fig. 43 is a wiring diagram showing the electrical connections for part of the equipment.
Figure 44:
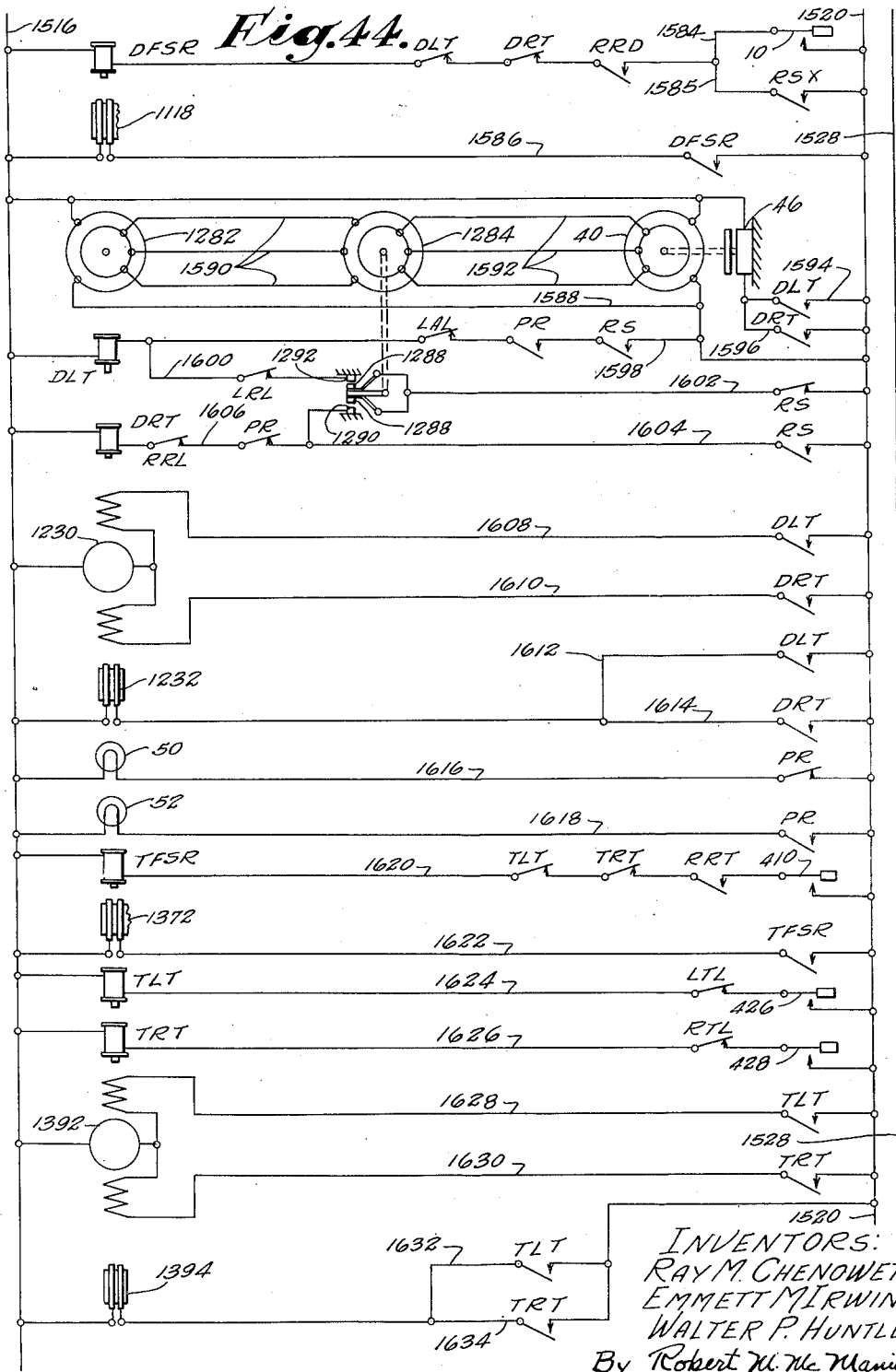
Fig. 44 is a wiring diagram forming a continuation of Fig. 43.
Figure 45:
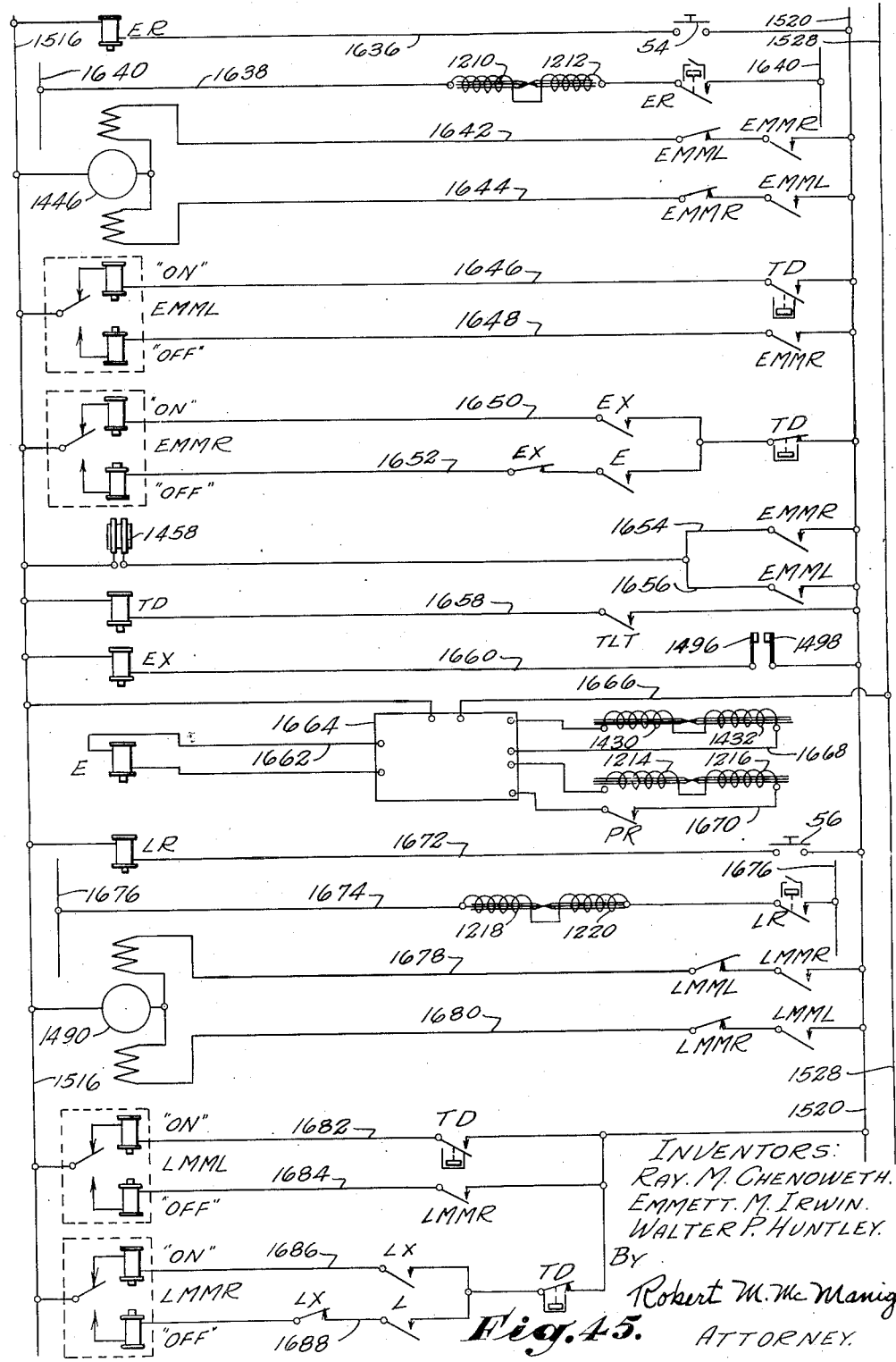
Fig. 45 is a wiring diagram forming a continuation of Fig. 44.
Figure 46:
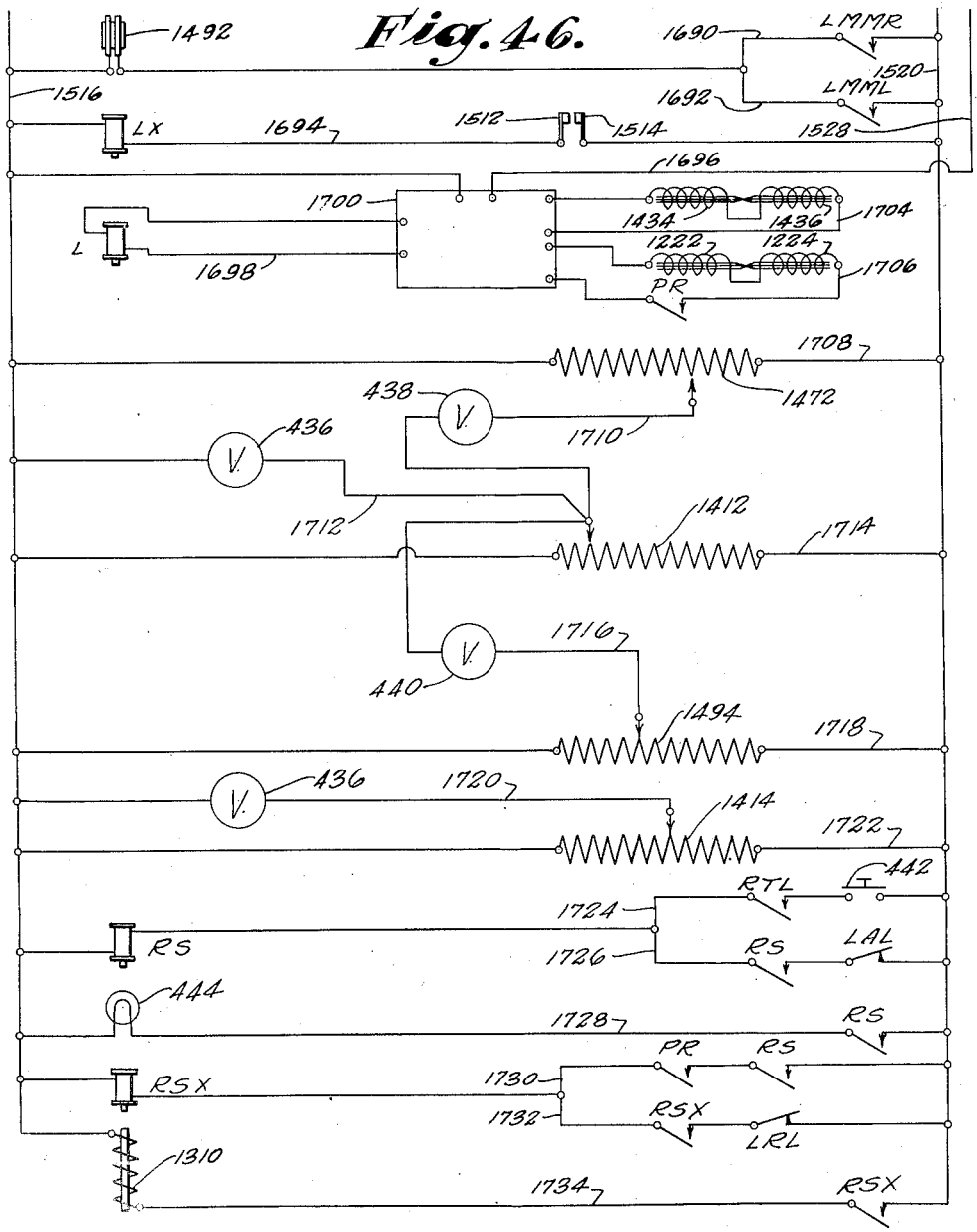
Fig. 46 is a wiring diagram forming a continuation of Fig. 45.

Referring now to Figure 42, we will consider the equipment which is used and operated by the transcribing operator, and which is located on the under side of the base 1040. In order that the transcribing operator may reproduce material which has been recorded on the recording medium by the dictating operator we have provided transcriber's speech reproducing units 1314 and 1316 which are identical to the dictator's speech recording units 1094 and 1096 previously described, and which are adapted to be advanced over the surface of the recording medium 1042 by a drive means which is similar to that previously described in connection with the dictating equipment. This drive means operates directly from the record shaft 1044 and may include advancing screws 1318 and 1320 which operate to move carriages 1322 and 1324, which support the reproducing units 1314 and 1316 along suitable guide channels 1326 and 1328.

The advancing screws 1318 and 1320 may be journalled for rotation in bearing posts 1330, 1332, 1334 and 1330, 1336, 1334 respectively which are formed on the base 1040. The advancing screws 1318 and 1320 are arranged to be driven in synchronism from a countershaft 1338 which is journalled in bearing posts 1340 and 1342 formed on the base 1040. This drive is accomplished by the use of bevel gear systems 1344—1346 and 1348—1350. We have provided a means for rotating the countershaft 1338 and have derived the power for this operation from the record shaft 1044. The manner in which this is accomplished will now be described.

We have provided a worm gear 1352 which meshes with the previously described formed worm 1102 on the record shaft 1044, and have suitably attached it to a countershaft 1354 which is journalled for rotation in suitable bearing posts 1356, 1358 and 1360 formed on the base 1040. We have suitably secured to the opposite end of the countershaft 1354 a bevel gear 1362 which is arranged to mesh with a second bevel gear 1364 attached to a countershaft 1366. The countershaft 1366 is mounted coaxially with the countershaft 1338 previously described and is journalled for rotation in bearing posts 1368 and 1370 formed on the base 1040.

We have provided equipment in the form of a transcriber's synchronising clutch mechanism 1372 for drivably connecting the countershaft 1366 to the countershaft 1338. We have suitably secured a clutch magnet 1374 to the countershaft 1338 and have arranged it to operate a clutch armature 1376 which is slidably splined on the countershaft 1366. The synchronizing clutch 1372 is identical with the dictator's synchronizing clutch 1118 previously described. The synchronizing switch which is formed by the spring finger attached to the clutch magnet 1374 and the contact segments distributed about the periphery of the armature 1376 shall be termed synchronizing switch means 1378.

As was pointed out in connection with the dictator's equipment, the pole pieces of the transcriber's reproducing unit 1314 and 1316 are arranged on opposite sides of the recording medium 1042 and are at all times directly opposed. It will be seen that the advancing screws 1318 and 1320 which are utilized to move the transcriber's carriages 1322 and 1324 along the recording medium are mechanically tied together through the bevel gears to the countershaft 1338. The carriage structures 1322 and 1324 will therefore at all times move at equal speeds in the same direction so that the polefaces of the units 1314 and 1316 are always aligned on opposite sides of the recording medium 1042.

We have also provided a transcriber's limit switch structure 1380 associated with the advancing screw 1320 which is similar to the limit switch structure 1264 previously described. The limit switch structure 1380 is arranged to slide along a guide channel 1382 in response to the rotation of the advancing screw 1320. As was pointed out in connection with the dictator's equipment it is obvious that the position of the limit switch structure 1380 along the guide channel 1382 is a function of the position of the transcriber's reproducing unit along the length of the recording medium 1042.

We have therefore extended the limit switch structure 1380 so that it extends over an insulating block 1384. Mounted on the extension of the limit switch structure 1380 is a spring contact 1386 (not shown) similar in construction and manner of mounting to the spring contact 1272 as shown on the dictator's limit switch structure 1264. The insulating block 1384 carries metallic contact points 1388 and 1390 which cooperate with the spring contact 1386 to establish electrical circuits which are used for the purpose of limiting the movement of the transcriber's carriage in either direction. Consequently we shall term the switch structure formed by the spring contact 1386 and the contact 1388 the "right transcription limit switch" since its function is to stop the transcriber's carriage when said carriage has traveled to the extreme right limit of its travel.

In a like manner we shall term the switch structure formed by the spring contact 1386 and the contact 1390 the "left transcription limit", since this switch structure operates to limit the travel of the transcriber's carriage to the left or back over previously recorded portions of the record.

The manner in which these switch structures operate to perform the functions described above will be set forth in detail in connection with the wiring diagram.

As is the case with the dictating operator, the transcribing operator often wishes to cause the reproducing units to travel at high speed to the right or to the left along the recording medium. We have accordingly provided a transcriber's travel motor 1392 which is adapted to drive the transcriber's advancing screws 1318 and 1320 at high speed. The manner in which the motor 1392 is coupled to the advancing screws through a transcriber's travel clutch mechanism 1394, a countershaft 1396 and the countershaft 1338 will now be described.

We have mounted the countershaft 1396 coaxially with the countershaft 1338 and the shaft of the motor 1392, and have suitably coupled it to the motor shaft by means of a coupling device 1398. The countershaft 1396 is journalled in a bearing post 1400 formed on the base 1040 and has suitably secured to the end thereof a clutch magnet 1402. This clutch magnet is arranged to operate a clutch armature 1404 slidably splined to an extension of the countershaft 1338. The clutch mechanism 1394 is identical to other clutches of this type which have been previously described and is arranged to derive power for its operation from brushes 1406 retained in a brush supporting means 1408 which may be mounted on a post 1410 formed on the base 1040.

Inasmuch as it is often desired to move the reproducing units in either direction, we prefer to make the motor 1392 reversible so that the countershaft 1338 and the advancing screws coupled thereto may be driven in either direction as desired.

The manner in which the motor 1392 and the clutch 1394 are electrically connected in certain controlling circuits will be explained in detail in connection with the wiring diagram.

As has been previously pointed out it is desirable that the transcriber may know at all times what portion of the record relative to its total length she may be transcribing at a given instant. We have accordingly provided a remotely operated indicating system which will indicate to the transcribing operator at all times the exact position of the reproducing unit with respect to the length of the record.

The carriage position indicating equipment which we have provided on this form of our machine is identical in construction and operation with that described in connection with the form of our machine adapted to record on a wax medium.

This equipment cooperates with the advancing screw 1318 and includes two potentiometers 1412 and 1414, suitably secured to posts 1416 and 1418 formed on the base 1040 and adapted to be driven by a suitable reducing gear means from the advancing screw 1318.

We therefore gear potentiometer 1412 to the potentiometer 1414 by means of a worm reduction gear system 1420, and extend a shaft 1422 of the potentiometer 1414 to a suitable bearing post 1426 formed on the base 1040 so that a spur gear 1424 may be secured to the extreme outer end thereof. We have also arranged a pinion 1428 secured to the advancing screw 1318 so that it will mesh with the spur gear 1424.

We propose to arrange the ratio of the gears 1428 and 1424 and the worm gear system 1420 so that the arm of the potentiometer 1412 makes less than a complete revolution during the total travel of the transcriber's carriage from one end of the recording medium to the other. In a manner similar to that used in connection with the machine for recording on a wax medium we allow the arm of the potentiometer 1414 to make several complete revolutions during the aforementioned length of travel. In this way we use the potentiometer 1414 to increase the accuracy of the indication and the facility of reading the position of the carriage over that obtainable with a system using a single potentiometer.

It has been noted in connection with the machine for recording on a wax medium that we have provided a system whereby the indicating meters in the transcriber's panel may indicate to her the distance from her carriage forward to the next "error" and "length" indication as placed by the dictating operator. It will be further remembered in connection therewith, that the operation of indicating remotely an "error" or a "length of letter" marking to the transcribing operator consists of two separate operations. First, during the dictating operation the dictating operator creates and causes to be retained a condition, the position of which is a function of the carriage position with respect to the length of the record at the time the indication was made.

The second, during the period of transcription by the transcribing operator, the position of this retained condition with respect to the transcriber's reproducing unit is indicated remotely to the operator in advance of the time her carriage may reach that point. The "error" and "length" indicating equipment used with this form of the machine functions in the same manner and operates the same indicating devices on the transcriber's control panel.

It will be noted in connection with this machine that in order for the dictating operator to indicate an "error" or "length of letter" marking, all that is necessary for him to do is to press the appropriate button on his control panel. As has been previously pointed out and as will be explained in more detail in connection with the wiring diagram, this is effective in causing the dictator's "length" or "error" recorders to create a condition which may be in the form of a suitable distinguishable frequency record on the recording medium 1190 or 1192, the location of which is a function of the location of the dictator's carriage at the time the appropriate control button was pressed.

In the form shown, and as will be explained in more detail in connection with the wiring diagram, the condition in the recording medium 1190 or 1192 which the dictating operator creates by pressing the appropriate control button, comprising a recording of an audible frequency. This frequency may be the usual commercial frequency which is used to operate the machine. It is also possible to record conditions which correspond to "error" and "length" indications by recording suitable distinguishable frequencies on the speech recording medium 1042 and later separating them from each other and the speech recording by the use of suitable electric filters well known in the communications art.

In order that the location of this recording with respect to the position of the transcriber's reproducing unit may be given to the transcribing operator in advance of the time she reaches that part during the transcription process, we have provided "error" reproducing units 1430 and 1432 and "length" reproducing units 1434 and 1436 which are powered to move along the record in advance of the transcriber's carriage. We have arranged the control means and the equipment such that when these reproducing units reach a point where an "error" or "length" recording has been made by the dictating operator, they will stop in their advance. Hence it is only necessary, as has been shown in connection with the machine for recording on a wax medium, to indicate the relative position of the "error" and "length" reproducing units with respect to the position of the transcriber's reproducing unit at the time said "error" and "length" units are at rest. Inasmuch as the equipment for indicating to the transcribing operator the location of "error" markings and "length" markings is identical, we deem it necessary to describe in detail only one of these devices.

We will at this time, therefore, consider the construction and operation of the equipment used to indicate to the transcribing operator the position of "errors" as recorded on the "error" disk 1190. We have accordingly supported the "error" reproducing units 1430 and 1432 for translatory movement along the "error" disk 1190 by carriage devices 1438 and 1440. These reproducing units are identical to the reproducing units which have been previously described herein.

The carriage devices 1438 and 1440 may be caused to travel in either direction along the "error" disk 1190 by "error" advancing screws 1442 and 1444 driven by a suitable reversible motor 1446, and may be guided in said movement along the "error" disk by guide channels 1448 and 1450.

We have therefore mounted a countershaft 1452 coaxially with the shaft of the motor 1446 and journalled it for rotation in suitable bearing posts 1454 and 1456. The countershaft 1452 may be drivably connected to the shaft of the motor 1446 by means of a suitable "error" clutch mechanism 1458 which includes a clutch magnet 1460 suitably secured to the shaft of the motor 1446 and a clutch armature 1462 which is slidably splined to one end of the countershaft 1452. The armature 1462 may be drawn to the magnet 1460 whenever said magnet is energized and thus provide a frictional drive means for the countershaft 1452. Whenever said magnet is de-energized, the armature 1462 will be forced by a compression spring forming part of the clutch mechanism into engagement with the bearing post 1454 and thus provide a braking action on the countershaft 1452 so that the advancing screws 1442 and 1444 which are driven thereby will be immediately stopped in their rotation. The "error" clutch mechanism 1458 is identical to the clutches of this type which were previously described in connection with the form of our invention which is adapted to record on a wax medium.

The advancing screws 1442 and 1444 are drivably connected to the countershaft 1452 by means of bevel gear systems comprising bevel gears 1464, 1466 and 1468, 1470 respectively.

In order that the transcribing operator may know at all times the distance separating the reproducing units 1314—1316 from the point at which the "error" was noted, we provide a potentiometer measuring device which is the mechanical equivalent of, and operates the indicating device 438 in a manner identical to that previously described in connection with the machine for recording on a wax medium.

This potentiometer measuring device may include a potentiometer 1472 which is associated with the countershaft 1452. Potentiometer 1472 is suitably secured to a post 1474 which is formed on the base 1040. A shaft 1476 of the potentiometer 1472 is journalled in the bearing post 1474 and has fitted thereon a worm gear 1478 which is adapted to be driven by a worm 1480 formed on the countershaft 1482 also journalled in the post 1474. We have also extended the countershaft 1482 through a suitable bearing post 1484 formed on the base 1040 so as to include a spur gear 1486 suitably attached thereto. The spur gear 1486 meshes with a pinion 1488 which is secured as by a set screw to an extension of the countershaft 1452.

We prefer to arrange the gear ratios of the gear trains 1486 and 1488 and the worm gear system 1478 and 1480 such that the arm of the potentiometer 1472 makes less than one complete revolution during the total travel of the "error" reproducing units 1430 and 1432 along the length of the "error" disk 1190.

The equipment used for operating the "length" indicating devices is in every way identical with that previously described and includes a length marker motor 1490, a length clutch 1492 and a potentiometer 1494.

In reviewing the sequence of operation of these devices it will be remembered that at the start the marking reproducers should be caused to move along the length of the record until such time as they encounter an indication of an "error" or "length" of letter. When they do encounter an indication as set by the dictator, the travel in that direction should be stopped instantly. We prefer to use the reproduction of the frequency that was recorded by the dictator as reproduced by the "error" and "length" reproducers to stop the travel of the proper carriage.

We use the reproduction of this frequency to operate the controlling means for the clutch mechanisms 1458 and 1492 and the motors 1446 and 1490. However, at the time the transcriber's carriage has reached the point at which the dictating operator wished to note an "error" or "length" of dictation, the "error" and "length" reproducing units should again move forward until they encounter another point as marked by the dictating operator. In order to accomplish this result we have therefore provided contact points 1496 and 1498 (considering the "error" indications only), mounted by insulating blocks 1500 and 1502 to uprights 1504 and 1506 suitably attached to extensions 1508 and 1510 of the transcriber's carriage 1322 and the "error" reproducing carriage 1438 respectively. The contacts 1496 and 1498 are so arranged that they will make contact at the instant the transscriber's reproducing equipment reaches a point corresponding to that at which the error was noted by the dictator for the transcriber's attention. In a like manner we have provided the length reproducing unit with contacts 1512 and 1514 similar in construction and operation to those just described. These contacts 1496, 1498 and 1512, 1514 operate in a unique manner to bring about the desired results and their operation will be more fully described later in connection with the wiring diagram.

It will be readily understood by one skilled in the art to which this invention appertains, that the recording mediums 1190 and 1192 may, as previously stated, be dispensed with so as to combine the condition retaining means with the recording medium 1042. It also follows that the condition creating means may also be combined with the speech recording unit 1094—1096 by eliminating the recording units 1210—1212 and 1218—1220.

In order to record the location of errors or other pertinent portions of the record, it would only be necessary to superimpose suitable distinguishable frequencies upon the speech recording through the use of the speech recording unit 1094—1096. It would also be necessary to assign one frequency to "error" indications and another to "length" indications. These frequencies may be separated from the speech recording during the reproducing process by the use of suitable electrical filter systems.

"Error" and "length" reproducing units similar to the units 1430—1432 and 1434—1436 previously described may be provided with a similar drive and interlocking control means. The indicating frequencies could be extracted from the speech frequencies by a suitable electric filter means, and the frequency corresponding to "error" indications could then be separated by means of a suitable electric filter from the frequency corresponding to "length" indications. These separated controlling frequencies could then be applied to the control means in a manner identical to that used in the previously described equipment.

Our invention therefore comprehends the use of a condition creating means, a condition retaining means, and a condition interpreting means for indicating to the transcribing operator the location of pertinent portions of the recording, whether such means are combined with the speech recording medium and the speech translation means, or whether separate means are employed.

The wiring diagram illustrates the complete wiring for the equipment described heretofore in connection with a machine for recording on a magnetic medium, and in addition, the amplifiers and certain relays which are mounted in the lower portion of the machine 2 behind the access doors 1036. The relays and amplifiers are electrically interlocked to secure the proper operation of the dictating machine 2. It is not essential that the equipment and relays be wired exactly as shown hereafter; it being understood that other circuits and arrangements of circuits may also accomplish the desired results in a satisfactory manner.

As has been hereinbefore stated, we prefer to use electrical relays which interlock with each other electrically instead of using mechanical linkages and movements which are dependent upon each other for proper operation.

Referring generally to the diagram it will be noted that we have arranged the drawing in the same manner as the wiring diagram which has been previously described. As in Figures 31 to 34 inclusive, we have, in Figures 43 to 46 inclusive, numbered the circuits consecutively. We have further shown the mechanical equipment in the same position as on previous drawings. All relays are shown de-energized.

In designating the various relays we have also lettered them corresponding to their function and the contacts belonging to a particular relay are lettered the same as the relay for clarity but are not necessarily shown in the wiring diagram adjacent to the relay coil. It will aid in tracing the circuits involved in this wiring diagram if one will recall the sequence of operation of the machine as previously outlined in connection with the machine for recording on a wax medium.

The operation of this machine as viewed from the transcriber's and dictator's control points, is the same as for the machine designed for recording on a wax medium. In order to connect the equipment for operation a main bus 1516 and a bus 1518 are connected to opposite polarities of a suitable source of electric power. The bus 1518 is connected to energize an operation bus 1520 through a contact of a time delay relay TDR. This time delay relay TDR is of the same type as has been previously described in connection with the machine for recording on a wax medium. The coil of relay TDR may be energized through circuits 1522 or 1524 by depressing the transcriber's foot switch 410 or the dictator's foot switch 10. Closing either of these foot switches will energize the coil of the TDR relay and consequently complete the circuit 1526 through instantaneously closing and time delay opening contacts of the relay TDR. Completion of circuit 1526 will then keep the coil of the relay TDR energized from the bus 1518 until sufficient time has elapsed for the time delay contacts to open. At this time the circuit 1526 is interrupted, de-energizing the coil of the relay TDR. The contacts of this TDR relay however remain closed for a definite time after the de-energization of the coil thereof. This time we have set as being approximately 10 minutes but it is obvious that other times may be used with equal satisfaction.

We have also provided an auxiliary bus 1528 which is connected to the main bus 1518 by an instantaneous contact of the time delay relay TDR. Reference to the auxiliary bus 1528 and the operation bus 1520 will show that immediately upon energization of the time delay relay TDR the auxiliary bus 1528 will become energized from the main bus 1518, while the operation bus 1520 will become energized after a definite time has passed. We propose to make this time sufficiently long for the amplifiers which are used in operating this system to become operative. We have accordingly supplied the power for operating amplifiers 1530 and 1532 by circuits 1534 and 1536 extending from the auxiliary bus 1528 to the amplifiers 1530 and 1532 respectively. We have also connected the transcriber's reproducing units 1314 and 1316 to the input of the speech amplifier 1530 by means of circuit 1538 including time delay contacts of a transcriber's foot switch relay TFSR. The use of these contacts in circuit 1538 will be explained later.

In a like manner we have connected the output of the amplifier 1530 by means of circuit 1540 to the transcriber's volume control means 448 and have connected the transcriber's volume control means 448 to the transcriber's sound reproducing unit, which we have shown as head phones by means of a circuit 1542.

Thus it will be seen that whenever circuit 1538 is completed speech currents generated in the coils 1314 and 1316 of the transcriber's reproducing equipment will be impressed upon the input of the amplifier. These currents will then be amplified and run through the transcriber's volume control system 448 to the transcriber's sound reproducing unit by means of circuits 1540 and 1542, and will thus operate to reproduce as sound material which has been recorded on the recording medium 1042. This transcriber's sound system is similar to that described in connection with the form of our machine for recording on a wax medium and differs only in the type of translation means employed and the manner of connecting it to the amplifier 1530.

We have also provided a dictator's sound system 1531 which is similar to the sound system 826 previously described in connection with a machine for recording on a wax medium, and differs only in the number and type of translation means employed and the manner of their connection to the amplifier 1532.

We have accordingly connected the voice coil of the sound responsive-sound producing device or dynamic loud speaker 28 in the conventional manner through the volume control means 38 and connected to a switching mechanism 1544 by wires in cable 12 which form a circuit 1546. Power for energizing the field of the dynamic speaker 28 may be derived from amplifier 1532 by means of circuit 1548. The switching mechanism 1544 is also connected by circuits 1550 and 1552 to the input and output terminals respectively of the amplifier 1532 and by circuit 1554 to the dictator's recording-reproducing unit 1094—1096.

The switching mechanism 1544 is similar to the one which we have described in connection with the machine for recording on a wax medium. We prefer to arrange the connections such that when the relay comprising the switching mechanism 1544 is energized, the sound system 1531 will be connected for recording by connecting the recording-reproducing device 1094—1096 to the output of the amplifier 1532 and the dynamic speaker 28 to the input thereof; and when de-energized the sound system will be connected for reproducing by connecting the recording-reproducing device 1094—1096 to the input of the amplifier 1532 and the dynamic speaker 28 to the output thereof.

In order to properly establish these connections we have connected the coil of the switching relay 1544 in a circuit 1556 which extends from the operation bus 1520 and includes a normally open contact of a position registering relay PR. The position registering relay as used in this machine performs the same function as did the position registering relay PR previously described in connection with the machine for recording on a wax medium. That is to say, the position registering relay PR operates when energized to condition the dictating portion of the machine 2 for recording and when de-energized operates to condition said portion of the machine 2 for reproducing. The manner in which the position registering relay PR is connected to be controlled by the position registering mechanism will be described hereinafter.

In order that the recording medium will be conditioned for recording at the time the recording-reproducing unit 1094—1096 is conditioned for recording, we have, as has been described previously, provided erasing units 1176—1178 which are so located that the recording medium passes between their pole-pieces prior to passing between the pole-pieces of the recording-reproducing units. We have therefore connected said erasing units in circuit 1558 which is attached to a source of direct current which may be derived from the amplifier 1532 and which includes normally open contacts of the position registering relay PR. Since the sound system 1531 is conditioned for recording only at the time the position registering relay PR is energized, the erasing units will only be energized by the completion of circuit 1558 when the sound system 1531 is conditioned for recording.

As stated hereinbefore, we prefer to relay all mechanically operated contacts. We have therefore shown the circuits for accomplishing this in the wiring diagram directly below those just described. We have accordingly included contacts 1272 and 1274 of the right recording limit switch in a circuit 1560 which extends from the operation bus 1520 and includes the coil of a light recording limit relay RRL.

We have also provided a left recording limit relay LRL and included it in a circuit 1562 which extends from the operation bus 1520 and includes contacts 1272 and 1276 of the left recording limit switch.

In the same way we have included contacts 1272 and 1278 of the left auxiliary limit switch in a circuit 1564 which extends from the operation bus 1520 to the coil of a left auxiliary limit relay LAL.

We have also relayed the contacts 1386 and 1388 of the transcriber's right limit switch by including them in a circuit 1566 which extends from the operation bus 1520 and includes the coil of a right transcription limit relay RTL.

Contacts 1386 and 1390 of the left transcription limit switch are included in a circuit 1568 which extends from the operation bus 1520 to the coil of a left transcription limit relay LTL.

We have also relayed the contacts of the rotation synchronizing switch means by including them in circuits 1570 and 1572 which extend from the operation bus 1520 to coils of a dictator's rotation synchronizing relay RRD and a transcriber's rotation synchronizing relay RRT respectively, and which respectively include therein contacts of the switch means 1128 and 1378.

It will be noted in connection with the circuits just described that closure of any one of the mechanically operated contacts will complete the circuit in which it is included and thus energize the relay with which it is associated from the operation bus 1520.

We also prefer to relay the contacts 1302 and 1304 of the position registering mechanism by including them in a circuit 1574 which extends from the operation bus 1520 to the coil of the position registering relay PR.

It has been previously stated that the position registering relay PR performs the same function on this machine for recording on a magnetic medium as it did on the machine for recording on a wax medium. That is to say, the position registering contacts are so arranged that they will be closed only when the recording-reproducing unit 1094—1096 has been moved to the right sufficiently far that it will operate upon an unrecorded portion of the recording medium 1042.

It will be remembered in connection with the dictator's sound system and the switching mechanism 1544 which is controlled by contacts of the position registering relay PR in circuit 1556, that said sound system will be conditioned for recording when said PR relay is energized and will be conditioned for reproducing when said PR relay is de-energized. We may therefore use the position registering relay PR as a master controlling relay in such a manner that energization of said relay is effective in conditioning the dictating equipment for recording, and conversely, de-energization of said relay is effective in conditioning said equipment for reproducing. Other contacts of the position registering relay PR are included in circuits to be described hereinafter and function in these circuits to control the machine 2 in accordance with the preceding statements. These connections and their mode of operation will be explained in detail hereinafter.

Circuit 1576 also extends from the operation bus 1520 to the coil of the position registering relay PR and includes normally open contacts of an auxiliary resetting relay RSX. This relay may be considered as being de-energized during the normal dictating and transcribing operation of the machine 2, it being energized only under special circumstances which will be explained in detail hereinafter. We may therefore at this time consider the circuit 1576 as being open so that the position registering relay PR will be controlled entirely by contacts 1302 and 1304 of the position registering mechanism.

We have included the record motor 1046 in a circuit 1578 which extends from the operation bus 1520 so that whenever sufficient time has elapsed after the initial closing of either of the foot switches 10 or 410 for the operation bus 1520 to be energized through the time delay contacts of the relay TDR, the record motor 1046 will be caused to rotate so as to drive the recording mediums at the proper speed for recording and reproducing.

We have also included the dictator's dial light 48 and the transcriber's indicating light 434 in circuits 1580 and 1582 respectively, which extend from the operation bus 1520 and include normally closed contacts of a resetting relay RS. This relay is the master controlling relay for a resetting operation and the operation of said relay will be made clear when said operation is explained in detail hereinafter. The relay RS may be considered as being de-energized at all times except during the resetting operation.

Whenever the operation bus 1520 is energized in the manner previously described, the respective operators will be apprised of the fact that the machine is energized for operation by the illumination of their respective indicating lights.

We have provided a dictator's foot switch relay DFSR and included it in a circuit 1584 which extends from the operation bus 1520 and includes contacts of the dictator's foot switch 10, normally open contacts of the dictator's rotation synchronizing relay RRD, and normally closed contacts of a dictator's right travel relay DRT and a dictator's left travel relay DLT. As will be explained hereinafter, the relays DRT and DLT are used to control the high speed travel of the recording-reproducing unit 1094–1096 along the recording medium 1042, and may be considered as being de-energized unless said unit is travelling at high speed along said recording medium.

Circuit 1584 is similar in manner of connection and operation to circuit 878 previously described in connection with the relay DFSR for use on the machine for recording on a wax medium.

Whenever the dictating operator depresses the foot switch 10 to record dictation or to reproduce material recorded on the recording medium 1042, circuit 1584 may be completed to energize the dictator's foot switch relay DFSR whenever the recording medium 1042 has rotated to such position that the pole-pieces of the recording-reproducing unit 1094-1096 will lie on the sound track on said recording medium.

It will have been noted in connection with the mechanical specification for this form of our machine, that the record drive and the drive means for moving the recording-reproducing unit 1094–1096 along the record, as well as the synchronizing clutch and the switch means 1128 are similar to the corresponding equipment described in connection with the machine for recording on a wax medium. It has been shown with reference thereto how the synchronizing switch means is closed whenever the operating member of the translation means is in a position to lie on the sound track on the record. It is therefore obvious that the same is true in this case and that the dictator's rotation synchronizing relay RRD will be energized whenever the pole-pieces of the recording-reproducing unit 1094-1096 are in a position to lie on the sound track.

Whenever the recording medium has rotated to the position as previously described, the dictator's foot switch relay DFSR may be energized by closing the dictator's foot switch 10 so as to complete circuit 1584. We prefer to use the energization of this relay to cause the recording-reproducing unit 1094–1096 to move along the recording medium 1042 at the proper speed and in the proper direction for recording or reproducing and to place the dictator's sound system in an operative condition.

We have therefore included the dictator's synchronizing clutch mechanism 1118 in a circuit 1586 which extends from the operation bus 1520 and includes a normally open contact of the dictator's foot switch relay DFSR. Energization of the dictator's foot switch relay DFSR will therefore complete circuit 1586 so as to energize the clutch mechanism 1118 and operatively connect the advancing screws 1154 and 1164 to the record shaft 1044 so as to advance the recording-reproducing unit 1094–1096 along the recording medium 1042.

We have also included contacts of the dictator's foot switch relay DFSR in circuit 1554 which connects the recording-reproducing unit 1094–1096 to the amplifier 1532 of the sound system 1531 so that energization of said relay will operatively connect said recording-reproducing unit in said sound system.

Depression of the foot switch 10 is therefore effective, whenever the recording medium 1042 has rotated to a synchronized position such that the pole-pieces of the recording-reproducing unit 1094–1096 lie on a sound track on the recording medium 1042, in energizing the dictator's foot switch relay DFSR and subsequently causing the recording-reproducing unit 1094–1096 to move along the recording medium 1042 and to be operatively connected electrically to the remainder of the sound system 1531. Conversely, de-energization of the dictator's foot switch relay DFSR by the releasing of the foot switch 10 will stop the recording-reproducing unit 1094–1096 in its travel along the recording medium 1042 and disconnect said unit from the sound system 1531.

Referring now to circuits 1588, 1590 and 1592, it will be seen that we have inter-connected the transmitting self-synchronous device 1282, the differential self-synchronous device 1284, and the receiving self-synchronous device 40 in a conventional manner. These connections are identical to those used in connection with the machine for recording on a wax medium. We have also connected the brake 46 on the receiving self-synchronous device 40 in circuits 1594 and 1596 which include contacts of the dictator's left travel relay DLT and the dictator's right travel relay DRT respectively. It is not deemed necessary to describe the principle of operation of the self-synchronous devices inasmuch as they operate in a manner identical with that previously described in connection with the machine for recording on a wax medium.

We have connected contact 1288 of the differential switch means in a circuit 1602 which extends from the operation bus 1520 and includes a normally closed contact of the resetting relay RS. As previously stated, the relay RS may be considered as de-energized at all times except during the resetting operation. Contact 1292 of the differential switch means is connected in a circuit 1600 which extends from said contact to the coil of the dictator's left travel relay DLT and includes normally closed contacts of the left recording limit relay LRL. We have also connected the dictator's right travel relay DRT in a circuit 1606 which extends from contact 1290 of the differential switch means and includes normally closed contacts of the position registering relay PR and the right recording limit relay RRL.

The differential switch means is operated by the differential self-synchronous device 1284 in a manner identical to that previously described in connection with the machine for recording on a wax medium, so that whenever the receiving self-synchronous device 40 is rotated by hand, the differential switch means will be operated so as to close the proper contacts. If the receiving self-synchronous device 40 is manually rotated to the left, the differential self-synchronous device 1284 will also be rotated to the left so as to close contacts 1288 and 1292 of the differential switch means and complete circuit 1600 and energize the dictator's left travel relay DLT. Conversely, manual rotation of the receiving self-synchronous device 40 to the right will rotate the differential self-synchronous device 1284 and the differential switch means so as to close contacts 1288 and 1290 and complete circuit 1606 to energize the dictator's right travel relay DRT.

In order that energization of either the dictator's left travel relay DLT or the dictator's right travel relay DRT may cause the recording-reproducing unit 1094–1096 to move at high speed along the recording medium 1042, we have included the dictator's travel motor 1230 in a forward circuit 1610 which extends from the operation bus 1520 and includes a normally open contact of the dictator's right travel relay DRT, and a reverse circuit 1608 which extends from the operation bus 1520 and includes a normally open contact of the dictator's left travel relay DLT.

Energization of either the dictator's left travel relay DLT or the dictator's right travel relay DRT will energize the dictator's travel motor to rotate in the proper direction to drive the recording-reproducing unit 1094–1096 along the recording medium 1042 in a direction which corresponds to the direction of the manual rotation of the receiving self-synchronous device 40 which was effective in energizing the appropriate relay.

We have also connected the dictator's travel clutch mechanism 1232 in circuits 1612 and 1614 which extend from the operation bus 1520 and include respectively therein normally open contacts of the dictator's left travel and the dictator's right travel relays DLT and DRT. Energization of either of the travel relays DLT or DRT will therefore energize the motor 1230 to rotate in the proper direction and will also energize the clutch mechanism 1232 so as to operatively connect the travel motor 1230 to the advancing screws 1154 and 1164 and drive the recording-reproducing unit 1094–1096 along the recording medium at high speed.

To illustrate further the circuits and relays and their mode of operation, we will trace the sequence of operation of the machine. Let us assume that the dictating operator has been dictating and at this time wishes to go back or to the left along the record and play back a portion of the record which has been previously recorded. To do this he turns the knob 42 and pointer 43 on the receiving self-synchronous device 40 to a point indicated to him on the translucent dial 44 as the point at which he wishes the recording reproduced. As has been pointed out heretofore, this is effective in rotating the differential self-synchronous device 1284 so as to close the electrical circuit between contacts 1288 and 1292 of the differential switch. This will then complete circuits 1602 and 1600 from the operation bus 1520 through normally closed contacts of the resetting relay RS and normally closed contacts of the left recording limit relay LRL to the dictator's left travel relay DLT.

Energization of the dictator's left travel relay DLT then completes circuit 1612 from the operation bus 1520 to the dictator's travel clutch mechanism 1232. At the same time energization of the dictator's left travel relay DLT completes circuit 1608 to energize the dictator's travel motor 1230 to rotate in such direction as to drive the dictator's carriage to the left or toward the beginning of the record.

It will be noted in connection with circuits 1608 and 1610 that the dictator's travel motor 1230 is shown as a split series field motor with one field in each of a pair of circuits controlled by the contacts of the dictator's left travel relay DLT and the dictator's right travel relay DRT, so that upon energization of one of the aforementioned relays the motor will revolve in one direction and upon energization of the other the motor will revolve in the opposite direction. Thus it will be seen that by turning the control knob 42 and pointer 43, the operator has caused the dictator's carriage to move to the left toward the forepart of the record.

The receiving self-synchronous device 40 is held in position, when released by the dictating operator, by completion of circuit 1594 which includes the contact of the dictator's left travel relay DLT so as to energize the brake 46 on the receiving self-synchronous device 40.

It will be seen that as the carriage travels back along the record, the transmitting self-synchronous device 1282 will rotate in response to this movement. Hence, when the carriage has travelled to the point corresponding to that indicated on the dial 44 by the pointer 43, the torque generated by the differential self-synchronous device 1284 will have reduced to substantially zero. The contacts 1288 and 1292 of the differential switch, will therefore open at this time and open circuits 1602 and 1600 so as to de-energize the dictator's left travel relay DLT.

De-energization of the dictator's left travel relay DLT then stops the travel to the left or toward the fore part of the record by opening circuit 1612 and de-energizing the dictator's travel clutch mechanism 1232. At the same time de-energization of the dictator's left travel relay DLT opens circuit 1608 to de-energize the dictator's travel motor 1230 and opens circuit 1594 to de-energize the brake 46 on the receiving self-synchronous device 40.

If the dictating operator then wishes to play back the material that has been previously recorded at this point, he depresses the foot switch 10. This completes circuit 1584 so as to energize the dictator's foot switch relay DFSR whenever the recording medium has revolved sufficiently to close contacts 1128 of the dictator's synchronizing switch means. Energization of the dictator's foot switch relay DFSR then completes circuit 1586 and energizes the dictator's synchronizing clutch mechanism 1118. This then, as has been shown in connection with the mechanical specification, operatively connects the dictator's advancing screws to the record shaft 1044 so that the advancing screws are driven in the proper direction to advance the carriages for reproducing.

At the same time, circuit 1554 is completed by the closing of the dictator's foot switch relay DFSR so that the dictator's recording-reproducing unit 1094—1096 is connected to the switching device 1544.

Referring now to circuit 1574, it will be seen that since the carriage has moved back from its initial position along the record the contacts 1302 and 1304 of the position registering device will be opened and therefore the position registering relay PR will be de-energized. De-energization of the position registering relay PR opens circuit 1556 and thus de-energizes the coil of the switching device 1544. This conditions the dictator's sound system 1531 for reproducing.

Therefore, it is seen that as the record rotates, the potentials induced in the coils of the dictator's recording-reproducing unit 1094—1096, varying in response to the varying magnetic field passing between their pole pieces, is transmitted by circuit 1554 to the dictator's amplifier 1532 where it is amplified and transmitted over circuit 1546 to the dictator's sound producing unit 28.

It will also be noted that we have included contacts of the position registering relay PR in circuit 1558, which supplies direct current to the dictator's erasing unit 1176—1178 adapted to erase the previous dictation. Thus it will be seen that whenever the position registering relay PR is de-energized the aforementioned erasing unit is also de-energized so that it is impossible for the dictator to inadvertently erase any of his recorded dictation.

At this point it is seen that the dictating operator may cause the carriage devices to move in either direction along the recording medium 1042 by rotating the receiving self-synchronous device 40 in the direction desired so as to energize the corresponding relay DRT or DLT. It will also be noted that if the recording-reproducing device 1094—1096 is to the left of the point at which the last of the dictated material was recorded, the equipment will be maintained conditioned for reproducing.

After having played back part of the recorded dictation, let us assume that the dictator wishes to return to the point on the record at which he last dictated material for record, and continue with his dictation. To do this he turns the knob 42 and pointer 43 of the receiving self-synchronous device to the right to a point in advance of that at which the carriage was located at the time he stopped dictation. As has been explained heretofore, this operates to rotate the differential self-synchronous device 1284 so as to close contacts 1288 and 1290. This then completes circuits 1602 and 1606 from the operation bus 1520 to the dictator's right travel relay DRT. The position registering relay contacts PR in circuit 1606 are closed at this time due to the fact that the carriage is to the left or back toward the fore part of the record from the point of farthest advance.

Completion of circuits 1602 and 1606 then energizes the dictator's right travel relay DRT. Energization of the relay DRT then completes circuit 1596 extending from the operation bus 1520 to the brake 46 on the receiving self-synchronous device 40. Energization of the brake 46 on the receiving self-synchronous device 40 then operates to hold the receiving self-synchronous device in the position in which it has been placed by the dictating operator. Energization of the dictator's right travel relay DRT then completes circuit 1614 and energizes the dictator's travel clutch mechanism 1232. Simultaneously the circuit 1610 is completed by the closing of the dictator's right travel relay DRT so as to energize the dictator's travel motor 1230 to rotate in a proper direction for advancing the carriage along the record.

It will be noted in referring to circuit 1584 that we have included therein normally closed contacts of the dictator's left travel relay DLT and the dictator's right travel relay DRT. Thus upon energization of either of the travel relays it will be seen that the dictator's foot switch relay DFSR must necessarily be de-energized. De-energization of the dictator's foot switch relay then opens circuit 1586 supplying the dictator's clutch mechanism 1118, so as to disconnect the lead screws from the record shaft 1044. In like manner the circuit 1554 which connects the dictator's recording and reproducing unit 1094—1096 to the amplifier 1532 is also interrupted so that inadvertent recording or the reproduction of noises resulting from the operation of the machine may not be reproduced as sound in the dictator's presence.

The high speed travel to the right will then continue until the carriage has reached the point at which the last of the dictated material is recorded. Upon reaching this point, contacts 1302 and 1304 of the position registering mechanism included in the circuit 1574 will be closed, thereby energizing the position registering relay PR. Energization of the position registering relay PR then interrupts circuit 1606 by virtue of the normally closed position registering relay contacts contained therein. Opening of the circuit 1606 likewise de-energizes dictator's right travel relay DRT. De-energization of the dictator's right travel relay DRT opens circuit 1614, de-energizing the dictator's travel clutch mechanism 1232 and also opens circuit 1610 which supplies the dictator's travel motor 1230.

Thus it will be seen that upon reaching the point at which the last of the dictated material is recorded, the high speed travel to the right will be immediately stopped. At the same time circuit 1596 which supplies the brake 46 on the receiving self-synchronous device 40 is opened by the dictator's right travel relay contact DRT contained therein. De-energization of the brake 46 on the receiving self-synchronous device 40 then allows the aforementioned device to return to a position which indicates accurately the position of the carriage with respect to the length of the record.

It will also be noted at this time that contacts 1288 and 1290 of the differential switch will be opened due to the spring action of the contacts 1288 and the fact that the torque of the differential self-synchronous device 1284 has been reduced to substantially zero by the rotation of the receiving self-synchronous device 40.

When the carriage reaches the point at which the last of the dictated material is recorded and the position registering relay PR is subsequently energized, circuit 1556 supplying the switching device 1544 is completed by the closing of position registering relay PR. This reconnects the various elements of the dictator's sound system so that these elements are connected for recording. Energization of the position registering relay PR also completes circuit 1558 so as to energize the erasing unit 1176—1178. This unit is then effective in erasing any previously recorded material which may lie ahead of the point at which the last of the present dictated material was recorded.

We should also consider at this time one other condition. Let us assume that after having travelled to the left or back toward the fore part of the record, the dictating operator causes the recorded dictation to be reproduced until the carriage has travelled to the right to the point where the last of the dictated material was recorded. Energization of the position registering relay PR by the closing of the contacts 1302 and 1304 will then complete circuit 1556 which supplies the switching device 1544 and instantly reconnects the dictator's recording-reproducing equipment so that it is conditioned for recording rather than reproducing.

At the same time circuit 1558 is completed energizing the speech erasing structure 1176—1178 so that recorded material which lies ahead of the recording-reproducing unit 1094—1096 will be erased as the dictation continues so as to leave a blank recording medium to pass under the poles of the recording unit. The dictating operator will be apprised of the fact that the equipment is in the recording instead of the reproducing condition by the cessation of the reproduction and the change in the indicating lights 50 and 52.

The indicating light 50 which indicates the fact that the machine is in the playback or reproducing condition is energized from the operation bus 1520 by a circuit 1616 which includes a normally closed contact of the position registering relay PR. It will be noted that since the switching device 1544 is controlled by the position registering relay PR, that whenever the position registering relay PR is energized, the equipment must necessarily be placed in the reproducing or playback condition. Thus the de-energization of the relay PR completes circuit 1616 so as to light the indicating light 50 and apprise the operator of the fact that the machine is in the reproducing condition.

Conversely the indicating light 52 which indicates the fact that the machine is in recording or dictate condition, is supplied from the operation bus 1520 by a circuit 1618 which includes a normally open contact of the position registering relay PR. Whenever, therefore, the machine is conditioned for recording due to the energization of the position registering relay PR and the subsequent energization of the switching device 1544, the indicating light 52 will also be energized, thus indicating to the dictating operator that the machine is conditioned for dictating or recording.

In summary, it will be seen that the equipment that we have provided for use by the dictating operator, operates in a manner similar to that previously described in connection with the machine for recording on a wax medium. It will also be noted that the same controlling devices are used and that they operate in a manner identical to their mode of operation when used with the machine for recording on a wax medium. The machine which we have described for recording on a wax medium is similar to the machine now being described, notwithstanding the fact that the medium which is used to retain the recorded dictation and the manner used to suitably record speech and similar sounds thereon is radically different in the principles involved.

Let us now consider the manner in which this alternate form of the machine 2 may be controlled by a transcribing operator through her use of the foot control panel 16 and the indicating panel 14. A requisite in any transcribing system, is that the transcribing operator may reproduce as sound the material which has previously been recorded on the recording medium. As has been previously shown, we have provided the transcriber's sound system, which operates to reproduce as sound in the presence of the transcribing operator any material which has been recorded on the recording medium 1042. It is also essential that a means be provided which will allow the transcribing operator to start and stop at will the reproduction of the recorded material so that she may suitably transcribe same as by typing.

We have therefore included the transcriber's foot control device 410 in a circuit 1620 so that it may be used to properly energize a transcriber's foot switch relay TFSR. Circuit 1620 therefore extends from the operation bus 1520 to the coil of the transcriber's foot switch relay TFSR and includes in addition to the contacts of the transcriber's foot control device 410, normally open contacts of the transcriber's rotation synchronizing relay RRT and normally closed contacts of a transcriber's right travel relay TRT and a transcriber's left travel relay TLT. This circuit operates in a manner similar to that previously described in connection with the dictator's foot switch relay DFSR which is included in circuit 1584. The transcriber's foot switch relay TFSR may be energized by the closing of the transcriber's foot control device 410 whenever the recording medium 1042 has rotated to a synchronized position such that the pole-pieces of the transcriber's reproducing unit 1314—1316 are properly located with respect to the sound track on the recording medium 1042.

In order that energization of the transcriber's foot switch relay TFSR may cause the reproducing unit 1314—1316 to move forwardly or to the right along the record at the proper speed for reproducing, we have connected the transcriber's synchronizing clutch mechanism 1372 in a circuit 1622 which extends from the operation bus 1520 and includes a normally open contact of the transcriber's foot switch relay TFSR. Energization of the transcriber's foot switch relay TFSR will complete circuit 1622 and energize the clutch mechanism 1372 so as to operatively connect the advancing screws 1318 and 1320 to the record shaft 1044 and drive the reproducing unit 1314—1316 along the recording medium 1042 in response to the rotation thereof.

We have also included normally open contacts of the transcriber's foot switch relay TFSR in circuit 1538 so that energization of said relay will operatively connect the reproducing unit 1314—1316 to the amplifier 1530.

Depression of the foot control device 410 is therefore effective in connecting the reproducing device 1314—1316 operatively to the amplifier 1530 and causing said reproducing device to move along the recording medium 1042 at the proper speed for reproducing. Release of the foot control device 410 will perform the reverse operation and disconnect the reproducing device 1314—1316 from the amplifier 1530 and stop the travel of said reproducing device along the record.

We have also connected the foot control devices 426 and 428 in suitable circuits to control the transcriber's left travel and right travel relays TLT and TRT respectively so that the transcribing operator may cause the reproducing device 1314—1316 to move at high speed in either direction along the recording medium 1042. We have therefore included the foot control device 426 in a circuit 1624 which extends from the operation bus 1520 to the coil of the transcriber's left travel relay TLT and includes a normally closed contact of the left transcription limit relay LTL. Circuit 1626 extends from the operation bus 1520 and includes contacts of the foot control device 428 and normally closed contacts of the right transcription limit relay RTL.

Depression of either the transcriber's left travel pedal 426 or the transcriber's right travel pedal 428 will energize the corresponding relay providing the transcriber's carriage has not already been caused to travel to the limit of its travel in said direction so as to open the circuit 1624 or 1626 by energizing the corresponding limit relay.

In order that energization of the travel relays TRT or TLT may cause the reproducing device 1314—1316 to move in the proper direction along the recording medium 1042, we have included contacts of these relays in circuits which control the transcriber's travel motor 1392. We have therefore included a normally open contact of the transcriber's left travel relay TLT in a circuit 1628 which extends from the operation bus 1520 to one field of the transcriber's travel motor 1392. We have also included a normally open contact of the transcriber's right travel relay TRT in a circuit 1630 which extends from the operation bus 1520 to the other field of the motor 1392. We have shown the motor 1392 as being of the split-series field type in which energization of one field will cause the motor to rotate in one direction while energization of the other field will cause the motor to rotate in the opposite direction. It is obvious, however, that any type of reversible drive means may be used satisfactorily.

Energization of the transcriber's left travel relay TLT will therefore cause the motor 1392 to rotate in a reverse direction so as to cause the reproducing unit 1314—1316 to move to the left or back toward the fore part of the recording medium 1042, and energization of the transcriber's right travel relay will cause the motor 1392 to rotate in a forward direction so as to cause said reproducing device to move to the right or forwardly along the record.

In order that rotation of the motor 1392 may be transmitted to the advancing screws 1318 and 1320, we have included the transcriber's travel clutch mechanism 1394 in circuits 1632 and 1634 which extend from the operation bus 1520 and include respectively therein normallly open contacts of the transcriber's left travel relay TLT and the transcriber's right travel relay TRT. Whenever either travel relay TRT or TLT is energized to cause the motor 1392 to rotate, the clutch 1394 will also be energized to transmit this rotation to the advancing screws 1318 and 1320 and cause the reproducing unit 1314—1316 to move along the recording medium 1042 at high speed.

It will also be noted that the transcriber's foot switch relay TFSR will be de-energized regardless of the foot control device 410 whenever either of the travel relays TRT or TLT is energized. This is by virtue of the contacts of the travel relays which are included in circuit 1620. It will be noted that this operates to release the clutch mechanism 1372 and to disconnect the reproducing unit 1314—1316 whenever said unit is being moved over the surface of the recording medium at high speed. This operates to prevent any loud or disturbing noises which may result from the high speed operation of the machine being reproduced as sound in the presence of the transcribing operator.

Let us now consider the operation of the equipment which is used to remotely indicate to the transcribing operator the location of certain points of interest which the dictating operator may wish to call to the transcribing operator's attention. These points of interest may include the location of "errors" and the "length" of dictated material. It will be remembered that we have arbitrarily divided this equipment into three parts, namely, the dictator's condition creating means or the "error" and "length" recording units 1210—1212 and 1218—1220, the condition retaining means or the "error" and "length" disks 1190 and 1192, and the condition interpreting means or the "error" and "length" reproducing units 1430—1432 and 1434—1436 and the indicating and controlling equipment associated therewith.

Inasmuch as the condition retaining means is not electrical in its operation it is not shown on the wiring diagram. We have however shown the complete wiring for the condition creating means and the condition interpreting means. At this time, therefore, we will consider the manner of connection and operation of the dictator's condition creating means. We will also confine our explanation to the equipment associated with the "error" indications inasmuch as the equipment for indicating the "length" indications is identical in construction and operation.

Referring now to circuit 1636, it will be seen that we have included therein the error push button 54. Circuit 1636 extends from the operation bus 1520 to the coil of an "error" relay ER so that depression of the push button 54 will complete said circuit and energize the "error" relay ER.

We have included the error recording unit 1210—1212 in a circuit 1638 which includes normally open contacts of the error relay ER and extends from a source 1640 of a distinguishable frequency. This source of a distinguishable frequency, as heretofore explained, may be obtained from the main busses of this equipment so as to furnish the standard commercial frequency.

It will be later shown that we have connected the length recording unit 1218—1220 to a suitable source of distinguishable frequency. If it is desired to record the location of "length" and "error" indications on the recording medium 1042 along with the speech recording, it is desirable that the error and length recording units be connected to separate sources which supply frequencies which are distinguishable from each other.

We prefer to make the error relay ER of the instantaneously closing but time delay opening type. This time delay period must be slightly longer than the time required for the recording medium to make one complete revolution. Thus it will be seen that depression of the push button 54 will consequently connect the error recording unit 1210—1212 for a length of time sufficient that the frequency will be recorded on the recording medium 1190 for at least one complete revolution. Thus it will be seen that no matter what the angular position of the recording medium 1190 may be at the time that the transcriber's "error" reproducing unit 1430—1432 may go by the indicated point the pole pieces will always encounter a portion of the recording medium which has been recorded thereupon. If on the other hand it were possible to record, a very short portion or a part of a revolution, it is entirely conceivable that these reproducing units may pass at such a time that the recording placed thereon would not be under the pole pieces. Thus it would be impossible to secure the proper indications for the transcriber. For this reason we prefer to make the error relay ER of the time delay opening type.

Thus, the dictating operator may at will, as was the case in the machine for recording on a wax medium, create a condition whose position with respect to the length of the condition retaining means is a function of the position of the dictator's recording - reproducing unit 1094—1096 with respect to the length of the recording medium.

It will be remembered as was pointed out in connection with the machine for recording on a wax medium, that the condition interpreting means includes means whereby certain carriage devices are caused to move along the condition retaining means until such time as they are adjacent a point at which a condition created by the dictating operator has been retained, at which time they will stop in their travel. We then indicate to the transcribing operator the relative position of these carriage devices with respect to the position of the transcriber's reproducing unit 1314—1316 and thus provide a means of indicating the location of a point that the dictating operator wished to call to the transcribing operator's attention.

We have therefore included the error marker motor 1446 of the drive means for the carriage devices in a system of reversing circuits 1642 and 1644 which are controlled by various impulse relays so that said motor may be energized to drive the error reproducing unit 1430—1432 in the proper direction along the condition retaining means. These impulse relays are of a common type as explained in connection with the machine for recording on a wax medium and may include two operating coils which are adapted to operate a toggle so as to maintain the contacts in the last operated position. An auxiliary finger is provided which de-energizes the coils whenever the toggle has been tripped. The impulse relays shown in this wiring diagram are shown with the contacts in the position which they occupy after energization of the "off" coil.

The impulse relays which control the operation of the error marker motor 1446 may include an error marker motor left travel relay EMML and an error marker motor right travel relay EMMR. The manner in which these relays are connected in various circuits and the manner in which they operate to control the equipment will now be described.

Controlling circuits for the motor 1446 include a forward circuit 1642 which extends from the operation bus 1520 to one field of the motor 1446 and includes a normally open contact of the error marker motor right travel relay EMMR and a normally closed contact of the error marker motor left travel relay EMML. The reverse circuit 1644 extends from the operation bus 1520 and includes a normally open contact of the error marker motor left travel relay EMML and a normally closed contact of the error marker motor right travel relay EMMR.

The marker motor left travel relay EMML is controlled by an "on" circuit 1646 which extends from the operation bus 1520 to the "on" coil of the error marker motor left travel relay EMML and includes a normally open contact of a time delay relay TD, the function of which will be explained in detail later, and an "off" circuit 1648 which extends from the operation bus 1520 to the "off" coil of said relay and includes a normally open contact of the error marker motor right travel relay EMMR.

In the same way, the error marker motor right travel relay EMMR is controlled by an "on" circuit 1650 which extends from the operation bus 1520 to the "on" coil of said relay and includes a normally closed contact of the time delay relay TD and a normally open contact of an error auxiliary relay EX, and an "off" circuit 1652 which extends from the operation bus 1520 to the "off" coil of said relay and includes a normally closed contact of the time delay relay TD, a normally closed contact of the error auxiliary relay EX and a normally open contact of an error controlling relay E. The function and manner of connection of the relays E and EX will be described hereinafter.

We have also included the error clutch mechanism 1458 in circuits 1654 and 1656 which extend from the operation bus 1520 and include respectively therein normally open contacts of the error marker motor right and left travel relays EMMR and EMML. Thus, whenever either relay EMMR or EMML is tripped to the "on" position so as to cause the error marker motor 1446 to rotate, the clutch mechanism 1458 will be energized so as to transmit the power of the motor 1446 to the error advancing screws.

The circuits which control the operation of the time delay relay TD, the error auxiliary relay EX, and the error controlling relay E will now be described. We have included the coil of the time delay relay TD in a circuit 1658 which extends from the operation bus 1520 and includes a normally open contact of the transcriber's left travel relay TLT. The manner in which this relay is used to control the operation under certain special conditions will be explained later.

We have included the coil of the error auxiliary relay EX in a circuit 1660 which extends from the operation bus 1520 and includes contacts 1496 and 1498 which have been previously described in connection with the construction of the condition interpreting means.

The error controlling relay E is connected by means of a circuit 1662 to the output of an error amplifier 1664 which receives the power for its energization through a circuit 1666 extending from the auxiliary bus 1528. It will be remembered that the auxiliary bus 1528 is energized prior to the energization of the operation bus 1520 so that the error amplifier 1664 will be operative at the time the operation bus 1520 is energized for the first time. We have also connected the error reproducing unit 1430—1432 to the input of this amplifier by means of a circuit 1668.

The error amplifier may also include a suitable electric filter means well known in the communications art so that if a single recording medium is used to record more than one type of recording, any frequencies which do not correspond to the recorded indications for "error" will be excluded from the amplifier proper. The filter means may be used to separate the "error" indications from the speech frequencies and the "length" indications if all of these frequencies are recorded on the same recording medium. This will insure that the error controlling relay E will be energized only by the reproduction of "error" recordings and thus tend to eliminate possible incorrect indications.

Whenever the "error" reproducing unit 1430—1432 encounters a recording on the error disk 1190, alternating currents corresponding to said recording will be induced in the windings of the reproducing unit and transmitted to the input of the amplifier. The amplified currents will then be applied to the error controlling relay E by circuit 1662. Thus, whenever the error reproducing unit 1430—1432 encounters an error recording as made by the dictating operator, the error controlling relay E will be energized.

It will aid in understanding the operation of the above described devices if we trace the sequence of operation and remember the sequence of operation as described in connection with the same equipment in the machine for recording on a wax medium.

Let us therefore assume that the transcriber's reproducing unit 1314—1316 is at the outside or the beginning of the recording medium 1042 and that the error reproducing carriages are at the same point so that contacts 1496 and 1498 are closed. Let us further assume that the dictating operator has dictated a considerable portion of the recording medium 1042 and has created certain conditions corresponding to the location of "errors" by making suitable recordings on the "error" disk 1190 in a manner which has been previously explained.

Referring to circuit 1660 it will be seen that closure of contacts 1496 and 1498 is effective in energizing the error auxiliary relay EX from the operation bus 1520. Energization of the relay EX will then complete circuit 1650 so as to trip the error marker motor right travel relay EMMR to the "on" position and close the normally open contacts associated therewith.

Referring to circuit 1642 we see that tripping the relay EMMR to the "on" position will complete circuits 1642 and 1654 so as to cause the motor 1446 to rotate in such direction as to cause the error reproducing unit 1430—1432 to travel to the right along the error disk 1190 and to energize the error clutch mechanism 1458 so as to transmit the power of the motor 1446 to the error advancing screws. It will also be noted that should the error marker motor left travel relay EMML be tripped to the "on" position, tripping the error marker motor right travel relay EMMR to the "on" position will complete circuit 1648 so as to trip the left travel relay EMML to the "off" position.

We have thus caused the error reproducing unit 1430—1432 to travel at high speed along the error disk 1190. This travel will continue until such time as the error reproducing unit 1430—1432 encounters an error recording as created by the dictating operator. At this time the error controlling relay E will be energized by the amplified reproduction of the recording as has been previously explained.

Energization of the relay E will thereupon complete circuit 1652 to the "off" coil of the error marker motor right travel relay EMMR and trip said relay to the "off" position. This will then interrupt circuit 1654 so as to release the clutch mechanism 1458 and apply a braking action to the advancing screws, and thus immediately stop the travel of the reproducing unit 1430—1432 along the condition retaining means 1190. Tripping the relay EMMR to the "off" position also opens circuit 1642 so as to de-energize the error marker motor 1446.

The error reproducing unit 1430—1432 has thus been caused to travel along the condition retaining means 1190 and come to rest at the point where the dictating operator has created a condition corresponding to the location of an "error" on the recording medium 1042. We prefer to indicate the location of the "error" by indicating remotely to the transcribing operator the location of the reproducing unit 1430—1432 at this time. The manner in which this is accomplished will be explained hereinafter.

As soon as the transcriber's speech reproducing unit 1314—1316 has travelled to the right during the process of transcribing the material recorded on the recording medium 1042 to the point indicated as the location of an "error," contacts 1496—1498 will close and energize the error auxiliary relay EX in the manner previously described.

Energization of the relay EX will open circuit 1652 so that the relay EMMR cannot be tripped to the "off" position as long as contacts 1496 and 1498 are closed. Energization of the relay EX also causes the error reproducing unit 1430—1432 to travel at high speed along the condition retaining means in the manner previously described. This travel will continue until said reproducing unit encounters another recording on the condition retaining means 1190. At that time the reproducing unit 1430—1432 will again be stopped in the manner previously described.

It sometimes happens that the transcribing operator is obliged to return the speech reproducing unit 1314—1316 to the fore portion of the record in order to transcribe material recorded thereon. If this becomes necessary, it is also essential that the transcribing operator be provided with the proper indications as regards "error" etc. We have therefore provided a means which operates to return the error reproducing unit 1430—1432 to the fore part of the record whenever the transcriber's speech reproducing unit 1314—1316 is caused to move a considerable distance toward the fore part of the recording medium 1042.

We have therefore provided the time delay relay TD as previously described. We prefer to make this relay of such type that the contacts thereof are delayed in their operation a definite time after energization of the coil thereof, but such that the contacts will perform the reverse operation immediately upon de-energization of the coil thereof.

As was pointed out in connection with the machine for recording on a wax medium, the transcriber's high speed left travel pedal 426 is used to energize the transcriber's left travel relay TLT momentarily for the ordinary backspacing operation. For this operation it is not necessary to return the error reproducing unit 1430—1432 to the fore portion of the error disk 1190. We have therefore made the time delay relay TD of the type described.

Referring to circuit 1646 it will be seen that energization of the time delay relay TD will complete circuit 1646 so as to trip the error marker motor left travel relay EMML to the "on" position. This will then complete circuits 1644 and 1656 so as to cause the error reproducing unit 1430—1432 to travel to the left or back toward the fore part of the condition retaining means 1190. As explained in connection with the machine for recording on a wax medium we prefer to make the speed of the drive for the error reproducing unit 1430—1432 higher than the speed of the drive of the transcriber's speech reproducing unit 1314—1316 and have accordingly made the error clutch mechanism of such type that it may slip whenever the contacts 1496 and 1498 close during the left travel.

This travel to the left will continue until the operator releases the foot control device 426 and deenergizes the left travel relay TLT. If the contacts 1496 and 1498 are closed at this time, the error reproducing unit 1430—1432 will start travelling to the right in a manner previously described.

It will also be noted that we have connected the error erasing unit 1214—1216 to a suitable source of direct current which may be derived from the error amplifier 1664 by means of a circuit 1670 which includes a normally open contact of the position registering relay PR. It will be remembered that the error erasing unit 1214—1216 is moved over the error disk 1190 with the error recording unit 1210—1212 so that it may operate to erase any error recordings which may have been previously recorded thereon. It will be noted that the inclusion of the contacts of the position registering relay PR in circuit 1670 automatically disconnects the erasing unit whenever it is over a previously recorded portion of the record. This erasing unit thus operates to erase any error recordings which have been made prior to the cycle of operation which has just been considered.

We have also shown on the wiring diagram the complete wiring for the equipment used in connection with the operation of indicating the position of the "length" indications. Such equipment is included in circuits 1672 to 1706 inclusive, and will not be described at this time inasmuch as it is identical in construction and operation with that just described.

We have previously stated that we prefer to indicate remotely to the transcribing operator the location of the points of interest to which the dictating operator wishes to call the transcribing operator's attention by indicating on the indicating devices 438 and 440 the relative location of the error and length reproducing units with respect to the location of the transcriber's speech reproducing unit when the first mentioned units are at rest. We have therefore included the indicating devices 436, 438 and 440 and the potentiometers 1412, 1414, 1472 and 1494 in circuits 1708 to 1722 inclusive. The manner of connection of these devices and the manner in which they operate to transmit the proper indications to the transcribing operator is identical with those previously described in connection with the machine for recording on a wax medium.

It is obvious that after the dictating operator has dictated the full length of the recording medium 1042, the dictator's equipment must be returned to the beginning of the recording medium before a new series of dictation may be started. Consequently, we have provided a means such that after the transcribing operator has transcribed all of the material which has been dictated on the recording medium 1042, she may perform the above operation, and in addition, return the position registering device to the beginning of the record, so that a new series of dictation may be recorded. The way in which this resetting operation is accomplished will now be described.

The equipment which operates during the resetting operation includes in addition to that previously described, the resetting relay RS which is the master controlling relay for the resetting operation, an auxiliary resetting relay RSX, the transcriber's indicating light 444, and the position registering solenoid 1310.

We have included the transcriber's resetting push button 442 in a circuit 1724 which extends from the operation bus 1520 to the resetting relay RS, and includes a normally open contact of the right transcription limit relay RTL. Thus it will be seen that whenever the transcriber's carriage is at the extreme right limit of its allowable travel, depression of the button 442 will energize the resetting relay RS from the operation bus 1520 by the completion of circuit 1724. We place the responsibility of resetting the machine for further dictation on the transcribing operator, but provide contacts of the right transcription limit relay RTL in circuit 1724 so that if the button 442 were inadvertently pushed at any time other than whenever the transcriber's carriage is at the extreme right limit of its travel, no operation would result.

The responsibility of resetting the equipment for further dictation and transcription is rightfully the transcriber's inasmuch as she is the person who will most likely know whether or not all the material dictated on the record has been transcribed. Depression of the button 442 under the proper conditions completes circuit 1724 as previously described and energizes the resetting relay RS.

The resetting operation may be started under two separate conditions. The first is the condition when the dictator's carriage has been left somewhere along the center of the record so that the position registering contacts 1302 and 1304 are open. The other condition is when the dictator's carriage has been left at the extreme right position so that the contacts 1302 and 1304 of the position registering device are closed.

Let us first consider the operation in the first case when the contacts 1302 and 1304 of the position registering device are open. It will be seen that as soon as the resetting relay RS is energized by the depression of the button 442, it establishes its own holding circuit 1726 which extends from the operation bus 1520 to the resetting relay RS and includes normally closed contacts of the left auxiliary limit relay LAL and normally open contacts of the resetting relay RS. Inasmuch as the left auxiliary limit relay LAL is de-energized except at such time as the dictator's carriage is further to the left than the normal left recording limit, the contacts LAL included in circuit 1726 will be closed. Thus it will be seen that it is only necessary for the operator to depress the button 442 momentarily to start the operation. The operation from this point is fully automatic, requiring no attention from either the dictating or the transcribing operator.

As soon as the resetting relay RS is energized, the dictating operator will be apprised of the fact that the resetting operation has started by the darkening of the dial light 48. It will be remembered that the dial light 48 is supplied from the operation bus 1520 by circuit 1580 which also includes a normally closed contact of the resetting relay RS. The transcriber's indicating light 434 is included in a similar circuit 1582 which, as previously explained, includes a normally closed contact of the resetting relay RS. We have also included the transcriber's indicating light 444 in a circuit 1728 which includes a normally open contact of the resetting relay RS. The transcribing operator will therefore also be apprised of the fact that the resetting operation has begun by the darkening of the dial light 434 and the illumination of the dial light 444.

We have also included a normally open contact of the relay RS in a circuit 1604 which extends from the operation bus 1520 to contact 1290 of the differential switch means. It will be seen that energization of the resetting relay RS will close the RS contacts contained in circuit 1604 and thus energize the dictator's right travel relay DRT and the operation bus 1520 through circuit 1606. It will also be noted that we have provided a normally closed contact of the resetting relay RS in circuit 1602 which supplies the differential switch means so that at the beginning of the resetting operation the differential switch means is disconnected from the operation bus 1520 so that should the contacts 1288 and 1290 or 1288 and 1292 become closed during the resetting operation, said operation will be undisturbed.

Thus it is seen that upon the energization of the resetting relay RS, the dictator's right travel relay DRT is energized. Energization of the dictator's right travel relay DRT, as has been heretofore shown, causes the dictator's recording-reproducing units to travel to the right at high speed. This travel to the right will continue until the said units reach the point of farthest advance at which time the position registering contacts 1302 and 1304 in circuit 1574 close to energize the position registering relay PR. Energization of the position registering relay PR then opens circuit 1606 by virtue of the position registering relay contacts contained therein, thus de-energizing the dictator's right travel relay DRT and stopping the high speed travel to the right.

Referring to circuit 1598 which extends from the operation bus 1520 to the dictator's left travel relay DLT and includes normally open contacts of the position registering relay PR, the resetting relay RS, and normally closed contacts of the left auxiliary limit relay LAL, it will be seen that energization of the position registering relay will complete circuit 1598 so as to energize the dictator's left travel relay DLT. This is by virtue of the fact that the resetting relay RS contacts contained in circuit 1598 are closed. Completion of circuit 1598 in turn energizes the dictator's left travel relay DLT and causes the dictator's recording-reproducing unit to travel to the left in a manner heretofore described.

We have included the auxiliary resetting relay RSX in a circuit 1730 which extends from the operation bus 1520 and includes normally open contacts of the position registering relay PR and the resetting relay RS. We have also provided a holding circuit which extends from the operation bus 1520 to the auxiliary resetting relay RSX and includes normally open contacts of said relay and normally closed contacts of the left recording limit relay LRL. We have also connected the position registering solenoid 1310 in a circuit 1734 which extends from the operation bus 1520 and includes a normally open contact of the auxiliary resetting relay RSX.

Referring to circuit 1730, it will be seen that the energization of the resetting relay RS and the subsequent energization of the position registering relay PR will energize the auxiliary resetting relay RSX.

The auxiliary resetting relay RSX will then establish its own holding circuit 1732 through contacts of the auxiliary resetting relay RSX and normally closed contacts of the left recording limit relay LRL.

We have provided a means during the resetting operation whereby the position registering mechanism may be returned to the beginning of the record during the period of high speed travel to the left.

Referring to circuit 1734 it will be seen that energization of the auxiliary resetting relay RSX will energize the solenoid 1310 from the operation bus 1520. Remembering that the auxiliary resetting relay RSX closes only at the time the contacts of the position registering relay PR are closed, it will be seen that the armature of the solenoid 1310 will be lifted only when the armature is behind the block of the position registering mechanism. Thus it will be seen that as the carriage travels to the left or toward the beginning of the record the position registering mechanism is carried along with the dictator's carriage by virtue of the drive means established by the armature of the solenoid 1310 extending upward so as to engage the rearward face of said block. This means of returning the position registering mechanism is identical with that described in connection with the machine for recording on a wax medium.

Referring to circuit 1576, it will be seen that we have provided contacts of the auxiliary resetting relay RSX in a circuit which parallels the position registering contacts 1302 and 1304, so that as soon as the auxiliary resetting relay RSX is energized, circuit 1576 is completed so as to energize the position registering relay and keep same energized as long as the auxiliary resetting relay RSX is energized, regardless of whether the position registering contacts 1302 and 1304 may or may not be open. Thus it is seen that as the carriage travels to the left at high speed the relay RSX is kept energized through circuit 1730 even though the circuit 1732 may be momentarily interrupted at the time the dictator's carriage reaches the left recording limit.

This high speed travel to the left will continue until the left auxiliary limit relay contacts contained in circuit 1598 open to de-energize the dictator's left travel relay DLT. The left auxiliary limit relay contacts open whenever the left auxiliary limit relay is energized by the closing of contacts 1272 and 1278 in circuit 1564. It will be remembered in connection with the mechanical specifications that the erasing units 1176—1178, 1214—1216 and 1222—1224 are positioned ahead of the recording units with which they are associated. The left auxiliary limit is to the left of the ordinary left recording limit a sufficient distance so that when the carriages have reached said left auxiliary limit the aforementioned erasing units are in a position to erase the first part of the previously recorded material.

By referring to circuit 1726 it will be seen that at this time the resetting relay RS is de-energized by the opening of the LAL contacts in circuit 1726. This then opens circuits 1598 and 1604 which stop the automatic operation of the dictator's travel relays and restores the normal operation through circuit 1602 to the differential switch.

It will also be noted that we have provided a contact of the auxiliary resetting relay RSX in a circuit 1585 paralleling the circuit 1584 which includes contacts of the dictator's foot switch 10. Thus it will be seen that upon energization of the auxiliary resetting relay, circuit 1585 to the dictator's foot switch relay DFSR will be partially completed. It will be noted however that during the high speed travel to the right and to the left, the dictator's foot switch relay DFSR is prevented from closing by virtue of the normally closed contacts of the dictator's left travel relay DLT and the dictator's right travel relay DRT contained in the supply circuit thereto. However, upon conclusion of the high speed travel to the left, the dictator's foot switch relay will be energized as soon as the recording medium has rotated sufficiently far to energize the dictator's synchronizing relay RRD. This will then complete circuit 1585 so as to energize the dictator's foot switch relay from the operation bus 1520.

As has been heretofore explained, energization of the dictator's foot switch relay DFSR causes the dictator's carriage to advance along the record at recording speed.

It will be further noted that the position registering relay PR is maintained energized by virtue of the auxiliary resetting relay contacts contained in circuit 1576. Thus it is seen that the various erasing units supplied with direct current by circuits 1558, 1670 and 1706 are energized to erase any of the recorded material which may lie at this point. This slow speed travel to the right continues as long as the auxiliary resetting relay RSX is kept energized.

Referring to circuit 1732, it will be seen that as soon as the carriage has advanced to the right sufficiently far to reach the left recording limit, circuit 1732 will be opened thereby de-energizing the auxiliary resetting relay RSX. De-energization of the relay RSX will then interrupt circuit 1585, de-energizing the dictator's foot switch relay DFSR and stopping the slow speed travel to the right. At the same time circuit 1576 is opened so that the position registering relay PR may function in the usual manner.

Let us now consider the operation when the transcribing operator depresses the push button 442 and the dictator's carriage is at a point to the right sufficiently far for the position registering contacts 1302 and 1304 to be closed. As has been heretofore described the depression of the push button 442 is effective in energizing the resetting relay RS. This is effective in starting the sequence of operation at a point corresponding to the point in the previously described sequence when the contacts 1302 and 1304 close.

It will be seen that the circuit 1598 supplying the dictator's left travel relay DLT will be closed by virtue of the fact that the position registering relay contacts PR contained therein are closed so as to energize said relay, and that the dictator's right travel relay DRT will not be energized because circuit 1600 is open. In the same manner, by referring to circuit 1730 it is seen that upon the energization of the resetting relay RS, the auxiliary resetting relay RSX will also be energized. This results from the fact that the position registering relay contacts PR contained in circuit 1730 were closed at the time the push button 442 was depressed.

The dictator's carriages therefore begin to travel to the left at high speed and the resetting operation then continues to completion as previously described.

Summarizing briefly, the resetting operation is started by the depression of the resetting push button 442 which, under proper conditions, causes the resetting relay RS to be energized. This supersedes all normal operation of the machine. If the dictator's carriages are midway of the recording medium, a primary operation is started wherein the carriages travel to the right at high speed until the position registering contacts 1302 and 1304 close. The closing of these contacts starts the second portion of the sequence, in which the carriages travel to the left at high speed until the left auxiliary limit is reached. A third operation is then begun which causes the carriages to advance at recording speed so as to erase the first part of the previously recorded material. The recording units are then placed in a position to begin recording on a freshly polarized recording medium, and all circuits are conditioned for normal operation.

In case the position registering contacts 1302 and 1304 are closed due to the carriages being at the point at which the last of the dictated material was recorded, the primary operation is dispensed with and the sequence begins with the secondary operation.

This automatic resetting operation is very similar to the shaving operation which has been described in connection with the machine for recording on a wax medium, and accomplishes the same results, although in this case we do not actually mechanically remove any of the material from the record. We merely reset the system so that the old recording may be erased by an erasing unit as the new dictation continues. Inasmuch as the dictator cannot dictate on a previously dictated portion of the record unless the position registering contacts 1302 and 1304 are closed, it is obvious that he will be unable to go back to the beginning of the record and dictate on that portion thereof unless the transcribing operator has depressed the resetting button so as to start the sequence anew.

We have shown how our extremely adaptable and flexible system of remote control for a dictating machine may be used with a second type of machine which operates to record on a recording medium which differs materially from that previously described, and records on said medium in a manner unlike that previously described. It will be noted when using the control system of our invention, that the operator need not know the type of machine upon which he is operating, inasmuch as the control devices operate in an identical manner on various types of machine. The dictating machine 2 which we have provided may be any one of a plurality of types of dictating machines, and we are not limited to the types illustrated. In referring hereinafter to the dictating machine 2, it is understood that we comprehend the use of any dictating machine which may be adapted to record in various manners on different types of recording medium.

The dictating machine 2 of our invention is adapted to be controlled in a novel manner by a plurality of operators operating independently on a single recording medium. This control means, when operated with a machine of our invention, allows a plurality of independently operating operators to perform the three functions now accomplished by the use of a commercial dictating machine, transcribing machine, and a record reconditioning or shaving machine.

It further falls entirely within the scope of this invention to provide a plurality of systems and equipment which may be operated from a plurality of control stations by a plurality of dictating and transcribing operators and which may be arranged to function at various points along a single recording medium. This is made possible by providing a continuously rotating recording medium and by providing means whereby the recording and/or reproducing units may be independently placed in an operative condition relative to the recording medium.

This allows the use of a recording medium which has a much higher inertia than those used in the type of machine in which pauses in the dictation and transcription are accomplished by starting and stopping the rotation of the recording medium. This permits the use of a recording medium larger than those used at present, and thus much more dictation may be recorded on a single recording medium of this type. It will also be apparent that the provision of a system which allows the use of a recording medium with high inertia also allows the use of a disk shaped medium with numerous advantages which will be readily apparent to one skilled in the art to which this invention appertains.

In connection with this type of recording medium, it will be noted that we have provided a novel means for compensating for pauses in the dictation and transcription, and have also provided a novel means for synchronizing the operation of the translation means and the rotation of the recording medium.

We have also provided a novel means of controlling the operation of the dictating machine of our invention whereby the position of the operators with respect to the machine is not important. That is to say, the machine of our invention may be operated in the manner set forth by a plurality of operators situated remotely from the machine. This remote operation provides means of performing all of the functions required on a dictating machine of our invention and includes means for indicating the various functions being performed by the machine. In this connection it will be noted that the use of a very large record requires an indicating means for indicating the position of the translation means with respect to the length of the recording medium which will furnish indications of a high order of accuracy. We have provided a novel means of providing this indication; said means providing indications with an accuracy which surpasses that obtainable with the systems at present known to the art.

We have simplified the operation of the dictating machine of our invention by providing a novel control means in the form of a single device which operates to perform the major operations on the machine. In the forms shown, we have utilized the self-synchronous devices in a novel manner to provide this type of control. In the machine of our invention, a single motion of the control device is effective in performing the function which is desired at the time the control device was operated. Through the use of the novel control means of our invention, the operator is enabled to preselect the portion of the recording medium upon which he wishes the machine to operate. It is also possible when using the novel control means of our invention to preselect the operation to be performed by the translation means. That is to say, use of the control means of our invention makes it possible for the operator to control in advance of the operation whether the machine shall be conditioned to record dictation or reproduce recorded dictation from the recording medium.

When using the control means of our invention, it is not necessary for the operator to know the exact operation which takes place in the machine nor which direction of movement the recording-reproducing devices should make relative to the recording medium. This is automatically taken care of in our machine and it is only necessary for the operator to move the control device in the direction indicated by one of two arrows which may be etched on the dial and appropriately labeled "Playback" and "Dictate."

If the operator turns the control knob in the direction indicated by the arrow labeled "Playback," the machine will automatically be conditioned for reproducing at the point indicated by the pointer attached to the control knob. If on the other hand, the operator turns the control knob in the direction indicated by the arrow labeled "Dictate," the machine will automatically be conditioned for recording at the point where the last of the dictated material was recorded.

In connection with the novel control means of our invention, it should also be noted that we have combined into this single device an indicating means which operates to indicate to the operator the relative position of the translation means with respect to the length of the record. This combination allows the use of a preselection controlling system as set forth hereinbefore.

We have, in the machine of our invention, provided a novel means whereby a dictating operator may create, and cause to be retained, certain conditions which operate to register portions of the recording medium which said operator may wish to call to a transcribing operator's attention. These may include portions in which an error was made, or the end of a given series of dictation such as an end of a letter.

We have also provided a novel system for interpreting the retained conditions so that they may be easily understood by the transcribing operator. We have also provided a novel means for indicating remotely to the transcribing operator the interpretations of the aforementioned retained conditions. Taken in combination, it will be seen that we have provided a means whereby a dictating operator situated remotely from the machine may cause indications to be transmitted to a transcribing operator also situated remotely from the machine. These transmitted indications may be used to indicate pertinent portions of the recording such as the location of an error or the end of a given series of dictation.

It will thus be noted that the machine of our invention performs in a novel manner all of the functions now provided in a conventional dictating system. In addition, however, our invention provides additional novel features in connection with the indication of the location of errors and the length of the dictated material. The system of our invention, in addition to indicating the location of the aforementioned portions of the recording medium, operates in a novel manner to indicate to a transcribing operator the relative amount of recorded dictation which would normally be transcribed before the aforementioned portions are encountered.

In addition to indicating to a transcribing operator the location of pertinent portions of the recording medium with respect to the portion she may be transcribing at a given instant, we have provided a novel means whereby the location of sucessive portions of the recording medium is remotely indicated to said operator in succession as needed.

The use of a means of creating, and causing to be retained, a condition the location of which is a function of the location of a pertinent portion of the recording medium, is believed to be novel per se and not dependent upon the novel interpreting and indicating means of our invention for novelty. It may well be possible to utilize the aforementioned condition creating and retaining means for providing indications of the type described to a transcribing operator if said operator is positioned where she may readily see the condition retaining means.

As hereinbefore stated in connection with the equipment discussed above, it falls within the scope of this invention to combine the condition creating means with the translation means used for recording speech. In the same manner the condition retaining means and the recording medium may also be combined into a single device.

We have provided a second type of control means for controlling the operation of the machine; this control means finding particular utility when operated by a transcribing operator. This control means, as hereinbefore stated, comprises three foot-operated control devices. Depression of the center control device is effective in causing the recorded dictation to be reproduced as sound. Depression of either of the side devices causes the transcriber's translation means to be moved in a corresponding direction over the surface of the recording medium at high speed.

The machine of our invention also includes a new and novel means of automatically conditioning the recording medium for the recording of further dictation. In the machine of our invention the recording medium is mounted semi-permanently so that it need not be removed from the machine during the life of said medium. The machine of our invention therefore provides a novel means of conditioning said recording medium for the recording of further dictation and utilizes the same mandrel for this operation as is used for the recording and reproducing operation.

The use of the same mandrel for the conditioning and the recording operations, in combination with the fact that the guide means for guiding the conditioning means is contoured such that the projected contours thereof are congruent with the contours of the guide means for guiding the translation means, allows the use of a translation means which is supported for operation in a novel manner. That is to say, the loosely suspended type of translation means as used at present may be dispensed with and a rigid type of mounting as described hereinbefore may be used. As hereinbefore explained, this eliminates many defects in the present recording systems. This novel means of supporting the translation means insures that the operating member thereof always contacts the record, when conditioned for operation, in the most advantageous manner. In the first form of our invention illustrated hereinbefore this permits the cutting stylus to penetrate the recording medium a predetermined and unvarying depth. In the second form of our invention, after an initial adjustment such refinement is unnecessary since the recording medium is not mechanically altered by either the recording or conditioning operations.

The record conditioning equipment of our invention operates in a novel manner and is fully automatic in its operation. We have provided control means whereby the record conditioning operation may be initiated from a point remote from the machine. This control means and the machine cooperate in a novel manner; such that upon operation of the control device, the conditioning operation is started and the other control devices are rendered inoperative. After operation of the controlling means to start the conditioning operation, said operation is then automatically continued until completed, at which time normal control of the machine is reestablished.

We have provided other novel features of mechanical construction and electrical connections of the equipment. Certain of these novel features and constructions, together with certain others, will be more fully set forth in connection with the appended claims.

From the foregoing description, taken in connection with the accompanying drawings, advantages of construction and methods of operation will be readily understood by those skilled in the art to which the invention appertains; and while we have described the principle of operation, together with the devices which we now consider to be the best embodiments thereof, we desire to have it understood that the devices shown are merely illustrative, and that such changes may be made as desired, as fall within the scope of the appended claims.

We claim as our invention:

1. In a system of office dictation and transcription, the combination of: a recording station comprising a recording medium, a recording means operable to record on said recording medium material for record, and a reproducing means operable to reproduce said recorded material; means for continuously moving said recording medium relative to said recording means and said reproducing means to record and reproduce said material; a dictating station remote from said recording station having transmitting means thereat; means coupling said transmitting means and said recording means to transmit to said recording means material for record; a transcribing station remote from said recording station and remote from said dictating station having receiving means thereat; means coupling said receiving means and said reproducing means for reproducing at said transcribing station material from said recording station; drive mechanism for causing said recording means and said reproducing means to independently traverse the recording medium; dictating control means at said dictating station for controlling said drive mechanism to selectively position said recording means at any point along said recording medium for recording material thereat; and transcribing control means at said transcribing station for independently controlling said drive mechanism for positioning said reproducing means at any selected point along said recording medium independently of the position of said recording means, whereby said reproducing means may reproduce recorded material from any portion of said recording medium independently of whether or not said recording means is then operating to record material upon some other portion of said recording medium.

2. In a system of office dictation and transcription, the combination of: a recording station comprising a recording medium, a recording means operable to record on said recording medium material for record, and a reproducing means operable to reproduce said recorded material; means for continuously moving said recording medium relative to said recording means and said reproducing means to record and reproduce said material; dictating actuating means for rendering said recording means operable and non-operative; transcribing actuating means for rendering said reproducing means operable and non-operative; a dictating station remote from said recording station having transmitting means thereat; means coupling said transmitting means to said recording means to transmit to said recording means material for record; a transcribing station remote from said recording station and remote from said dictating station having receiving means thereat; means coupling said receiving means with said reproducing means to transmit reproduced material from said recording station to said transcribing station; drive mechanism for causing said recording means and reproducing means to independently traverse said recording medium; dictating control means at said dictating station for controlling said drive mechanism to selectively position said recording means at any point along said recording medium and for actuating said dictating actuating means; and a separate control means at said transcribing station for controlling said drive mechanism to independently position said reproducing means at any selected point along said recording medium and for actuating said transcribing actuating means independently of the position of the recording means therealong, whereby reproduction of said recorded material may be accomplished at the transcribing station simultaneously with and independently of the operation of said recording means.

3. In a system of office dictation and transcription, the combination of: a recording station comprising a recording medium, a recording means operable to record upon said recording medium material for record, a reproducing means operable to reproduce said recorded material, and a second recording medium and means associated therewith and coordinated with said first named recording means to record on said second recording medium material conveying information relating to the material recorded on said first recording medium; a dictating station remote from said recording station having transmitting means thereat; means coupling said transmitting means and said recording means to transmit to said first recording medium material for record; means operable from said dictating station for transmitting to said second recording means for information conveying material; a transcribing station remote from said recording station and said dictating station and having receiving means thereat; means coupling said receiving means and said reproducing means for reproducing at said transcribing station material from said first recording medium; means at said transcribing station for receiving thereat the information conveyed by the material recorded on said second recording medium; and means operable from the recording station for transmitting to the transcribing station said information in advance of the reproduction at the transcribing station of the material from said first recording medium to which said information relates.

4. In a system of office dictation and transcription, the combination of: a recording station comprising a recording medium, a recording means operable to record on said recording medium material for record, a reproducing means operable to reproduce said recorded material; a dictating station remote from said recording station having transmitting means thereat; means coupling said transmitting means and said recording means to transmit to said recording means material for record; a transcribing station remote from said recording station and remote from said dictating station having receiving means thereat; means coupling said receiving means and said reproducing means for reproducing at said transcribing station material from said recording station; a second recording medium at said recording station; means operable from said dictating station for transmitting to said second recording medium material conveying information relating to material recorded on said first recording medium; and means at said transcribing station coupled to said second recording medium for visually registering at said transcribing station the information conveyed by said material recorded on said second recording medium.

5. In a dictating machine, the combination of: a recording medium; a registering mechanism for denoting predetermined information relative to a plurality of predetermined areas along said recording medium; a member placeable in a position corresponding to the location of one of said areas denoted by said registering mechanism; a translation means operable between said recording medium and a propagating medium to transmit undulations existing in one of said mediums to the other of said mediums; means mounting said translation means and said recording medium for movement relative to each other toward and away from the location of said placeable member; an indicating means; and a coupling means for coupling said indicating means to said translation means and said placeable member for operating said indicating means to indicate the extent of said movement of said translation means relative to said placeable member.

6. In a dictating machine, the combination of: a recording medium; a translation means operable between said recording medium and a propagating medium to transmit undulations existing in one of said mediums to the other of said mediums; means mounting said translation means for movement along said recording medium; a primary electric potentiometer having a contact which is movable to a position corresponding to the location of a predetermined point on said recording medium; a secondary electrical potentiometer having a contact which is movable therealong by said translation means to a position corresponding to the location of said translation means relative to said recording medium; and a potential responsive device connected between said contacts of said primary and said secondary electrical potentiometers for indicating the displacement of said predetermined point from the location of said translation means.

7. In a dictating machine, the combination of: a recording medium; a translation means operable between said recording medium and a propagating medium to transmit undulations existing in one of said mediums to the other of said mediums; means mounting said translation means and said recording medium for movement relative to each other; a primary measuring member extending in a direction to measure the displacement of said translation means along said medium from a predetermined reference point; a plurality of registering members each of which is identified with the location of a predetermined area of said recording medium; means disposing said registering members in locations corresponding to location of said areas of said recording medium; means mounting said members for movement from a non-registering to a registering position for denoting predetermined information relative to said recording medium; pointing means mounted for movement relative to said registering members to a position corresponding to the location of any one of said registering members occupying registering positions; a secondary measuring member extending in a direction to measure the displacement of said pointing means from said predetermined reference point; an indicating means coupled to said measuring members to indicate the difference between the displacement of said translation means and the displacement of said pointing means from said predetermined reference point.

8. In a dictating machine, the combination of: a recording medium; a translation means operable between said recording medium and a propagating medium to transmit undulations existing in one of said mediums to the other of said mediums; means mounting said translation means and said recording medium for movement relative to each other; a primary electrical potentiometer having a contact which is movable to a position corresponding to the displacement of a predetermined point on said recording medium from a predetermined reference point; a plurality of registering members each of which is identified with the location of a predetermined area of said recording medium; means disposing said registering members in locations corresponding to the location of said areas of said recording medium; means mounting said members for movement from a non-registering to a registering position for denoting predetermined information relative to said recording medium; pointing means mounted for movement relative to said registering members to a position corresponding to the location of any one of said registering members occupying said registering positions; a secondary electrical potentiometer having a contact movable to a position corresponding to the location of said pointing means relative to said predetermined reference point, and a potential responsive device connected between said contacts of said primary and said secondary electrical potentiometers for indicating the difference between the displacement of said translation means and displacement of said pointing means from said predetermined reference point.

9. In a dictating machine, the combination of: a record tablet; a recording means operable to transmit to said record tablet material for record; a recording medium; means for identifying predetermined areas of said recording medium with predetermined areas of said record tablet; altering means associated with said recording medium for altering any selected areas of said recording medium from a normal to an abnormal condition to thereby denote predetermined information relative to the material recorded on corresponding areas of said record tablet; reproducing means responsive to the abnormal condition of said recording medium for indicating the alteration of said selected areas thereof to thereby convey the predetermined information denoted by said altered areas; restoring means associated with said recording medium for restoring to said normal condition said areas of said recording medium previously altered to said abnormal condition; and control means for rendering the altering means inoperable and said restoring means operable.

10. In a dictating machine, the combination of: a recording medium; a registering mechanism for denoting predetermined information relative to a plurality of predetermined areas along said recording medium; a member placeable in a position relative to said registering mechanism corresponding to the location of one of said areas denoted by said registering mechanism; a translation means operable between said recording medium and a propagating medium to transmit undulations existing in one of said mediums to the other of said mediums; means mounting said translation means for movement relative to the recording medium to a position coincident with the location of said movable member; a drive means for moving said movable member and said recording medium relative to each other; and a control means cooperating with said movable member and said translation means for starting said drive means, said control means being responsive to movement of said translation means to said position of coincidence.

11. In a dictating machine, the combination of: a recording medium having an area along which material may be recorded; a translation means operable between said recording medium and a propagating medium to transmit undulations existing in one of said mediums to the other of said mediums, said translation means being movable over the area of said recording medium; a member movable along said recording medium to a position corresponding to any selective area of said recording medium; a drive means for moving said member; and an actuating means operable to actuate said drive means, said actuating means being operably connected between said member and said translation means for operation when said member and said translation means are coincident.

12. In a dictating machine, the combination of: a recording medium; a translation means operable between said recording medium and a propagating medium to transmit undulations existing in one of said mediums to the other of said mediums; means mounting said translation means for movement relative to said recording medium; a drive means for causing relative movement between said translation means and said recording medium; control means for controlling said drive means; means mounting said control means for movement at will to start the operation of said drive means; and means coupling said drive means to said control means to move said control means, when unrestrained, in proportion to the movement of said drive means to indicate the location of said translation means.

13. In a dictating machine, the combination of: a recording medium; a translation means operable between said recording medium and a propagating medium to transmit undulations existing in one of said mediums to the other of said mediums; means mounting said translation means for movement relative to said recording medium; a drive means for causing relative movement between said translation means and said recording medium; indicating means coupled to said drive means for normally indicating the location of said translation means; means for moving said indicating means at will; and a control means cooperating with said drive means and responsive to movement of said indicating means to a position displaced from said indicating position for starting said drive means.

14. In a dictating machine, the combination of: a recording medium; a translation means operable between said recording medium and a propagating medium to transmit undulations existing in one of said mediums to the other of said mediums; means mounting said translation means for movement relative to said recording medium; a drive means for causing relative movement between said translation means and said recording medium; indicating means coupled to said drive means for normally indicating the location of said translation means; means for moving said indicating means at will; and a control means cooperating with said drive means and responsive to movement of said indicating means to a position displaced from said indicating position for moving said translation means toward correspondence with the then position of said indicating means.

15. In a dictating machine, the combination of: a recording medium; a translation means operable between said recording medium and a propagating medium to transmit undulations existing in one of said mediums to the other of said mediums; means mounting said translation means for movement relative to said recording medium; a drive means for moving said translation means relative to said recording medium; indicating means coupled to said drive means for normally indicating the location of said translation means; means for moving said indicating means at will to a position corresponding to any one of a plurality of predetermined points on said recording medium; and a control means cooperating with said drive means and responsive to movement of said indicating means to a position corresponding to any selected one of said points for moving said translation means to correspondence with the then position of said indicating means.

16. In a dictating machine, the combination of: a recording medium; a recording means operable to transmit to said recording medium material for record; drive means for advancing said recording means and said recording medium relative to each other to record said material, and for retracting; means operated by said drive means and in proportion to said advancing movement to define the point of farthest advance of said recording means; indicating means coupled to said drive means for normally indicating the location of said recording means; means for moving said indicating means at will to a position displaced from said indicating position; control means cooperating with said drive means and responsive to movement of said indicating means to a displaced position in advance of said point defined by said point defining means for moving said translation means toward correspondence with the then position of said indicating means; and means operatively responsive to arrival of said translation means at a position coincident with the point defined by said point defining means for stopping said drive means.

17. In a dictating machine, the combination of: a recording medium; a recording means operable to transmit to said recording medium material for record; shift means for moving said recording means relative to said recording medium between a recording and a non-recording position; drive means for advancing said recording means and said recording medium relative to each other to record said material, and for retracting; means operated by said drive means and in proportion to said advancing movement to define the point of farthest advance of said recording means; indicating means coupled to said drive means for normally indicating the location of said recording means; means for moving said indicating means at will to a position displaced from said indicating position; control means cooperating with said drive means and responsive to movement of said indicating means to a displaced position in advance of said point defined by said point defining means for moving said recording means toward correspondence with the then position of said indicating means; and means cooperating with said shift means and with said drive means and operatively responsive to arrival of said recording means at a position coincident with the point defined by said point defining means for stopping said drive means and for actuating said shift means to shift said recording means to said recording position.

18. In a dictating machine, the combination of: a recording medium; a translation means operable between said recording medium and a propagating medium to transmit undulations existing in one of said mediums to the other of said mediums; means mounting said translation means for movement relative to said recording medium; a drive means for causing relative movement between said translation means and said recording medium; indicating means coupled to said drive means for normally indicating the location of said translation means; moving means for moving said indicating means at will to a non-indicating position displaced from said indicating position; a control means cooperating with said drive means and responsive to movement of said indicating means to a position displaced from said indicating position for moving said translation means toward correspondence with the then position of said indicating means; and locking means cooperating with said moving means and operatively responsive to said movement of said indicating means to said non-indicating position to lock said indicating means in said non-indicating position until said translation means has moved to a position coincident with said non-indicating position.

19. In a dictating machine, the combination of: a recording medium; a translation means operable when connected for reproducing to transmit undulations existing in said recording medium to a propagating medium, and operable when connected for recording to transmit undulations existing in said propagating medium to said recording medium; means mounting said translation means for movement relative to said recording medium; a drive means for causing relative movement between said translation means and said recording medium; connecting means coupled to said translation means for disconnecting said translation means and for connecting said translation means for recording and for reproducing; indicating means coupled to said drive means and said connecting means for indicating the state of connection of said translation means and for indicating the location of said translation means relative to said recording medium; means for moving said indicating means at will to a position displaced from said indicating position; and control means cooperating with said drive means and said connecting means and responsive to movement of said indicating means for operating said connecting means and said drive means to change the state of connection of said translation means and move said translation means toward correspondence with the then position of said indicating means.

20. In a dictating machine, the combination of: a recording medium; a translation means operable when connected for reproducing to transmit undulations existing in said recording medium to a propagating medium, and operable when connected for recording to transmit undulations existing in said propagating medium to said recording medium; means mounting said translation means for movement relative to said recording medium; a drive means for relative movement between said translation means and said recording medium; connecting means coupling said translation means for disconnecting said translation means and for connecting said translation means for recording and reproducing; indicating means coupled to said drive means and said connecting means for indicating state of connection of said translation means and for indicating the location of said translation means relative to said recording medium; means for moving said indicating means at will to a position displaced from said indicating position; control means cooperating with said drive means and said connecting means and responsive to movement of said indicating means for operating said drive means to move said translation means to correspondence with the then position of said indicating means; and means operatively responsive to arrival of said translation means at said correspondent position for changing the state of connection of said translation means.

21. In a dictating machine, the combination of: a recording medium; a translation means operable between said recording medium and a propagating medium to transmit undulations existing in one of said mediums to the other of said mediums; means mounting said translation means for movement relative to said recording medium; a drive means for causing relative movement at a given rate between said translation means and said recording medium; indicating means coupled to said drive means for normally indicating the location of said translation means; means coupling said indicating means to said translation means to permit movement of said indicating means relative to said recording medium at a rate higher than said rate of movement of said translation means; and a control means cooperating with said drive means and responsive to movement of said indicating means to a position displaced from said indicating position for starting said drive means.

22. In a dictating machine, the combination of: a recording medium; a translation means operable between said recording medium and a propagating medium to transmit undulations existing in one of said mediums to the other of said mediums; means mounting said translation means for movement relative to said recording medium; a drive means for causing relative movement at a given rate between said translation means and said recording medium; indicating means coupled to said drive means for normally indicating the location of said translation means; means coupling said indicating means to said translation means to permit movement of said indicating means relative to said recording medium at a rate higher than said rate of movement of said translation means; and a control means cooperating with said drive means and responsive to movement of said indicating means to a position displaced from said indicating position for moving said translation means toward correspondent with the then position of the indicating means.

23. In a dictating machine, the combination of: a recording medium; a translation means operable between said recording medium and a propagating medium to transmit undulations existing in one of said mediums to the other of said mediums; means mounting said translation means for movement relative to said recording medium; a drive means for causing relative movement between said translation means and said recording medium; indicating means; a resilient means for coupling said indicating means to said translation means for movement therewith to normally indicate the position of said translation means; means for moving said indicating means against the restoring force of said resilient means to a position displaced from the indicating position; means for maintaining said indicating means in said displaced position against said restoring force of said resilient means; and a control means cooperating with said drive means and responsive to action of said restoring force of said resilient means to start said drive means.

24. In a dictating machine, the combination of: a recording medium; a translation means operable between said recording medium and a propagating medium to transmit undulations existing in one of said mediums to the other of said mediums; means mounting said translation means for movement relative to said recording medium; a drive means for causing relative movement between said translation means and said recording medium; indicating means, a resilient means for coupling said indicating means to said translation means for movement therewith to normally indicate the position of said translation means; means for moving said indicating means against the restoring force of said resilient means to a position displaced from the indicating position; means for maintaining said indicating means in said displaced position against said restoring force of said resilient means; and a control means cooperating with said drive means and responsive to action of said restoring force of said resilient means to start said drive means to move said translation means toward correspondence with the then position of said indicating means.

25. In a dictating machine, the combination of: a recording medium; a translation means operable between said recording medium and a propagating medium to transmit undulations existing in one of said mediums to the other of said mediums; means mounting said translation means for movement relative to said recording medium; a drive means for causing relative movement between said translation means and said recording medium; an indicating means; a resilient means for coupling said indicating means to said translation means for movement therewith to normally indicate the position of said translation means; means for moving said indicating means against the restoring force of said resilient means to a position displaced from said indicating position; a restraining means for maintaining said indicating means in said displaced position against said restoring force of said resilient means; a control means cooperating with said drive means and responsive to action of said restoring force of said resilient means to start said drive means to move said translation means toward correspondence with the then position of said indicating means; and means responsive to arrival of said translation means at said point of correspondence to release said restraining means.

26. In a dictating machine, the combination of: a recording medium; a translation means operable between said recording medium and a propagating medium to transmit undulations existing in one of said mediums to the other of said mediums; means mounting said translation means for movement relative to said recording medium; a drive means for causing relative movement between said translation means and said recording medium; an indicating means; a resilient means for coupling said indicating means to said translation means for movement therewith to normally indicate the position of said translating means; means for moving said indicating means against the restoring force of said resilient means to a position displaced from said indicating position; a restraining means for maintaining said indicating means in said displaced position against said restoring force of said resilient means; a control means cooperating with said drive means and responsive to action of said restoring force of said resilient means to start said drive means to move said translation means toward correspondence with the then position of said indicating means; and means responsive to arrival of said translation means at said point of correspondence to stop said drive means.

27. In a dictating machine, the combination of: a recording medium; a recording means operable to transmit to said recording medium material for record; drive means for advancing said recording means and said recording medium relative to each other to record said material, and for retracting; means operated by said drive means and in proportion to said advancing movement to define the point of farthest advance of said recording means; indicating means; resilient coupling means for coupling said indicating means to said recording means for movement therewith to normally indicate the position of said recording means; means for moving said indicating means at will against the restoring force of said resilient means to a position in advance of said point defined by said point defining means; restraining means for maintaining said indicating means in said advanced position against said restoring force of said resilient coupling means; a control means cooperating with said drive means and responsive to action of said restoring force of said resilient means for moving said recording means toward correspondence with the then position of said indicating means; and means operatively responsive to arrival of said recording means at a position coincident with the point defined by said point defining means for stopping said drive means and for releasing said restraining means.

28. In a dictating machine, the combination of: a recording medium; a translation means operable between said recording medium and a propagating medium to transmit undulations existing in one of said mediums to the other of said mediums; means mounting said translation means for movement relative to said recording medium; a drive means for causing relative movement between said translation means and said recording medium; an indicating means; yieldable coupling means for coupling said indicating means to said translation means for movement therewith to normally indicate the position of said translation means; means for moving said indicating means to a position displaced from said indicating position and for causing said coupling means to yield; and a control means cooperating with drive means and responsive to yielding of said yieldable coupling means for starting said drive means.

29. In a dictating machine, the combination of: a recording medium; a translation means operable between said recording medium and a propagating medium to transmit undulations existing in one of said mediums to the other of said mediums; an erasing means for erasing undulations from said recording medium; actuating means for rendering said erasing means operative or non-operating; means mounting said translation means and said erasing means for movement relative to said recording medium; a drive means for causing relative movement between said translation means and said recording medium and between said erasing means and said recording medium; and control means cooperating with said drive means and said actuating means and movable to one position for simultaneously rendering said erasing means non-operating and starting said drive means, and movable to another position for simultaneously rendering said erasing means operative and stopping said drive means.

30. In a dictating machine, the combination of: a recording medium; a translation means operable between said recording medium and a propagating medium to transmit undulations existing in one of said mediums to the other of said mediums; an erasing means for erasing undulations from said recording medium; actuating means for rendering said erasing means operative or non-operating; a drive means for advancing said translation means relative to said recording medium; point defining means cooperating with said drive means and operated in proportion to said advancing movement for defining the point of farthest advance of said translation means; and control means cooperating with said point defining means and coupled to said actuating means for controlling the operation of said erasing means.

31. In a dictating machine, the combination of: a recording medium; a recording means having a stylus for cutting a sound track on said recording medium; means mounting said recording means for movement toward and away from the surface of said recording medium; shaving means operable to remove said sound track from said recording medium by removing a layer from said surface thereof; means mounting said shaving means for movement toward and away from the surface of said recording medium; gauging means for adjusting the spacing of said shaving means relative to the surface of said recording medium to determine the thickness of layer to be removed; means cooperating with said gauging means for adjusting the spacing of said recording means relative to said surface of said recording medium in accordance with the thickness of said layer to be removed by said shaving means.

32. In a dictating machine, the combination of: a rotatable recording medium; a translation means operable between said recording medium and a propagating medium to transmit undulations existing in one of said mediums to the other of said mediums; a drive means for rotating said recording medium; a feed screw for causing relative movement between said translation means and said recording medium; a disconnectible connecting means for coupling said feed screw and said drive means; a stylus attached to said translation means for describing a sound track upon said recording medium; means for disconnecting said connecting means to permit misalignment between said stylus and said sound track; and actuating means interposed between said feed screw and said drive means and cooperating with said connecting means for re-establishing alignment between said stylus and said sound track.

33. In a system of office dictation and transcription, the combination of: a recording station comprising a recording medium, a recording means operable to record on said recording medium material for record, and a reproducing means operable to reproduce said recorded material; a dictating station remote from said recording station having transmitting means thereat; means coupling said transmitting means to said recording means to transmit to said recording means material for record; a transcribing station remote from said recording station and remote from said dictating station having receiving means thereat; means coupling said receiving means with said reproducing means to transmit reproduced material from said recording station to said transcribing station; drive mechanism for causing said recording means and said reproducing means to independently traverse the recording medium; dictating control means at said dictating station for controlling said drive mechanism to selectively position said recording means at any point along said recording medium for recording material thereat; and transcribing control means at said transcribing station for independently controlling said drive mechanism for positioning said reproducing means at any selected point along said recording medium independently of the position of said recording means, whereby said reproducing means may reproduce recorded material from any portion of said recording medium independently of whether or not said recording means is then operating to record material upon some other portion of said recording medium.

34. In a system of office dictation and transcription, the combination of: a recording medium, a translation means operable between said recording medium and a propagating medium to transmit undulations existing in one of said mediums to the other of said mediums; a separate reproducing means for reproducing undulations recorded on said recording medium; drive mechanism for causing said translation means and said reproducing means to independently traverse said recording medium; a control means for actuating said drive mechanism to selectively position said translation means at any point along said recording medium; and a separate control means for actuating said drive mechanism independently of said first named control means to selectively position said reproducing means at any desired point along said recording medium independently of the position of the translation means therealong, whereby said reproducing means may reproduce recorded material from said recording medium independently of whether or not said translation means is then operating.

35. In a dictating machine, the combination of: a recording medium; a translation means operable between said recording medium and a propagating medium to transmit undulations existing in one of said mediums to the other of said mediums; means mounting said translation means for movement along said recording medium; measuring means, having length, extending from a reference point representative of a predetermined reference point on said recording medium; a member movable by said translation means along said measuring means representative of the movement of said translation means along said medium; pointing means; means mounting said pointing means for movement along said recording medium to a position indicating a predetermined portion of said medium; a second member movable by said pointing means along said measuring means representative of the movement of said pointing means along said medium; and indicating means coupled between said members to indicate the difference between the displacement of said translation means and the displacement of said pointing means from said predetermined reference point.

36. In a dictating machine, the combination of: a recording medium; a translation means mounted for movement relative to said recording medium and operable between said recording medium and a propagating medium to transmit undulations existing in one of said mediums to the other of said mediums; means mounting said translation means for movement along said recording medium; a plurality of registering members, each of said registering members being identified with the location of a predetermined area of said recording medium; means mounting said members for movement from a non-registering position to a registering position for denoting predetermined information relative to said recording medium; a measuring means having length extending from a reference point representative of a predetermined reference point on said recording medium; a member movable along said measuring means to a position therealong representative of the location of the area identified by any one of said registering members occupying registering positions; a member movable by said translation means along said measuring means representative of the movement of said translation means along said recording medium; and means coupled between said members to measure the displacement of said translation means from the location of said registering member.

37. In a dictating machine, the combination of: a recording medium; a translation means mounted for movement relative to said recording medium and operable between said recording medium and a propagating medium to transmit undulations existing in one of said mediums to the other of said mediums; means mounting said translation means for movement along said recording medium; a plurality of registering members, each of said registering members being identified with the location of a predetermined area of said recording medium; means disposing said registering members in locations relative to each other corresponding to the relative locations of said areas of said recording medium; means mounting said members for movement from a non-registering position to a registering position for denoting predetermined information relative to said recording medium; a measuring means having length extending from a reference point representative of a predetermined reference point on said recording medium; a member movable along said measuring means to a position therealong representative of the location of any one of said registering members occupying registering positions; a member movable by said translation means along said measuring means representative of the movement of said translation means along said recording medium; and means coupled between said members to measure the displacement of said translation means from the location of said registering member.

38. In a system of office dictation and transcription, the combination of: a recording station comprising a recording medium, a recording means operable to record upon said recording medium material for record, and a reproducing means operable to reproduce said recorded material; a dictating station remote from said recording station having transmitting means thereat; means coupling said transmitting means with said recording means to transmit to said recording means material for record; registering means at said recording station operable from said dictating station to distinguishably register a plurality of different selected items of information relating to the material recorded on said recording medium, said registering means being so coordinated with said recording means as to identify said items of information with that part of the recorded material disposed adjacent to the recording means at the time said registering means is operated; a transcribing station remote from said recording station and remote from said dictating station and having receiving means thereat; means coupling said receiving means with said reproducing means for reproducing at said transcribing station material from said recording station; and means at said recording station cooperating with said reproducing means and operable by said registering means to convey to said transcribing station the selected items of information registered by said registering means and in advance of the reproduction at the transcribing station of the recorded material to which said information relates, whereby the transcriber will be warned in advance of receiving the reproduced material that a correction or other information relating thereto is to be noted.

39. In a system of office dictation and transcription, the combination of: a recording station comprising a recording medium, a recording means operable to record upon said recording medium material for record, and a reproducing means operable to reproduce said recorded material; a dictating station remote from said recording station having transmitting means thereat; means coupling said transmitting means with said recording means to transmit to said recording means material for record; registering means at said recording station operable from said dictating station to distinguishably register a plurality of different selected items of information relating to the material recorded on said recording medium, said registering means being so coordinated with said recording means as to identify said items of information with that part of the recorded material disposed adjacent to the recording means at the time said registering means is operated; a transcribing station remote from said recording station and remote from said dictating station and having receiving means thereat; means coupling said receiving means with said reproducing means for reproducing at said transcribing station material from said recording station; means at said recording station cooperating with said reproducing means and operable by said registering means to convey to said transcribing station the selected items of information registered by said registering means and in advance of the reproduction at the transcribing station of the recorded material to which said information relates, whereby the transcriber will be warned in advance of receiving the reproduced material that a correction or other information relating thereto is to be noted; and means cooperating with said last-named means for denoting at the transcribing station the amount of material to be reproduced before that material to which the information relates will be reproduced.

RAY M. CHENOWETH.
EMMETT M. IRWIN.
WALTER P. HUNTLEY.